(12) United States Patent
Zilka

(10) Patent No.: US 8,190,692 B1
(45) Date of Patent: *May 29, 2012

(54) LOCATION-BASED MESSAGING SYSTEM, METHOD, AND COMPUTER PROGRAM PRODUCT

(75) Inventor: Kevin J. Zilka, Los Gatos, CA (US)

(73) Assignee: Boadin Technology, LLC, Newark, DE (US)

( * ) Notice: Subject to any disclaimer, the term of this patent is extended or adjusted under 35 U.S.C. 154(b) by 19 days.

This patent is subject to a terminal disclaimer.

(21) Appl. No.: 12/340,602

(22) Filed: Dec. 19, 2008

Related U.S. Application Data

(60) Provisional application No. 61/091,253, filed on Aug. 22, 2008.

(51) Int. Cl.
*G06F 15/16* (2006.01)

(52) U.S. Cl. ........ 709/206; 709/203; 709/204; 709/205; 709/207

(58) Field of Classification Search .................. 709/203, 709/204, 205, 206, 207, 217, 218, 219, 224, 709/225

See application file for complete search history.

(56) References Cited

U.S. PATENT DOCUMENTS

| | | | | |
|---|---|---|---|---|
| 4,356,589 A | 11/1982 | Mealing et al. | ........... | 15/320 |
| 5,404,443 A | 4/1995 | Hirata | ............... | 725/75 |
| 5,644,737 A | 7/1997 | Tuniman et al. | ............. | 715/810 |
| 5,895,464 A | 4/1999 | Bhandari et al. | ............... | 704/9 |
| 6,038,441 A | 3/2000 | Slaven et al. | ............... | 455/413 |
| 6,065,051 A | 5/2000 | Steele et al. | ................. | 709/219 |
| 6,073,143 A | 6/2000 | Nishikawa et al. | ........... | 715/207 |
| 6,199,157 B1 | 3/2001 | Dov et al. | ........... | 713/1 |
| 6,253,325 B1 | 6/2001 | Steele et al. | ................. | 713/201 |
| 6,314,458 B1 | 11/2001 | Steele et al. | ................. | 709/219 |
| 6,349,257 B1 | 2/2002 | Liu et al. | ....................... | 701/200 |
| 6,393,468 B1 | 5/2002 | McGee | ......................... | 709/218 |
| 6,397,086 B1 | 5/2002 | Chen | ........................... | 455/569 |
| 6,405,367 B1 | 6/2002 | Bryant et al. | ................. | 717/115 |
| 6,421,651 B1 | 7/2002 | Tedesco et al. | ................... | 705/8 |
| 6,430,537 B1 | 8/2002 | Tedesco et al. | ................... | 705/8 |
| 6,472,771 B1 | 10/2002 | Frese et al. | .................... | 307/10.1 |
| 6,542,812 B1 | 4/2003 | Obradovich et al. | ......... | 701/207 |
| 6,633,311 B1 | 10/2003 | Douvikas et al. | ............. | 345/731 |
| 6,650,948 B1 | 11/2003 | Atkinson et al. | ................ | 700/66 |
| 6,691,158 B1 | 2/2004 | Douvikas et al. | ............. | 709/219 |
| 6,697,730 B2 | 2/2004 | Dickerson | ..................... | 701/200 |
| 6,711,474 B1 | 3/2004 | Treyz et al. | ........................ | 701/1 |
| 6,782,240 B1 | 8/2004 | Tabe | ........................... | 455/66.1 |
| 6,829,532 B2 | 12/2004 | Obradovich et al. | ......... | 701/207 |
| 6,871,067 B2 | 3/2005 | Clark et al. | .................. | 455/428 |
| 6,885,874 B2 | 4/2005 | Grube et al. | .................. | 455/520 |
| 6,889,213 B1 | 5/2005 | Douvikas et al. | ............... | 705/67 |
| 6,892,201 B2 | 5/2005 | Brown et al. | ......................... | 1/1 |

(Continued)

OTHER PUBLICATIONS

Arrington, Michael, "Google Docs & Spreadsheets Launches" Oct. 10, 2006 Tech Crunch.

(Continued)

*Primary Examiner* — Barbara Burgess
(74) *Attorney, Agent, or Firm* — Patrick E. Caldwell, Esq.; The Caldwell Firm, LLC

(57) ABSTRACT

A system, method, and computer program product are provided for location-based messaging. In operation, a message to be communicated to at least one recipient is received. Furthermore, the at least one recipient is selected from a plurality of recipient candidates, based on a current location of the recipient candidates.

190 Claims, 74 Drawing Sheets

U.S. PATENT DOCUMENTS

| | | | |
|---|---|---|---|
| 6,934,697 B1 | 8/2005 | Warren | 707/1 |
| 6,952,730 B1 | 10/2005 | Najork et al. | 709/225 |
| 6,983,203 B1 | 1/2006 | Wako | 701/208 |
| 7,010,751 B2 | 3/2006 | Shneiderman | 715/764 |
| 7,017,109 B1 | 3/2006 | Douvikas et al. | 715/501.1 |
| 7,024,451 B2 | 4/2006 | Jorgenson | 709/203 |
| 7,031,724 B2 | 4/2006 | Ross et al. | 455/456.1 |
| 7,069,308 B2 | 6/2006 | Abrams | 709/218 |
| 7,117,254 B2 | 10/2006 | Lunt et al. | 709/218 |
| 7,133,687 B1 | 11/2006 | El-Fishawy et al. | 455/466 |
| 7,158,878 B2 | 1/2007 | Rasmussen et al. | 701/208 |
| 7,188,080 B1 | 3/2007 | Walker et al. | 705/26 |
| 7,188,153 B2 | 3/2007 | Lunt et al. | 709/218 |
| 7,197,531 B2 | 3/2007 | Anderson | 709/203 |
| 7,203,721 B1 | 4/2007 | Ben-Efraim et al. | 709/203 |
| 7,209,929 B2 | 4/2007 | Dominguez, Jr. et al. | 707/103 |
| 7,222,309 B2 | 5/2007 | Chupin et al. | 715/848 |
| 7,231,428 B2 | 6/2007 | Teague | 709/206 |
| 7,233,997 B1 | 6/2007 | Leveridge et al. | 709/229 |
| 7,284,197 B2 | 10/2007 | Lucovsky | 715/210 |
| 7,340,419 B2 | 3/2008 | Walker et al. | 705/27 |
| 7,373,338 B2 | 5/2008 | Thompson et al. | 707/3 |
| 7,392,132 B2 | 6/2008 | Matsuo | 701/207 |
| 7,428,454 B2 | 9/2008 | Shikano et al. | 701/36 |
| 7,451,161 B2 | 11/2008 | Zhu et al. | 707/104.1 |
| 7,478,078 B2 | 1/2009 | Lunt et al. | 707/1 |
| 7,516,191 B2 | 4/2009 | Brouk et al. | 709/217 |
| 7,526,440 B2 | 4/2009 | Walker et al. | 705/26 |
| 7,529,728 B2 | 5/2009 | Weissman et al. | 707/2 |
| 7,590,685 B2 | 9/2009 | Palmeri et al. | 709/203 |
| 7,590,701 B2 | 9/2009 | Panec et al. | 709/207 |
| 7,606,687 B2 | 10/2009 | Galbreath et al. | 703/3 |
| 7,634,505 B2 | 12/2009 | Chasman et al. | |
| 7,646,296 B2 | 1/2010 | Ohki | 340/539.13 |
| 7,669,123 B2 | 2/2010 | Zuckerberg et al. | 715/273 |
| 7,680,882 B2 | 3/2010 | Tiu et al. | 709/203 |
| 7,685,200 B2 | 3/2010 | Gunawardena et al. | 707/748 |
| 7,689,711 B2 | 3/2010 | Brouk et al. | 709/238 |
| 7,706,967 B2 | 4/2010 | Knockeart et al. | 701/119 |
| 7,721,328 B2 | 5/2010 | Boulos et al. | 726/6 |
| 7,725,492 B2 | 5/2010 | Sittig et al. | 707/784 |
| 7,725,605 B2 | 5/2010 | Palmeri et al. | 709/246 |
| 7,730,478 B2 | 6/2010 | Weissman | 717/171 |
| 7,734,608 B2 | 6/2010 | Fell et al. | 707/705 |
| 7,739,351 B2 | 6/2010 | Shkvarchuk et al. | 709/217 |
| 7,761,871 B2 | 7/2010 | Edwards et al. | 707/176 |
| 7,765,243 B2 | 7/2010 | Kedem | 707/822 |
| 7,769,142 B2 | 8/2010 | Selbie et al. | 379/68 |
| 7,774,366 B2 | 8/2010 | Fisher et al. | 707/784 |
| 7,779,039 B2 | 8/2010 | Weissman et al. | 707/793 |
| 7,788,260 B2 | 8/2010 | Lunt et al. | 707/727 |
| 7,788,399 B2 | 8/2010 | Brouk et al. | 709/238 |
| 7,797,256 B2 | 9/2010 | Zuckerberg et al. | 705/319 |
| 7,802,007 B2 | 9/2010 | Reese | 709/232 |
| 7,809,805 B2 | 10/2010 | Stremel et al. | 709/219 |
| 7,814,052 B2 | 10/2010 | Bezar et al. | 707/610 |
| 7,818,194 B2 | 10/2010 | Yoshida et al. | 705/7 |
| 7,818,298 B2 | 10/2010 | Barker et al. | 707/638 |
| 7,818,677 B2 | 10/2010 | Ruthfield et al. | 715/749 |
| 7,826,945 B2 | 11/2010 | Zhang et al. | 701/36 |
| 7,827,138 B2 | 11/2010 | Salmon et al. | 707/610 |
| 7,827,208 B2 | 11/2010 | Bosworth et al. | 707/802 |
| 7,827,265 B2 | 11/2010 | Cheever et al. | 709/223 |
| 7,831,455 B2 | 11/2010 | Yoshida et al. | 705/7 |
| 7,835,950 B2 | 11/2010 | Walker et al. | 705/27 |
| 7,836,019 B2 | 11/2010 | Barker et al. | 707/638 |
| 7,840,413 B2 | 11/2010 | Yoshida et al. | 705/1 |
| 7,840,501 B2 | 11/2010 | Sallam | 706/10 |
| 7,847,686 B1 | 12/2010 | Atkins et al. | 340/539.13 |
| D630,302 S | 1/2011 | Ambriz | D23/249 |
| 7,865,282 B2 | 1/2011 | Murlidar et al. | 701/36 |
| 7,865,303 B2 | 1/2011 | Weiss et al. | 701/209 |
| 7,869,941 B2 | 1/2011 | Coughlin et al. | 701/204 |
| 7,880,602 B2 | 2/2011 | Kasamatsu | 340/461 |
| 7,890,501 B2 | 2/2011 | Lunt et al. | 707/722 |
| 7,904,882 B2 | 3/2011 | Hinks | 717/120 |
| 7,912,628 B2 | 3/2011 | Chapman et al. | 701/117 |
| 7,912,629 B2 | 3/2011 | Sutter et al. | 701/118 |
| 7,912,758 B2 | 3/2011 | Walker et al. | 705/26 |
| 7,913,311 B2 | 3/2011 | Alain et al. | 726/28 |
| 7,921,013 B1 | 4/2011 | Ostermann et al. | 704/260 |
| 7,933,810 B2 | 4/2011 | Morgenstern | 705/26.1 |
| 7,933,889 B2 | 4/2011 | Smetters et al. | 707/708 |
| 7,945,653 B2 | 5/2011 | Zuckerberg et al. | 709/223 |
| 7,949,529 B2 | 5/2011 | Weider et al. | 704/270 |
| 7,953,775 B2 | 5/2011 | Dasdan | 707/830 |
| 7,970,657 B2 | 6/2011 | Morgenstern | 705/26.1 |
| 7,986,974 B2 | 7/2011 | Arun | 455/563 |
| 8,010,458 B2 | 8/2011 | Galbreath et al. | 705/319 |
| 8,065,423 B2 | 11/2011 | Braddy et al. | 709/229 |
| 8,065,713 B1 | 11/2011 | Vainstein et al. | 726/2 |
| 2001/0029455 A1 | 10/2001 | Chin et al. | 704/277 |
| 2001/0034771 A1 | 10/2001 | Hutsch et al. | 709/217 |
| 2002/0016922 A1 | 2/2002 | Richards et al. | 726/3 |
| 2002/0083178 A1 | 6/2002 | Brothers | 709/226 |
| 2002/0095425 A1 | 7/2002 | Abu-Husein | 707/100 |
| 2002/0122063 A1 | 9/2002 | Weinberg et al. | 715/764 |
| 2002/0143818 A1 | 10/2002 | Roberts et al. | 707/513 |
| 2002/0152020 A1 | 10/2002 | Seibel | 701/208 |
| 2002/0174010 A1 | 11/2002 | Rice, III | 705/14.67 |
| 2002/0177928 A1 | 11/2002 | Moriguchi et al. | 701/1 |
| 2002/0198635 A1 | 12/2002 | Obradovich et al. | 701/1 |
| 2003/0051039 A1 | 3/2003 | Brown et al. | 709/229 |
| 2003/0061567 A1 | 3/2003 | Brown et al. | 715/224 |
| 2003/0084404 A1 | 5/2003 | Dweck et al. | 715/513 |
| 2003/0085920 A1 | 5/2003 | Belknap et al. | 345/740 |
| 2003/0126136 A1 | 7/2003 | Omoigui | 707/999.01 |
| 2003/0140120 A1 | 7/2003 | Hartman | 709/219 |
| 2003/0210159 A1 | 11/2003 | Arunkumar | 340/988 |
| 2004/0095260 A1 | 5/2004 | Shintani | 240/994 |
| 2004/0097272 A1 | 5/2004 | Schuffert | 455/569.1 |
| 2004/0158607 A1 | 8/2004 | Coppinger et al. | 709/206 |
| 2004/0158746 A1 | 8/2004 | Hu et al. | 726/8 |
| 2004/0189694 A1 | 9/2004 | Kurtz et al. | 715/738 |
| 2004/0192339 A1 | 9/2004 | Wilson et al. | 455/456.1 |
| 2004/0199494 A1 | 10/2004 | Bhatt | 707/3 |
| 2004/0210909 A1 | 10/2004 | Dominguez et al. | 719/316 |
| 2004/0235530 A1 | 11/2004 | Arun | 455/563 |
| 2005/0005242 A1 | 1/2005 | Hoyle | 715/745 |
| 2005/0065909 A1 | 3/2005 | Musgrove et al. | 707/2 |
| 2005/0065925 A1 | 3/2005 | Weissman et al. | 707/4 |
| 2005/0075128 A1 | 4/2005 | Diedrich et al. | 455/552.1 |
| 2005/0080772 A1 | 4/2005 | Bem | 707/3 |
| 2005/0143134 A1 | 6/2005 | Harwood et al. | 455/563 |
| 2005/0179540 A1 | 8/2005 | Rubenstein | 340/539.18 |
| 2005/0223022 A1 | 10/2005 | Weissman et al. | 707/102 |
| 2005/0238047 A1 | 10/2005 | Holland et al. | 370/465 |
| 2005/0240608 A1 | 10/2005 | Jones et al. | 707/999.101 |
| 2005/0266879 A1 | 12/2005 | Spaur et al. | 455/556.2 |
| 2005/0266884 A1 | 12/2005 | Marriott et al. | 455/558 |
| 2005/0267940 A1 | 12/2005 | Galbreath et al. | 709/206 |
| 2005/0278083 A1 | 12/2005 | Shikano et al. | 701/1 |
| 2005/0278179 A1 | 12/2005 | Overend et al. | 704/270.1 |
| 2005/0278443 A1 | 12/2005 | Winner et al. | 709/224 |
| 2005/0283478 A1 | 12/2005 | Choi et al. | 707/9 |
| 2006/0021009 A1 | 1/2006 | Lunt | 726/4 |
| 2006/0046845 A1 | 3/2006 | Armand et al. | 715/856 |
| 2006/0053376 A1 | 3/2006 | Ng et al. | 715/742 |
| 2006/0061458 A1 | 3/2006 | Simon et al. | 340/426.35 |
| 2006/0085735 A1 | 4/2006 | Shimizu | 715/201 |
| 2006/0095860 A1 | 5/2006 | Wada et al. | 715/771 |
| 2006/0111893 A1 | 5/2006 | Florian et al. | 704/8 |
| 2006/0128301 A1 | 6/2006 | Dorfstatter et al. | 455/3.04 |
| 2006/0135181 A1* | 6/2006 | Dale et al. | 455/456.5 |
| 2006/0155429 A1 | 7/2006 | Boone et al. | 701/1 |
| 2006/0167861 A1 | 7/2006 | Arrouye et al. | 707/999.003 |
| 2006/0184516 A1 | 8/2006 | Ellis | 707/3 |
| 2006/0195605 A1 | 8/2006 | Sundarrajan et al. | 709/232 |
| 2006/0206834 A1 | 9/2006 | Fisher et al. | 715/777 |
| 2006/0223592 A1 | 10/2006 | Kouno | 455/569.1 |
| 2006/0239546 A1 | 10/2006 | Tedesco et al. | 382/159 |
| 2006/0242591 A1 | 10/2006 | Van Dok et al. | 715/762 |
| 2006/0265458 A1 | 11/2006 | Aldrich et al. | 709/206 |
| 2006/0282328 A1 | 12/2006 | Gerace et al. | 705/14.66 |
| 2007/0022021 A1 | 1/2007 | Walker et al. | 705/26 |
| 2007/0032225 A1 | 2/2007 | Konicek et al. | 455/417 |
| 2007/0043503 A1 | 2/2007 | Oesterling et al. | 701/211 |

| Publication No. | Date | Inventor | Class |
|---|---|---|---|
| 2007/0054704 A1 | 3/2007 | Satoh | 455/569.1 |
| 2007/0061335 A1 | 3/2007 | Ramer et al. | 707/999.01 |
| 2007/0078950 A1 | 4/2007 | Hopkins et al. | 709/217 |
| 2007/0088741 A1 | 4/2007 | Brooks et al. | |
| 2007/0124276 A1 | 5/2007 | Weissman et al. | 707/2 |
| 2007/0130130 A1 | 6/2007 | Chan et al. | 707/3 |
| 2007/0130137 A1 | 6/2007 | Oliver et al. | 707/5 |
| 2007/0179800 A1 | 8/2007 | Oesterling | 701/2 |
| 2007/0185843 A1 | 8/2007 | Jones et al. | 707/999.003 |
| 2007/0192299 A1 | 8/2007 | Zuckerberg et al. | 707/3 |
| 2007/0220008 A1 | 9/2007 | Mizhar et al. | 707/10 |
| 2007/0223436 A1 | 9/2007 | Lenardi et al. | 370/338 |
| 2007/0233378 A1 | 10/2007 | Tanaka et al. | 701/211 |
| 2007/0255807 A1 | 11/2007 | Hayashi et al. | 709/219 |
| 2007/0288510 A1 | 12/2007 | Dominguez, Jr. et al. | |
| 2008/0010243 A1 | 1/2008 | Weissman et al. | 707/2 |
| 2008/0026793 A1 | 1/2008 | Teegan et al. | 455/557 |
| 2008/0027643 A1 | 1/2008 | Basir et al. | 701/213 |
| 2008/0032721 A1 | 2/2008 | MacDonald et al. | 455/466 |
| 2008/0033714 A1 | 2/2008 | Gupta | 704/9 |
| 2008/0036586 A1 | 2/2008 | Ohki | 340/539.13 |
| 2008/0040474 A1 | 2/2008 | Zuckerbert et al. | 709/224 |
| 2008/0040475 A1 | 2/2008 | Bosworth et al. | 709/224 |
| 2008/0046845 A1 | 2/2008 | Chandra | 715/856 |
| 2008/0046976 A1 | 2/2008 | Zuckerberg | 726/4 |
| 2008/0052373 A1 | 2/2008 | Pousti | 709/217 |
| 2008/0059447 A1 | 3/2008 | Winner et al. | 707/999.005 |
| 2008/0065604 A1 | 3/2008 | Tiu et al. | 707/3 |
| 2008/0065701 A1 | 3/2008 | Lindstrom et al. | 707/201 |
| 2008/0077310 A1 | 3/2008 | Murlidar et al. | 701/117 |
| 2008/0077566 A1 | 3/2008 | Fell et al. | 707/4 |
| 2008/0080689 A1 | 4/2008 | Casalaina et al. | |
| 2008/0082504 A1 | 4/2008 | Jasik et al. | 707/3 |
| 2008/0082540 A1 | 4/2008 | Weissman et al. | 707/9 |
| 2008/0082555 A1 | 4/2008 | Salmon et al. | 707/100 |
| 2008/0082572 A1 | 4/2008 | Ballard et al. | 707/102 |
| 2008/0082586 A1 | 4/2008 | Jasik et al. | 707/200 |
| 2008/0082986 A1 | 4/2008 | Cheenath et al. | 719/313 |
| 2008/0086358 A1 | 4/2008 | Doshi et al. | 705/10 |
| 2008/0086447 A1 | 4/2008 | Weissman et al. | 707/2 |
| 2008/0086455 A1 | 4/2008 | Meisels et al. | 707/3 |
| 2008/0086479 A1 | 4/2008 | Fry et al. | 707/10 |
| 2008/0086482 A1 | 4/2008 | Weissman | 707/10 |
| 2008/0086514 A1 | 4/2008 | Weissman et al. | 707/200 |
| 2008/0086735 A1 | 4/2008 | Cheenath et al. | 719/313 |
| 2008/0109426 A1 | 5/2008 | Constantinides | 707/5 |
| 2008/0120539 A1 | 5/2008 | Stephens, Jr. | 715/256 |
| 2008/0126333 A1 | 5/2008 | Bezar et al. | 707/5 |
| 2008/0126803 A1 | 5/2008 | Ginter et al. | 713/168 |
| 2008/0133122 A1 | 6/2008 | Mashitani et al. | 701/200 |
| 2008/0133685 A1* | 6/2008 | Boss et al. | 709/206 |
| 2008/0133754 A1 | 6/2008 | Smyth et al. | 709/226 |
| 2008/0147671 A1 | 6/2008 | Simon et al. | 707/10 |
| 2008/0147753 A1 | 6/2008 | Chasman et al. | 707/203 |
| 2008/0162544 A1 | 7/2008 | Weissman et al. | 707/103 R |
| 2008/0167937 A1 | 7/2008 | Coughlin et al. | 705/9 |
| 2008/0177460 A1 | 7/2008 | Blackwood et al. | 701/118 |
| 2008/0183687 A1 | 7/2008 | Law | 707/4 |
| 2008/0184157 A1 | 7/2008 | Selig | 715/781 |
| 2008/0189292 A1 | 8/2008 | Stremel et al. | 707/10 |
| 2008/0189380 A1 | 8/2008 | Bosworth et al. | 709/207 |
| 2008/0189395 A1 | 8/2008 | Stremel et al. | 709/219 |
| 2008/0189768 A1 | 8/2008 | Callahan et al. | 726/4 |
| 2008/0201701 A1 | 8/2008 | Hofhansl et al. | 717/168 |
| 2008/0201731 A1 | 8/2008 | Howcroft | 725/13 |
| 2008/0209503 A1 | 8/2008 | Hess et al. | 726/1 |
| 2008/0214148 A1 | 9/2008 | Ramer et al. | 455/414.1 |
| 2008/0222191 A1 | 9/2008 | Yoshida et al. | 707/102 |
| 2008/0228924 A1 | 9/2008 | Herberger et al. | 709/227 |
| 2008/0249711 A1 | 10/2008 | Matsuda | 701/443 |
| 2008/0256002 A1 | 10/2008 | Yoshida et al. | 705/500 |
| 2008/0263152 A1 | 10/2008 | Daniels et al. | 709/204 |
| 2008/0270354 A1 | 10/2008 | Weissman | 707/2 |
| 2008/0270516 A1 | 10/2008 | Ragnet et al. | 709/202 |
| 2008/0270987 A1 | 10/2008 | Weissman | 717/124 |
| 2008/0275884 A1 | 11/2008 | Yoshida et al. | 707/10 |
| 2008/0281610 A1 | 11/2008 | Yoshida et al. | 705/1 |
| 2008/0288511 A1 | 11/2008 | Jasik et al. | 707/100 |
| 2008/0299960 A1 | 12/2008 | Lockhart et al. | 455/418 |
| 2008/0305742 A1 | 12/2008 | Basir | 455/41.2 |
| 2008/0313714 A1 | 12/2008 | Fetterman et al. | 726/4 |
| 2008/0319652 A1 | 12/2008 | Moshfeghi | 701/208 |
| 2008/0319653 A1 | 12/2008 | Moshfeghi | 701/208 |
| 2009/0005070 A1 | 1/2009 | Forstall et al. | 455/456.1 |
| 2009/0013011 A1 | 1/2009 | Barker et al. | 707/203 |
| 2009/0013413 A1 | 1/2009 | Vera et al. | 726/30 |
| 2009/0024548 A1 | 1/2009 | Zhu et al. | 706/21 |
| 2009/0024609 A1 | 1/2009 | Barker et al. | 707/5 |
| 2009/0024673 A1 | 1/2009 | Barker et al. | 707/203 |
| 2009/0029744 A1 | 1/2009 | Boersma | 455/569.1 |
| 2009/0030906 A1 | 1/2009 | Doshi et al. | 707/9 |
| 2009/0031301 A1 | 1/2009 | D'Angelo et al. | 717/178 |
| 2009/0037277 A1 | 2/2009 | Zuckerberg et al. | 705/14 |
| 2009/0037828 A1 | 2/2009 | Waite et al. | 715/760 |
| 2009/0044146 A1 | 2/2009 | Patel et al. | 715/808 |
| 2009/0048922 A1 | 2/2009 | Morgenstern et al. | 705/14 |
| 2009/0049014 A1 | 2/2009 | Steinberg | 707/3 |
| 2009/0049036 A1 | 2/2009 | Juan et al. | 707/5 |
| 2009/0049053 A1 | 2/2009 | Barker et al. | 707/10 |
| 2009/0049065 A1 | 2/2009 | Weissman | 707/100 |
| 2009/0049070 A1 | 2/2009 | Steinberg | 707/101 |
| 2009/0049101 A1 | 2/2009 | Weissman | |
| 2009/0049102 A1 | 2/2009 | Weissman | |
| 2009/0049127 A1 | 2/2009 | Juan et al. | 709/204 |
| 2009/0049288 A1 | 2/2009 | Weissman | 712/245 |
| 2009/0049413 A1 | 2/2009 | Lehtovirta et al. | 715/855 |
| 2009/0049525 A1 | 2/2009 | D'Angelo et al. | 726/4 |
| 2009/0063178 A1 | 3/2009 | Pousti et al. | 705/1 |
| 2009/0063249 A1 | 3/2009 | Tomlin et al. | 705/10 |
| 2009/0070219 A1 | 3/2009 | D'Angelo et al. | 705/14 |
| 2009/0070334 A1 | 3/2009 | Callahan et al. | 707/9 |
| 2009/0070412 A1 | 3/2009 | D'Angelo et al. | 709/203 |
| 2009/0083058 A1 | 3/2009 | Beringer et al. | 705/1 |
| 2009/0094554 A1 | 4/2009 | Karstens | 715/810 |
| 2009/0100342 A1 | 4/2009 | Jakobson | 715/733 |
| 2009/0119167 A1 | 5/2009 | Kendall et al. | 705/14 |
| 2009/0132646 A1 | 5/2009 | Yang et al. | 709/203 |
| 2009/0132815 A1 | 5/2009 | Ginter et al. | 713/164 |
| 2009/0135089 A1 | 5/2009 | Konishi et al. | 345/1.3 |
| 2009/0138188 A1 | 5/2009 | Kores et al. | 701/117 |
| 2009/0144341 A1 | 6/2009 | Hauck et al. | 707/202 |
| 2009/0144392 A1 | 6/2009 | Wang et al. | 709/217 |
| 2009/0144451 A1 | 6/2009 | Cabezas et al. | 709/248 |
| 2009/0158161 A1 | 6/2009 | Gibbs et al. | 715/733 |
| 2009/0160732 A1 | 6/2009 | Kimura | 345/1.1 |
| 2009/0164110 A1 | 6/2009 | Basir | 701/117 |
| 2009/0164915 A1 | 6/2009 | Gasn et al. | 715/753 |
| 2009/0170434 A1* | 7/2009 | Tengler et al. | 455/41.2 |
| 2009/0172559 A1 | 7/2009 | Waldman et al. | 715/744 |
| 2009/0182589 A1 | 7/2009 | Kendall et al. | 705/5 |
| 2009/0189373 A1 | 7/2009 | Schramm et al. | 280/731 |
| 2009/0198487 A1 | 8/2009 | Wong et al. | 704/4 |
| 2009/0228342 A1 | 9/2009 | Walker et al. | 705/10 |
| 2009/0228780 A1 | 9/2009 | McGeehan | 715/234 |
| 2009/0233629 A1* | 9/2009 | Jayanthi | 455/457 |
| 2009/0234573 A1* | 9/2009 | Notarantonio | 701/201 |
| 2009/0235176 A1* | 9/2009 | Jayanthi | 715/738 |
| 2009/0259699 A1 | 10/2009 | Chasman et al. | 707/203 |
| 2009/0276395 A1 | 11/2009 | Weissman et al. | 707/2 |
| 2009/0276405 A1 | 11/2009 | Weissman et al. | 707/3 |
| 2009/0298474 A1 | 12/2009 | George | 455/412.2 |
| 2010/0049534 A1 | 2/2010 | Whitnah et al. | 705/1 |
| 2010/0049852 A1 | 2/2010 | Whitnah et al. | 709/226 |
| 2010/0070323 A1 | 3/2010 | Polcari et al. | 705/8 |
| 2010/0070480 A1 | 3/2010 | Ahuja et al. | 707/703 |
| 2010/0070528 A1 | 3/2010 | Collins et al. | 707/776 |
| 2010/0075631 A1 | 3/2010 | Black et al. | 455/410 |
| 2010/0076946 A1 | 3/2010 | Barker et al. | 707/705 |
| 2010/0077468 A1 | 3/2010 | Pragides et al. | 726/7 |
| 2010/0082431 A1 | 4/2010 | Ramer et al. | 705/14.52 |
| 2010/0088316 A1 | 4/2010 | Robinson et al. | 707/737 |
| 2010/0088636 A1 | 4/2010 | Yerkes et al. | 715/809 |
| 2010/0100367 A1 | 4/2010 | Hopkins | 703/13 |
| 2010/0114912 A1 | 5/2010 | Hofhansl et al. | 707/749 |
| 2010/0118025 A1 | 5/2010 | Smith et al. | 345/418 |
| 2010/0120366 A1 | 5/2010 | DeBiasio et al. | 455/41.3 |
| 2010/0132049 A1 | 5/2010 | Vernal et al. | 726/27 |
| 2010/0162375 A1 | 6/2010 | Tiu, Jr. et al. | 726/7 |

| | | | | | | | |
|---|---|---|---|---|---|---|---|
| 2010/0164957 | A1 | 7/2010 | Lindsay et al. ............... 345/440 | 2011/0153412 | A1 | 6/2011 | Novikov et al. ........... 705/14.42 |
| 2010/0169327 | A1 | 7/2010 | Lindsay et al. ............... 707/750 | 2011/0153416 | A1 | 6/2011 | Walker et al. ............. 705/14.49 |
| 2010/0180032 | A1 | 7/2010 | Lunt ............................. 709/225 | 2011/0153421 | A1 | 6/2011 | Novikov et al. ........... 705/14.52 |
| 2010/0185580 | A1 | 7/2010 | Zhu et al. ........................ 706/52 | 2011/0154223 | A1 | 6/2011 | Whitnah et al. .............. 715/753 |
| 2010/0185593 | A1 | 7/2010 | Wong et al. .................... 707/684 | 2011/0154842 | A1 | 6/2011 | Heydari et al. ............... 62/259.2 |
| 2010/0191719 | A1 | 7/2010 | Weissman et al. ............ 707/716 | 2011/0156480 | A1 | 6/2011 | Park ............................... 307/23 |
| 2010/0192067 | A1 | 7/2010 | Casalaina ....................... 715/742 | 2011/0161602 | A1 | 6/2011 | Adams et al. .................. 711/148 |
| 2010/0192204 | A1 | 7/2010 | Boulos et al. ...................... 726/4 | 2011/0161980 | A1 | 6/2011 | English et al. ................. 718/105 |
| 2010/0198498 | A1 | 8/2010 | Jansen ........................... 701/201 | 2011/0161987 | A1 | 6/2011 | Huang et al. .................. 719/318 |
| 2010/0198581 | A1 | 8/2010 | Ellis ................................... 704/4 | 2011/0179347 | A1 | 7/2011 | Proctor et al. ................. 715/234 |
| 2010/0205165 | A1 | 8/2010 | Fell et al. ....................... 707/705 | 2011/0196855 | A1 | 8/2011 | Wable et al. .................... 707/711 |
| 2010/0205216 | A1 | 8/2010 | Durdik et al. .................. 707/783 | 2011/0218808 | A1 | 9/2011 | Parthasarathy ............... 704/257 |
| 2010/0205227 | A1 | 8/2010 | Weissman et al. ............ 707/803 | 2011/0230169 | A1 | 9/2011 | Ohki .......................... 455/412.1 |
| 2010/0205243 | A1 | 8/2010 | Brady ............................ 709/203 | 2011/0244888 | A1 | 10/2011 | Ohki .......................... 455/456.2 |
| 2010/0205595 | A1 | 8/2010 | Weissman ...................... 717/171 | | | | |
| 2010/0211619 | A1 | 8/2010 | Weissman et al. ............ 707/812 | | | | |
| 2010/0211996 | A1 | 8/2010 | McGeehan et al. ................ 726/4 | | | | |
| 2010/0211997 | A1 | 8/2010 | McGeehan et al. ................ 726/4 | | | | |
| 2010/0217645 | A1 | 8/2010 | Jin et al. ............................. 705/9 | | | | |
| 2010/0217758 | A1 | 8/2010 | Weissman et al. ............ 707/713 | | | | |
| 2010/0223100 | A1 | 9/2010 | Lee et al. ........................ 705/10 | | | | |
| 2010/0223254 | A1 | 9/2010 | Weissman et al. .............. 707/16 | | | | |
| 2010/0223255 | A1 | 9/2010 | Weissman et al. .............. 707/16 | | | | |
| 2010/0223284 | A1 | 9/2010 | Brooks et al. ................. 707/769 | | | | |
| 2010/0223301 | A1 | 9/2010 | Shkvarchuk et al. .......... 707/803 | | | | |
| 2010/0223467 | A1 | 9/2010 | Dismore et al. ............... 713/168 | | | | |
| 2010/0229223 | A1 | 9/2010 | Shepard et al. .................... 726/5 | | | | |
| 2010/0235322 | A1 | 9/2010 | Kuruganti et al. ............. 707/610 | | | | |
| 2010/0235445 | A1 | 9/2010 | Palmeri et al. ................. 709/204 | | | | |
| 2010/0235495 | A1 | 9/2010 | Petersen et al. ................ 709/224 | | | | |
| 2010/0235837 | A1 | 9/2010 | Weissman et al. ................ 718/1 | | | | |
| 2010/0250497 | A1 | 9/2010 | Redlich et al. ................. 707/661 | | | | |
| 2010/0250565 | A1 | 9/2010 | Tobin et al. .................... 707/756 | | | | |
| 2010/0257023 | A1 | 10/2010 | Kendall et al. ................... 705/10 | | | | |
| 2010/0257351 | A1 | 10/2010 | O'Connor et al. ............. 713/150 | | | | |
| 2010/0257459 | A1 | 10/2010 | Galbreath et al. ............. 715/753 | | | | |
| 2010/0262362 | A1 | 10/2010 | Naito et al. .................... 701/204 | | | | |
| 2010/0268740 | A1 | 10/2010 | Barker et al. .................. 707/783 | | | | |
| 2010/0274779 | A1 | 10/2010 | Weissman et al. ............ 707/714 | | | | |
| 2010/0281014 | A1 | 11/2010 | Weissman et al. ............ 707/715 | | | | |
| 2010/0281015 | A1 | 11/2010 | Weissman et al. ............ 707/716 | | | | |
| 2010/0281016 | A1 | 11/2010 | Weissman et al. ............ 707/716 | | | | |
| 2010/0281039 | A1 | 11/2010 | Dayon ........................... 707/754 | | | | |
| 2010/0281515 | A1 | 11/2010 | Lerner et al. ....................... 726/1 | | | | |
| 2010/0287503 | A1 | 11/2010 | Dayon ........................... 715/810 | | | | |
| 2010/0299608 | A1 | 11/2010 | Fisher et al. ................... 715/738 | | | | |
| 2010/0299663 | A1 | 11/2010 | Weissman et al. ............ 717/170 | | | | |
| 2010/0299664 | A1 | 11/2010 | Taylor et al. ................... 717/173 | | | | |
| 2010/0306043 | A1 | 12/2010 | Lindsay et al. ............. 705/14.41 | | | | |
| 2010/0306536 | A1 | 12/2010 | Brouk et al. ................... 713/168 | | | | |
| 2010/0318571 | A1 | 12/2010 | Pearlman et al. .............. 707/784 | | | | |
| 2010/0332447 | A1 | 12/2010 | Bezar et al. .................... 707/610 | | | | |
| 2011/0004668 | A1 | 1/2011 | Salmon et al. ................. 709/204 | | | | |
| 2011/0004692 | A1 | 1/2011 | Occhino et al. ................ 709/228 | | | | |
| 2011/0004831 | A1 | 1/2011 | Steinberg et al. .............. 715/753 | | | | |
| 2011/0016169 | A1 | 1/2011 | Cahill et al. ................... 709/203 | | | | |
| 2011/0016381 | A1 | 1/2011 | Cahill et al. ................... 715/234 | | | | |
| 2011/0016382 | A1 | 1/2011 | Cahill et al. ................... 715/234 | | | | |
| 2011/0018342 | A1 | 1/2011 | Park et al. ........................ 307/23 | | | | |
| 2011/0022657 | A1 | 1/2011 | Zhu et al. ....................... 709/204 | | | | |
| 2011/0023017 | A1 | 1/2011 | Calvin ........................... 717/120 | | | | |
| 2011/0023101 | A1 | 1/2011 | Vernal et al. ....................... 726/7 | | | | |
| 2011/0023129 | A1 | 1/2011 | Vernal et al. ..................... 726/28 | | | | |
| 2011/0029879 | A1 | 2/2011 | Calvin ........................... 715/733 | | | | |
| 2011/0044354 | A1 | 2/2011 | Wei ............................... 370/468 | | | | |
| 2011/0055314 | A1 | 3/2011 | Rosenstein et al. ........... 709/203 | | | | |
| 2011/0055332 | A1 | 3/2011 | Stein .............................. 709/206 | | | | |
| 2011/0055683 | A1 | 3/2011 | Jiang .............................. 715/234 | | | | |
| 2011/0060842 | A1 | 3/2011 | Reese ............................ 709/232 | | | | |
| 2011/0083101 | A1 | 4/2011 | Sharon et al. .................. 715/800 | | | | |
| 2011/0087526 | A1 | 4/2011 | Morgenstern et al. ........ 705/14.1 | | | | |
| 2011/0106630 | A1 | 5/2011 | Hegeman et al. ........... 705/14.71 | | | | |
| 2011/0125599 | A1 | 5/2011 | Morin et al. .................. 705/26.1 | | | | |
| 2011/0128699 | A1 | 6/2011 | Heydari et al. .......... 361/679.48 | | | | |
| 2011/0137902 | A1 | 6/2011 | Wable et al. ................... 707/737 | | | | |
| 2011/0137932 | A1 | 6/2011 | Wable ............................ 707/769 | | | | |
| 2011/0145287 | A1 | 6/2011 | Jiang et al. ..................... 707/780 | | | | |
| 2011/0145321 | A1 | 6/2011 | Jiang .............................. 709/203 | | | | |
| 2011/0153377 | A1 | 6/2011 | Novikov et al. .............. 705/71.1 | | | | |

OTHER PUBLICATIONS

Office Action Summary for U.S. Appl. No. 12/340,531 which was mailed on Apr. 6, 2011.
Office Action Summary for U.S. Appl. No. 12/340,532 which was mailed on Dec. 29, 2010.
Office Action Summary for U.S. Appl. No. 12/340,532 which was mailed on May 2, 2011.
Office Action Summary for U.S. Appl. No. 12/340,533 which was mailed on Mar. 2, 2011.
Office Action Summary for U.S. Appl. No. 12/340,534 which was mailed on Dec. 30, 2010.
Office Action Summary for U.S. Appl. No. 12/340,537 which was mailed on Feb. 2, 2011.
Office Action Summary for U.S. Appl. No. 12/340,576 which was mailed on Apr. 20, 2011.
Office Action Summary for U.S. Appl. No. 12/340,582 which was mailed on Dec. 9, 2010.
Office Action Summary for U.S. Appl. No. 12/340,584 which was mailed on Apr. 20, 2011.
Office Action Summary for U.S. Appl. No. 12/340,585 which was mailed on Apr. 20, 2011.
Office Action Summary for U.S. Appl. No. 12/340,590 which was mailed on Apr. 21, 2011.
Office Action Summary for U.S. Appl. No. 12/340,601 which was mailed on Mar. 31, 2011.
Office Action Summary for U.S. Appl. No. 12/340,607 which was mailed on Mar. 31, 2011.
Office Action Summary from U.S. Appl. No. 12/340,582 which was mailed on May 27, 2011.
Office Action Summary from U.S. Appl. No. 12/340,527 which was mailed on May 5, 2011.
Office Action Summary from U.S. Appl. No. 12/340,538 which was mailed on Jun. 7, 2011.
Matsuo et al., "Keyword Extraction From a Single Document Using Word Co-Occurrence Statistical Information," (c) 2003, Intl. Journal on Artificial Intelligence Tools, vol. 13, No. 1, pp. 157-169.
U.S. Appl. No. 12/340,527, filed Dec. 19, 2008.
U.S. Appl. No. 12/340,531, filed Dec. 19, 2008.
U.S. Appl. No. 12/340,532, filed Dec. 19, 2008.
U.S. Appl. No. 12/340,533, filed Dec. 19, 2008.
U.S. Appl. No. 12/340,534, filed Dec. 19, 2008.
U.S. Appl. No. 12/340,537, filed Dec. 19, 2008.
U.S. Appl. No. 12/340,538, filed Dec. 19, 2008.
U.S. Appl. No. 12/340,539, filed Dec. 19, 2008.
U.S. Appl. No. 12/340,550, filed Dec. 19, 2008.
U.S. Appl. No. 12/340,554, filed Dec. 19, 2008.
U.S. Appl. No. 12/340,561, filed Dec. 19, 2008.
U.S. Appl. No. 12/340,575, filed Dec. 19, 2008.
U.S. Appl. No. 12/340,576, filed Dec. 19, 2008.
U.S. Appl. No. 12/340,582, filed Dec. 19, 2008.
U.S. Appl. No. 12/340,584, filed Dec. 19, 2008.
U.S. Appl. No. 12/340,585, filed Dec. 19, 2008.
U.S. Appl. No. 12/340,590, filed Dec. 19, 2008.
U.S. Appl. No. 12/340,592, filed Dec. 19, 2008.
U.S. Appl. No. 12/340,593, filed Dec. 19, 2008.
U.S. Appl. No. 12/340,597, filed Dec. 19, 2008.
U.S. Appl. No. 12/340,598, filed Dec. 19, 2008.
U.S. Appl. No. 12/340,599, filed Dec. 19, 2008.

U.S. Appl. No. 12/340,601, filed Dec. 19, 2008.
U.S. Appl. No. 12/340,605, filed Dec. 19, 2008.
U.S. Appl. No. 12/340,607, filed Dec. 19, 2008.
U.S. Appl. No. 12/340,615, filed Dec. 19, 2008.
U.S. Appl. No. 12/340,617, filed Dec. 19, 2008.
Office Action from U.S. Appl. No. 12/340,534 which was mailed on Jun. 28, 2011.
Office Action from U.S. Appl. No. 12/340,537 which was mailed on Jul. 7, 2011.
Office Action from U.S. Appl. No. 12/340,539 which was mailed on Jul. 26, 2011.
Office Action from U.S. Appl. No. 12/340,554 which was mailed on Jul. 28, 2011.
Office Action from U.S. Appl. No. 12/340,592 which was mailed on Jun. 29, 2011.
Office Action from U.S. Appl. No. 12/340,593 which was mailed on Jun. 30, 2011.
Office Action from U.S. Appl. No. 12/340,599 which was mailed on Jul. 18, 2011.
Office Action from U.S. Appl. No. 12/340,617 which was mailed on Jun. 24, 2011.
U.S. Appl. No. 13/287,083, filed Nov. 1, 2011.
U.S. Appl. No. 13/287,089, filed Nov. 1, 2011.
GM Navigation System Supplement 2002.
Notice of Allowance from U.S. Appl. No. 12/340,576 which was mailed on Oct. 21, 2011.
Notice of Allowance from U.S. Appl. No. 12/340,584 which was mailed on Oct. 18, 2011.
Notice of Allowance from U.S. Appl. No. 12/340,585 which was mailed on Oct. 19, 2011.
Notice of Allowance from U.S. Appl. No. 12/340,590 which was mailed on Oct. 17, 2011.
Notice of Allowance from U.S. Appl. No. 12/340,539 which was mailed on Nov. 9, 2011.
Office Action from U.S. Appl. No. 12/340,533 which was mailed on Oct. 19, 2011.
Office Action from U.S. Appl No. 12/340,582 which was mailed on Oct. 19, 2011.
Office Action from U.S. Appl. No. 12/340,527 which was mailed on Nov. 9, 2011.
Office Action from U.S. Appl. No. 12/340,531 which was mailed on Nov. 22, 2011.
Office Action from U.S. Appl. No. 12/340,593 which was mailed on Nov. 17, 2011.
Office Action from U.S. Appl. No. 12/340,599 which was mailed on Nov. 15, 2011.
Office Action from U.S. Appl. No. 12/340,617 which was mailed on Nov. 17, 2011.
Pioneer AVIC-ZH900MD audio book_2004 and English Translation.
Pioneer AVIC-ZH900MD installment manual_2004 and English Translation.
Pioneer AVIC-ZH900MD navigation book_2004 and English Translation.
Pioneer AVIC-ZH900MD start book_2004 and English Translation.
Office Action from U.S. Appl. No. 12/340,601 which was mailed on Sep. 15, 2011.
Office Action from U.S. Appl. No. 12/340,607 which was mailed on Sep. 15, 2011.
Office Action from U.S. Appl. No. 12/340,550 which was mailed on Sep. 28, 2011.
Office Action from U.S. Appl. No. 12/340,615 which was mailed on Sep. 28, 2011.
Notice of Allowance from U.S. Appl. No. 12/340,538 which was mailed on Sep. 30, 2011.
Notice of Allowance from U.S. Appl. No. 12/340,576 which was mailed on Sep. 30, 2011.
Notice of Allowance from U.S. Appl. No. 12/340,584 which was mailed on Sep. 29, 2011.
Notice of Allowance from U.S. Appl. No. 12/340,585 which was mailed on Sep. 29, 2011.
Office Action from U.S. Appl. No. 12/340,561 which was mailed on Aug. 5, 2011.
Office Action from U.S. Appl. No. 12/340,598 which was mailed on Aug. 24, 2011.
Office Action from U.S. Appl. No. 12/340,605 which was mailed on Aug. 26, 2011.
Office Action from U.S. Appl. No. 12/340,561 dated Mar. 27, 2012.
Interview Summary from U.S. Appl. No. 12/340,554 dated Mar. 7, 2012.
BMW AG, "2005 645Ci Owner's Manual," Sep. 2004.
Notice of Allowance from U.S. Appl. No. 12/340,538 dated Jan. 6, 2012.
Notice of Allowance from U.S. Appl. No. 12/340,538 dated Dec. 14, 2011.
Notice of Allowance from U.S. Appl. No. 12/340,539 dated Nov. 28, 2011.
Notice of Allowance from U.S. Appl. No. 12/340,584 dated Jan. 23, 2012.
Office Action from U.S. Appl. No. 12/340,554 dated Feb. 24, 2012.
Office Action from U.S. Appl. No. 12/340,592 dated Dec. 13, 2011.
Office Action from U.S. Appl. No. 12/340,597 dated Feb. 3, 2012.
Office Action from U.S. Appl. No. 12/340,598 dated Feb. 15, 2012.
U.S. Appl. No. 13/341,882, filed Dec. 30, 2011.
U.S. Appl. No. 13/341,888, filed Dec. 30, 2011.
Interview Summary from U.S. Appl. No. 12/340,605 dated Mar. 1, 2012.
Interview Summary from U.S. Appl. No. 12/340,615 dated Mar. 1, 2012.

* cited by examiner

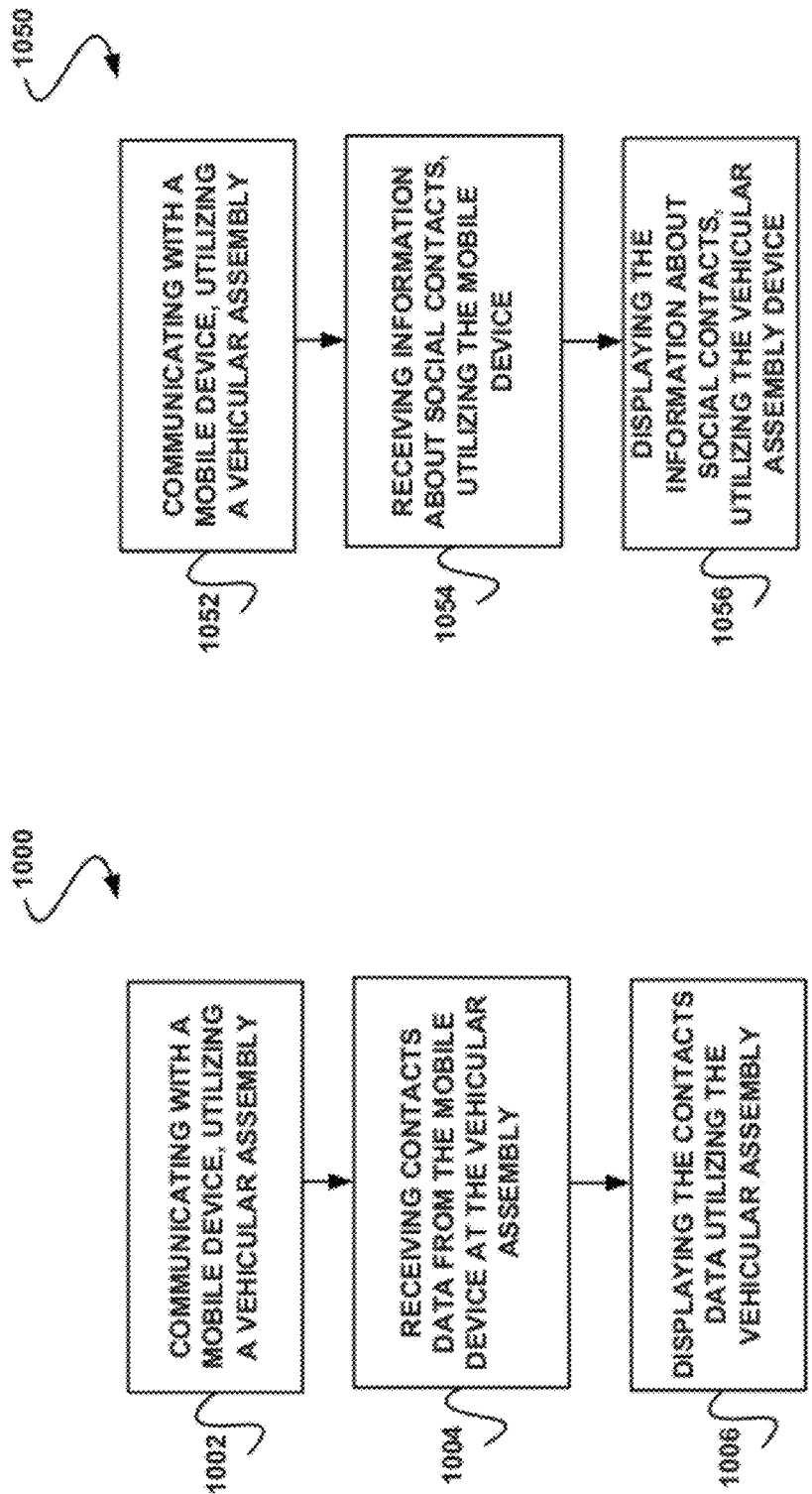

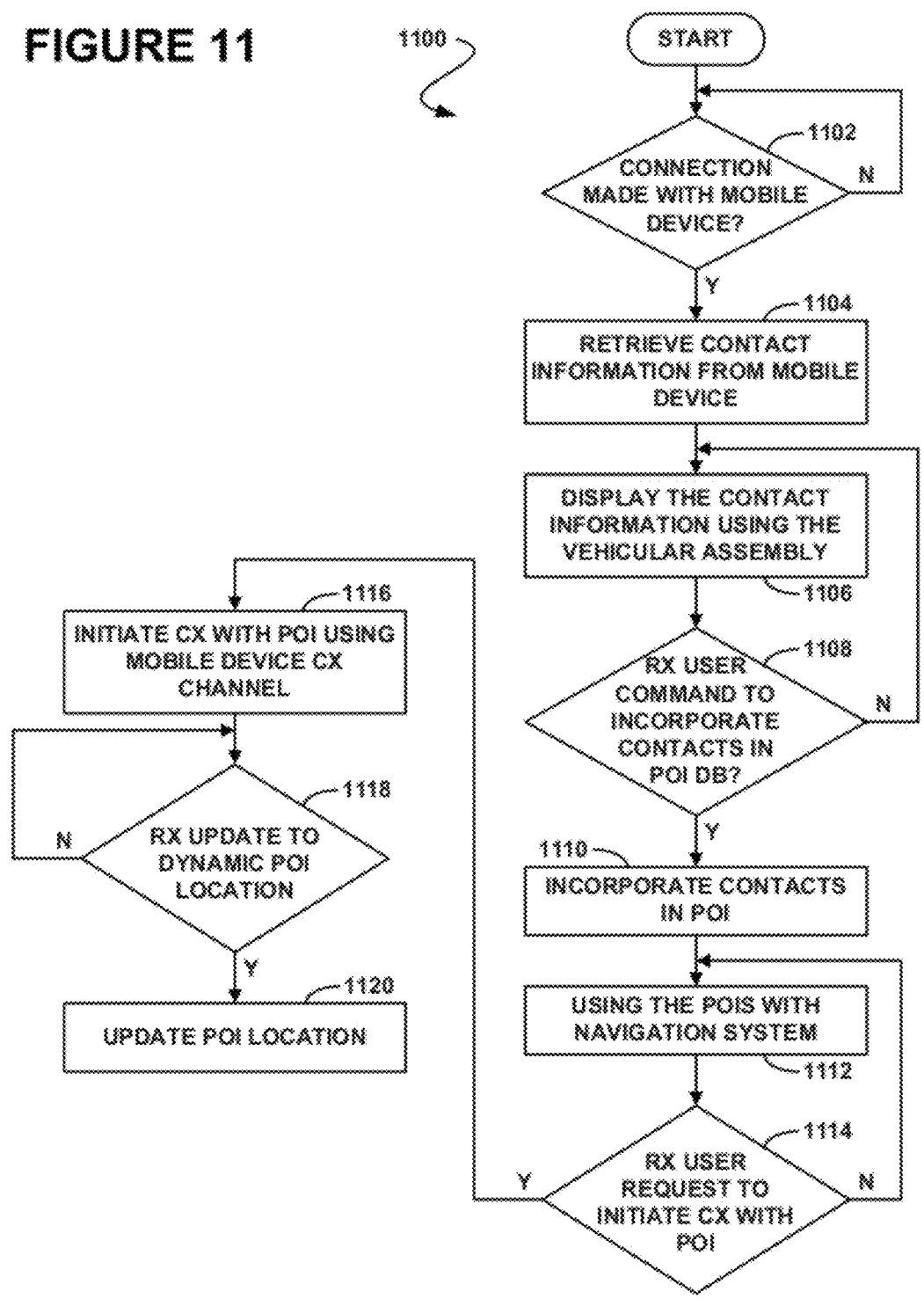

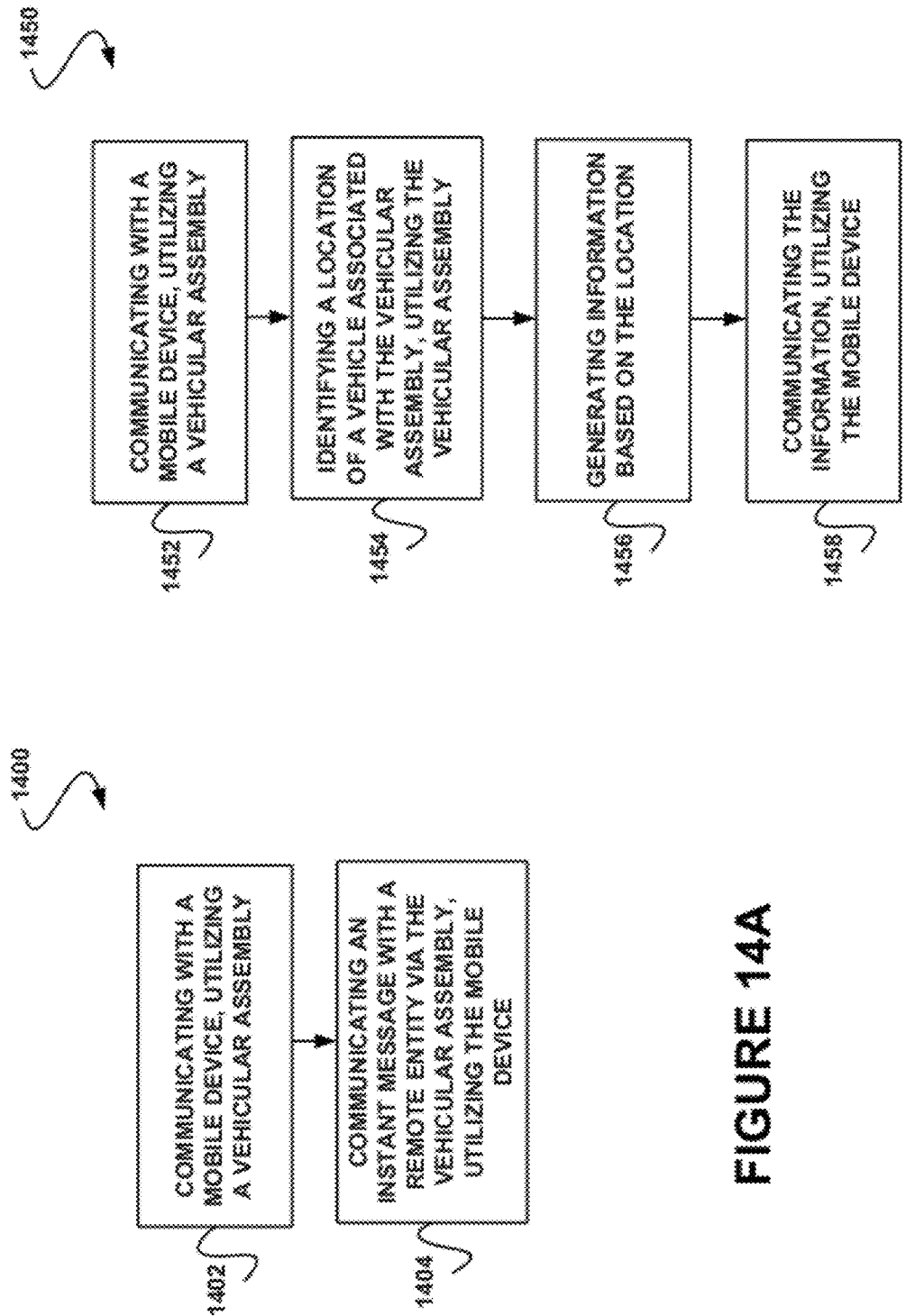

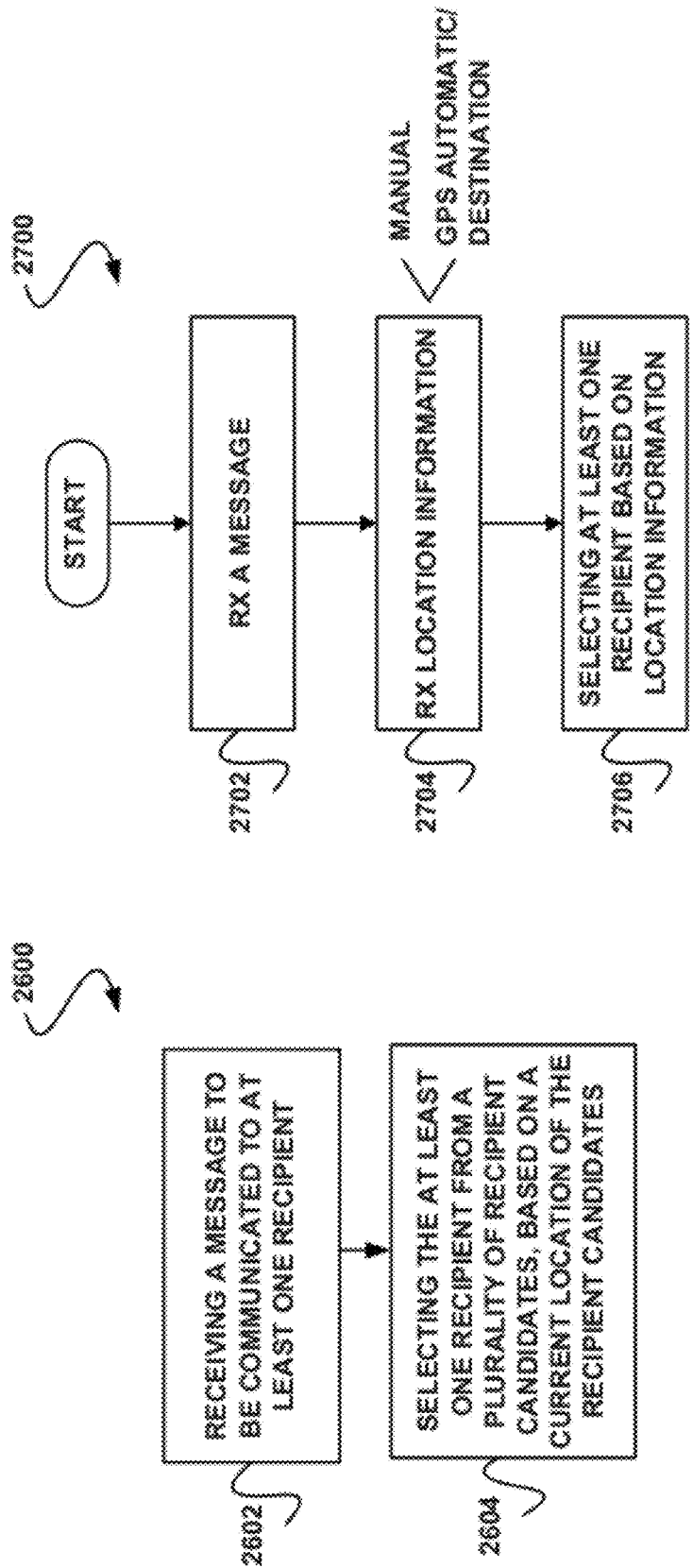

4700

NETWORK BROWSER PLUGIN(S)

APP_1
- NAME
- LOGIN INFO
- URL
- PREFERENCES

APP_2
- NAME
- LOGIN INFO
- URL
- PREFERENCES

LOCATION-BASED MESSAGING SYSTEM, METHOD, AND COMPUTER PROGRAM PRODUCT

RELATED APPLICATIONS

The present application claims priority from U.S. Provisional Application No. 61/091,253, filed Aug. 22, 2008, which is incorporated herein by reference in its entirety for all purposes.

BACKGROUND AND FIELD OF THE INVENTION

The present invention relates to vehicular assembly functionality, and more particularly to vehicular assembly functionality in association with a mobile device.

SUMMARY

A system, method, and computer program product are provided for location-based messaging. In operation, a message to be communicated to at least one recipient is received. Furthermore, the at least one recipient is selected from a plurality of recipient candidates, based on a current location of the recipient candidates.

BRIEF DESCRIPTION OF THE DRAWINGS

FIG. 10A shows a method for incorporating contacts from a mobile device into a points-of-interest database of a vehicular assembly, in accordance with one embodiment.

FIG. 10B shows a method for social networking utilizing a vehicular assembly, in accordance with one embodiment.

FIG. 11 shows a method for social networking utilizing a vehicular assembly, in accordance with one embodiment.

FIG. 14A shows a method for instant messaging utilizing a vehicular assembly, in accordance with one embodiment.

FIG. 14B shows a method for communicating, location-related information, in accordance with one embodiment.

FIG. 26 shows a method for location based messaging, in accordance with one embodiment.

FIG. 27 shows a method for location based messaging, in accordance with another embodiment.

FIG. 47 shows a network browser plugin for accommodating different online applications, in accordance with one embodiment.

DETAILED DESCRIPTION

Figure 1:
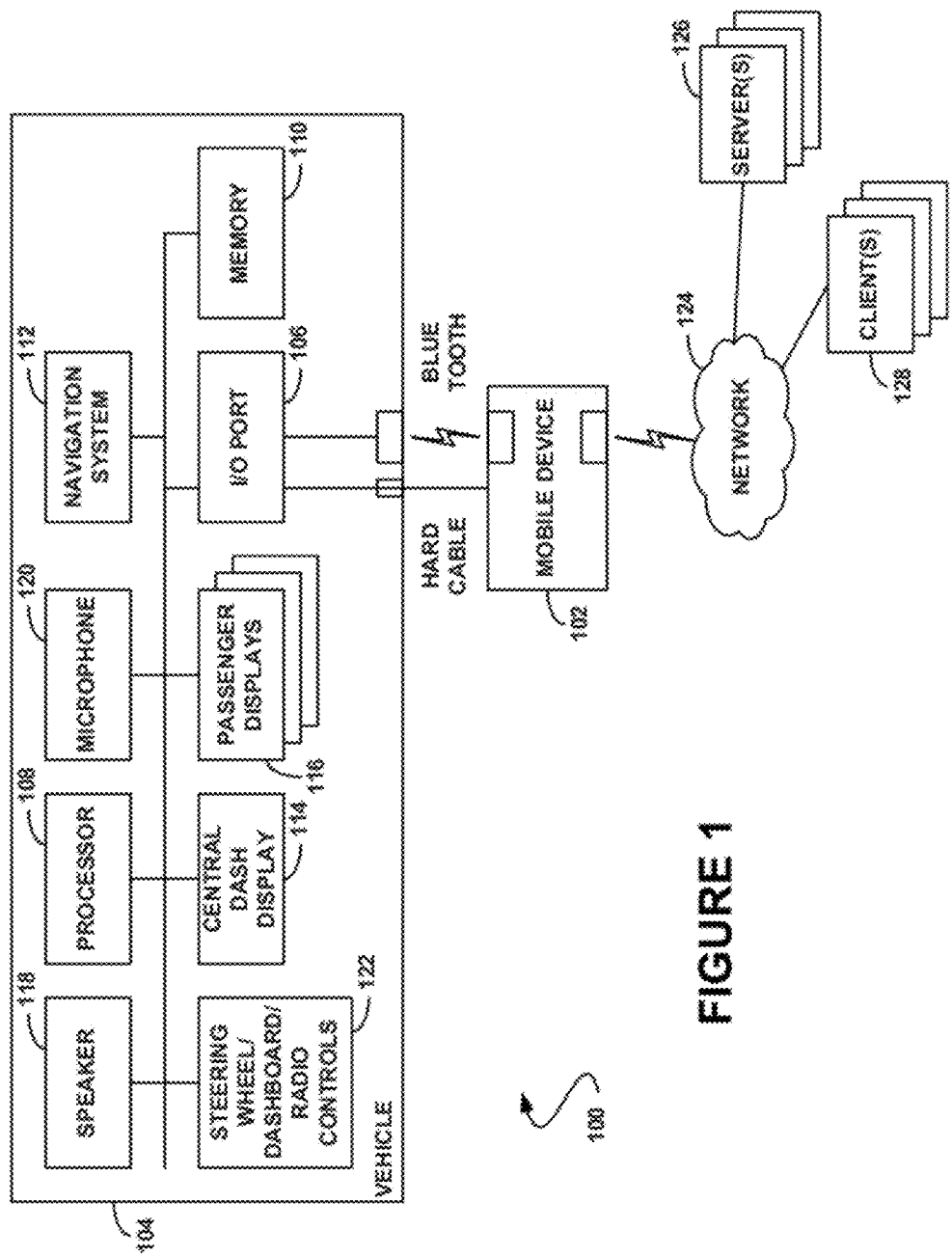
FIG. 1 illustrates a communication system, in accordance with one embodiment.

FIG. 1 illustrates a communication system 100, in accordance with one embodiment. As shown, a mobile device 102 is capable of interfacing with a vehicle 104 including various components of the vehicle 104. The mobile device 102 may include any mobile device capable of interfacing with a vehicle 104 including a lap-top computer, hand-held computer, mobile phone, personal digital assistant (PDA), a music player (e.g. a digital music player, etc.), a GPS device, etc.

In various embodiments, the mobile device 102 may communicate with a vehicular assembly system (e.g. a communication and entertainment system, etc.) corresponding to the vehicle 104 via a wireless connection (e.g. Bluetooth, etc.), or via a cable connection (e.g. a USB cable, a serial cable, etc.). As an option, the mobile device 102 may interface with the communication and entertainment system vehicle utilizing an I/O port 106 of the vehicle 104. In various embodiments, the I/O port 106 may include a serial port, a USB port, FireWire/i.LINK ports, etc. In one embodiment, the I/O port 106 may include a wireless communication port.

Using this interface, the mobile device 102 may interface with various components and functionality of the vehicle, such as an onboard computer system including a processor 108, memory 110 (e.g. DRAM, flash memory, etc.), an onboard navigation system 112, displays (e.g. a central display 114, and one or more passenger displays 116, etc.), audio communication devices (e.g speakers 118, a microphone 120, etc.), and various other components and functionality of the vehicle included in the vehicular assembly system. The interface may also allow a user of the vehicle 104 to access and/or control the mobile device 102 utilizing controls associated with the vehicle 104, such as steering wheel, dashboard, and radio controls 122. Additionally, the user may access and/or control the mobile device utilizing the microphone 120 through voice commands.

Using these components and controls, a user may access and utilize one or more wireless networks 124 associated with the mobile device 102. Coupled to the networks 124 may be servers 126 which are capable of communicating over the networks 124. Also coupled to the networks 124 and the servers 126 is a plurality of clients 128.

Such servers 126 and/or clients 128 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 124, at least one gateway is optionally coupled therebetween.

It should be noted that the computer system of the vehicle 104 may include various software and applications for facilitating communication between the vehicle 104 and the mobile device 102. For example, in various embodiments, the vehicle computer system may include an operating system (e.g. Windows Mobile, Linux, etc.), embedded speech recognition software, telephone call steering systems, automated telephone directory services, character recognition software, and imaging software.

Figure 2:
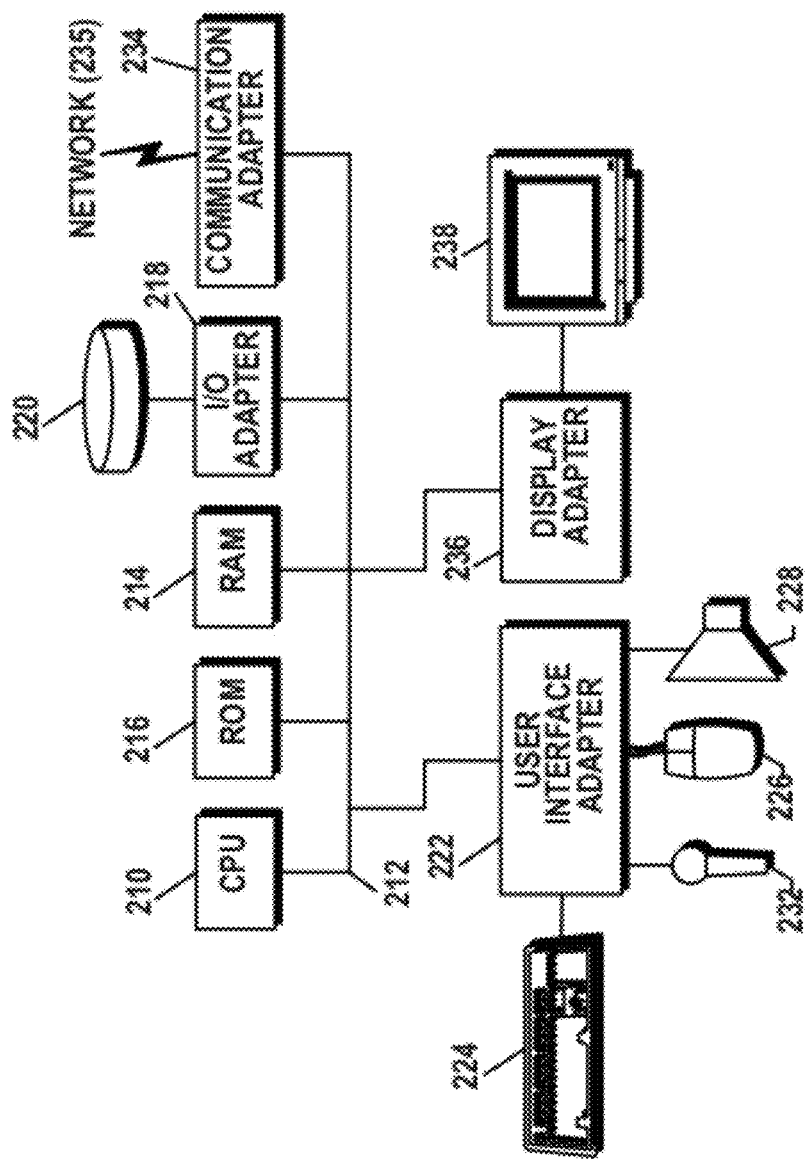
FIG. 2 shows a representative hardware environment that may be associated with the mobile device, the servers and/or clients of FIG. 1, in accordance with one embodiment.

FIG. 2 shows a representative hardware environment that may be associated with the mobile device 102, the servers 126 and/or clients 128 of FIG. 1, in accordance with one embodiment. Such figure illustrates a typical hardware configuration of a device in accordance with one embodiment having a central processing unit 210, such as a microprocessor, and a number of other units interconnected via a system bus 212.

The device shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for optionally connecting an input interface 224 (e.g. a keyboard, etc.), a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The device may have resident thereon any desired operating system. It will be appreciated that an embodiment may also be implemented on platforms and operating systems other than those mentioned. One embodiment may be written using JAVA, C, and/or C++ language, or other programming language, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
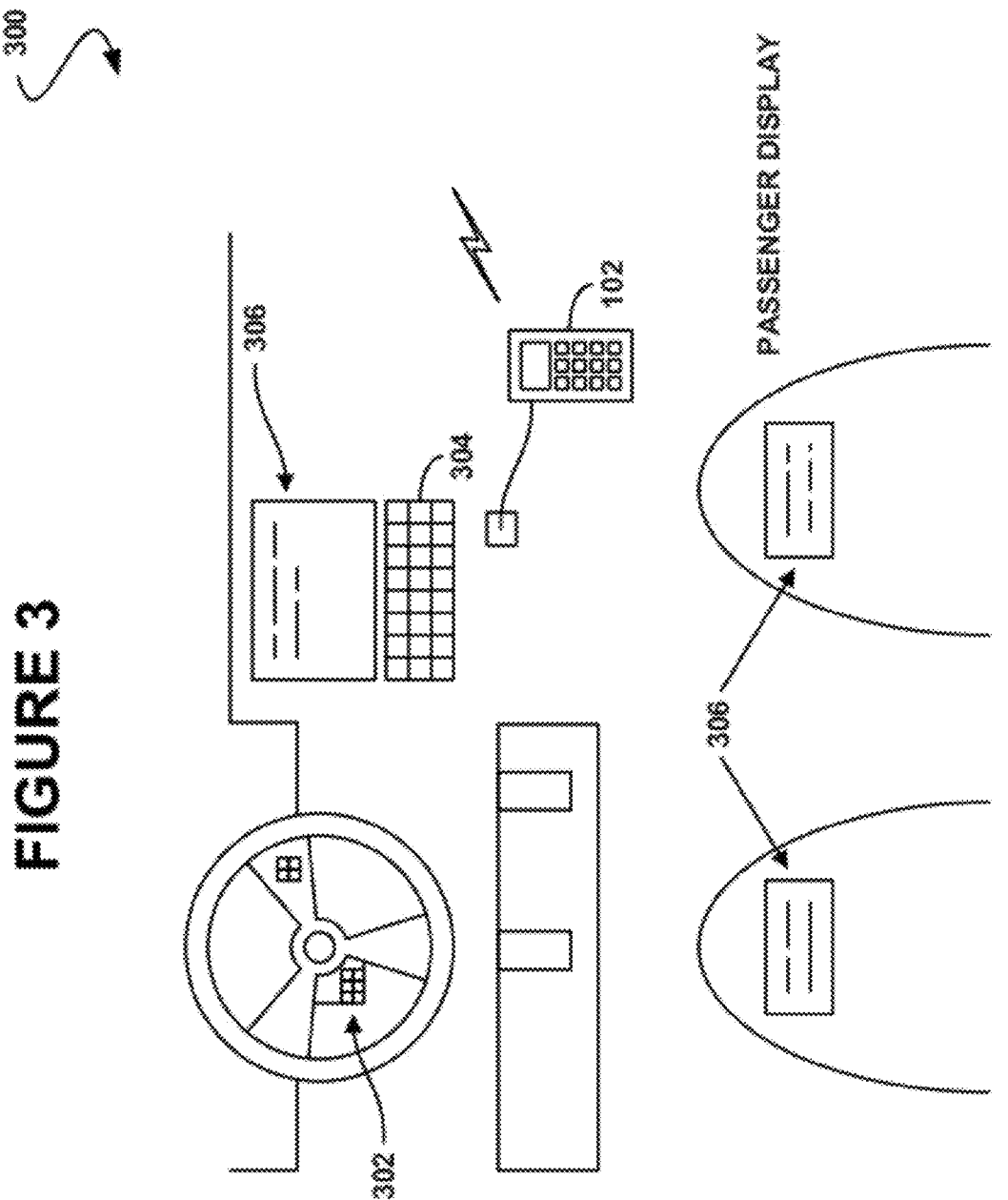
FIG. 3 shows a configuration for an automobile capable of interfacing with the mobile device of FIG. 1, in accordance with one embodiment.

FIG. 3 shows a configuration 300 for an automobile capable of interfacing with the mobile device 102 of FIG. 1, in accordance with one embodiment. As shown, the mobile device 102 may be coupled to the automobile utilizing a wired connection, such as a USB connection, etc., or a wireless connection such as Bluetooth, etc.

Using this connection, a user (e.g. a driver or passenger, etc.) may operate the mobile device 102, via the automobile, using voice commands, steering wheel controls 302, radio controls 304, and/or dashboard controls. Furthermore, the mobile device may communicate with vehicle displays (e.g. main displays, passenger displays 306, etc.) such that content associated with the mobile device (e.g. stored content, streaming content, etc.) may be displayed. For example, the mobile device may communicate stored video to at least one of the passenger displays 306. Additionally, the mobile device may communicate streaming or stored audio such that the audio may be transmitted utilizing an audio system of the automobile.

By interfacing the mobile device 102 with the automobile, voice-activated, hands-free calling may also be implanted. For example, a "Push to Talk" button on the steering wheel may allow the user to access contacts stored in a contact list of the mobile device 102 by voice command. Furthermore, the user may be able to switch use from the mobile device 102 to the vehicle control system transparently. For example, a user may push a "Telephone" button on the steering wheel to automatically transfer a current telephone call to the automobile communication system of the automobile without having to hang up and call again.

As an option, the text messages received by the mobile device 102 may be converted to audio utilizing a vehicle on-board processor and associated voice-to-text software. The communication system of automobile may then output the converted text in an audio stream via speakers. In one embodiment, the communication system associated with the automobile may include a main display 308 for displaying activities associated with the mobile device 102, along with other functionality (e.g. navigational functionality, etc.).

For example, the communication system may display any feature that is capable of being displayed using the mobile device 102. In various embodiments, such features may include caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allows a user to browse through music collections by genre, album, artist, and song title using simple voice commands.

Figure 4:
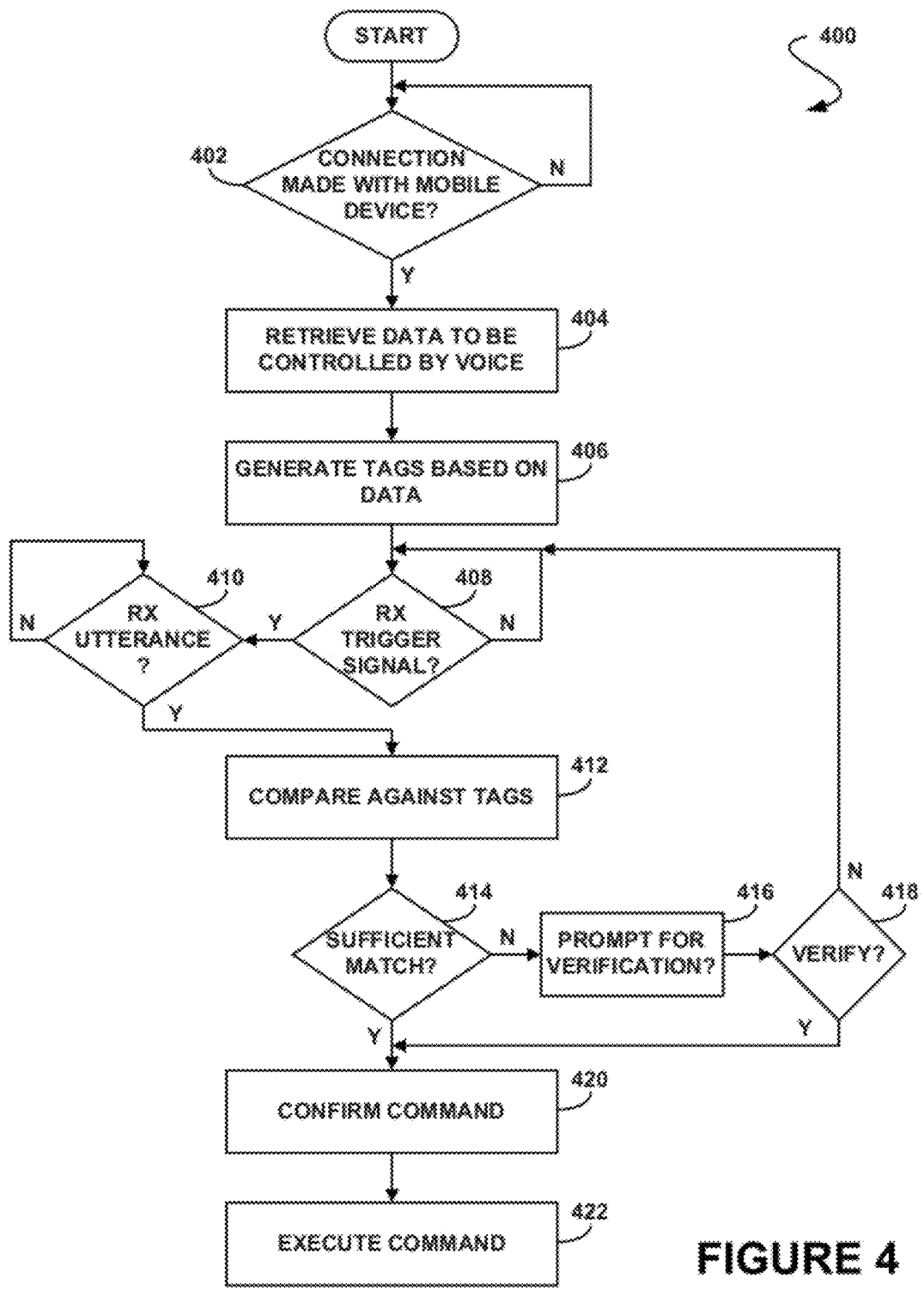
FIG. 4 shows a method for executing commands of a mobile device utilizing a communication and entertainment system of a vehicle, in accordance with one embodiment.

FIG. 4 shows a method 400 for executing commands of a mobile device utilizing a communication and entertainment system of a vehicle, in accordance with one embodiment. As an option, the method 400 may be implemented in the context of the architecture and environment of FIGS. 1-3. Of course, however, the method 400 may be carried out in any desired environment.

As shown, it is determined whether a connected is made between a mobile device and a computer system of a vehicle (i.e. a communication and entertainment system). See operation 402. Data to be controlled by voice commands is then retrieved from the mobile device. See operation 404. In various embodiments, the data may include music, contacts, and other data.

Tags are then generated, based on the data. See operation 406. Once the tags are generated, it is determined whether a trigger signal is received. See operation 408. For example, the trigger signal may be initiated by a button on a vehicular consol, steering wheel, or a key word or phrase used for triggering.

If a trigger signal is received, it is determined whether an utterance is received. See operation 410. In this case, the utterance may be a command from a user. As another option, the utterance may be an inquiry from the user. If an utterance is received, the utterance is compared against the tags. See operation 412.

It is then determined whether the utterance and one of the tags are a sufficient match. See operation 414. In this case, the determination may be based on a threshold. This threshold may be a pre-established threshold based on a error tolerance, for example.

If the utterance fails to match any tag sufficiently, the user is prompted for a verification. See operation 416. In one embodiment, the verification may include outputting an audible inquiry. The audible inquiry may include a closest matched tag to the utterance. As an option, the verification may occur multiple times, with every subsequent inquiry including the next closest match to the utterance. In one embodiment, the number of verifications may be user configurable.

Once it is determined that the utterance matches one of the tags, the command is confirmed and executed. See operations 420-422. For example, if the utterance included a command "Call BOB," the utterance would be compared against tags to determine if a tag corresponds to "BOB," and if it does, the call command would be confirmed and BOB would be called.

FIG. 5A shows a method 500 for voice-enabled access to mobile device data, in accordance with one embodiment. As an option, the method 500 may be implemented in the context of the architecture and environment of FIGS. 1-4. Of course, however, the method 500 may be carried out in any desired environment.

As shown, data from a mobile device is received utilizing a vehicular assembly. See operation 502. In this case, the data includes at least one of electronic message data, calendar data, and bookmark data. In various other embodiments, the data may further include data relating to stocks (e.g. a stock symbol, saved stock quotes, etc.), recent call data, ring tone data, photos, notes, email configurations, etc.

Furthermore, the vehicular assembly may include any interface for receiving data from the mobile device, along with processing/computing devices, displays, memory, software, and various other functionality. Thus, the vehicle assembly may include any computer system (e.g. a communication and entertainment system, navigation system, etc.) corresponding to the vehicle. In various embodiments, the data may be received over a wireless channel (e.g. Bluetooth, etc.) or a wired channel (e.g. a USB channel, etc.).

In one embodiment, the data may be retrieved arom the mobile device in response to an initial communication of the mobile device and the vehicular assembly. For example, upon establishing a connection between the mobile device and the vehicle, the data may be automatically retrieved from the mobile device.

In another embodiment, a user may be prompted to authorize data transfer between the mobile device and the vehicle. As an option, the initial communication between the mobile device and the vehicle may include a verification. For example, it may be verified that the mobile device is authorize to connect using the vehicular assembly.

In various embodiments, all of the data on the mobile device may be received, or a subset of the data may be received. For example, only a subset of the data may be received from the mobile device for generating the tags, to reduce a time required for initialization. In this case, the subset of data to be received may include a pre-defined subset of data.

As an option, a user may have the ability to select data to be received. For example, the user may select categories of data to be received or individual data to be relieved. In one embodiment, this configuration may be a configuration stored on the mobile device. In another embodiment, this configuration may be a configuration stored in an on-board computer system of the vehicle.

In various embodiments, the user may configure these settings using the on-board computer system of the vehicle, the mobile device, and/or another computer system to which the mobile device may be connected. As another option, the configuration may include a default configuration setting defining data or data categories to be received.

In one embodiment, only updated or recent data may be received. For example, the configuration may be set such that only data updated or stored on the mobile device since the communication between the vehicle's computer system and the mobile device is received. In this way, the subset of the data may be selected based on a predetermined criteria selected by a user, based on previous use of the mobile device or vehicular assembly, and/or based on whether the data was previously received.

In another embodiment, the predetermined criteria may be based on what functionality of a vehicle associated with the vehicular assembly supports. For example, the mobile device may include GPS functionality but the vehicle may not. In this case, the data associated with the GPS functionality may not be retrieved.

Once the data is retrieved, tags associated with the data are generated. See operation 504. In the context of the present description, tags refer to any keyword or term assigned to data. As an option, the tags may be stored in the vehicular assembly. As another option, the tags associated with a portion of the data other than the subset to be retrieved may be stored in the vehicular assembly.

Additionally, an utterance is received. See operation 506. The utterance may include any audible command or inquiry. For example the utterance may include a command to dial a number, play music, send an email, send a text mail, access a calendar, etc.

Still yet, access to the data is provided in response to the utterance, utilizing the tags. See operation 508. In various embodiments, the data may be provided in an audible form and/or a visual form. In some cases, the form in which the data is provided may depend on the command. In other cases, the form in which the data is provided may depend on user preferences.

It should be noted that, by only retrieving a subset of data from the mobile device, an initialization time may be minimized. In this case, the initialization time may correlate to the amount of tags to be generated. Thus, by only retrieving a subset of the data, time may be conserved that may otherwise be wasted on generating tags that may not necessarily be used by a user.

Additionally, in one embodiment, a first portion of data may be received from a mobile device utilizing a vehicular assembly. Subsequently, a first set of tags associated with the first portion of the data may be generated. An utterance may then be received, and while simultaneously providing access to the first portion of the data in response to the utterance utilizing the first set of tags, a second portion of data may be received from the mobile device utilizing the vehicular assembly, and a second set of tags associated with the second portion of the data may be generated. Thus, the second portion of the data may be received after the first set of tags associated with the first portion of the data are generated to minimize an initialization time associated with the first portion of the data.

In this way, a first set of tags may be generated for data corresponding to functionality that a user may desire to use immediately (e.g. music, contacts, etc.), such that access may be allowed the data. While accessing this data, or having the ability to access this data, other data not necessarily needed immediately (e.g. electronic message data, calendar data, bookmark data, etc.) may be retrieved and tags generated. Upon completion of this segmented initialization, the user would have access to all desired data. In various embodiments, this segmented initialization may include one or more stages.

Figure 5:
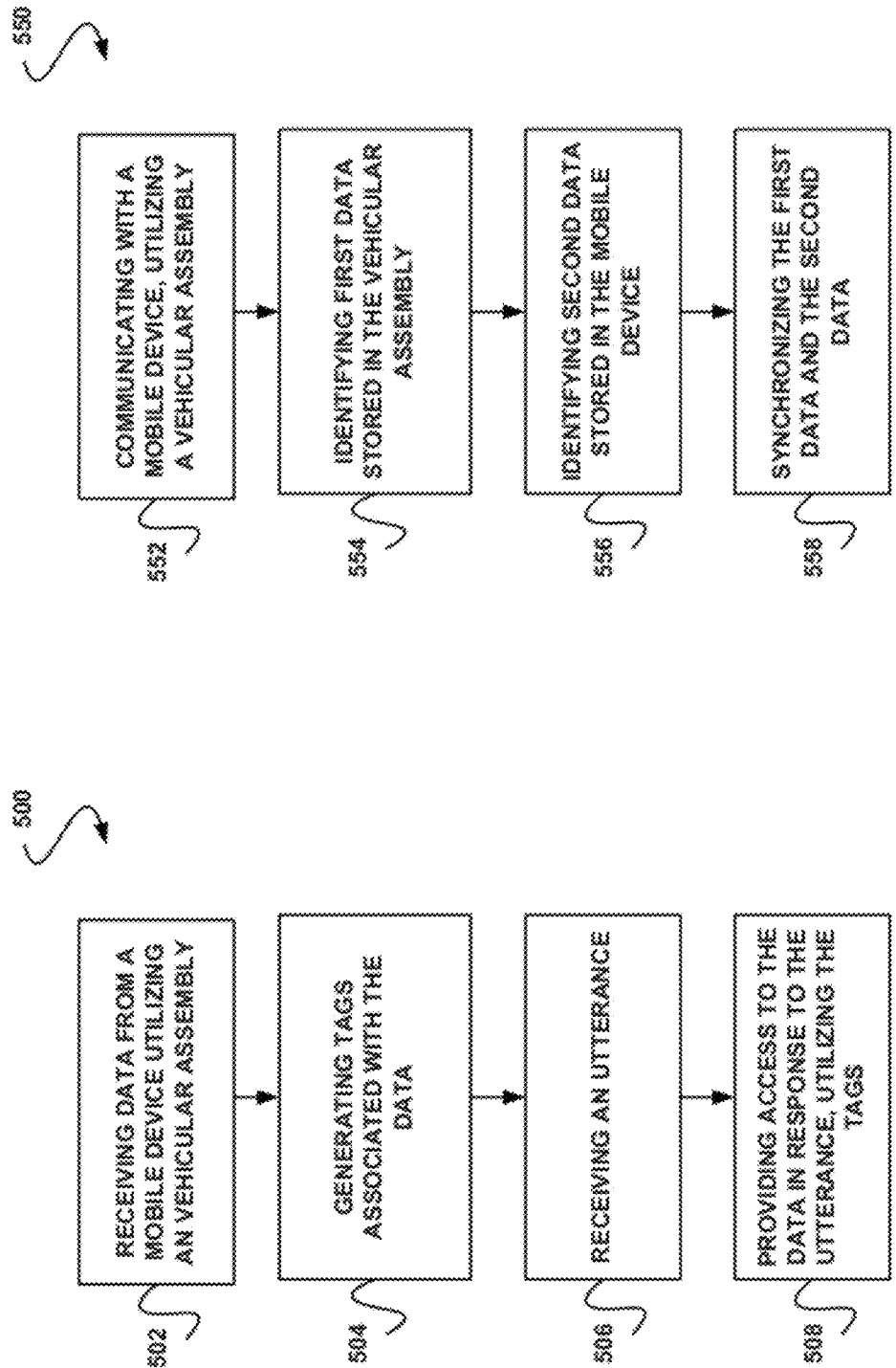
FIG. 5A shows a method for voice-enabled access to mobile device data, in accordance with one embodiment.
FIG. 5B shows a method for synchronizing a mobile device and a vehicular assembly, in accordance with one embodiment.

In addition to retrieving data from the mobile device and generating tags based on that data, the mobile device and the vehicular assembly may be synchronized. FIG. 5B shows a method 550 for synchronizing a mobile device and a vehicular assembly, in accordance with one embodiment. As an option, the method 550 may be implemented in the context of the architecture and environment of FIGS. 1-5A. Of course, however, the method 550 may be carried out in any desired environment. It should also be noted that the aforementioned definitions may apply during the present description.

As shown, a vehicular assembly is utilized to communicate with a mobile device. See operation 552. First data stored in the vehicular assembly is identified. See operation 554. Additionally, second data stored in the mobile device in identified. See operation 556. Further, the first data and the second data are synchronized. See operation 558.

In one embodiment, at least one of the first data and the second data may include favorite stations. For example, a user may have updated a favorite station list using the vehicular assembly or the mobile device. In this case, the favorite station list of the mobile device and the vehicular assembly may be synchronized. In one embodiment, the favorite stations may be updated on the vehicular assembly by programming a new station. In this case, the new station may be stored in the mobile device upon synchronization.

In another embodiment, a new station may be configured on the mobile device. For example, using the mobile device, a user may configure a radio station to stream music to the device. This station information may then be stored in the vehicular assembly upon synchronization.

In still another embodiment, at least one of the first data and the second data may include includes digital media. For example, in various embodiments the digital media may include music or video. In this case, music stored on the mobile device may updated by purchasing or uploading music to the mobile device using anther computer system. In this case, upon connecting with the vehicular assembly, the data stored utilizing the vehicular assembly may be updated with the new music.

In yet another embodiment, the first data and the second data may include contact information. In this case, the content information may include a name, phone number, and home address, a business address, an email address, etc.

Still yet, in one embodiment, the first data and the second data may include points-of-interest. In the context of the present description, points-of-interest refer to points corresponding to coordinates (e.g. GPS coordinates, map coordinates, etc.) that have been defined as a point-of interest. In one embodiment, the points-of-interest may be user defined points of interest.

For example, a user may define a point of interest utilizing a navigational system corresponding to the vehicle or the vehicle assembly. Upon connecting to the mobile device, the point-of interest may be updated and stored on the mobile device. As another example, the user may define a point-of-interest using the mobile device. Upon connecting to the mobile device, the point-of interest may be updated and stored on the vehicular assembly.

In another embodiment, at least one of the first and the second data may include software. For example, a software application may be installed on the mobile device. Upon connecting to the vehicular assembly, the software application may be installed on the vehicular assembly.

In yet another embodiment, at least one of the first and the second data may include a software patch or update. For example, the mobile device may upload a software patch of update via a wireless connection or via a connection with another computer system. Upon connecting the mobile device, the software patch or update may be stored on the vehicular assembly system. Subsequently, the software patch or update may be installed.

As an option, the software patch or update may correspond to an operating system of the vehicular assembly. In this case, synchronizing the data may allow the operating system of the vehicular assembly to be updated via the mobile device. As another option, the software, software patch, or software update may include antivirus software, updates, or patches.

In another embodiment, at least one of the first and the second data may include information corresponding to the vehicular assembly. In this case, the information may include hardware information, software information, revision information, version information, operating system information, etc. As an option, this information may be utilized by the mobile device to obtain software updates for the vehicular assembly.

In one embodiment, a first subset of at least one of the first data and the second data that has already been synchronized may be determined. Subsequently, only a second subset of at least one of the first data and the second data that has not already been synchronized may then be synchronized. This may allow for a more efficient synchronization process because processing power and time may be allocated to data that has not been synchronized.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 6:
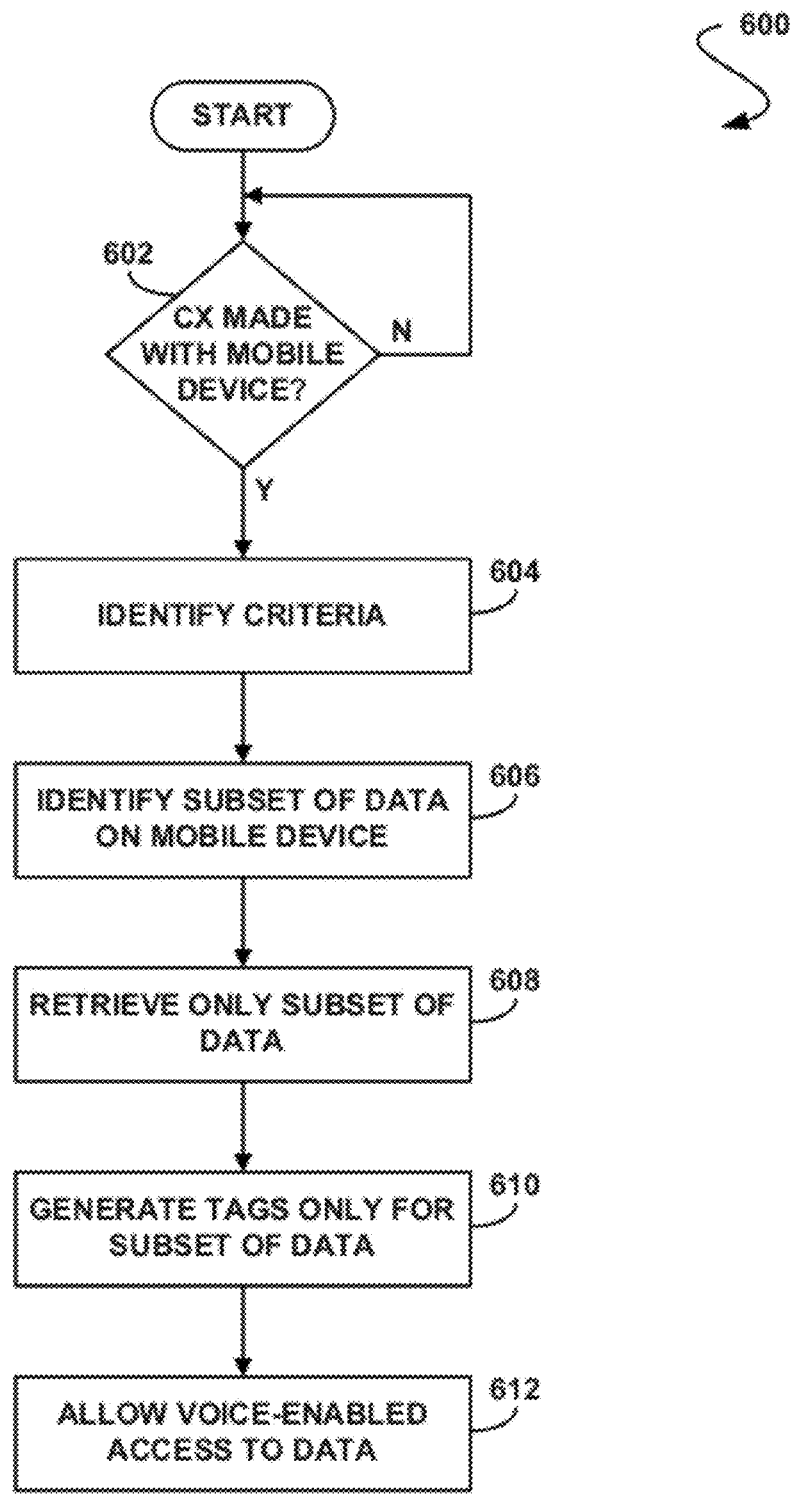
FIG. 6 shows a method for voice-enabled access to mobile device data, in accordance with another embodiment.

FIG. 6 shows a method 600 for voice-enabled access to mobile device data, in accordance with another embodiment. As an option, the method 600 may be implemented in the context of the architecture and environment of FIGS. 1-5B. Of course, however, the method 600 may be carried out in any desired environment. Again, the aforementioned definitions may apply during the present description.

As shown, it is determined whether a connection is made with a mobile device. See operation 602. Once a connection has been made, predetermined criteria is identified that may be used to select a subset of data to be received from the mobile device for generating tags. See operation 604.

For example, the predetermined criteria may be based on previous use of the mobile device or vehicular assembly, whether the data was previously received, what functionality of a vehicle associated with the vehicular assembly supports, and/or any other user or automatically defined criteria.

Once the criteria is identified, a subset of data to be retrieved from the mobile device is identified based on the criteria. See operation 606. Only the identified subset of data is retrieved. See operation 608. Tags are then generated for only the retrieved subset of data. See operation 610. Subsequently, voice enabled access is allowed to all data with corresponding tags. See operation 612.

Figure 7:
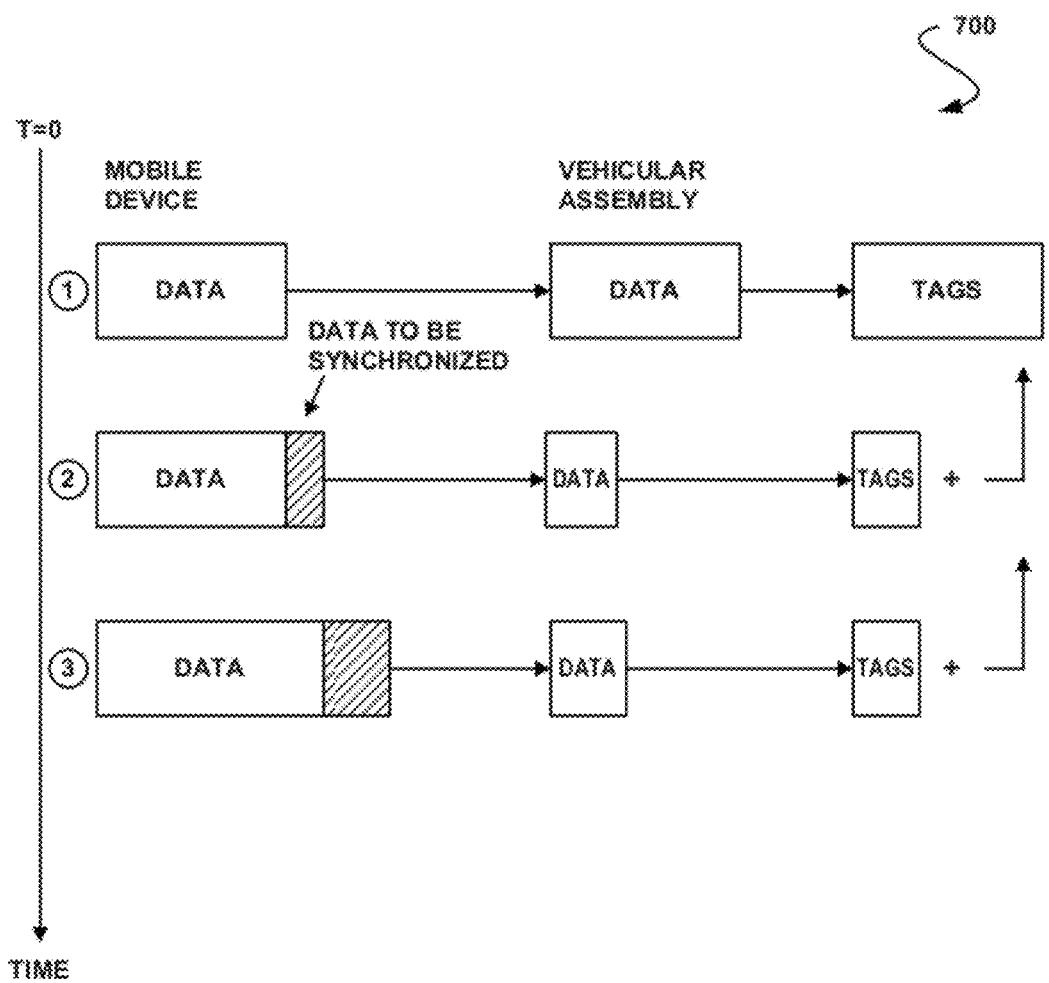
FIG. 7 shows a diagram showing data that is to be received by a vehicular assembly over a period of time, in accordance with one embodiment.

FIG. 7 shows a diagram 700 showing data that is to be received by a vehicular assembly over a period of time, in accordance with one embodiment. As an option, the method 700 may be implemented in the context of the architecture and environment of FIGS. 1-6. Of course, however, the method 700 may be carried out in any desired environment. Again, the aforementioned definitions may apply during the present description.

As shown, the first time a mobile device is connected to a vehicular assembly (e.g. through a wireless or wired connection), all data that is selected to be received by or synchronized with the vehicular assembly is received by the vehicular assembly and tags are generated. The next time the mobile device is connected to the vehicular assembly, not all of the data needs to be received by the vehicular assembly because tags have already been generated and stored from the first time the mobile device was connected. Thus, only the data on the mobile device that has not been previously received or synchronized by the vehicular assembly may be received. Of course, the data to be received may be based on criteria determining a subset of data to be received, as mentioned above.

Once the data that has not previously been received is received by the vehicular assembly, the vehicular assembly may generate tags for such data and store the tags with any previously generated tags. A third time the mobile device is connected, the same sequence of events may occur, such that only new or updated data on the mobile device is received for tag generation.

It should be noted, that although FIG. 7 is described in the context of tag generation, a similar sequence of events may occur for data synchronization between the mobile device and the vehicular assembly. For example, once connected, only new or updated data on the mobile device or the vehicular assembly may be synchronized. In one embodiments, data to be received for tag generation and/or data to be synchronized between the device and the vehicular assembly may be marked with a flag. In another embodiment, a time stamp may be utilized to determine whether data is to be received for tag generation and/or data to be synchronized between the device and the vehicular assembly. In this way, an overall initialization time may be minimized when initializing a mobile device and/or the vehicular assembly such that voice-enabled access to mobile device data may be enabled.

Figure 8B:
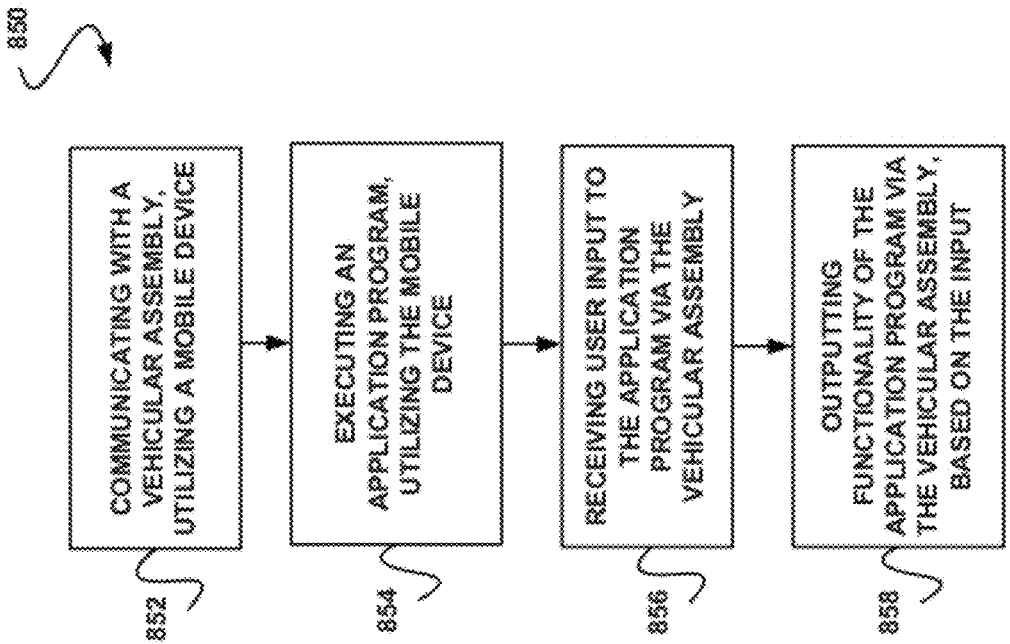
FIG. 8B shows a method for utilizing a mobile device as a platform to execute software to provide functionality via a vehicular assembly, in accordance with one embodiment.
Figure 8A:
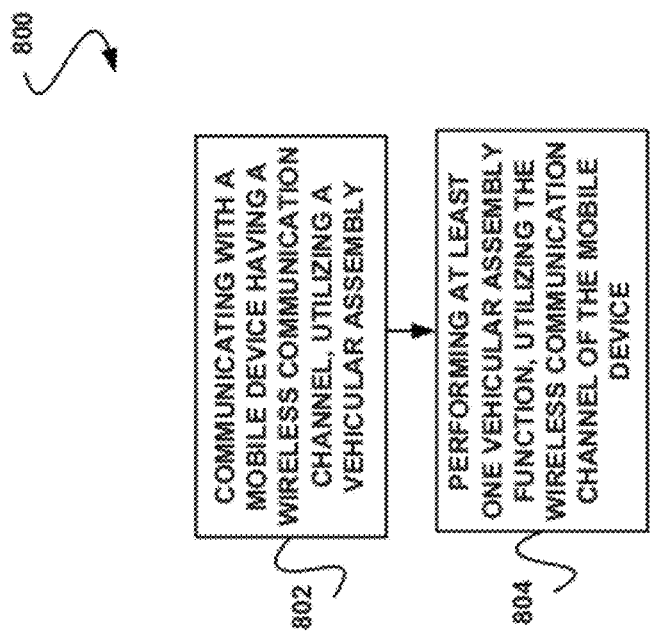
FIG. 8A shows a method for utilizing a communication channel of a mobile device by a vehicular assembly, in accordance with one embodiment.

In addition to providing voice-enabled access to mobile device data and accessing the mobile device functionality, in another embodiment, a communication channel of the mobile device may be utilized by the vehicular assembly to perform at least one vehicular assembly function. FIG. 8A shows a method 800 for utilizing a communication channel of a mobile device by a vehicular assembly, in accordance with one embodiment. As an option, the method 800 may be implemented in the context of the architecture and environment of FIGS. 1-7. Of course, however, the method 800 may be carried out in any desired environment. Again, the aforementioned definitions may apply during the present description.

As shown, a vehicular assembly communicates with a mobile device having a wireless communication channel (e.g. a broadband wireless less channel, a cellular wireless channel, etc.). See operation 802. Additionally, at least one vehicular assembly function is performed utilizing the wireless communication channel of the mobile device. See operation 804. In various embodiments, the communication between the mobile device and the vehicular assembly may be wired or wireless.

In the context of the present description, a vehicular assembly function refers to any function capable of being performed by the vehicular assembly. In one embodiment, the vehicular assembly function may include a navigation function. For example, the vehicular assembly may include a navigational system or an interface to a navigational system.

In this case, data including updated traffic data and/or updated roadway data may be received over the wireless communication channel. A navigation function may then use this data to route or reroute a path for the vehicle. As another option, the navigational information may be displayed to a user. In this way, the at least one vehicular assembly function may utilize data received over the wireless communication channel.

In one embodiment, the vehicular assembly function may utilize GPS data received by the vehicular assembly and/or the mobile device. For example, the vehicle assembly may receive GPS data for a particular location and utilize the mobile device to determine more information about this location. For example, a user may use navigational functionality of the vehicular assembly to find GPS coordinates for a business. The wireless connection of the mobile device may then be utilized to access information relating to the business such that the information may be displayed using a display associated with the vehicular assembly.

In another embodiment, the vehicular assembly function may include a communication function between a local person and a remote person. For example, the vehicular assembly may include a communication system. In this case, social network data or other contact data may be received by the mobile device. This data may be used by the communication function to be performed utilizing the wireless communication channel of the mobile device.

In still another embodiment, the vehicular assembly function may include a display function. In this case, digital media data may be received over the wireless communication channel of the mobile device. This digital media may be displayed on a display associated with the vehicular assembly. In one embodiment, data received from the wireless communication channel of the mobile device may be streamed directly to the display. In another embodiment, the content may be stored in the vehicular assembly and then displayed using the display.

Similarly, in one embodiment, the vehicular assembly function may include an audible function. In this case, audio data may be received over the wireless communication channel of the mobile device. This audio data may be played on an audio system associated with the vehicular assembly. In one embodiment, audio data received from the wireless communication channel of the mobile device may be streamed directly to the audio system. In another embodiment, the audio data may be stored in the vehicular assembly and then output using the audio system.

In some cases, social network data may be received over the wireless communication channel. For example, the social networking data may include a location of one of more contacts (e.g. GPS coordinates, an address, a business name, etc.), a traveling speed of one or more contacts, and a destination of one or more contacts, etc. The contacts may be predetermined people stored in a contact list of the mobile device for example.

This social networking data may be configured to automatically update or to be manually updated using the mobile device. For example, a mobile device of a first user may query a mobile device of a second user for the social networking data. The mobile device of the second user may then supply the requested information. As another option, the first user may manually query the second user for the social networking data using the mobile device (e.g. via a text message, etc.).

In either case, the vehicular assembly may utilize the social networking data received. For example, the vehicular assembly may automatically update a navigational system corresponding to the vehicular assembly with the social networking data. In one embodiment, the vehicular assembly may use this social networking data to calculate a route. As an option, this route may be calculated automatically. In one embodiment, a user may be prompted to verify the route calculation before the route is calculated.

It should be noted that the data received by the mobile device utilizing the wireless communication channel may either be automatically provided or a user may request the data. For example, the mobile device and/or the vehicular assembly may be configured to automatically query for the data. In this case, the query may be a periodic query.

As another option, the data may be provided automatically as streaming content to the mobile device. As still another option, a user may manually request the data. For example, the user may request the data utilizing the mobile device or the vehicular assembly.

In one embodiment, a text message may include the request. In another embodiment, the user may use a voice command directed towards the vehicular assembly or the mobile device. In this case, speech recognition software may be utilized to recognize the command an initiate the manual request. As an option, voice-to-text functionality may be utilized to issue the request. In this way, the user may use functionality associated with the vehicular assembly to request the data.

In addition to utilizing a communication channel of the mobile device to perform at least one vehicular assembly function, in another embodiment, the mobile device may be utilized as a platform to execute software to provide functionality via a vehicular assembly. FIG. 8B shows a method 850 for utilizing a mobile device as a platform to execute software to provide functionality via a vehicular assembly, in accordance with one embodiment. As an option, the method 850 may be implemented in the context of the architecture and environment of FIGS. 1-8A. Of course, however, the method 850 may be carried out in any desired environment. The aforementioned definitions may apply during the present description.

As shown, a mobile device is used to communicate with a vehicular assembly. See operation 852. Additionally, an application program is executed, utilizing the mobile device. See operation 854. Further, user input to the application program is received via the vehicular assembly. See operation 856. Still yet, functionality of the application program is outputted via the vehicular assembly, based on the input. See operation 858.

The application program may include any software application capable of being executed utilizing the mobile device. For example, in one embodiment, the application program may include a media player application. In various embodiments, the media player application may include an on-line radio station, an on-line video station (e.g. an on-line news station, an on-line TV station, etc.), a digital video player, a digital audio player, etc. In another embodiment, the application may include a finance related application (e.g. stocks, etc.), a web browser, a map application, a calendar application, a picture viewing application, a weather application, and/or any other application. Thus, the application program may be operable to interface with an on-line application program via a network for outputting the functionality.

As an option, the user input may select one of a plurality of the application programs to execute. In this case, the user input may control the application program. In one embodiment, the user input may be received by a microphone of the vehicular assembly. For example, the user may issue a voice command to execute a particular application on the mobile device.

In another embodiment, the user input may be received by a touch screen of the vehicular assembly. For example, icons or text may be displayed on the touch screen that correspond to applications on the mobile device. As an option, the touch screen may display a mirror image of what is displayed on the mobile device. The user may then use this touch screen to control the applications and/or the mobile device.

In still another embodiment, the user input may be received by a steering wheel control of the vehicular assembly. In this case, the user may input a command to select and/or control an application of the mobile device using button on the steering wheel control. As an option, results of this selection and/or control may be displayed on a display of the vehicular assembly.

Depending on the functionality of the application program, the functionality may be outputted via different devices of the vehicular assembly. For example, in the case that the functionality of the application program includes audio functionality (e.g. for a streaming audio application, etc.), the functionality may be outputted by a speaker of the vehicular assembly. In the case that the functionality of the application program includes visual data functionality (e.g. text, video, images, icons, etc.), the functionality may be outputted by a screen of the vehicular assembly.

In one embodiment, the application program may interface with a navigation system of the vehicular assembly. For example, the application program may include navigational software capable of interfacing with the navigational system. In this case, the navigational software may include maps, GPS coordinates for locations, etc.

As another example, the application program may include social networking software capable of providing location information, destination information, travel speed information, etc., for contacts. In this case, the social networking software may provide the navigational system with this information such that the navigation system may create routes, points-of-interest, calculate distances, etc.

In one embodiment, the functionality of the application program outputted via the vehicular assembly may be related to a navigation of a vehicle of which the vehicle assembly is a component. For example, the application program may supply road condition information, traffic condition information, weather information, and/or other information to the navigation system of the vehicle. Additionally, the mobile device may include a GPS system capable of supplying GPS coordinates and other navigational information to the vehicular assembly.

In another embodiment, the functionality of the application program outputted via the vehicular assembly may be related to a presentation of digital media in a vehicle of which the vehicle assembly is a component. For example, the functionality may be any functionality that may be output visually using a display, or audibly using speakers.

In still another embodiment, the functionality of the application program outputted via the vehicular assembly may be related to a communication between a user of a vehicle of which the vehicle assembly is a component and a remote entity. For example, the functionally may include a text messaging functionality, an email functionality, and a direct communication functionality, etc. that is capable of communicating with a remote entity (e.g. an individual, business, etc.). Thus, the communication functionality may include a textual communication and vocal communication. This communication functionality may be implemented and output using the vehicular assembly.

In one embodiment, the application program may receive updates utilizing a communication channel of the mobile device. For example, a user of the mobile device may be prompted to receive any available updates to the application program. As another option, the updates may be received automatically without user interaction.

As an option, the application program may be installed on the vehicular assembly utilizing the mobile device. For example, during a data synchronization process, a user may be prompted to install the application program on the vehicular assembly.

In one embodiment, the application program may include a program for modifying characteristics of the vehicle assembly. For example, in one embodiment, the characteristics of the vehicle assembly may include sounds associated with the vehicle assembly. In this case, the sounds may include a voice used by the vehicle assembly to convey information to a user, ring tones used by the vehicle assembly, chimes and chirps used by the vehicle assembly, etc. In another embodiment, the characteristics of the vehicle assembly may include visual objects associated with the vehicle assembly. In this case, the visual objects may include screen savers, wall paper for displays, icons, text formats, fonts, display characteristics, etc.

It should be noted that the vehicular assembly may include a standardized application program interface for allowing access thereto by a plurality of diverse application program developers. In this way, a versatile interface may be provided such that any application on the mobile device may be access and operated utilizing the vehicular assembly.

Figure 8C:
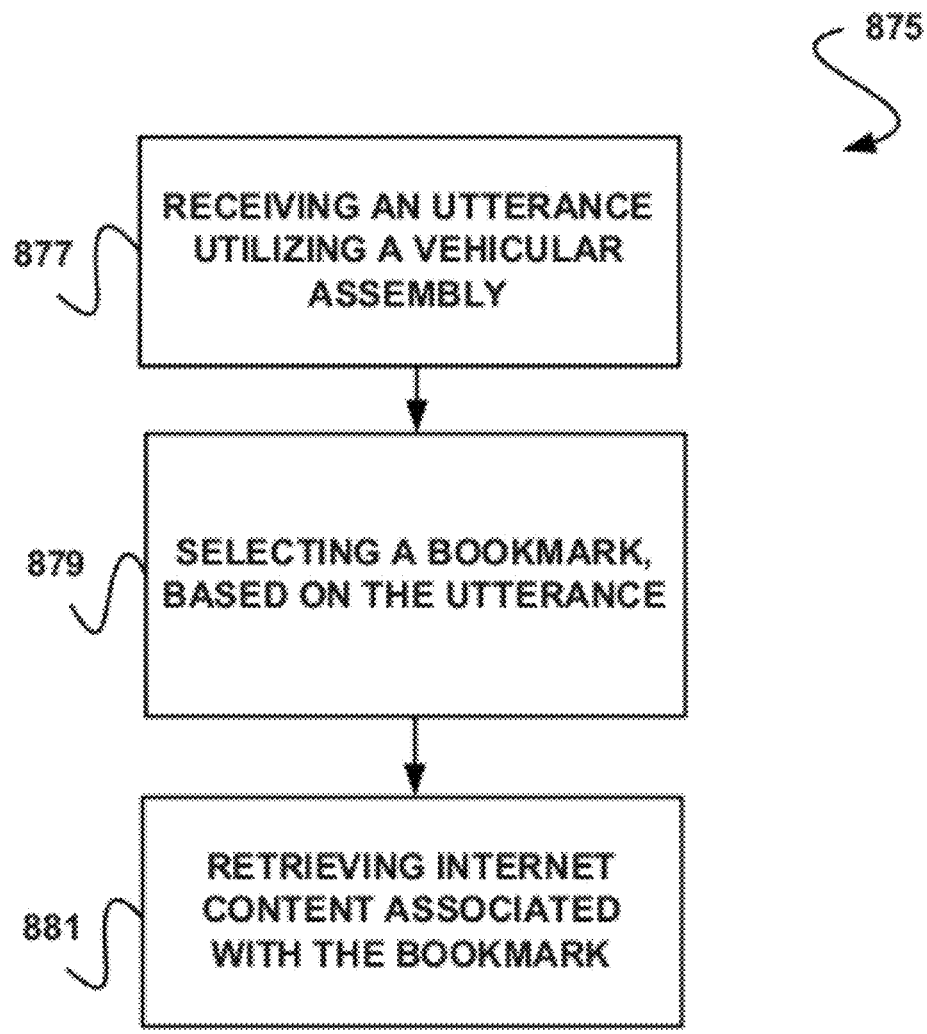
FIG. 8C shows a method for navigating a network, in accordance with one embodiment.

In addition to utilizing a communication channel of the mobile device to perform at least one vehicular assembly function, in another embodiment, the vehicular assembly may be utilized for navigating a network. FIG. 8C shows a method 875 for navigating a network, in accordance with one embodiment. As an option, the method 875 may be implemented in the context of the architecture and environment of FIGS. 1-8B. Of course, however, the method 875 may be carried out in any desired environment. The aforementioned definitions may apply during the present description.

As shown, an utterance is received utilizing a vehicular assembly. See operation 877. Additionally, a bookmark is selected, based on the utterance. See operation 879. Further, Internet content associated with the bookmark is retrieved. See operation 881.

In this case, a bookmark may include any pointer or link to a web page or other Internet content. In one embodiment, may include an html link to Internet content. As an option, the bookmarks may include pre-defined bookmarks. As another option, the bookmarks may be user configurable.

The Internet content may be any type of content accessible utilizing a bookmark. Furthermore, the Internet content may be output utilizing the vehicular assembly. In one embodiment, the content may be converted from speech-to-text. For example, the content may include one of audio news content, audio weather content, audio traffic information, audio from a user, etc. In these cases, the content may be displayed on a screen of the vehicular assembly.

The Internet content may also include any digital media such as streaming music, video, fictional, or non-fictional content. For example, the fictional content may include an online fictional book. The non-fictional content may include content such as news, weather, road information, or any other non-fictional content.

In one embodiment, the content may be converted from text-to-speech. For example, the content may include any web pages including text that are accessible using a bookmark. In these cases, the content may be output to an audio system associated with the vehicular assembly.

In either case, the vehicular assembly may be capable of communicating with a mobile device. In this way, the bookmark may be received from the mobile device for generating a voice tag to compare with the utterance. The Internet content may then be retrieved utilizing a communication channel of the mobile device.

In one embodiment, the mobile device may include a plurality of bookmarks that are accessible utilizing the vehicular assembly. For example, the mobile device may include a group of bookmarks (e.g. a folder of bookmarks, etc.) for use with the vehicular assembly. As an option, the bookmarks that are accessible utilizing the vehicular assembly may be user configurable. In this case, some bookmarks stored on the mobile device may be selected to be inaccessible from the vehicular assembly. In one embodiment, the bookmarks accessible to the vehicular assembly may be uploaded to the vehicular assembly and/or displayed to a user.

In one embodiment, functionality may be provided in conjunction with the Internet content. For example, the functionality may include navigation functionality such as GPS functionality, mapping functionality, etc. As another example, the functionality may include address lookup and/or telephone number lookup functionality.

In one embodiment, the functionality may be provided by way of an on-line application. For example, the on-line application may include a navigational application. As another example, the online application may include a database application. More information regarding online applications may be found in provisional U.S. Patent Application Ser. No. 61/022,235, titled "Mobile System, Method, And Computer Program Product For Executing An Online Application A Mobile Device," which is incorporated herein by reference in its entirety.

As an option, the Internet content may be conditionally displayed utilizing the vehicular assembly, based on movement of a vehicle of which the vehicular assembly is a component. For example, a navigational application may be displayed when the vehicle is moving whereas a media player application and streaming digital contact is displayed when the vehicle in not in motion.

In one embodiment, images stored on a mobile device or in an online database may be displayed utilizing the vehicular assembly. As an option, one or more of the images may be utilized as wallpaper for a display of the vehicular assembly. As another option, the images may be sequenced as a slide show.

In one embodiment, an online application accessed utilizing the mobile device may be utilized to create a slide show utilizing the stored images. In this case, the online application may utilize streaming audio to create the slide show. Thus, images may be sequenced while music is being played utilizing the vehicular assembly.

As an option, a touch screen display associated with the vehicular assembly may be utilized to select or deselect images that are displayed. In this way, a user may manually sequence through the images and also configure a slide show for automatic sequencing.

It should be noted that, in some cases, authentication information may be needed to access Internet content associated with a bookmark. In these cases, a user name and password may be automatically sent to a server in conjunction with retrieving the Internet content. For example, a plug-in may be utilized to automatically send the user name and password. In this case, the plug-in may be a plug-in associated with a web browser corresponding to a mobile device that is connected to the vehicular assembly.

Figure 9A:
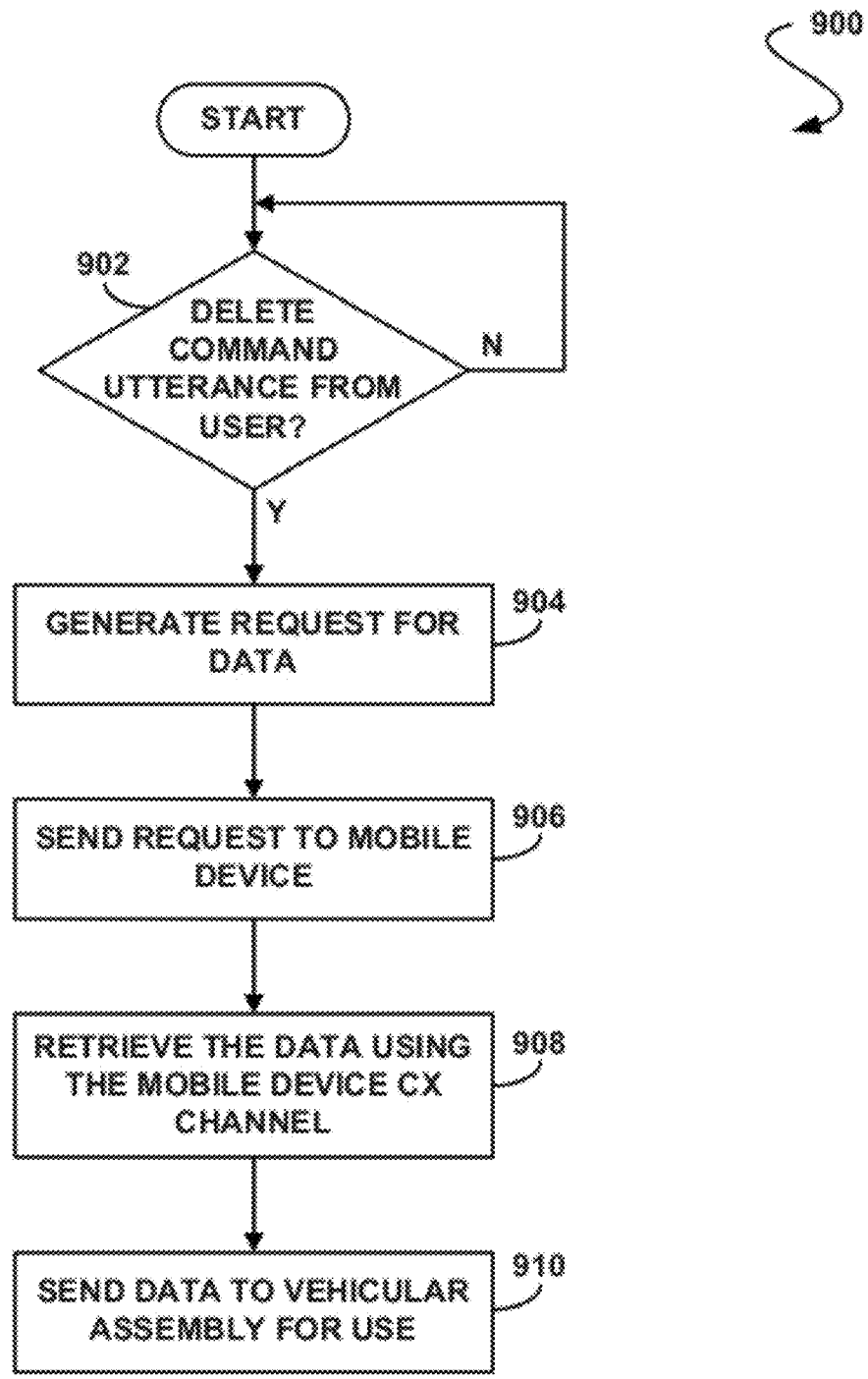
FIG. 9A shows a method for utilizing a communication channel of a mobile device by a vehicular assembly, in accordance with another embodiment.

FIG. 9A shows a method 900 for utilizing a communication channel of a mobile device by a vehicular assembly, in accordance with another embodiment. As an option, the method 900 may be implemented in the context of the architecture and environment of FIGS. 1-8C. Of course, however, the method 900 may be carried out in any desired environment. The aforementioned definitions may apply during the present description.

As shown, it is determined whether a command utterance is received by a vehicular assembly from a user. See operation 902. In this case, the command utterance may include a play command, a find command, a stop command, a start command, or any other command. In one embodiment, the command may include a command to access a bookmark.

If a command utterance is received from the user, a request for data is generated. See operation 904. Once the request for data is generated, the request is sent to a mobile device that is in communication with the vehicular assembly. See operation 906.

In one embodiment, the request may include a name of a bookmark. In another embodiment, the request may be utilized to determine a bookmark to be utilized. For example, the request may include a key word that may be utilized to determine a bookmark. In this case, the command utterance may be parsed to determine a key word for selecting a bookmark.

Once the request is sent to the mobile device, data associated with the request is retrieved using a communication channel of the mobile device. See operation 908. In one embodiment, the mobile device may utilize the bookmark to connect to a web page to retrieve Internet content associated with the request.

Once the data has been retrieved by the mobile device, the data is sent to the vehicular assembly. See operation 910. In this case, the data may be sent to the vehicular assembly by the mobile device utilizing a hard-wire connection or a wireless connection between the mobile device and the vehicular assembly. Once the data is sent to the vehicular assembly, the data may be output to a user.

Figure 9B:
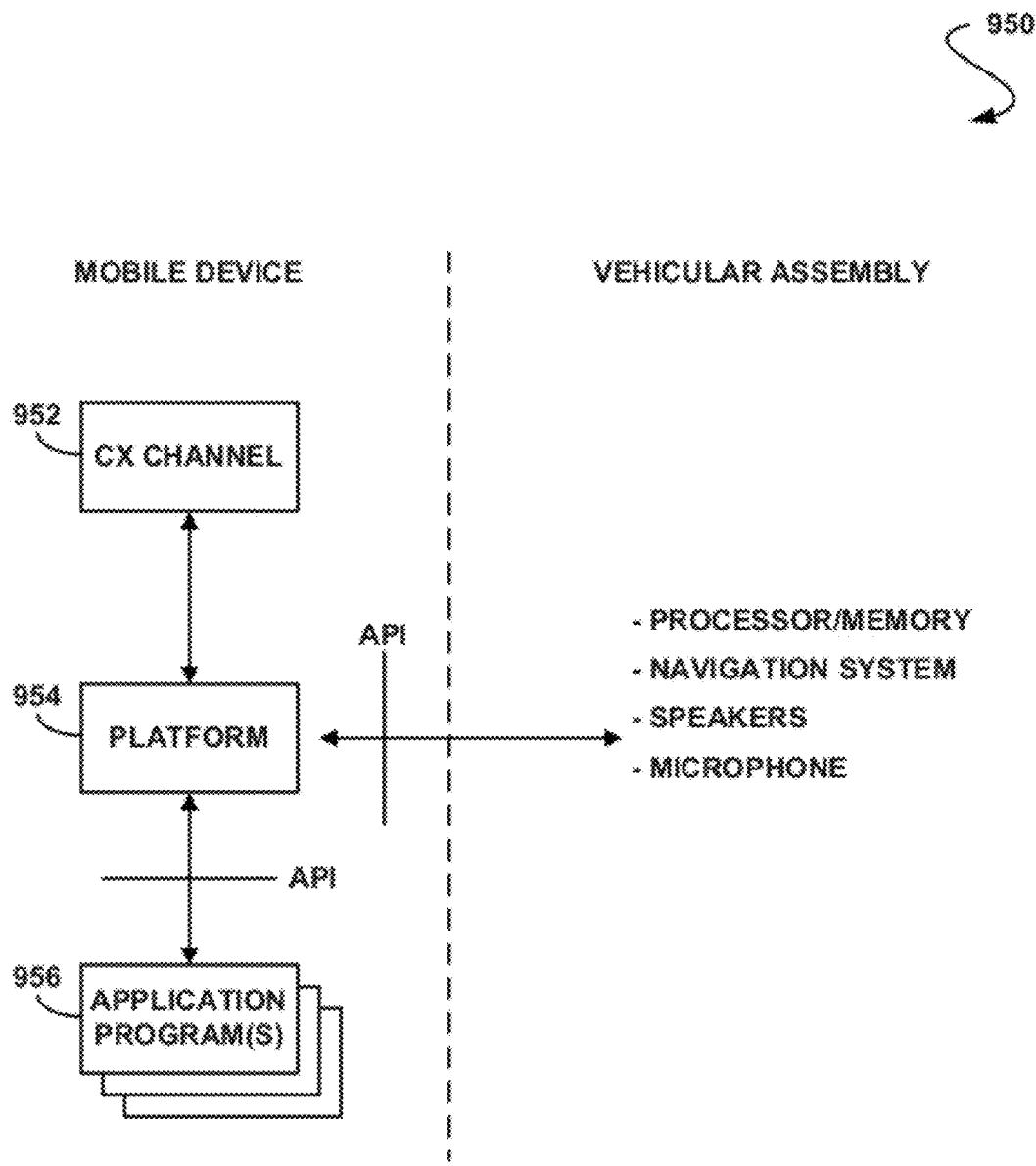
FIG. 9B shows a system for utilizing a communication channel of a mobile device by a vehicular assembly, in accordance with another embodiment.

FIG. 9B shows a system 950 for utilizing a communication channel of a mobile device by a vehicular assembly, in accordance with another embodiment. As an option, the system 950 may be implemented in the context of the architecture and environment of FIGS. 1-9A. Of course, however, the system 950 may be implemented in any desired environment. The aforementioned definitions may apply during the present description.

As shown, a mobile device may be in communication with a vehicular assembly. The mobile device may include a communication channel 952 for communicating with servers, online applications, and other devices. Furthermore, the mobile device may include a platform 954 capable of providing access to one or more application programs 956. In this case, the application programs 956 may be stored locally on the mobile device, on the vehicular assembly, or in a networked database.

Components of the vehicular assembly (e.g. a processor/memory, a navigational system, speakers, a microphone, etc.) may interface with the mobile device through an API such that the vehicular assembly may access application programs, software, data, and functionality corresponding to the mobile device.

In this way, any data and functionality associated with the mobile device may be accessed utilizing the vehicular assembly. In one embodiment, contact information from a mobile device may be incorporated into a points-of-interest database of a vehicular assembly.

FIG. 10A shows a method 1000 for incorporating contacts from a mobile device into a points-of-interest database of a vehicular assembly, in accordance with one embodiment. As an option, the method 1000 may be implemented in the context of the architecture and environment of FIGS. 1-9B. Of course, however, the method 1000 may be carried out in any desired environment. The aforementioned definitions may apply during the present description.

As shown, a vehicular assembly is utilized to communicate with a mobile device. See operation 1002. Contacts data is received from the mobile device at the vehicular assembly. See operation 1004. Furthermore, the contacts data is displayed utilizing the vehicular assembly. See operation 1006.

In the context of the present description, contacts data refers to any information corresponding to a contact or other identified entity. For example, in various embodiments, the contact data may include current location information of a contact, previous location information of a contact, future location information of a contact, destination information of a contact, travel speed information of a contact, an estimated time of arrival (ETA) of a contact, communication information of a contact, and/or any other contact data corresponding to a contact.

In one embodiment, the contacts data may be received from the mobile device in response to an initial communication between the mobile device and the vehicular assembly. As an option, only a subset of the contacts data may be received from the mobile device for generating the tags, to reduce a time required for initialization. In this case, the subset of the data may be selected based on a predetermined criteria, selected by a user, based on previous use of the mobile device or vehicular assembly, and/or based on whether the data was previously received.

In addition to displaying the contacts information utilizing the vehicular assembly, communication may be initiated with at least one contact utilizing the vehicular assembly. The communication may include textual communication or voice communication. In one embodiment, the communication with the at least one contact may be initiated by selecting the displayed contacts information for the at least one contact. For example, the contacts information may be displayed using a display including a touch screen interface. A user may touch the displayed contacts information to initiate communication with a contact.

In another embodiment, the communication with the at least one contact may be initiated utilizing an oral command. In this case, the oral command may include a command to call or text a contact. These commands and the communication may be executed utilizing the mobile device and an associated communication channel.

In one embodiment, the contacts data may be incorporated into a point-of-interest database of the vehicular assembly. For example, the vehicular assembly may include a navigation system including a database with one or more points-of-interest. The contacts data may be incorporated into this point-of-interest database such that the navigation system may utilize the contacts data.

As an option, a route may be determined between a current location of a vehicle associated with the vehicular assembly and at least one contact represented by the point-of-interest database. This information and other information associated with at least one contact represented by the point-of-interest database may be presented utilizing the vehicular assembly.

For example, the information displayed may include a permanent location of the at least one contact, a current location of the at least one contact, a picture of the at least one contact, a destination of the at least one contact, an ETA to a destination, travel statistics of the at least one contact, and any other information relating to the at least one contact. It should be noted that the contacts data may include static and/or dynamic data.

In one embodiment, the contacts data may be periodically supplied to the mobile device. In this case, the contacts data may be periodically supplied by one or more contacts and/or a third party service capable of supplying the contacts information. In another embodiment, the mobile device may periodically query one or more contacts or a third party service for the contacts information. In this way, the contacts information may be provided in real-time, near real-time, automatically, or manually.

For example, contacts information including GPS coordinates for a first contact may retrieved by the mobile device. The GPS coordinates may be utilized to track the first contact. In one embodiment, the first contact may be tracked and the tracking may be displayed utilizing the vehicular assembly. As an option, a picture of the first contact may be displayed as part of the tracking. To communicate with the first contact, a user may select the picture of the first contact by touching the picture on a touch screen display, for example.

In one embodiment, the vehicular assembly may be utilized for social networking. FIG. 10B shows a method 1050 for social networking utilizing a vehicular assembly, in accordance with one embodiment. As an option, the method 1050 may be implemented in the context of the architecture and environment of FIGS. 1-10A. Of course, however, the method 1050 may be carried out in any desired environment. The aforementioned definitions may apply during the present description.

As shown, a vehicular assembly is utilized to communicate with a mobile device. See operation 1052. Information about social contacts is received, utilizing the mobile device. See operation 1054. Further, the information about social contacts is displayed, utilizing the vehicular assembly. See operation 1056.

In the context of the present description, social contacts refer to any contacts that are determined to be contacts associated with social activity. For example, a user may define a contact as a social contact as opposed to a business contact. In one embodiment, social contacts may be any contact saved as a group or in a folder including primarily social contacts. As an option, a user may configure a contact to be a social contact (e.g. by selecting a "social contact" select box, etc.).

As another option, a contact may be determined to be a social contact automatically based on criteria for defining a social contact. In various embodiments, such criteria may include a frequency of interaction with the contact (e.g. a number of communication instances, etc.), a duration or average duration of interactions, a method of communication (e.g. email, text messaging, instant messaging, telephone or other voice communication, etc.), a formality of the communication (e.g. based on a spelling and/or grammar check, etc.), and/or various other criteria.

Additionally, the information about the social contact may include any information relating to a contact, a device used by the contact, a location of the contact, a destination of a contact, movement or travel information and/or statistics of a contact, and/or any other information associated with the contact.

In one embodiment, the information may include a status of the social contacts. For example, the status may include at least one of available and unavailable, where available indicates that the contact is available for communication and unavailable indicates that the client is not available for communication. In various embodiments, the status of the social contacts may be indicated by an icon, text, pictures, and various other indicators.

In one embodiment, the information may include which of a plurality of contacts is in at least one location. For example, the at least one location may include a vehicle. Thus, the information may indicate which contacts are in the vehicle.

As an option, a location of the vehicle may be displayed on a map. In this case, the vehicle may be displayed as a vehicle icon. Additionally, the location of the vehicle on the map may be updated in real-time or near real-time, utilizing location information received through the communication channel of the mobile device. As noted above, this information may be provided manually or automatically.

Using the display of the vehicular assembly, the vehicle may be displayed on the map with identifiers identifying each of the plurality of contacts. In various embodiments, the identifiers may include pictures, text (e.g. names, etc.), icons, and/or various other identifiers.

In one embodiment, the information of which contacts are in the vehicle may be provided by mobile devices from each of the contacts. For example, a mobile device, such as a cell phone, may provide location information (e.g. GPS coordinates, etc.) to a user. This location information may be provided to the vehicular assembly and may be used by the mobile device or the vehicular assembly to determine whether the contact is located in the vehicle.

In another embodiment, a contact may use a vehicular assembly or a mobile device associated with the contact to provide the information indicating the location of the contact. For example, a display of a vehicular assembly of the vehicle in which the contact is located may provide the contact with an interface for indicating that the contact is in the vehicle. Once the contact provides this location information, the information may be communicated to the mobile device of the user seeking the location information.

In another embodiment, the information may include which of a plurality of contacts is in at least one location, where the at least one location includes a point-of-interest. The point-of-interest may include any point-of-interest such as a restaurant, bar, club, park, or any other point-of-interest.

As an option, the point-of-interest may be displayed on the map. In this case, an icon, picture, and/or text associated with at least one of the social contacts at the point-of-interest may also be displayed. Again, the location information of the at least one contact may be provided manually or automatically by a mobile device of the contact, a vehicular assembly of the contact, or third party service capable of providing such information.

It should be noted that location information for each contact may be updated on the map in real-time or near real-time. In various embodiments, the updating may be configured by a user, a social contact, and/or a third party service. Accordingly, a picture or icon corresponding to each social contact may change positions on the displayed map, based on an actual location of the social contact.

In one embodiment, a user may communicate with a social contact in response to a selection of the icon or other item representing the social contact on the map. Thus, upon selection of the icon, a user may be given the option of voice communication or textual communication with the social contact.

As an option, additional information corresponding to at least one social contact may be displayed, in response to selection of the icon or other item. For example, in various embodiments, the other information may include GPS coordinates, destination information, an ETA, a message from the social contact, a number of the social contact, a nickname of the social contact, a past location of the social contact, a status of the social contact, a mood of the social contact, media being played by a social contact, media recommendations of the social contact, and/or various other information.

In another embodiment, instant communication options may be provided in response to selection of the icon or other item. For example, upon selection of the icon, a user may be presented with an option to update the contact associated with that icon with information such as an automatically provided ETA (e.g. calculated by the vehicular assembly or the mobile device, etc.), a status, predefined text messages, and other information.

In still another embodiment, driving directions may be provided to a location of the at least one social contact, in response to a selection of the icon. For example, in response to selecting the icon, a navigation system associated with the vehicular assembly or the mobile device may calculate driving directions to the social contact. In this case, the navigation system may utilize GPS coordinates to calculate the directions. The GPS coordinates may include coordinates associated with a mobile device of the social contact and/or a location of the social contact (e.g. coordinates of a vehicle, point-of-interest, etc.).

In one embodiment, at least one point-of-interest between a current location and a location of at least one social contact may be displayed, in response to selection of the icon. For example, upon selection of the icon, a point-of-interest between a location of the user who selected the icon and the location of the social contact associated with the icon may be determined and displayed. In this way, a meeting point may be established between the social contact and the user.

In one embodiment, the user may have the ability to select a type of point-of-interest to be displayed. For example, the user may select that a restaurant, a gas station, a bar, or other point-of-interest is the point-of-interest to be displayed. As an option, all available points-of-interest may be displayed.

In one embodiment, selecting the point-of-interest between the user and the social contact may provide the social contact with selected point-of-interest. For example, upon selecting a meeting point using a display of the vehicular assembly, the vehicular assembly may communicate the selection to the mobile device such that the mobile device may use the communication channel to provide a mobile device of the social contact with the selection. As an option, a display associated with a vehicular assembly of the social contact may then automatically display the selection.

Alternatively, the social contact may select a meeting point and the selection may be communicated to the mobile device of the user. The mobile device of the user may then communicate this selection to the vehicular assembly of the user such that a display is automatically updated with the selection.

As an option, driving directions may be provided to the point-of-interest if requested. For example, the user may select the point-of-interest selected by the social contact (or any point of interest between the user and the social contact), and driving directions to the point-of-interest may be provided (e.g. based on coordinates of a current user location and the coordinates of the point-of-interest, etc.).

FIG. 11 shows a method 1100 for social networking utilizing a vehicular assembly, in accordance with one embodiment. As an option, the method 1100 may be implemented in the context of the architecture and environment of FIGS. 1-10B. Of course, however, the method 1100 may be carried out in any desired environment. Again, the aforementioned definitions may apply during the present description.

As shown, it is determined whether a vehicular assembly makes a connection with a mobile device. See operation 1102. Once a connection is made, contact information is retrieved from the mobile device. See operation 1104.

In one embodiment, the contact information may include all contact information or all new contact information stored on the device. In another embodiment, the contact information may include only a subset of contact information that is determined to be retrieved from the mobile device. For example, the mobile device may include a folder indicating contacts to be retrieved.

Once the contact information is retrieved, the contact information is displayed utilizing the vehicular assembly. See operation 1106. As an option, the contact information may be displayed as a list. As another option, the contact information may be displayed on a map. As still another option, the contact information may be displayed utilizing a drop-down or pop-up list that is displayed by selecting an icon, picture, or text, associated with the contact.

It is then determined whether a user command is received to incorporate the contacts into a points-of-interest database. See operation 1108. In this case, incorporating the contacts in the points-of-interest database may include utilizing the contact information to determine or display a location of the contact. In one embodiment, incorporating the contacts into the points-of-interest database may be performed automatically.

If it is determined to incorporate the contacts into the points-of interest database, the contacts are incorporated. See operation 1110. It should be noted that incorporating the contacts into the points-of-interest database may include listing contacts whose location information is to be displayed and listing contacts whose location information is to be updated.

Once the contacts are incorporated, the contacts may be treated as dynamic or static points-of-interest that may be utilized with a navigation system corresponding to the vehicular assembly. See operation 1112. In this way, a location of the contacts may be monitored on a display of the vehicular assembly.

While using the contact information with the navigation system, it is determined whether a user request to initiate communication with a contact is received. See operation 1114. If such a request is received, communication with the contact is initiated using a communication channel of the mobile device. See operation 1116.

It should be noted that, location information for the contacts may be updated dynamically. Thus, in parallel with communication and navigational functionality, it is determined whether any update to a contact location is received. See operation 1118. If updated location information is received, the contact location is updated in the points-of-interest database and/or on the display of the vehicular assembly. See operation 1120.

Figure 12:
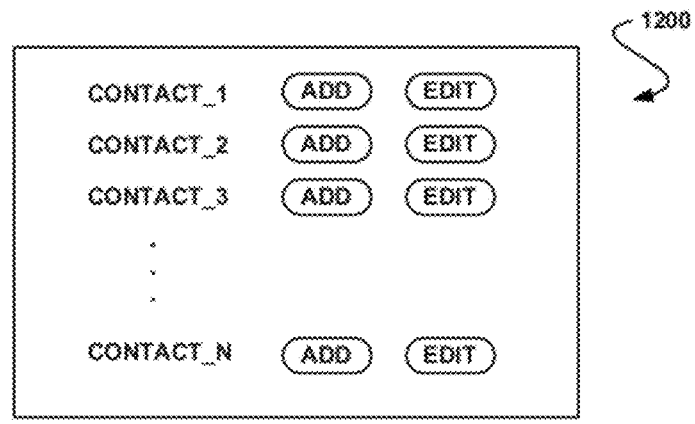
FIG. 12 shows an interface for adding contacts to be displayed on a vehicular assembly, in accordance with one embodiment.

FIG. 12 shows an interface 1200 for adding contacts to be displayed on a vehicular assembly, in accordance with one embodiment. As an option, the interface 1200 may be implemented in the context of the architecture and environment of FIGS. 1-11. Of course, however, the interface 1200 may be implemented in any desired environment. The aforementioned definitions may apply during the present description.

As shown, the interface 1200 may list a plurality of contacts. In this case, the interface 1200 may be displayed on a mobile device of a user, on a vehicular assembly display, and/or on any other suitable display.

In one embodiment, contacts of a user may be displayed using the interface 1200 such that a user may select to add the contact to a points-of-interest database. For example, the vehicular assembly may retrieve a list of contacts from the mobile device and display the contacts in a list on a display of the vehicular assembly. The user may then select "Add" to add the contact to a points-of-interest database.

In another embodiment, contacts of a user may be displayed using the interface 1200 such that a user may select to retrieve certain contacts or contact information using the vehicular assembly. For example, the vehicular assembly may retrieve a list of contacts from the mobile device and display the contacts in a list on a display of the vehicular assembly. The user may then select "Add" to retrieve the contact information.

As another option, the interface 1200 may allow a user to edit contact information by selecting an "Edit" button. For example, the user may edit settings corresponding to location updates for the contact. The user may also edit any other information associated with the contact.

In one embodiment, the interface 1200 may be displayed using the mobile device such that a user may select which contacts to be retrieved by the vehicular assembly. Furthermore, the mobile device may be utilized to edit configuration settings associated with each contact.

Figure 13:
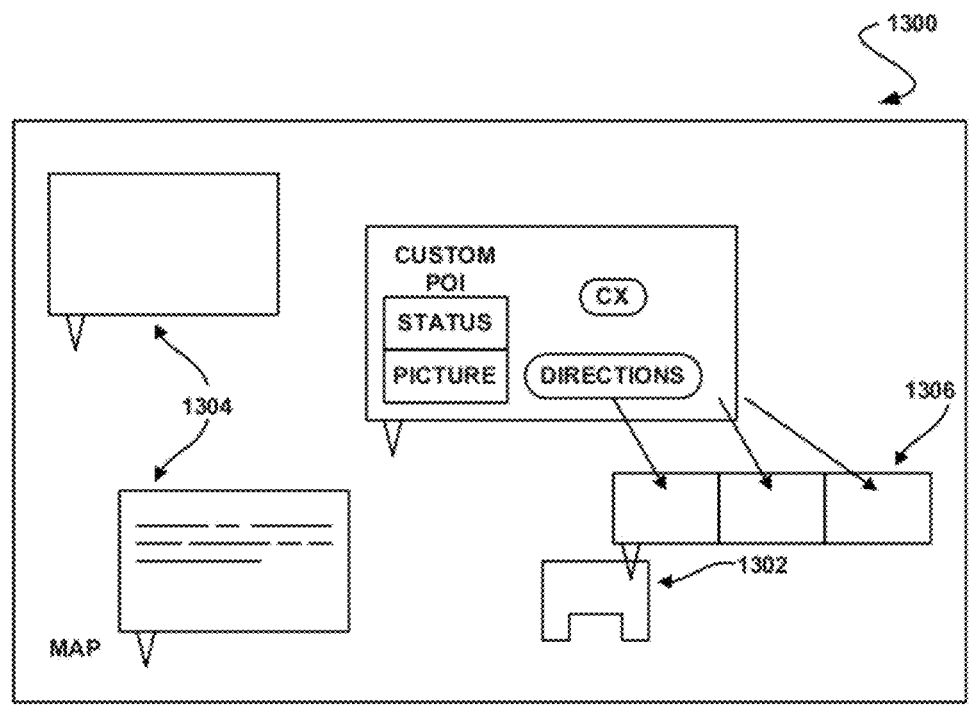
FIG. 13 shows an interface for displaying a contact location, in accordance with one embodiment.

Once the contacts to be incorporated into the points-of-interest data base are selected, the navigation system of the vehicular assembly may utilize contact information to display a location of the contacts. FIG. 13 shows an interface 1300 for displaying a contact location, in accordance with one embodiment. As an option, the interface 1300 may be implemented in the context of the architecture and environment of FIGS. 1-12. Of course, however, the interface 1300 may be implemented in any desired environment. Again, the aforementioned definitions may apply during the present description.

As shown, a vehicle icon 1302 and other icons 1304 corresponding to points-of-interest may be displayed on a map using the interface 1300. Pictures 1306 or other indicators representing each contact selected to be displayed may be provided and displayed on the map, indicating a location of each contact. For example, one or more contacts are in a vehicle, a vehicle icon may be shown along with indicators for each contact in the vehicle.

Upon selection of an indicator for the contacts, additional information for the selected contact may be displayed, such as a status, directions to the contact, etc. Furthermore, upon selection of the indicator, communication options may be displayed. In this way, each contact is a customized point-of-interest including various information relating to that contact.

Furthermore, a user may easily initiate communication with the contact by selecting a communication option associated with an icon, picture, or other symbol corresponding to the contact. In one embodiment, the communication option may include an instant messaging option.

FIG. 14A shows a method 1400 for instant messaging utilizing a vehicular assembly, in accordance with one embodiment. As an option, the method 1400 may be implemented in the context of the architecture and environment of FIGS. 1-13. Of course, however, the method 1400 may be carried out in any desired environment. The aforementioned definitions may apply during the present description.

As shown, a vehicular assembly is utilized to communicate with a mobile device. See operation 1402. Additionally, an instant message is communicated with a remote entity via the vehicular assembly, utilizing the mobile device. See operation 1404.

In the context of the present description, a remote entity refers to an individual, company, organization, or system capable of communicating, receiving, transmitting or generating an instant message. Furthermore, the instant message may include any type of instant message. For example, in one embodiment, the instant message may include a short messaging service message. In another embodiment, the instant message may include a multimedia messaging service message (e.g. images, audio, video, rich text, etc.).

As an option, the instant message may include text converted from speech received utilizing the vehicular assembly. As another option, the instant message may include a voice message received utilizing the vehicular assembly. Additionally, the instant message may include a picture received utilizing the vehicular assembly. Still yet, the instant message may include navigation information received utilizing the vehicular assembly. In one embodiment, contact information associated with the instant message may be received from the mobile device.

In any of these cases, the instant message may be transmitted utilizing a communication channel of the mobile device (e.g. a cellular channel, a broadband channel, etc.). In one embodiment, a plurality of messages may be received from the remote entity. For example, another subsequent instant message may be received from the remote entity via the vehicular assembly, utilizing the mobile device. In this case, at least a portion of the instant message may be converted from text-to-speech. In one embodiment, a sender identifier of the instant message may be converted from text-to-speech. In another embodiment, a sender identifier of the instant message may be displayed utilizing a display of the vehicular assembly.

FIG. 14B shows a method 1450 for communicating location-related information, in accordance with one embodiment. As an option, the method 1450 may be implemented in the context of the architecture and environment of FIGS. 1-14A. Of course, however, the method 1450 may be carried out in any desired environment. The aforementioned definitions may apply during the present description.

As shown, a vehicular assembly is utilized to communicate with a mobile device. See operation 1452. Additionally, a location of a vehicle associated with the vehicular assembly is identified, utilizing the vehicular assembly. See operation 1454. Furthermore, information based on the location is generated. Still yet, the information is communicated utilizing the mobile device. See operation 1456.

In various embodiments, the information may be generated utilizing the vehicular assembly or the mobile device. Additionally, as an option, the information may be communicated utilizing an instant messaging protocol In one embodiment, a destination for a user of a vehicle associated with the vehicular assembly may be determined. In this case, the information may be generated based on the location and the destination. As an option, the information may be automatically generated and automatically transmitted. For example, the information may be automatically transmitted on a periodic basis. In this case, the information may be automatically transmitted on a periodic basis until a destination is reached.

The information may include a variety of information based on the location. For example, in various embodiments, the information may include an estimated time of arrival, a map, a link for accessing additional information via the Internet, a current location, an alert upon the arrival at a destination, and/or various other information.

In one embodiment, a recipient of the information may automatically be identified based on a destination. In another embodiment, a recipient of the information may be identified utilizing a contact database of the mobile device.

In some cases, a request for the information may be received and an acceptance from a user may be received. In these cases, the information may be generated and communicated, in response to response to the receipt of the acceptance.

Figure 14C:
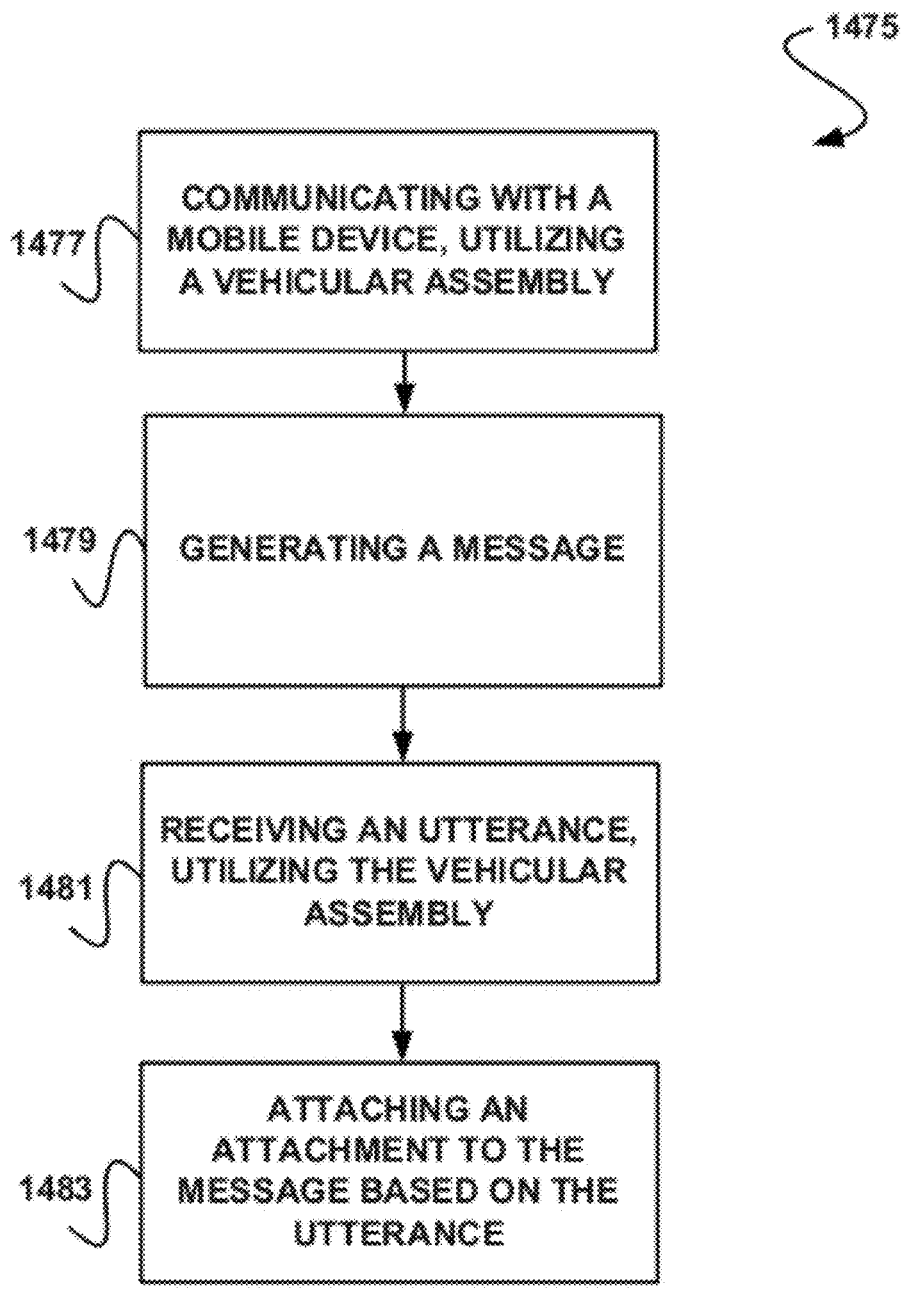
FIG. 14C shows a method for voice controlled attachments, in accordance with one embodiment.

FIG. 14C shows a method 1475 for voice controlled attachments, in accordance with one embodiment. As an option, the method 1475 may be implemented in the context of the architecture and environment of FIGS. 1-14B. Of course, however, the method 1475 may be carried out in any desired environment. The aforementioned definitions may apply during the present description.

As shown, a vehicular assembly is utilized to communicate with a mobile device. See operation 1477. Additionally, a message is generated. See operation 1479. Further, an utterance is received, utilizing the vehicular assembly. See operation 1481. Still yet, an attachment is attached to the message based on the utterance. See operation 1483.

In various embodiments, the message may include an e-mail, an instant message, a voice message, and/or any other type of message. In the case that the message includes a voice message, the voice message may be recorded utilizing the vehicular assembly.

Additionally, the attachment may include various attachments such as a picture or navigation information, etc. In some cases, this navigation information may include a map. Furthermore, the navigation information may be generated utilizing a navigation system of the vehicular assembly.

In one embodiment, an utterance may specify a specific file to attach. As an option, the attachment may identify or include digital media. In this case, the digital media may include digital media being presented when the message is generated.

The message may be transmitted utilizing a communication channel of the mobile device. Additionally, a recipient of the message may be identified utilizing contact information stored on the mobile device. As an option, the receipt of the message may be automatically acknowledged.

Figure 15:
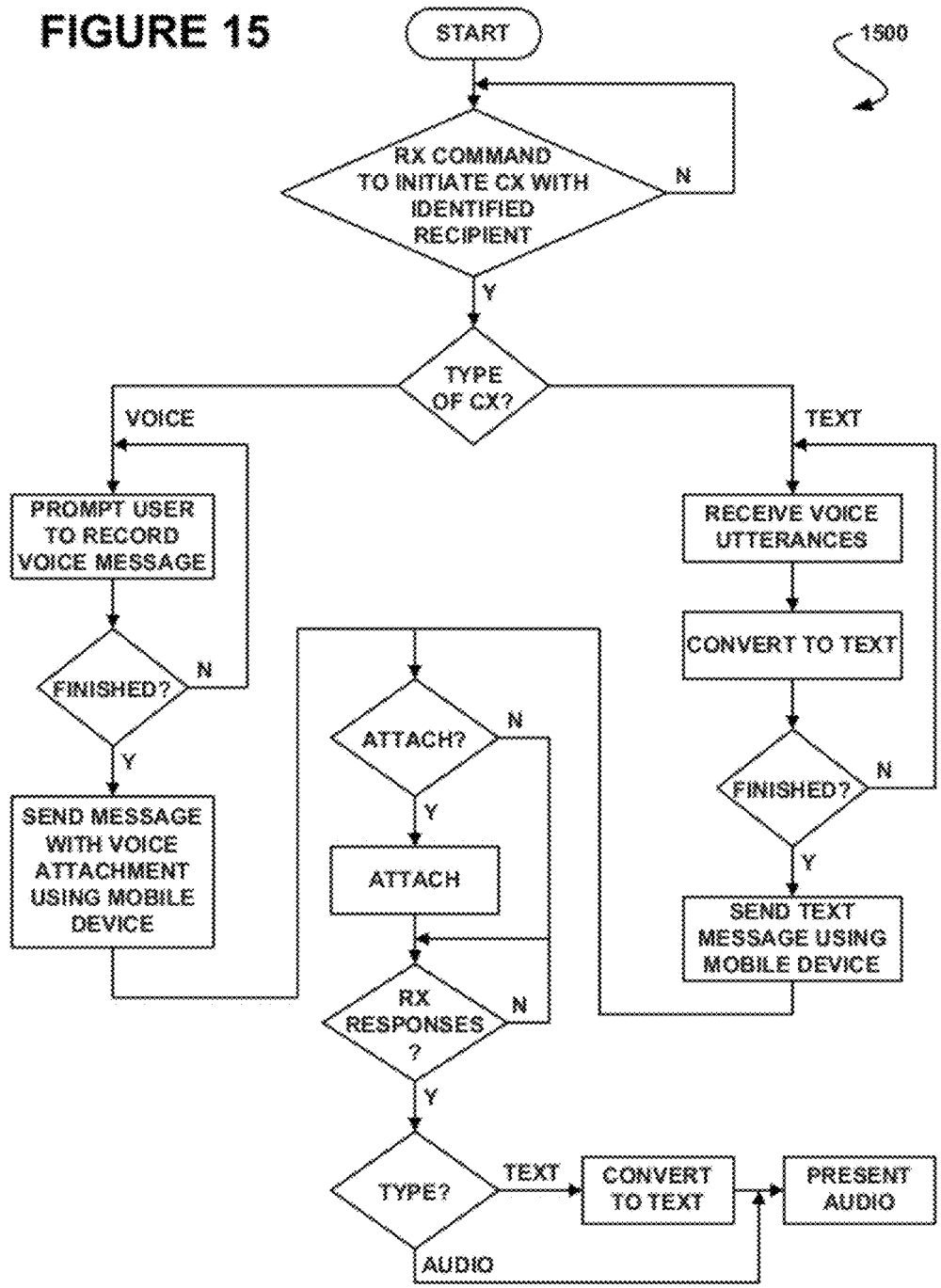
FIG. 15 shows a method for voice controlled attachments and for communicating location-related information, in accordance with another embodiment.

FIG. 15 shows a method 1500 for voice controlled attachments and for communicating location-related information, in accordance with another embodiment. As an option, the method 1500 may be implemented in the context of the architecture and environment of FIGS. 1-14C. Of course, however, the method 1500 may be carried out in any desired environment. The aforementioned definitions may apply during the present description.

Figure 16A:
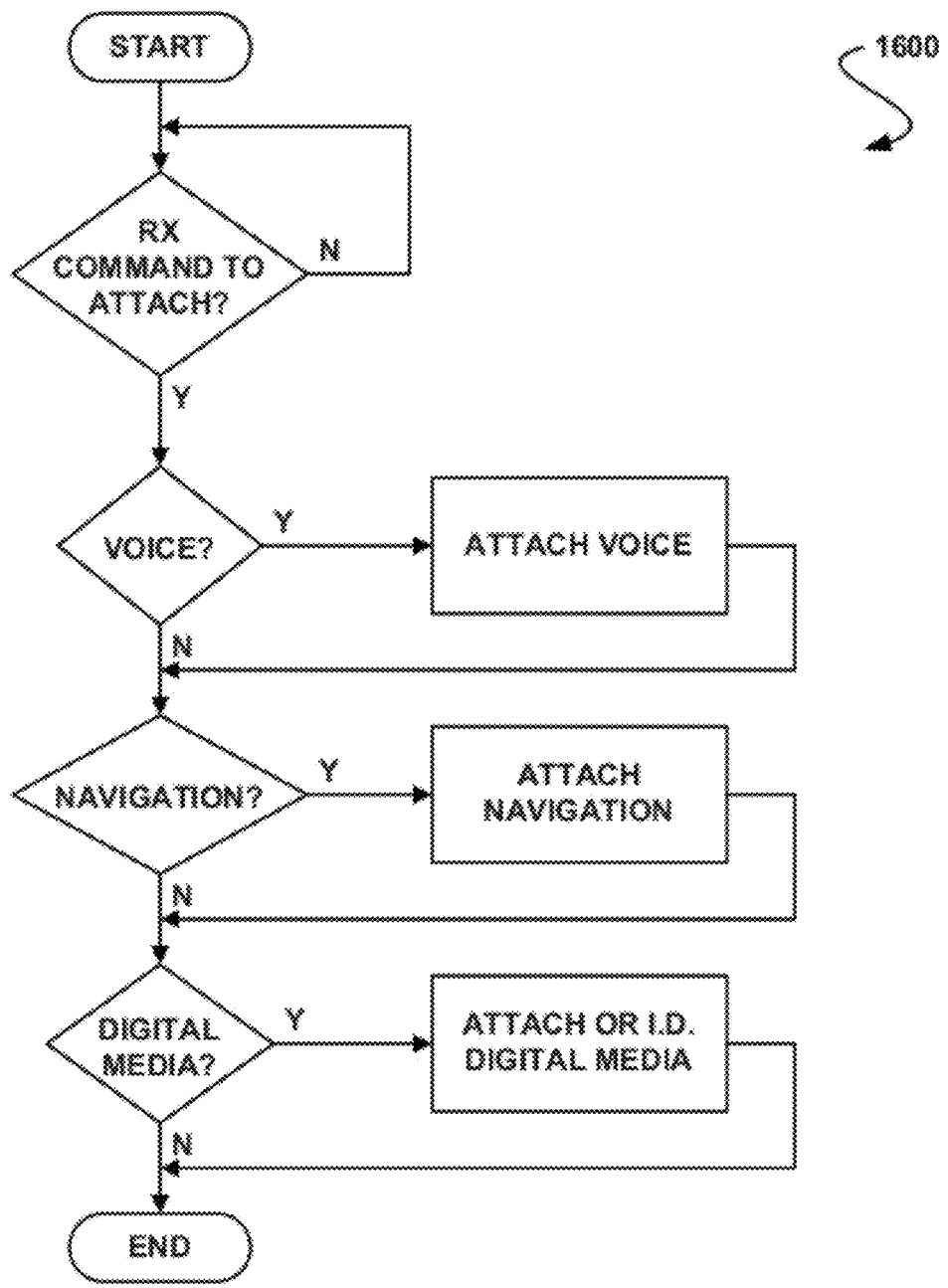
FIG. 16A shows a method for voice controlled attachments, in accordance with another embodiment.

FIG. 16A shows a method 1600 for voice controlled attachments, in accordance with another embodiment. As an option, the method 1600 may be implemented in the context of the architecture and environment of FIGS. 1-15. Of course, however, the method 1600 may be carried out in any desired environment. The aforementioned definitions may apply during the present description.

Figure 16B:
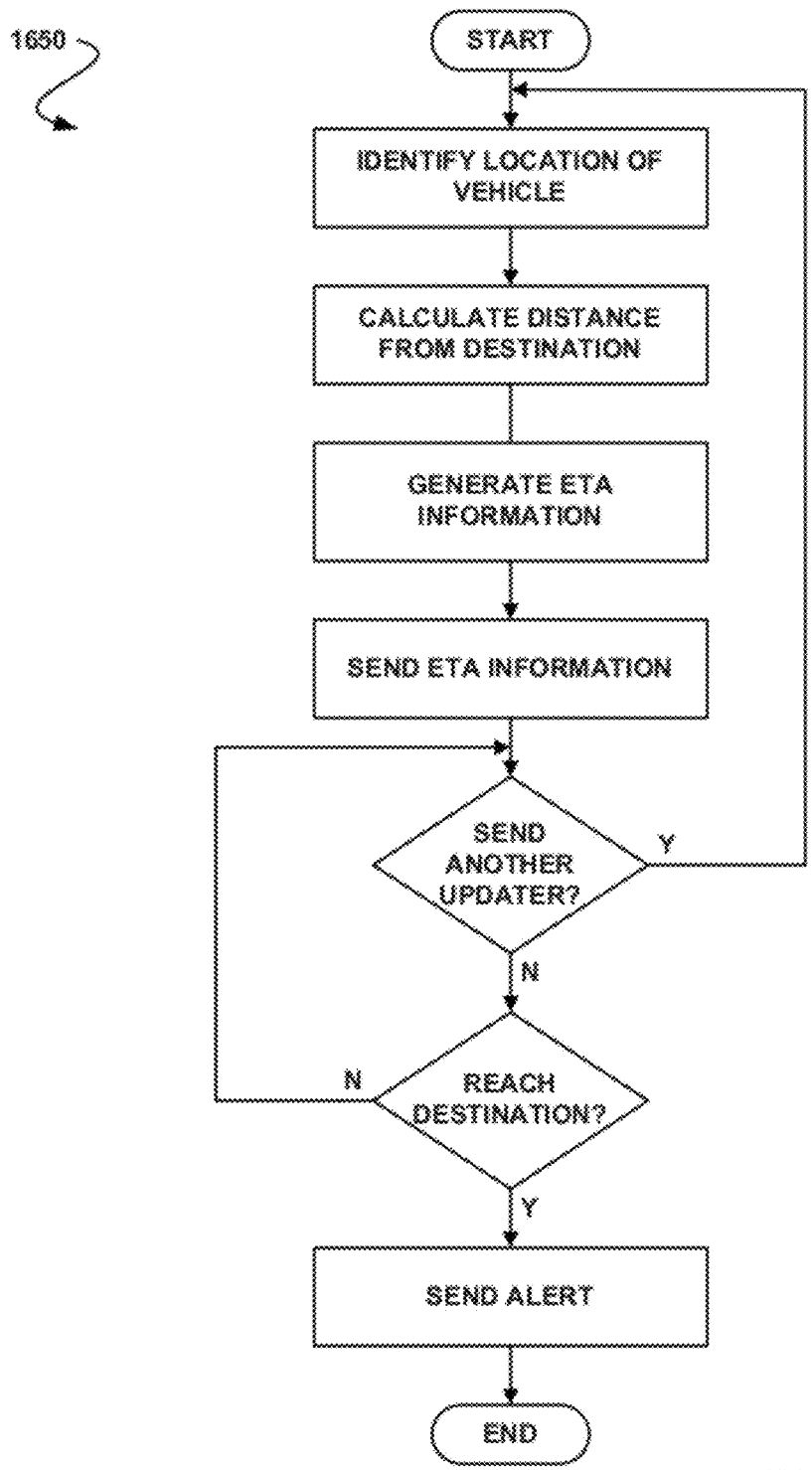
FIG. 16B shows a method for communicating location-related information, in accordance with another embodiment.

FIG. 16B shows a method 1650 for communicating location-related information, in accordance with another embodiment. As an option, the method 1650 may be implemented in the context of the architecture and environment of FIGS. 1-16A. Of course, however, the method 1650 may be carried out in any desired environment. The aforementioned definitions may apply during the present description.

Figure 17:
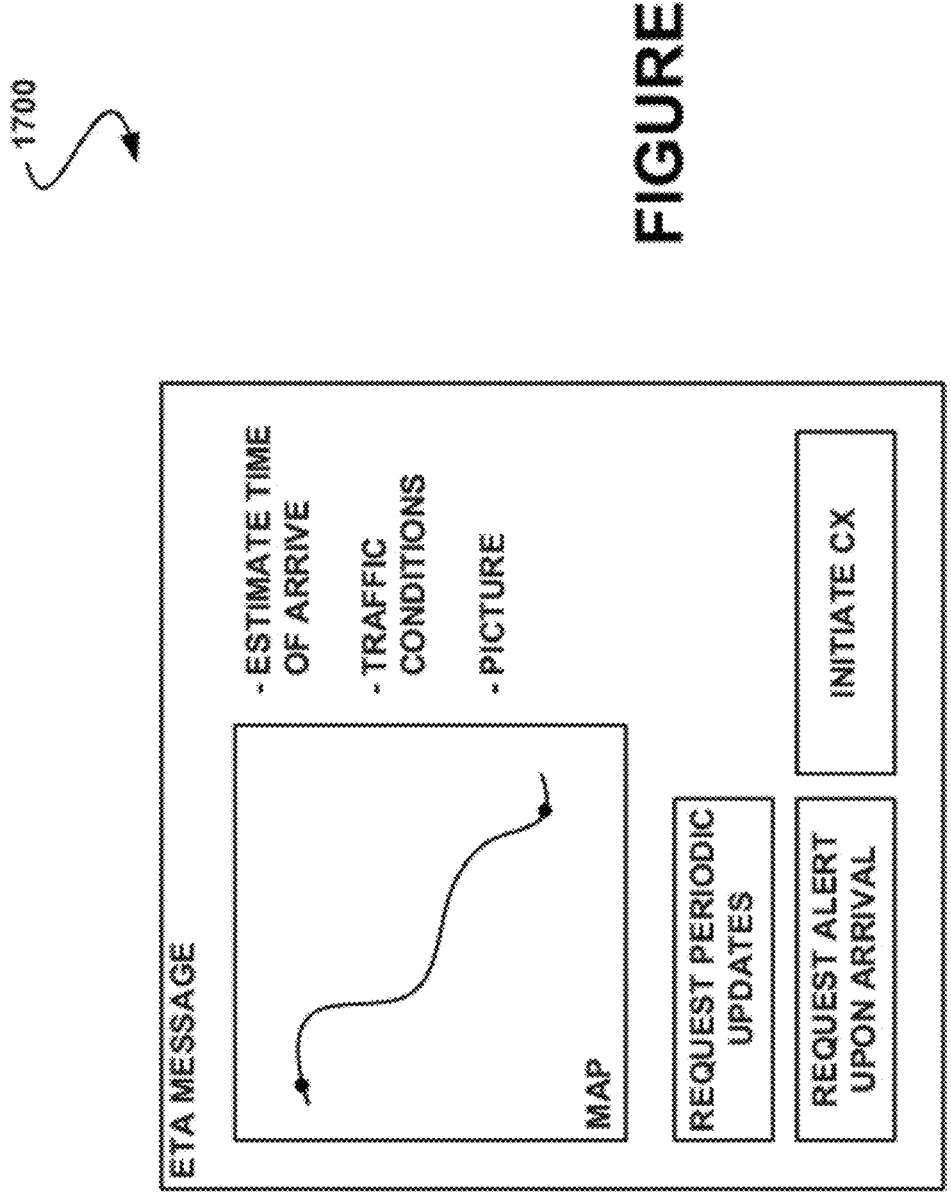
FIG. 17 shows an interface for communicating and displaying location-related information, in accordance with another embodiment.

FIG. 17 shows an interface 1700 for communicating and displaying location-related information, in accordance with another embodiment. As an option, the interface 1700 may be implemented in the context of the architecture and environment of FIGS. 1-16B. Of course, however, the interface 1700 may be implemented in any desired environment. The aforementioned definitions may apply during the present description.

Figure 18:
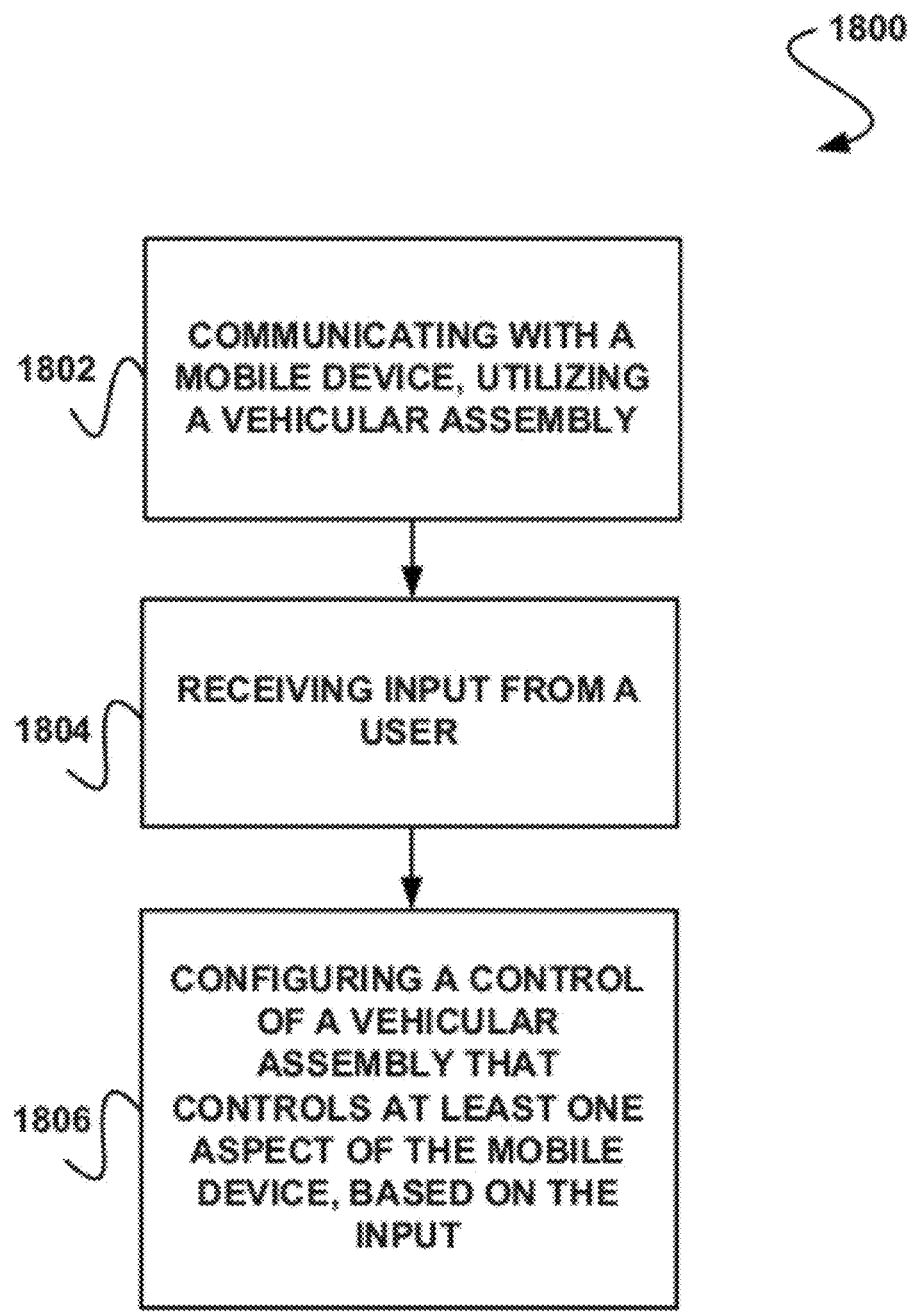
FIG. 18 shows a method for programmable mobile device controls, in accordance with one embodiment.

FIG. 18 shows a method 1800 for programmable mobile device controls, in accordance with one embodiment. As an option, the method 1800 may be implemented in the context of the architecture and environment of FIGS. 1-17. Of course, however, the method 1800 may be carried out in any desired environment. The aforementioned definitions may apply during the present description.

As shown, a vehicular assembly communicates with a mobile device. See operation 1802. Additionally, an input is received from a user. See operation 1804. Further, a control of a vehicular assembly that controls at least one aspect of the mobile device is configured, based on the input. See operation 1806.

The input may be received using an interface of the mobile device or the vehicular assembly. In one embodiment, the input may be received utilizing a user interface of the mobile device. In another embodiment, the input may be received utilizing a touch screen of the vehicular assembly. In yet another embodiment, the input may be received utilizing a microphone of the vehicular assembly.

The control may include any control of the vehicular assembly that controls at least one aspect of the mobile device. For example, the control may include a steering wheel control, a button, a touch screen, etc. Furthermore, the at least one aspect of the mobile device may include a variety of aspects including a control of an application program resident on the mobile device. In this case, the application program may include a mail application, a contacts application, a calendar application, a network browser application, and/or any other application.

Additionally, the at least aspect may be accessed by a single selection of the control. In this case, the at least aspect may be accessed by a plurality of user actions utilizing a menu of the mobile device.

In one embodiment, a current configuration of the control may be displayed on a display of a vehicular assembly. In this case, the current configuration may be displayed by displaying a plurality of the controls and an associated current aspect of the mobile device that is thereby controlled. In one embodiment, a plurality of options may be displayed with a current configuration for changing the associated current aspect of the mobile device that is controlled by the controls.

Figure 19:
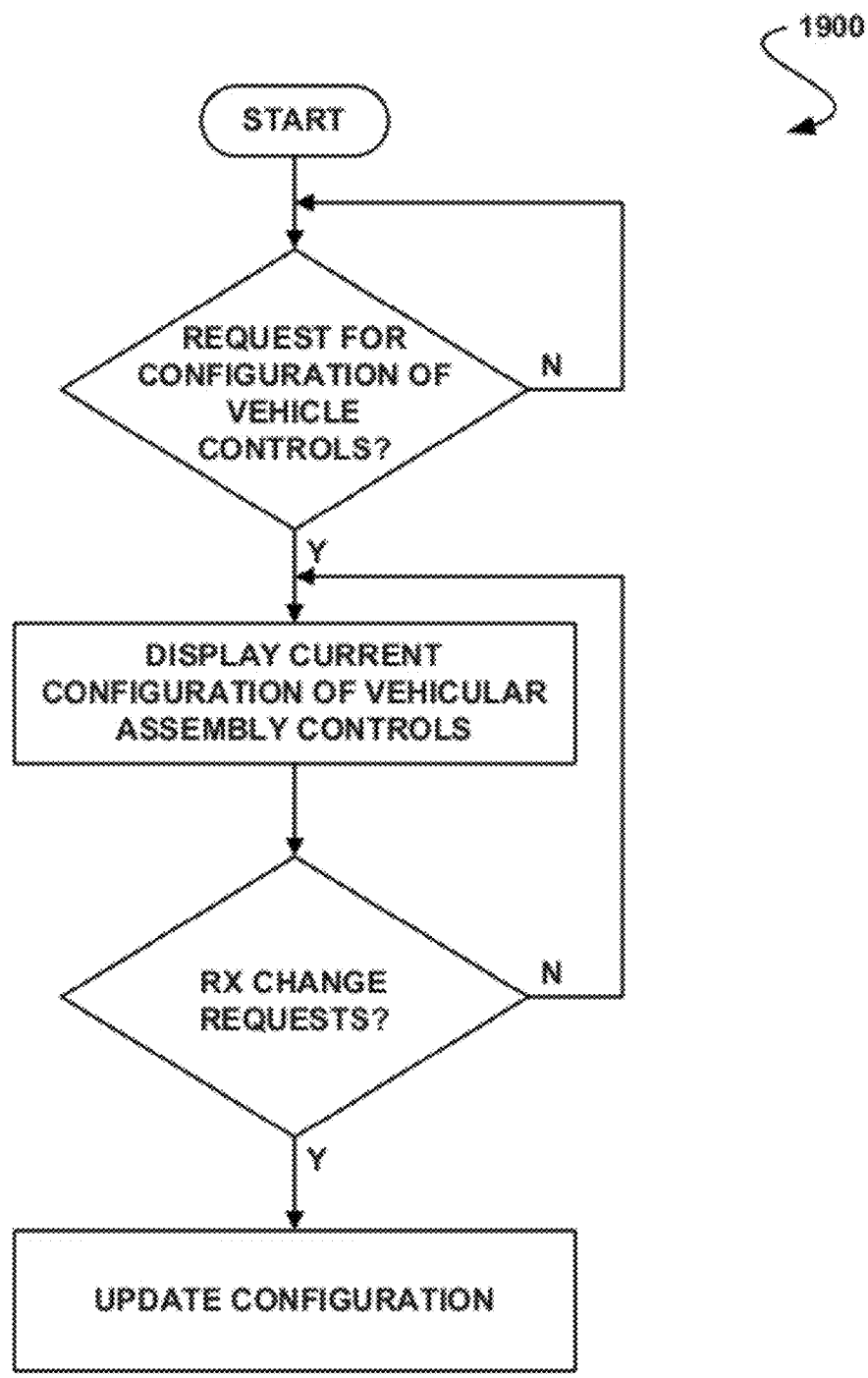
FIG. 19 shows a method for programmable mobile device controls, in accordance with another embodiment.

FIG. 19 shows a method 1900 for programmable mobile device controls, in accordance with another embodiment. As an option, the method 1900 may be implemented in the context of the architecture and environment of FIGS. 1-18. Of course, however, the method 1900 may be carried out in any desired environment. The aforementioned definitions may apply during the present description.

Figure 20:
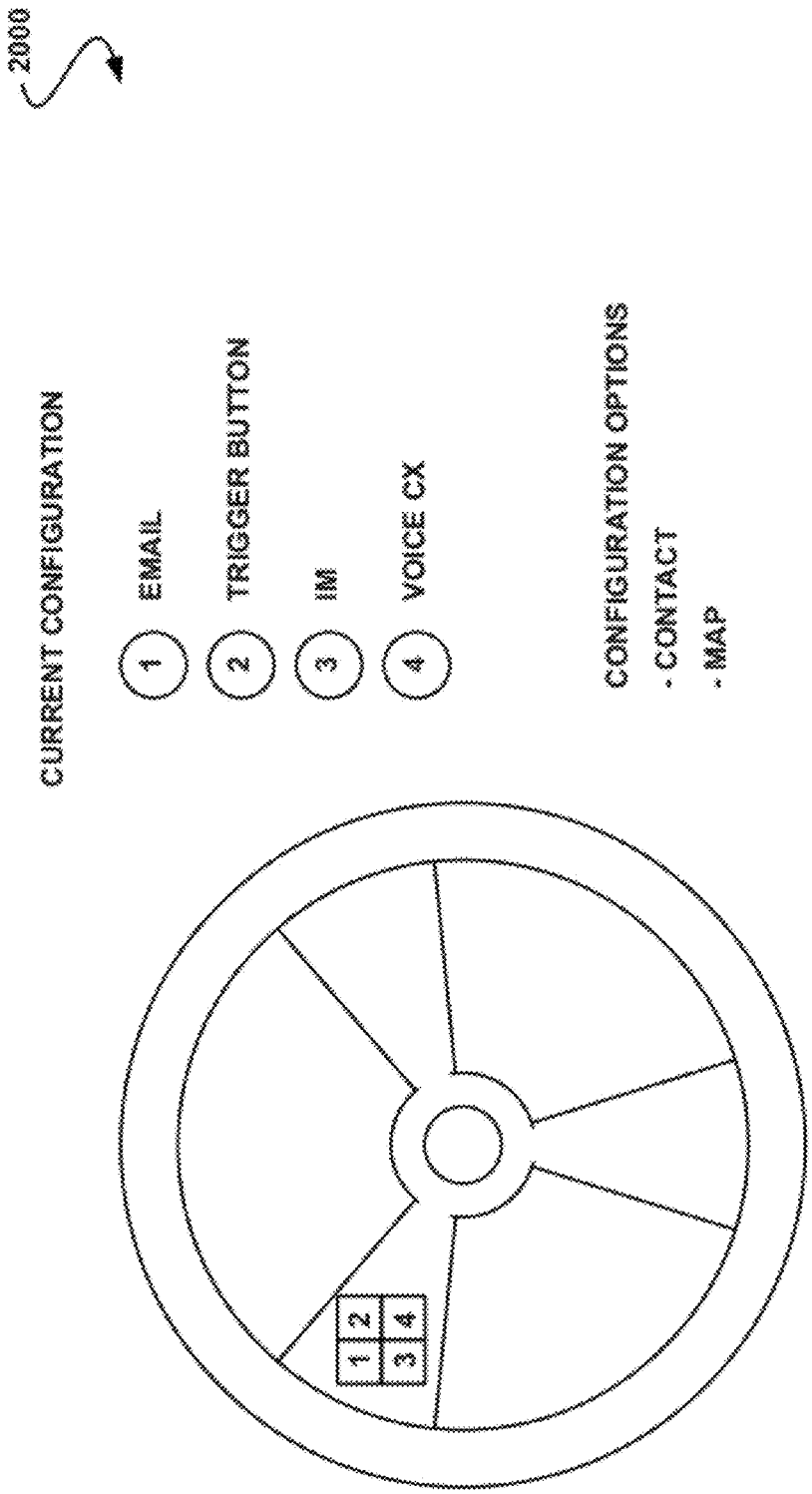
FIG. 20 shows a system for programmable mobile device controls, in accordance with one embodiment.

FIG. 20 shows a system 2000 for programmable mobile device controls, in accordance with one embodiment. As an option, the system 2000 may be implemented in the context of the architecture and environment of FIGS. 1-19. Of course, however, the system 2000 may be implemented in any desired environment. The aforementioned definitions may apply during the present description.

Figure 21:
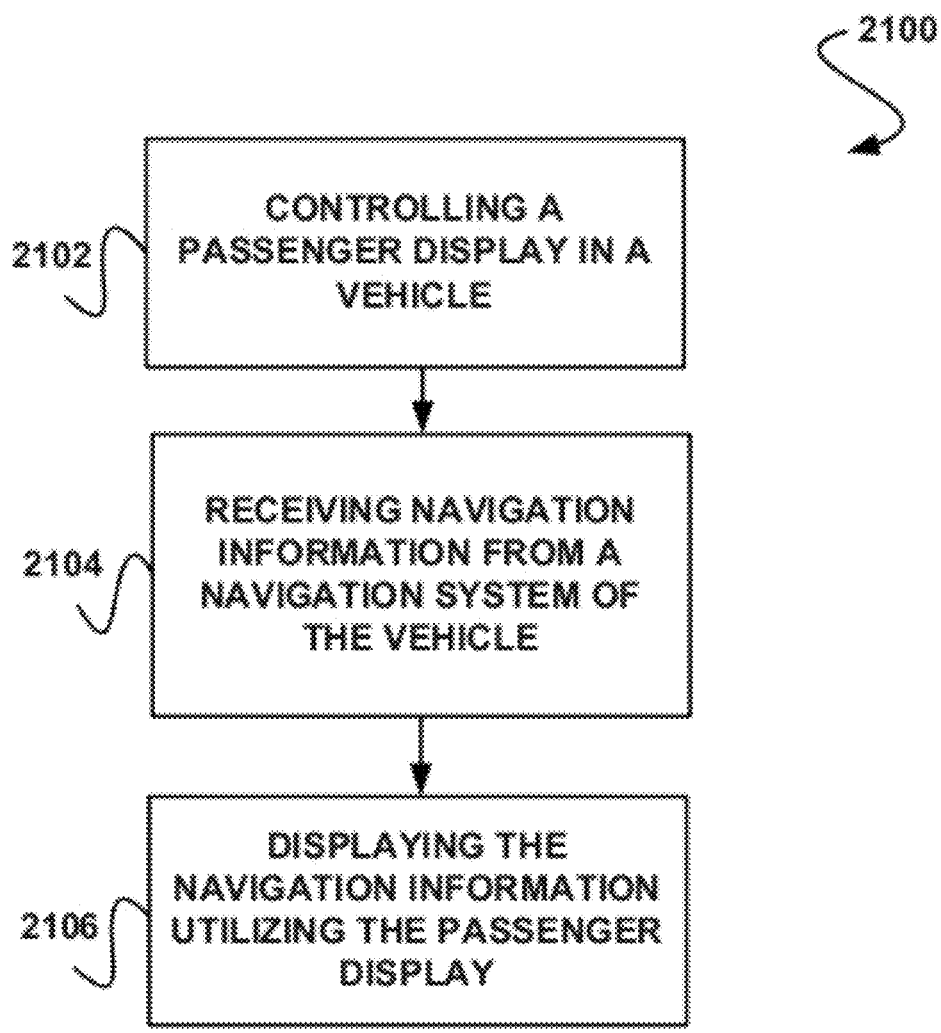
FIG. 21 shows a method for providing enhanced passenger display functionality, in accordance with one embodiment.

FIG. 21 shows a method 2100 for providing enhanced passenger display functionality, in accordance with one embodiment. As an option, the method 2100 may be implemented in the context of the architecture and environment of FIGS. 1-20. Of course, however, the method 2100 may be carried out in any desired environment. The aforementioned definitions may apply during the present description.

As shown, a passenger display in a vehicle is controlled. See operation 2102. Additionally, navigation information is received from a navigation system of the vehicle. See operation 2104. Furthermore, the navigation information is displayed utilizing the passenger display. See operation 2106.

In various embodiments, the passenger display may be positioned on a rear face of a front seat of a vehicle, attached to a roof of the vehicle, and/or located in various other passenger accessible positions. Furthermore, the passenger display may be controlled utilizing different devices. For example, the passenger display may be controllable by a central driver display. In this case, the navigation information may be selected utilizing the central driver display.

As an option, input may be received utilizing the passenger display. In this case, information may be displayed on the central driver display, based on the input. Thus, a passenger may recommend stopping points and/or preferences to a driver of a vehicle.

As an option, the navigation information may be selected utilizing the passenger display. The navigation information may include various information such as information on points-of-interest. In this case, the points-of-interest may include restaurants, locations that include a restroom, and various other information on points-of-interest.

In one embodiment, the points-of-interest may be filtered. For example, the points-of-interest may be filtered based on at least one of point-of-interest type, distance from a current location, an estimated time of arrival from a current location, and a distance from a current route.

As an option, the navigation information may also include an estimated time of arrival. In this case, the estimated time of arrival may be based on at least one of traffic conditions, current speed, and a distance from a destination.

Figure 22:
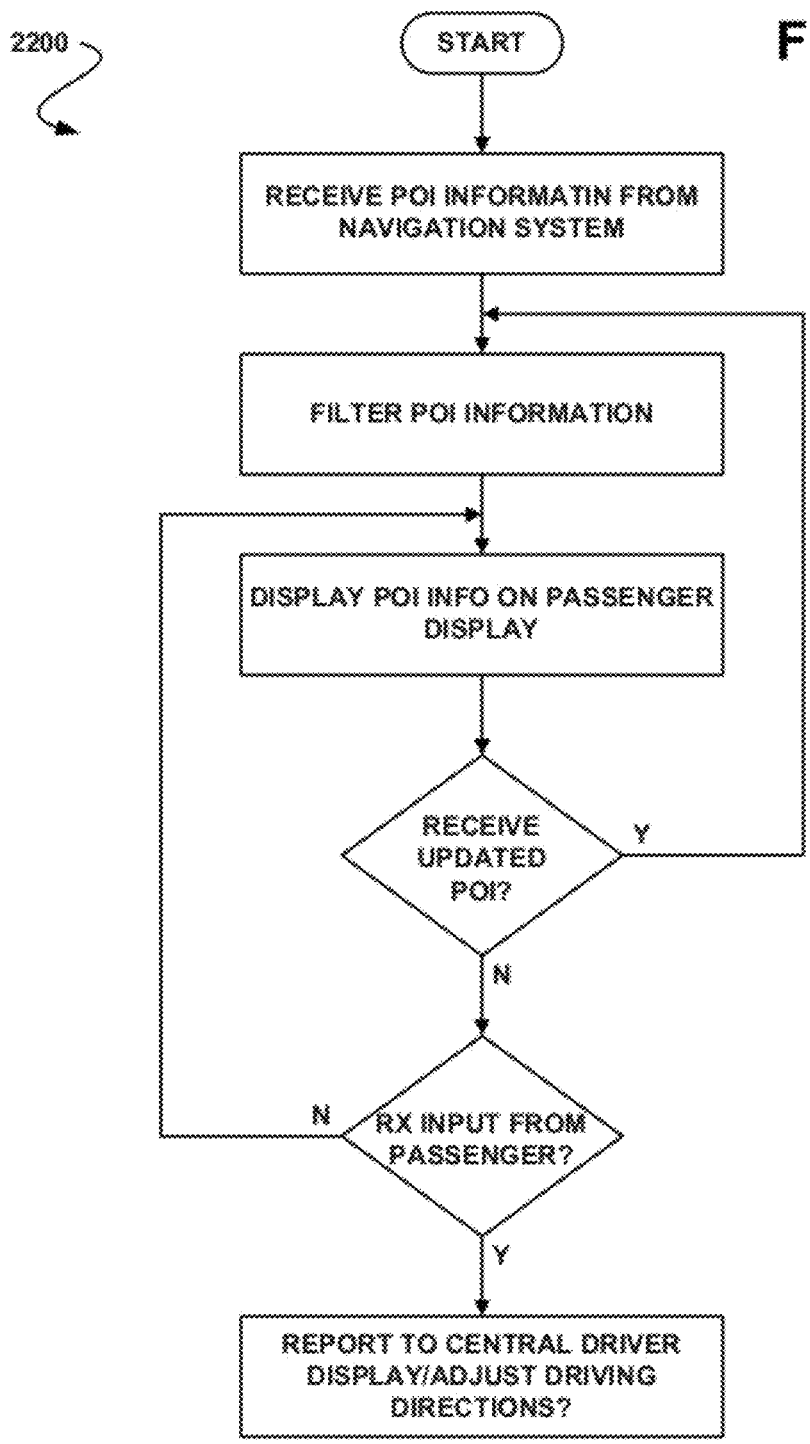
FIG. 22 shows a method for providing enhanced passenger display functionality, in accordance with another embodiment.

FIG. 22 shows a method 2200 for providing enhanced passenger display functionality, in accordance with another embodiment. As an option, the method 2200 may be implemented in the context of the architecture and environment of FIGS. 1-21. Of course, however, the method 2200 may be carried out in any desired environment. The aforementioned definitions may apply during the present description.

Figure 23:
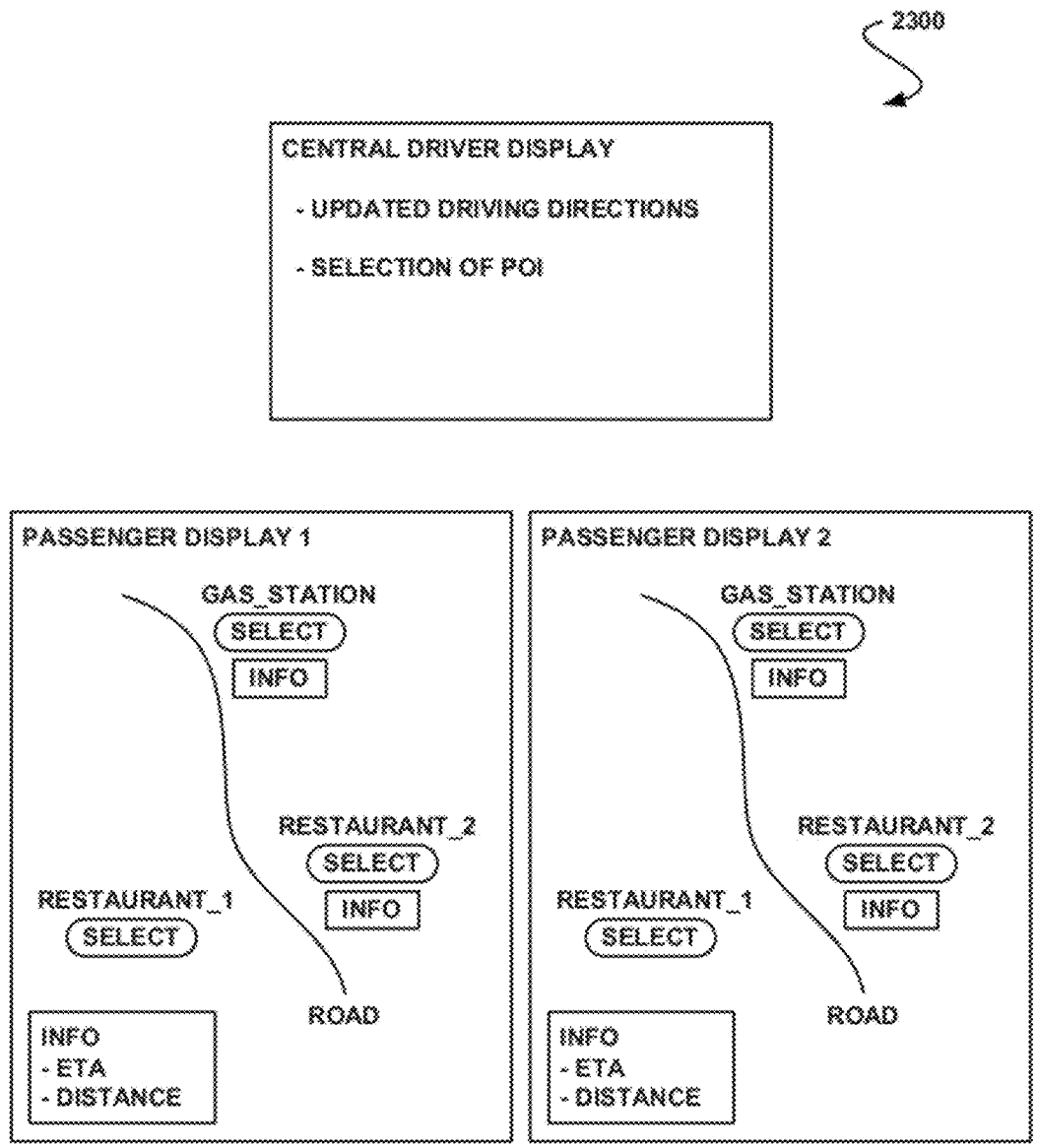
FIG. 23 shows a system for providing enhanced passenger display functionality, in accordance with one embodiment.

FIG. 23 shows a system 2300 for providing enhanced passenger display functionality, in accordance with one embodiment. As an option, the system 2300 may be implemented in the context of the architecture and environment of FIGS. 1-22. Of course, however, the system 2300 may be implemented in any desired environment. The aforementioned definitions may apply during the present description.

Figure 24:
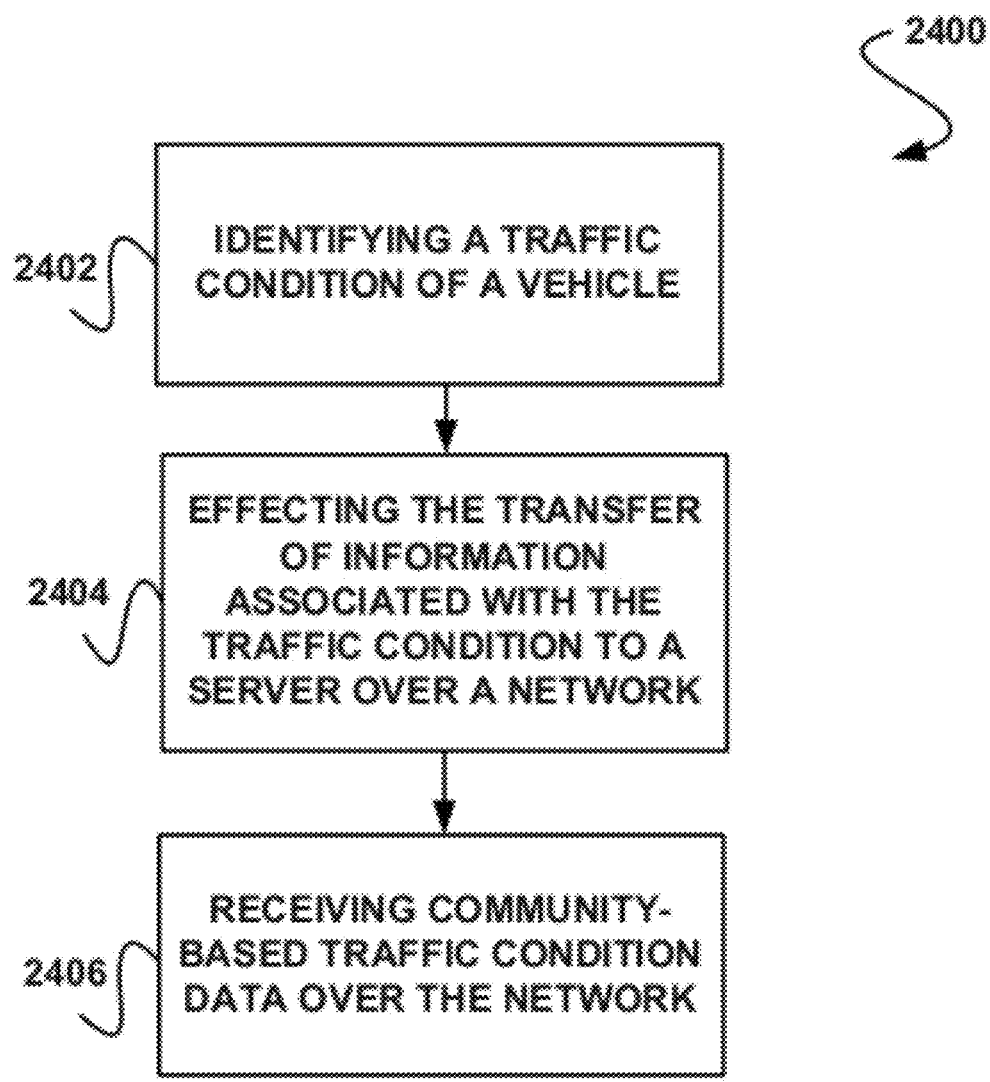
FIG. 24 shows a method for community-based traffic condition information, in accordance with one embodiment.

FIG. 24 shows a method 2400 for community-based traffic condition information, in accordance with one embodiment. As an option, the method 2400 may be implemented in the context of the architecture and environment of FIGS. 1-23. Of course, however, the method 2400 may be carried out in any desired environment. The aforementioned definitions may apply during the present description.

As shown, a traffic condition of a vehicle is identified. See operation 2402. Additionally, information associated with the traffic condition is transferred to a server over a network. See operation 2404. Furthermore, community-based traffic condition data is received over the network. See operation 2406.

In one embodiment, the traffic condition may be identified based on a speed of the vehicle. In another embodiment, the traffic condition may be identified based on a progress of the vehicle along a predetermined route. In still another embodiment, the traffic condition may be identified based on stop and go activity of the vehicle.

As an option, the information associated with the traffic condition may be transferred and the community-based traffic condition data may be received via a communication channel of a mobile device in communication with a vehicular assembly associated with the vehicle. In one embodiment, the community-based traffic condition data may be periodically received. Furthermore, the community-based traffic condition data may be based, at least in part, on information received from a plurality of vehicles (e.g. contacts vehicles, vehicles associated with an organization, etc.).

In another embodiment, the community-based iaffic condition data may include only a subset of community-based traffic condition data that is selected based on a route of the vehicle. In still another embodiment, the conmiunity-based traffic condition data may include only a subset of community-based traffic condition data that is selected based on at least one of a current location, a direction, and a speed of the vehicle.

As another option, the community-based traffic condition data may be based, at least in part, on information received from a traffic service. In one embodiment, the community-based traffic condition data may include statistics. In this case, the statistics may include a number of vehicles that is associated with the community-based traffic condition data. In another embodiment, the community-based traffic condition data may include only a subset of community-based traffic condition data that is selected based on a route of the vehicle.

It should be noted that the information may be automatically transferred. As an option, the information may be transferred in response to input by a user.

Figure 25:
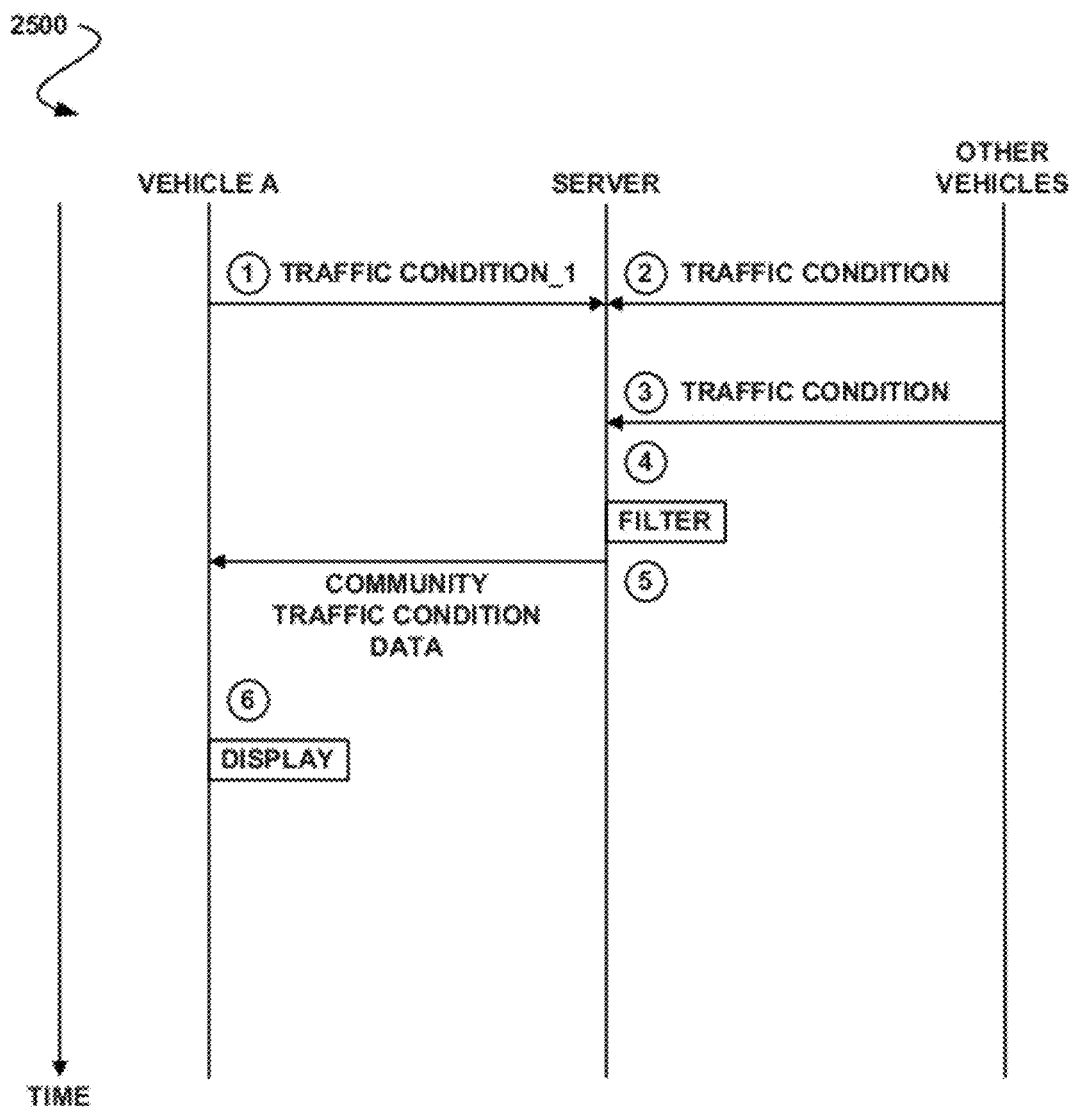
FIG. 25 shows a method for community-based traffic condition information, in accordance with another embodiment.

FIG. 25 shows a method 2500 for community-based traffic condition information, in accordance with another embodiment. As an option, the method 2500 may be implemented in the context of the architecture and environment of FIGS. 1-24. Of course, however, the method 2500 may be carried out in any desired environment. The aforementioned definitions may apply during the present description.

FIG. 26 shows a method 2600 for location based messaging, in accordance with one embodiment. As an option, the method 2600 may be implemented in the context of the architecture and environment of FIGS. 1-25. Of course, however, the method 2600 may be carried out in any desired environment. The aforementioned definitions may apply during the present description.

As shown, a message to be communicated to at least one recipient is received. See operation 2602. Furthermore, the at least one recipient is selected from a plurality of recipient candidates, based on a current location of the recipient candidates. See operation 2604. In various embodiments, the message may include an instant message, an e-mail and any other type of message.

In one embodiment, the current location of the recipient candidates may be determined utilizing a global positioning system carried by the recipient candidates. In this case, the current location of each recipient candidate may be received at a server, and the server may select the at least one recipient. As an option, the recipient candidates may be identified utilizing a contact database.

In another embodiment, the at least one recipient may be further selected from the plurality of recipient candidates, based on a current location of a sender of the message. In this case, the at least one recipient may be selected from the plurality of recipient candidates, if the current location of the sender of the message is within a predetermined distance of the current location of the recipient candidate. As another option, the at least one recipient may be selected from the plurality of recipient candidates, if a destination of the sender of the message is within a predetermined distance of the current location of the recipient candidate.

In one embodiment, the selected at least one recipient may be displayed on a display. In this case, the message may be sent to the at least one recipient, in response to a selection thereof by a sender of the message. It should be noted, that functionality associated with the present description may be carried out utilizing a vehicular assembly. For example, the vehicular assembly may include computer code to implement such functionality which is a component of the vehicular assembly.

Additionally, the vehicular assembly may be operable to communicate with a mobile device. In this case, the current location may be received and the message may be sent, utilizing a communication channel of the mobile device. Furthermore, the current location of the recipient candidates may be displayed via a display of the vehicular assembly. In another embodiment, the selecting of the at least one recipient from a plurality of recipient candidates may be based on a destination of the recipient candidates.

FIG. 27 shows a method 2700 for location based messaging, in accordance with another embodiment. As an option, the method 2700 may be implemented in the context of the architecture and environment of FIGS. 1-26. Of course, however, the method 2700 may be carried out in any desired environment. The aforementioned definitions may apply during the present description.

Figure 28:
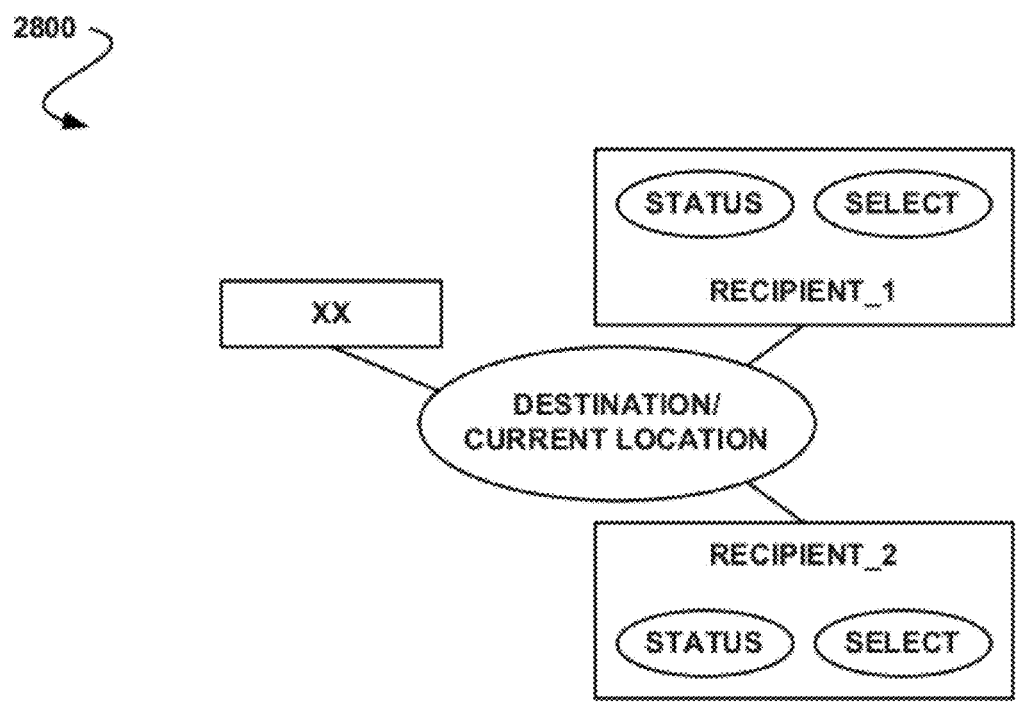
FIG. 28 shows an interface for location based messaging, in accordance with one embodiment.

FIG. 28 shows an interface 2800 for location based messaging, in accordance with one embodiment. As an option, the interface 2800 may be implemented in the context of the architecture and environment of FIGS. 1-27. Of course, however, the interface 2800 may be implemented in any desired environment. The aforementioned definitions may apply during the present description.

Figure 29:
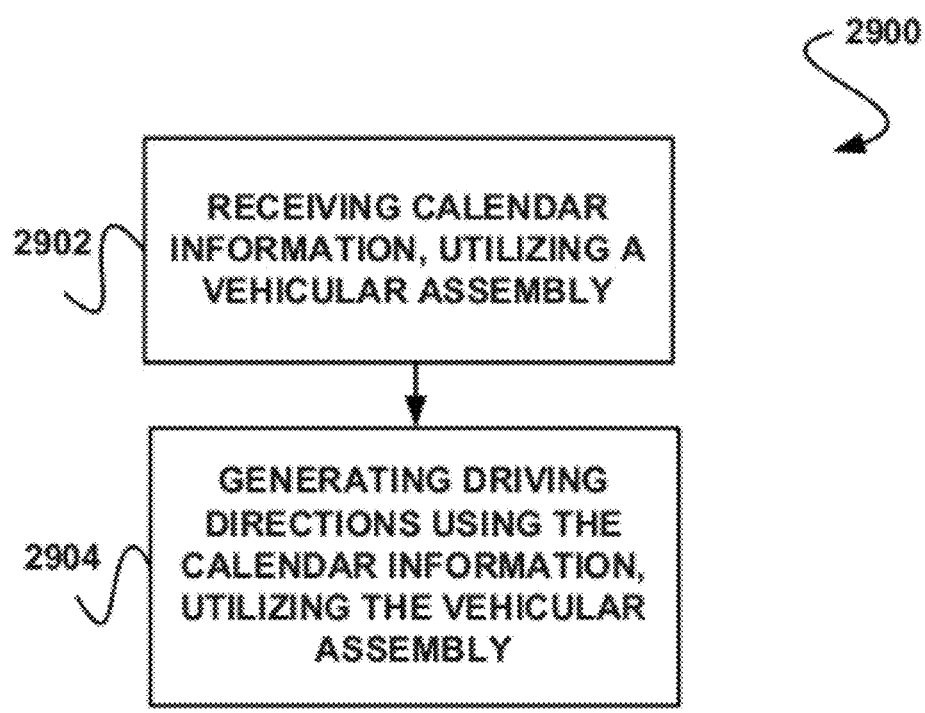
FIG. 29 shows a method for generating navigation information based on calendar information, in accordance with one embodiment.

FIG. 29 shows a method 2900 for generating navigation information based on calendar information, in accordance with one embodiment. As an option, the method 2900 may be implemented in the context of the architecture and environment of FIGS. 1-28. Of course, however, the method 2900 may be carried out in any desired environment. The aforementioned definitions may apply during the present description.

As shown, calendar information is received utilizing a vehicular assembly. See operation 2902. Additionally, driving directions are generated using the calendar information, utilizing the vehicular assembly. See operation 2904. In one embodiment, the calendar information may be used to lookup a destination using a contacts database.

As an option, the calendar information may be received from a mobile device in communication with the vehicular assembly. Furthermore, the calendar information may be displayed utilizing the vehicular assembly.

As another option, an estimated time of arrival may also be generated. In this case, the estimated time of arrival may be based on at least one of traffic conditions, current speed, and a distance from a destination. Additionally, the estimated time of arrival may be compared with a time included with the calendar information. In this case, a status may be displayed utilizing the vehicular assembly based on the comparison. The status may indicate a difference between the estimated time of arrival and the time included with the calendar information.

In another embodiment, a status may be communicated to a recipient based on the comparison. Furthermore, a user to may be prompted to communicate a status to a recipient based on the comparison of the estimated time of arrival and the time included with the calendar information.

In various embodiments, the status may be communicated utilizing an instant message, an e-mail, voice message, and using other communication mechanisms. The recipient may be identified utilizing the calendar information.

As an option, the status may be communicated utilizing a mobile device in communication with the vehicular assembly. For example, the status may be communicated utilizing a communication channel of the mobile device.

Figure 30:
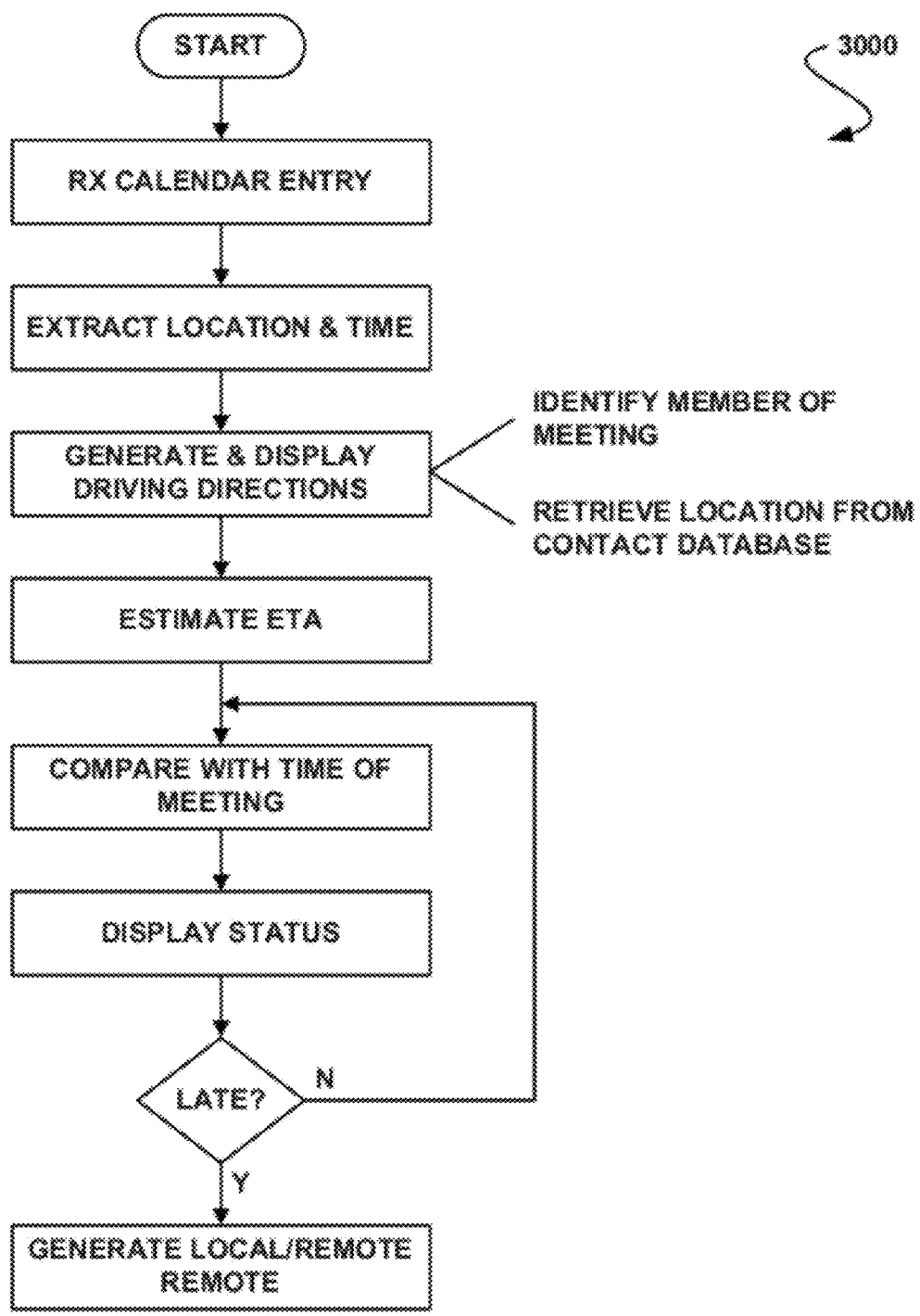
FIG. 30 shows a method for generating navigation information based on calendar information, in accordance with another embodiment.

FIG. 30 shows a method 3000 for generating navigation information based on calendar information, in accordance with another embodiment. As an option, the method 3000 may be implemented in the context of the architecture and environment of FIGS. 1-29. Of course, however, the method 3000 may be carried out in any desired environment. The aforementioned definitions may apply during the present description.

Figure 31:
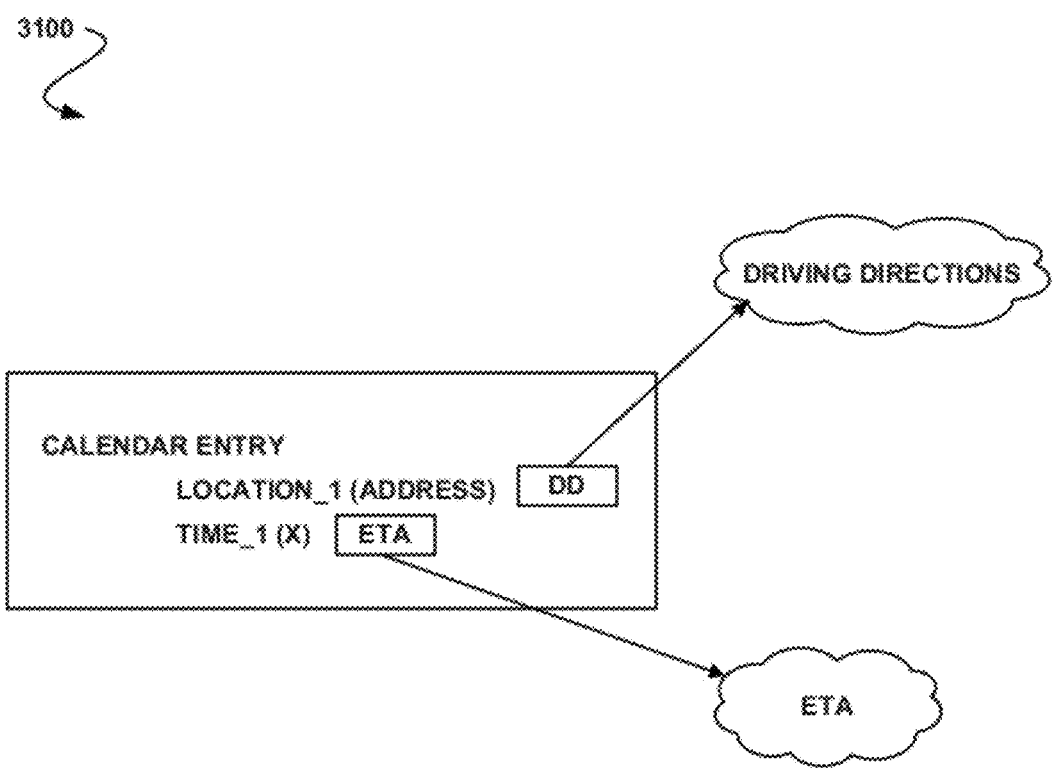
FIG. 31 shows an interface for generating navigation information based on calendar information, in accordance with one embodiment.

FIG. 31 shows an interface 3100 for generating navigation information based on calendar information, in accordance with one embodiment. As an option, the interface 3100 may be implemented in the context of the architecture and environment of FIGS. 1-30. Of course, however, the interface 3100 may be implemented in any desired environment. The aforementioned definitions may apply during the present description.

Figure 32:
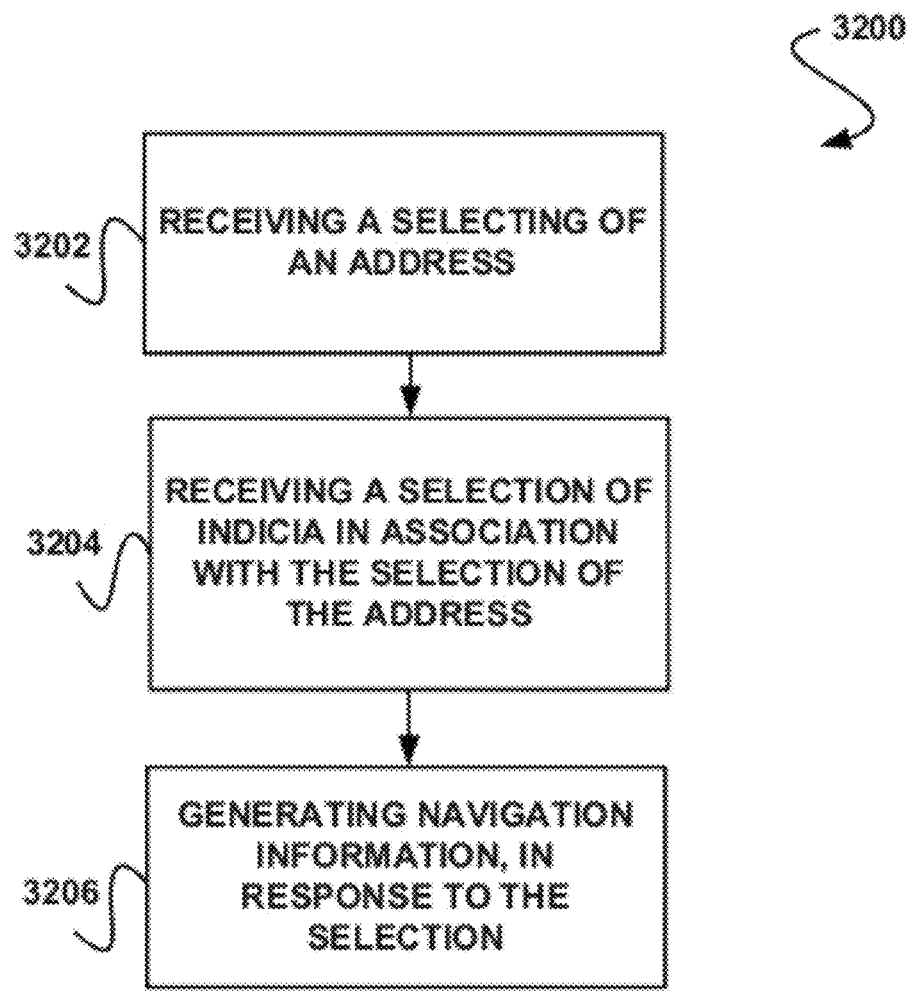
FIG. 32 shows a method for creating a map in association with an address, in accordance with one embodiment.

FIG. 32 shows a method 3200 for creating a map in association with an address, in accordance with one embodiment. As an option, the method 3200 may be implemented in the context of the architecture and environment of FIGS. 1-31. Of course, however, the method 3200 may be carried out in any desired environment. The aforementioned definitions may apply during the present description.

As shown, a selection of an address is received. See operation 3202. Additionally, a selection of indicia in association with the selection of the address is received. See operation 3204. As an option, the indicia may be displayed in response to a right-click operation. Further, navigation information is generated in response to the selection. See operation 3206.

In one embodiment, the address may be a component of a web page and the icon may be available during use of a network browser. In another embodiment, the address may be a component of an electronic message and the icon may be available during use of an electronic message browser. In still another embodiment, the address may be a component of a contact and the icon may be available during use of contact database application.

As an option, the navigation information may nclude a map including an identifier of a location of the address. Furthermore, a current location may be identified (e.g. utilizing computer code associated with a navigation system, etc.). In this case, the current location may be pre-selected. Additionally, the current location may be determined utilizing a global positioning system.

The generated navigation information may include a variety of information such as driving directions from the current location to the address. In one embodiment, the driving directions may include a map. Furthermore, the driving directions may include a list of directions.

In one embodiment, the navigation information may be generated utilizing a navigation system of a vehicular assembly. In another embodiment, the navigation information may be generated utilizing a navigation system of a mobile device. As an option, the navigation information may be generated by automatically sending the address and a current location to a server, and receiving the navigation information in response. As another option, the navigation information may be generated by automatically sending the address to a server, and receiving the navigation information in response.

Figure 33:
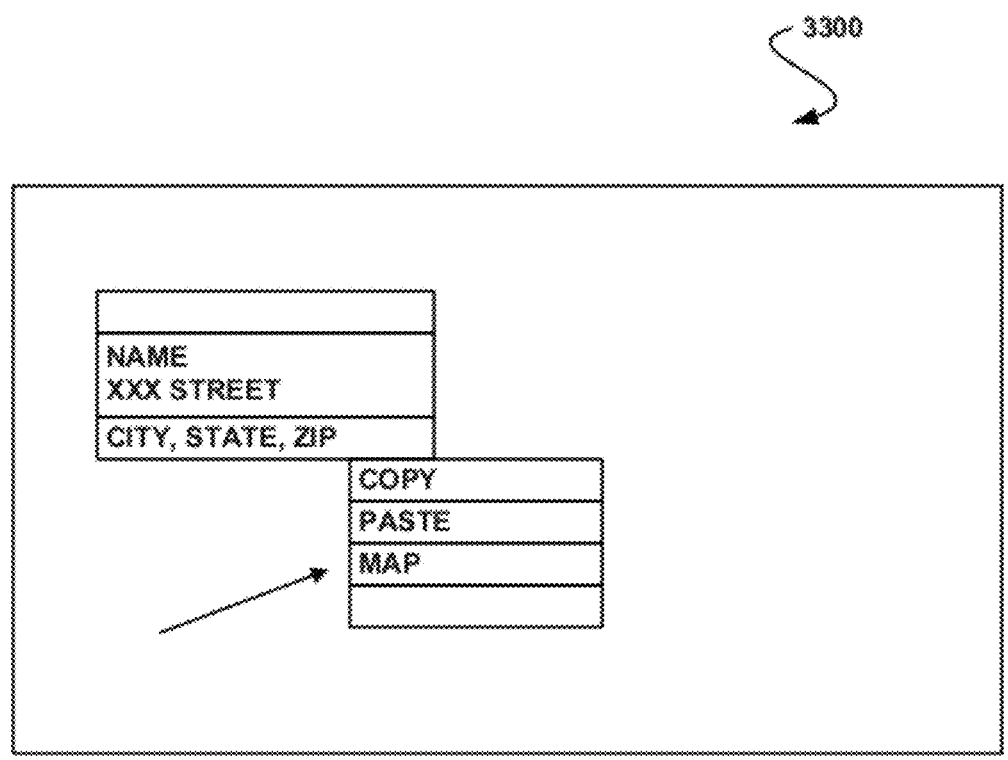
FIG. 33 shows an interface for creating a map in association with an address, in accordance with one embodiment.

FIG. 33 shows an interface 3300 for creating a map in association with an address, in accordance with one embodiment. As an option, the interface 3300 may be implemented in the context of the architecture and environment of FIGS. 1-32. Of course, however, the interface 3300 may be implemented in any desired environment. The aforementioned definitions may apply during the present description.

Figure 34:
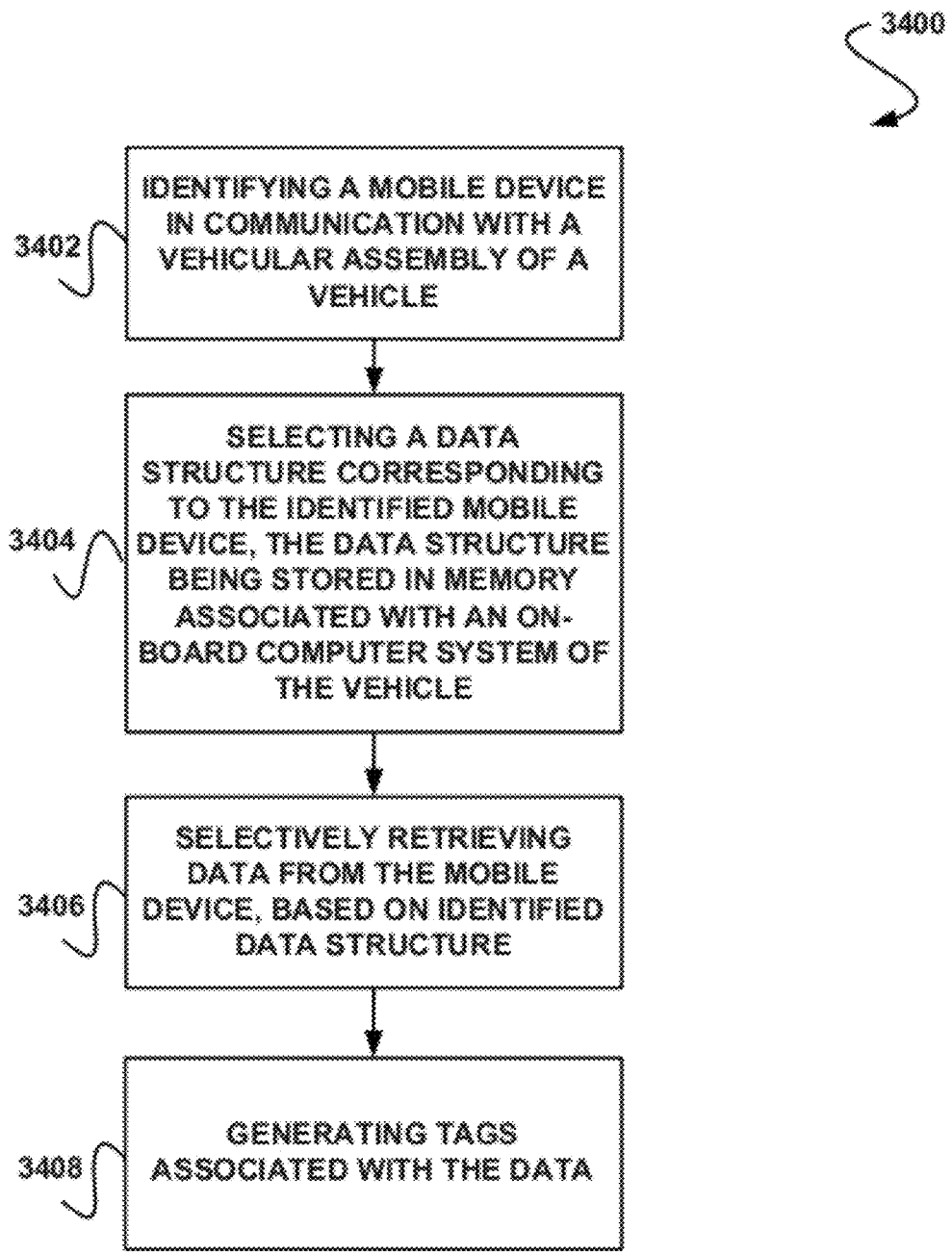
FIG. 34 shows a method for selectively retrieving data from a mobile device in communication with a vehicular assembly, in accordance with one embodiment.

FIG. 34 shows a method 3400 for selectively retrieving data from a mobile device in communication with a vehicular assembly, in accordance with one embodiment. As an option, the method 3400 may be implemented in the context of the architecture and environment of FIGS. 1-33. Of course, however, the method 3400 may be carried out in any desired environment. The aforementioned definitions may apply during the present description.

As shown, a mobile device in communication with a vehicular assembly of a vehicle is identified. See operation 3402. Additionally, a data structure corresponding to the identified mobile device is selected, the data structure being stored in memory associated with an on-board computer system of the vehicle. See operation 3404. Furthermore, data is selectively retrieved from the mobile device, based on the selected data structure. See operation 3406. Still yet, tags associated with the data are generated. See operation 3408.

In one embodiment, the data structure may be one of a plurality of data structures stored in the memory. In this case, each of the plurality of data structures may correspond to different mobile devices, where each of the different mobile devices may correspond to different users. As an option, the plurality of data structures may include setting information. Further, the setting information may include the data to be selectively retrieved from the mobile device.

In one embodiment, the setting information may be automatically configured. In another embodiment, the setting information may be automatically configured based on a previous history of use. In still another embodiment, the setting information may be manually configured. Additionally, the setting information may include a variety of information including user preferences.

Figure 35:
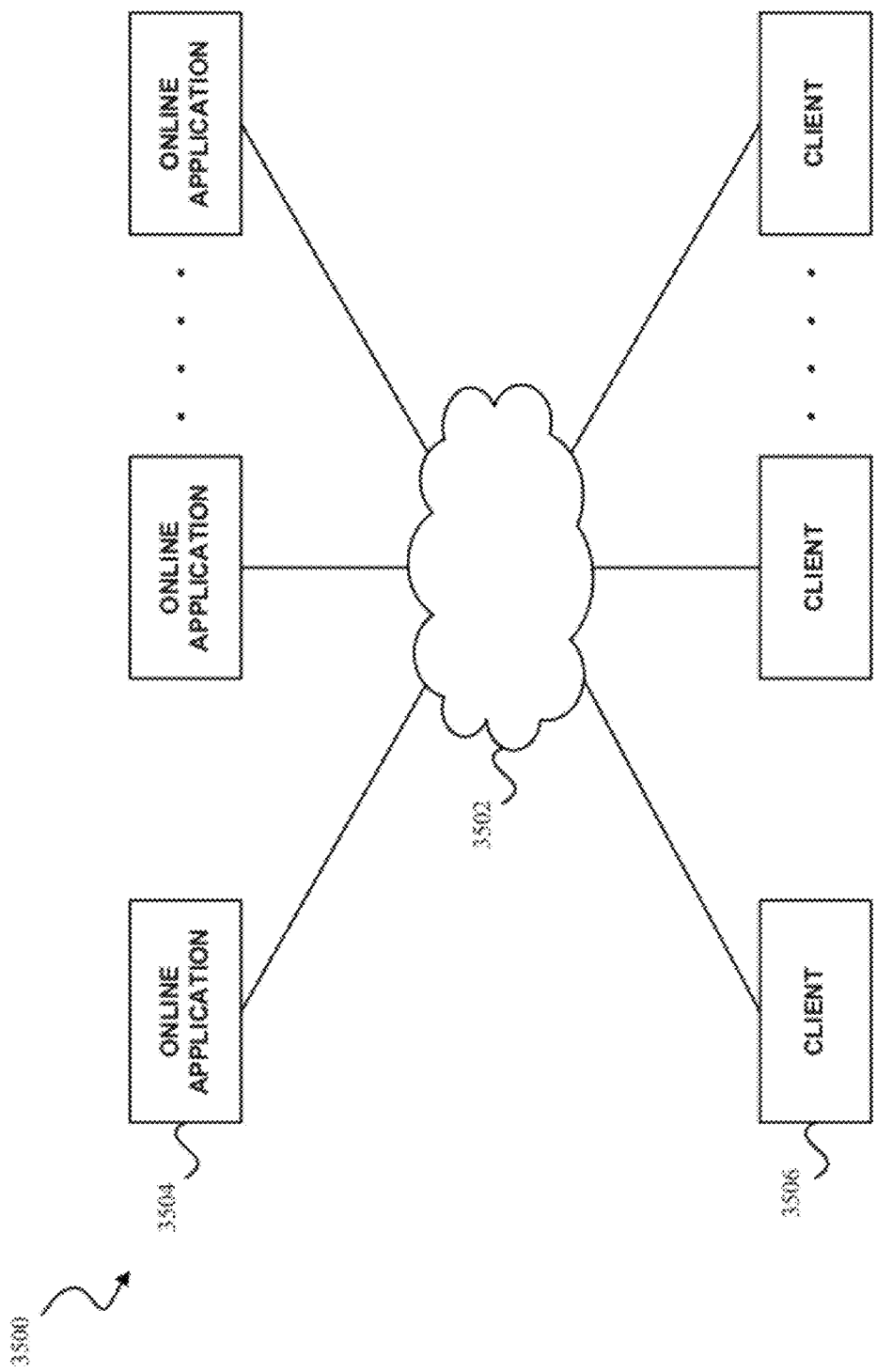
FIG. 35 shows a system for accessing one or more online applications, in accordance with one embodiment.

FIG. 35 shows a system 3500 for accessing one or more online applications, in accordance with one embodiment. As shown, a plurality of networks 3502 is provided. In the context of the present network architecture 3500, the networks 3502 may each take any form including, but not limited to a local area network (LAN), a wireless network, a wide area network (WAN) such as the Internet, peer-to-peer network, etc.

Coupled to the networks 3502 are servers 3504 including one or more online software applications, which are capable of communicating over the networks 3502. Also coupled to the networks 3502 and the servers 3504 is a plurality of clients 3506. Such servers 3504 and/or clients 3506 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 3502, at least one gateway is optionally coupled therebetween.

Figure 36:
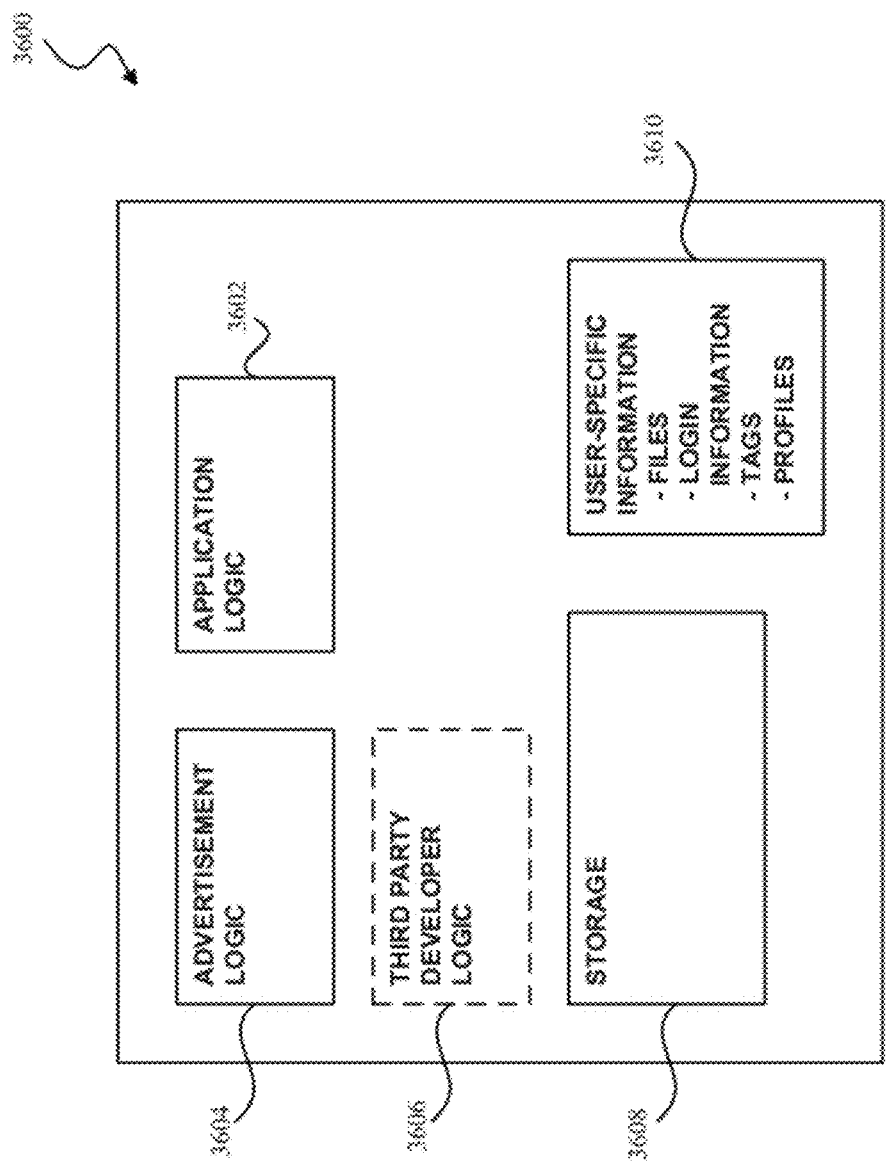
FIG. 36 shows a representative environment that may be associated with the servers and/or clients of FIG. 35, in accordance with one embodiment.

FIG. 36 shows a representative environment 3600 that may be associated with the servers 3504 and/or clients 3506 of FIG. 35, in accordance with one embodiment. As shown, the environment 3600 may include software application logic 3602, advertisement logic 3604, and third party developer logic 3606. Furthermore, storage 3608 may also be provided such that documents may be stored. In some cases, these documents may include documents associated with online applications. Additionally, other storage may be provided for various other data such as user specific information 3610.

Various embodiments set forth herein may be implemented utilizing hardware, software, or any desired combination thereof. For that matter, any type of logic may be utilized which is capable of implementing the various functionality set forth herein.

Figure 37:
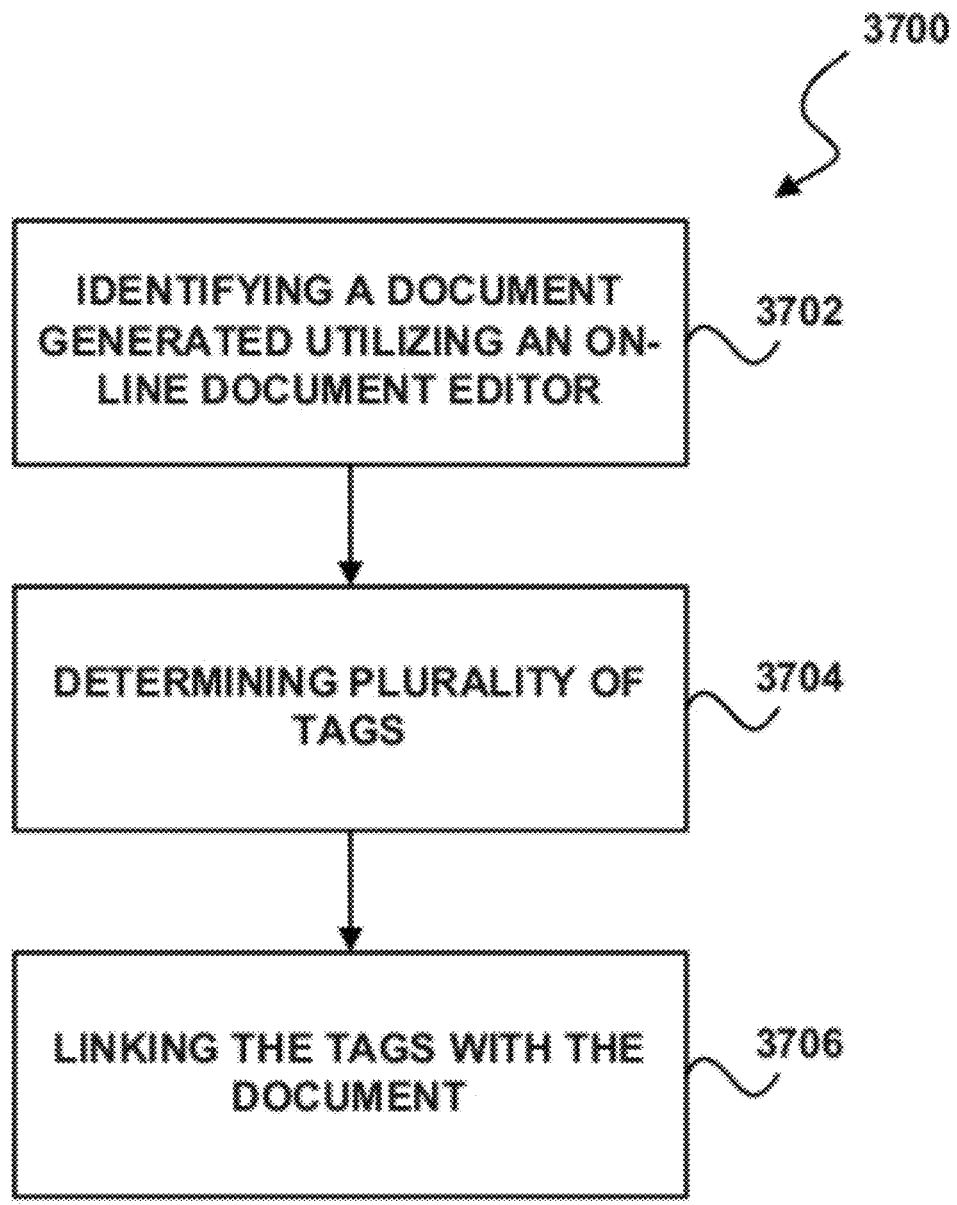
FIG. 37 shows a method for linking a plurality of tags with a document, in accordance with one embodiment.

FIG. 37 shows a method 3700 for linking a plurality of tags with a document, in accordance with one embodiment. As an option, the present method 3700 may be implemented in the context of the functionality and architecture of FIGS. 35-36. Of course, however, the method 3700 may be carried out in any desired environment. It should also be noted that the aforementioned definitions may apply during the present description.

As shown, a document generated utilizing an online document editor is identified. See operation 3702. In the context of the present description, an online document editor refers to any online editor used to generate or modify documents. For example, in various embodiments, the online document editor may include, but is not limited to, WebOffice Document Manager, Zoho Writer, Google Docs, and/or any other document editor that meets the above definition.

Further, the document generated may include any document capable of being generated with an editor. For example, in various embodiments, the document may include a may include, but is not limited to, a text document, any word processor document (e.g. a Microsoft Word document, Microsoft Works document, etc.), a spreadsheet document (e.g. a .xls document, etc.), a presentation document (e.g. a .ppt document, etc.), a portable document format (PDF) file, a picture, a drawing, and/or any other document that meets the above definition.

Additionally, a plurality of tags are determined. See operation 3704. In the context of the present description, a tag refers to any keyword, term, or phrase associated with or assigned to a piece of information (e.g. a picture, a geographic map, a blog entry, a video clip, or any document, etc.).

Furthermore, the tags are linked with the document. See operation 3706. As an option, the tag may be utilized to describe the document and enable keyword-based classification and searches of information associated with such document.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 38:
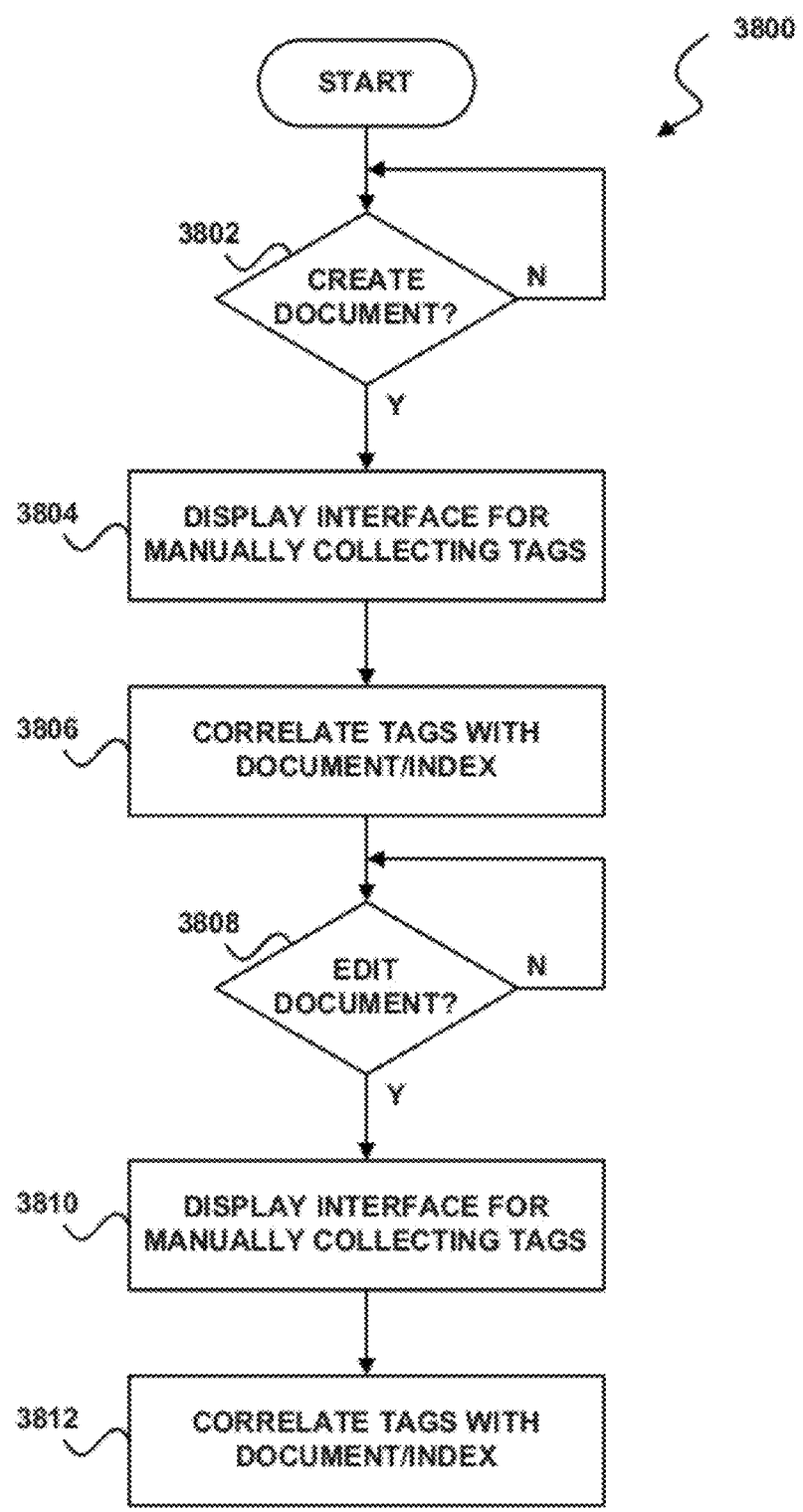
FIG. 38 shows a method for linking a plurality of tags with a document, in accordance with another embodiment.

FIG. 38 shows a method 3800 for linking a plurality of tags with a document, in accordance with another embodiment. As an option, the present method 3800 may be implemented in the context of the functionality and architecture of FIGS. 35-37. Of course, however, the method 3800 may be carried out in any desired environment. It should also be noted that the aforementioned definitions may apply during the present description.

As shown, it is determined whether online documents have been created. See operation 3802. If one or more documents have been created, an interface is displayed for manually collecting tags. See operation 3804. As an option, the interface may be displayed upon saving the document. As another option, the interface may be displayed by selecting a tag creation icon or option in a menu or a toolbar.

Furthermore, the interface may include various functionality for manually collecting the tags. For example, the interface may include text edit boxes for manually inserting tags. The interface may also include a drop-down menu or other list of potential tags.

Additionally, the interface may provide suggested tags. For example, the list or drop-down menu may include a list of suggested tags. As another option, upon invocation of the interface, suggested tags may be highlighted in the created document. In this case, the interface may include text from the selected document illustrating the highlighted words or phrases to potentially be used as tags. Further, the document itself may include the highlighted words or phrases. In this case, a user may have the option to select the highlighted words or phrases (e.g. by clicking or scrolling over) utilizing a mouse.

In one embodiment, the tags may be manually selected from the document without by selecting any of the text in the document, not necessarily recommended tags. Further, the interface may provide a list of words in the created document with an associated number indicating the frequency of use in the document. These words may be ordered in a list from most to least use, for example. Additionally, the list may only include a certain number of the most used words in the document.

As another option, the tags may be recommended based on previously existing tags. For example, if a plurality of existing tags include a specific word or term, but other tags associated with those particular tags are dissimilar, a tag may be recommended that exploits this dissimilarity. As a specific example, if two existing documents have a tag that includes "apple" and another tag that includes "computer," but the newly created document has multiple occurrences of the term "apple" and few occurrences of the term "computer" in the document, another keyword may be recommended based on the number of times found in the document (e.g. "fruit") to distinguish the documents.

Once the tags have been collected, the tags are correlated with a document/index. See operation 3806. In this way, the tags may be indexed. For example, the tags may then be associated or linked with/to the document and an index location such that the tag may be utilized to access the indexed location of the document. In this case, an index may refer to any location of a data structure. Furthermore, the index may refer to any location in a database. In this way, the tags may be utilized for searching the documents.

Once the tags are correlated with a document/index, it is determined whether the document is to be edited. See operation 3808. For example, the document may be selected to be edited by the user. If the document is to be edited, the interface is displayed for manually collecting tags. See operation 3810. As an option, the interface may be displayed when the edited document is to be saved (e.g. when the user selects a save document option or icon, etc.).

Once the tags have been collected, the tags are correlated with the document/index. See operation 3812. It should be noted, that suggested tags may again be optionally displayed using the interface. Furthermore, the user may have the option to utilize previously generated tags instead of generating new or additional tags.

Figure 39:
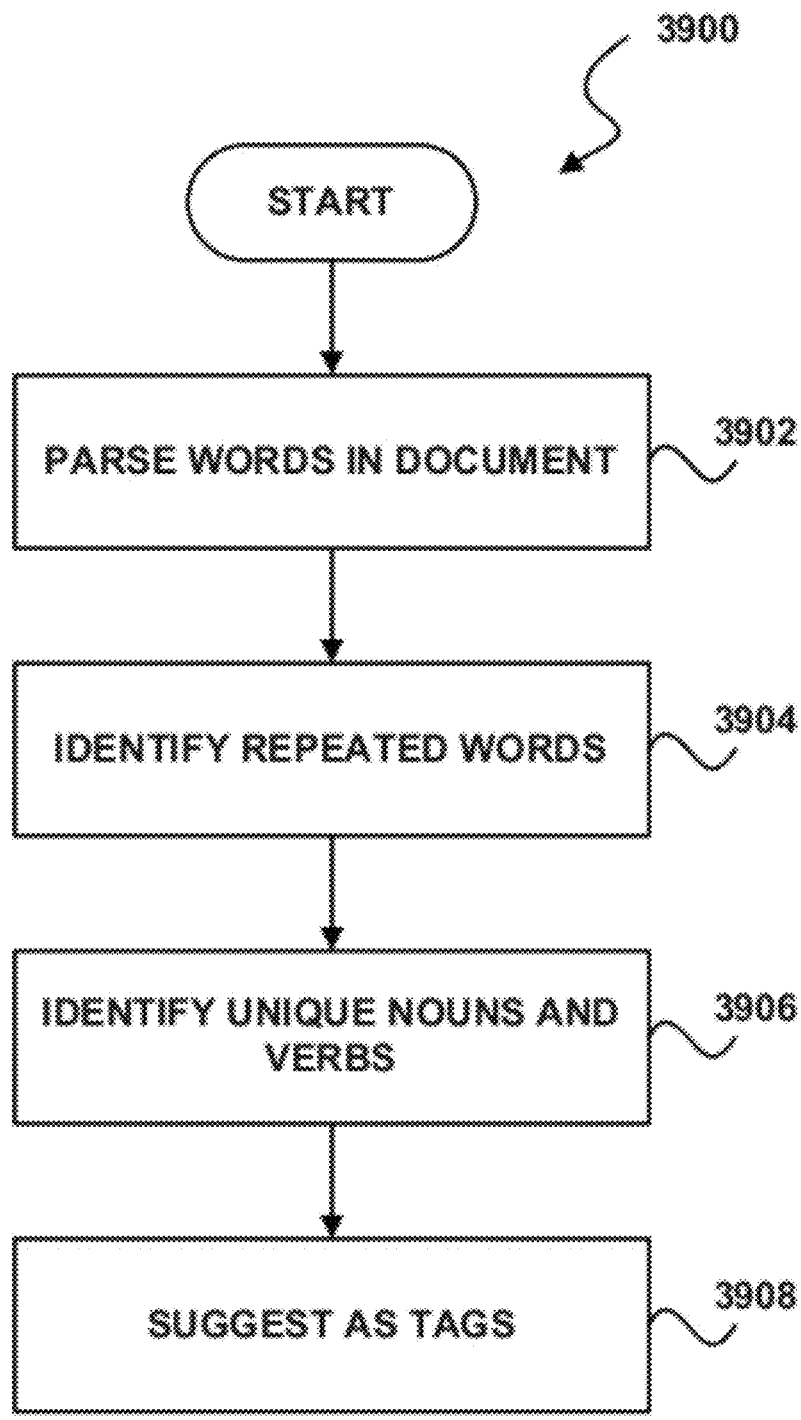
FIG. 39 shows a method for suggesting tags or automatically selecting tags, in accordance with another embodiment.

In addition to manual selection, in another embodiment, the tags may also be automatically selected. FIG. 39 shows a method 3900 for suggesting tags or automatically selecting tags, in accordance with another embodiment. As an option, the present method 3900 may be implemented in the context of the functionality and architecture of FIGS. 35-38. Of course, however, the method 3900 may be carried out in any desired environment. It should also be noted that the aforementioned definitions may apply during the present description.

As shown, words in a document are parsed. See operation 3902. In the context of the present description, parsing refers to transforming text into a word or data structure. For example, in various embodiments, parsing may include, but is not limited to, extracting words from text, extracting phrases from text, extracting symbols from text, lexical functional grammar parsing, head-driven phrase structure grammar parsing, shallow parsing, dependency grammar parsing, etc.

Once the words in the document have been parsed, repeated words are identified. See operation 3904. In one embodiment, identifying the repeated words may include implementing a statistical analysis on the repeated words to determine a frequency of use and/or a relevance analysis (i.e. the likelihood the word is relevant in the context used). As an option, the identification of repeated words may include only identifying nouns and/or verbs that are repeated.

Furthermore, unique nouns and or verbs may also be identified. See operation 3906. In this case, the unique nouns or verbs may be identified from the list of repeated words and/or non-repeated words in the document. In one embodiment, the unique nouns or verbs may refer to any noun or verb that is not statistically likely to appear in a document (e.g. less than 60% likely, 50% likely, 40% likely, etc.). Additionally, the unique nouns or verbs may be determined based on the frequency of use in the document.

As shown further, tags may be suggested based on the identification. See operation 3908. In this way, nouns, verbs, and/or repeated words may be determined to be tags.

In various embodiments, the tags may be suggested as a list, dialog box, input text box, highlighted text, etc. Furthermore, the tags may be automatically selected and applied. For example, an interface may provide a user an option to have tags automatically selected. In this case, tags that would otherwise be suggested may be utilized as tags automatically. Thus, the tags may be determined automatically by parsing words in the document.

Figure 40:
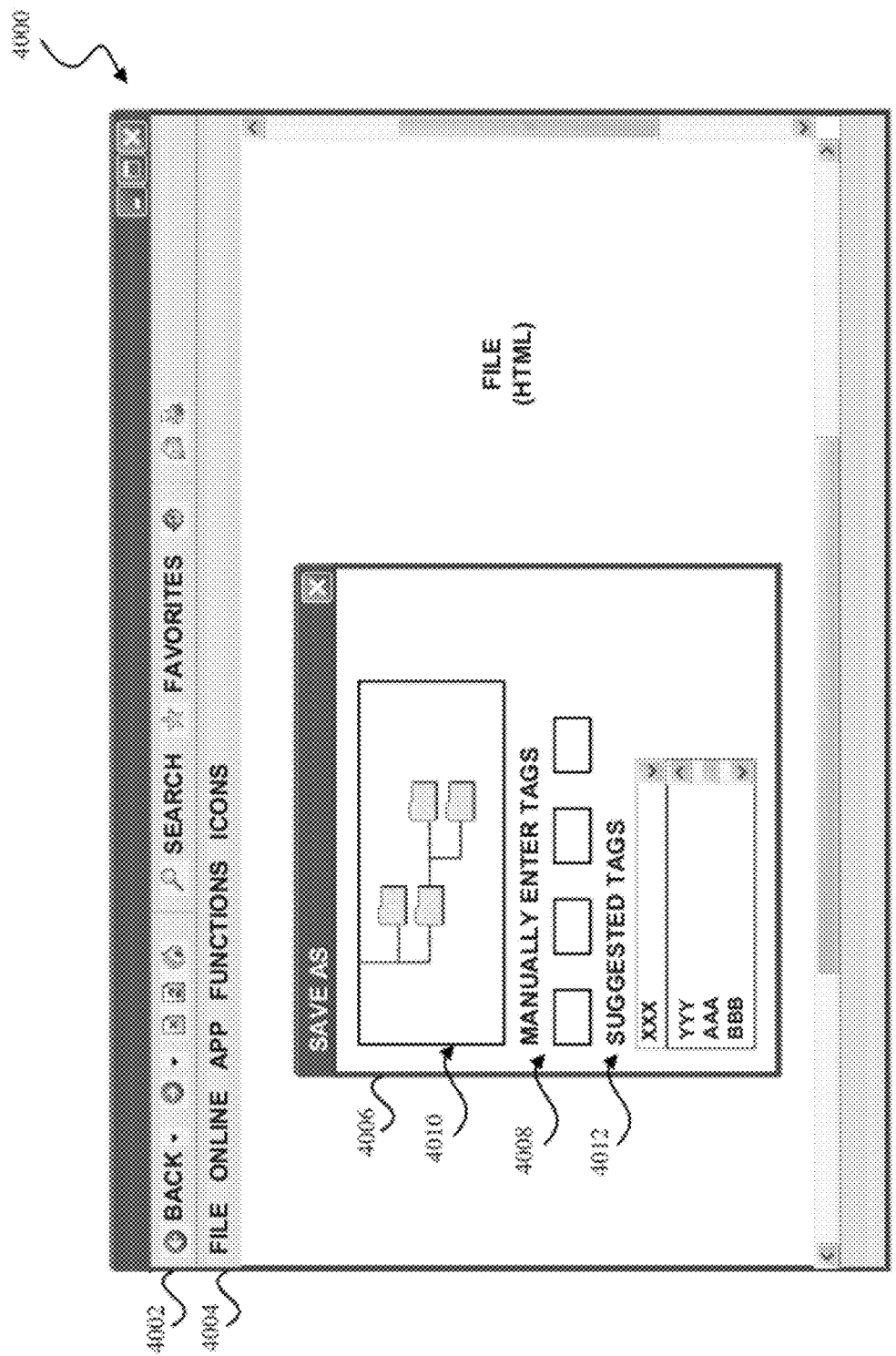
FIG. 40 shows an interface for linking a plurality of tags with a document, in accordance with one embodiment.

FIG. 40 shows an interface 4000 for linking a plurality of tags with a document, in accordance with one embodiment. As an option, the interface 4000 may be implemented in the context of the details of FIGS. 35-39. Of course, however, the interface 4000 may be implemented in any desired environment. It should also be noted that the aforementioned definitions may apply during the present description.

As shown, the interface 4000 may include a navigator bar 4002 (e.g. an explorer bar) including back, forward, stop, reload, etc. functionally for navigating online. Further, a toolbar 4004 may be provided including various functionality for accessing/managing documents. For example, the toolbar 4004 may include a file option to access functionality associated with a document (e.g. save, save as, send, properties, etc.). Furthermore, the toolbar 4004 may include options for switching between online applications (e.g. word processors, spread sheet generation tools, PDF generators, etc.). Still yet, the toolbar may include various other functions such as view options, format options, tool options, table options, window options, help options, and various icons associated with various functionality.

Additionally, the interface 4000 includes a window for viewing documents. In operation, a user may generate a document or a plurality of documents using the interface 4000. Tags may then be determined manually or automatically, correlating to the document.

As an option, the tags may be manually entered upon saving the document. For example, upon save the document a user interface 4006 may be displayed, allowing a user to manually enter a tag or a plurality or tags into a text box 4008. In one embodiment, the interface 4006 may include a folder directory 4010. Furthermore, the interface 4006 may include a list of suggested tags 4012. Once the tags have been selected (manually and/or automatically), the tags are indexed.

Thus, the tags may be utilized for searching the documents. As an option, the interface 4000 may allow the user to search a plurality of documents using the tags. In this way, the user may examine tags relating to information being sought, and the tag may be used to find appropriate documents.

It should be noted that the interface 4000 may represent any network browser. Thus, by using the interface 4000 multiple online applications may be accessed utilizing the tags. Furthermore, in various embodiments, the documents may be created using many different online applications. As an option, these online applications may employ functionality of various other online applications.

Figure 41:
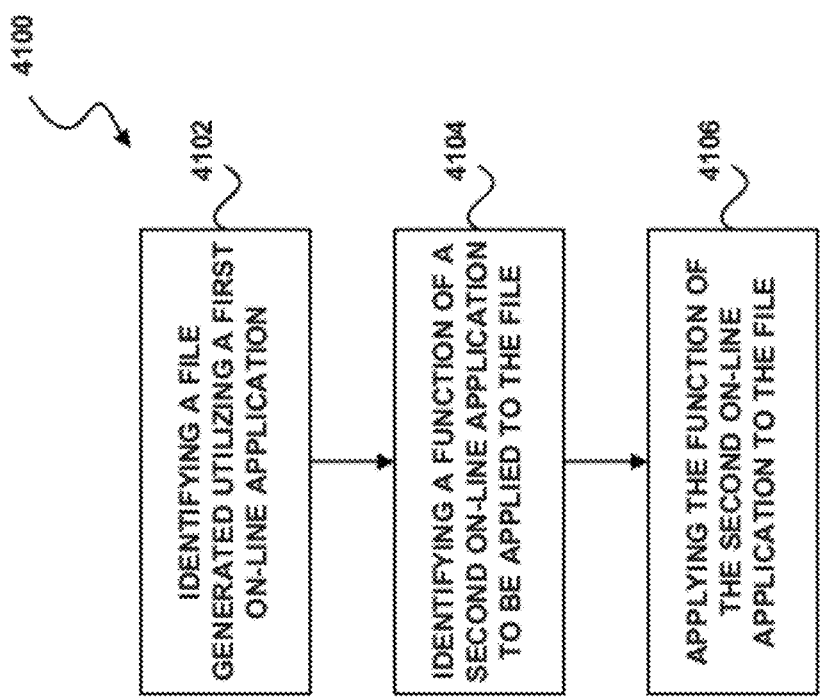
FIG. 41 shows a method for applying a function of an online application to a file generated by a second online application, in accordance with one embodiment.

FIG. 41 shows a method 4100 for applying a function of an online application to a file generated by a second online application, in accordance with one embodiment. As an option, the present method 4100 may be implemented in the context of the functionality and architecture of FIGS. 35-40. Of course, however, the method 4100 may be carried out in any desired environment. It should also be noted that the aforementioned definitions may apply during the present description.

As shown, a file generated utilizing a first online application is identified. See operation 4102. In the context of the present description, an online application refers to any software application that is utilized over a network. For example, in various embodiments, the online applications may include, but are not limited to, online word processors, online spread sheet generators, online presentation tools and generators, online project management software, online accounting software, and/or any other online applications that meet the above definition.

Additionally, a function of a second online application to be applied to the file is identified. See operation 4104. In the context of the present description, a function refers to function associated with an application. For example, in various embodiments, the function may include, but is not limited to, a format conversion, a commenting function, a publishing function, a spell check function, a track changes function, a text formatting function, an object modifying function, a drawing function, a table function, a macro function, and/or any other function that meets the above definition.

Further, the function of the second online application is applied to the file. See operation 4106. The function may be applied in a variety of ways. For example, the function of the second online application may be applied to the file utilizing code stored at a server hosting the first online application. As another example, the function of the second online application may be applied to the file utilizing code stored at a server hosting the second online application. In this case, the function may be applied by passing a URL associated with the file to second online application.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 42:
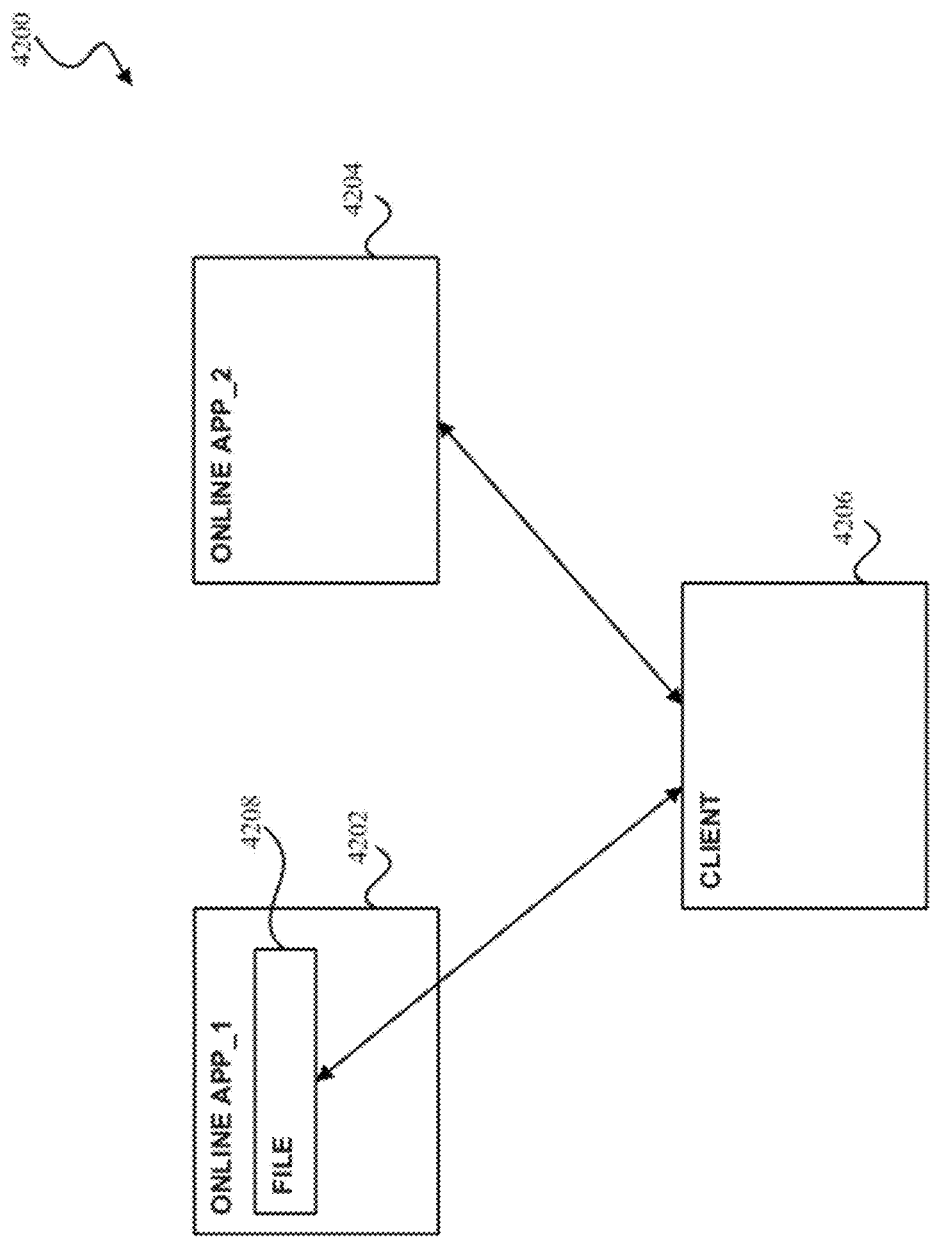
FIG. 42 shows a system for applying a function of an online application to a file generated by a second online application, in accordance with one embodiment.

FIG. 42 shows a system 4200 for applying a function of an online application to a file generated by a second online application, in accordance with one embodiment. As an option, the system 4200 may be implemented in the context of the functionality and architecture of FIGS. 35-41. Of course, however, the system 4200 may be implemented in any desired environment. It should also be noted that the aforementioned definitions may apply during the present description.

As shown, a server including a first online application 4202, a server including a second online application 4204, and a client 4206 are provided. In operation, a file 4208 generated utilizing the first online application 4202 is identified. Additionally, a function of the second online application 4204 is identified to be applied to the file 4208. Further, the function of the second online application 4206 is applied to the file 4208.

In one case, the function of the second online application 4206 may be unavailable utilizing the first online application. In this way, functionality of multiple applications may be shared between applications.

As shown further, the client 4206 has access to both the first and second online applications 4202 and 4204. For example, the first online application 4202 and the second online application 4204 may be accessible via a network browser. In this way, the function of the second online application 4204 may be selected utilizing the network browser.

For example, the function of the second online application 4204 may be selected utilizing a toolbar of the network browser. In this case, the toolbar may include a plugin. In the context of the present description, a plugin refers to any computer program that interacts with a host application (e.g. the network browser, etc.). In one embodiment, the plugin may provide a function using an icon and/or dedicated text.

Although not illustrated, in one embodiment, the first the second online application 4202 and 4204 may be included on one server. In another embodiment, the server including the first online application 4202 and the server including the second online application 4204 may be in communication. In this way, applying the function of the second application 4204 to the file 4208 may not necessarily involve communicating data via the client 4206, as shown in FIG. 42.

Figure 43:
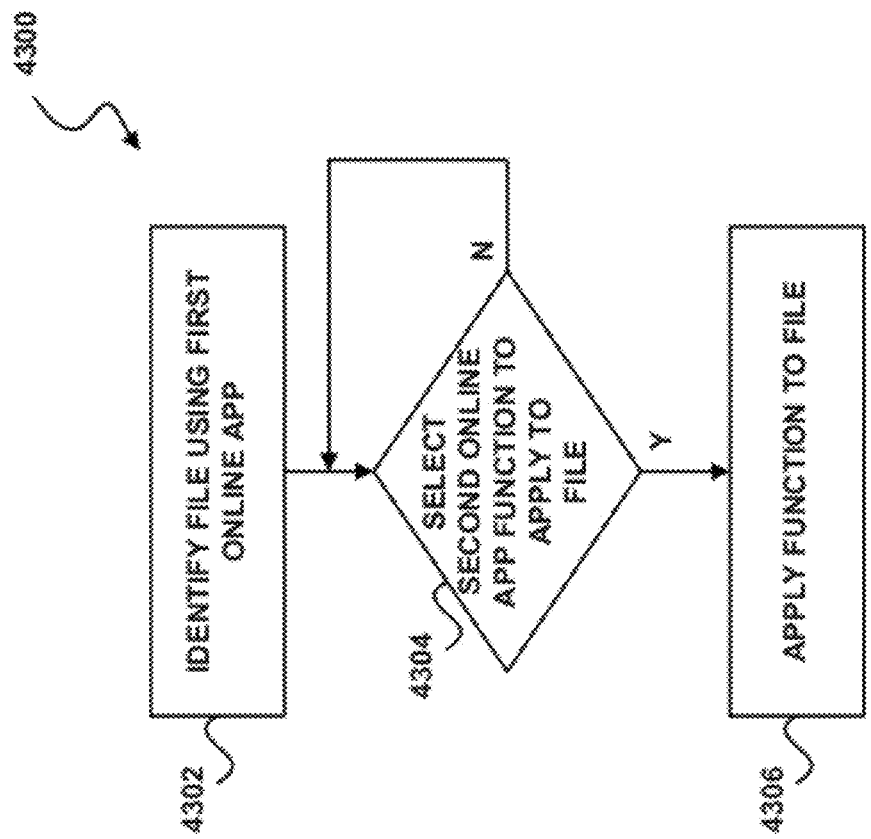
FIG. 43 shows a method for applying a function of an online application to a file generated by a second online application, in accordance with one embodiment.

FIG. 43 shows a method 4300 for applying a function of an online application to a file generated by a second online application, in accordance with one embodiment. As an option, the present method 4300 may be implemented in the context of the functionality and architecture of FIGS. 35-42. Of course, however, the method 4300 may be carried out in any desired environment. It should also be noted that the aforementioned definitions may apply during the present description.

As shown, a file is identified using a first online application. See operation 4302. As an option, identifying the file may include selecting the file via a user interface. As another option, the file may be selected from a network browser. In this case, the network browser may include a drop-down list of potential files. In one embodiment, the network browser may include a bookmark to the file.

Once the file is selected using the first online application, it is determined whether a function from a second online application function is selected to be applied to the file. See operation 4304. As an option, the function may be selected using a toolbar including functionality of both the first and second application. In one case, this toolbar may be displayed upon accessing two or more applications. For example, upon accessing a first online application, a toolbar including functionality of the first application may be displayed. Then, after accessing a second online application, the toolbar may be updated to include functionality of the second online application.

In another embodiment, a toolbar may be displayed including functionality of all available online applications. In this case, the available functionality may include only online application functions available to a user or compatible with the opened file and/or application.

If it is determined that a function from the second online application is selected to be applied to the file, the function is applied to the file. See operation 4306. The function may be applied to the file in many ways. For example, in one embodiment, code including the function may be transferred to the server including the first application such that the first application may apply the function to the file.

In another embodiment, the file may be transferred to the server including the second online application and the function may be applied to the file. In still another embodiment, the server including the file and the first online application may include a list of various functions and associated code, capable of being applied to the file. In this case, such functionality may or may not be included as part of the first application. As an option, all capable functionality of the first online application and/or the second online application may be available via a network browser.

Figure 44:
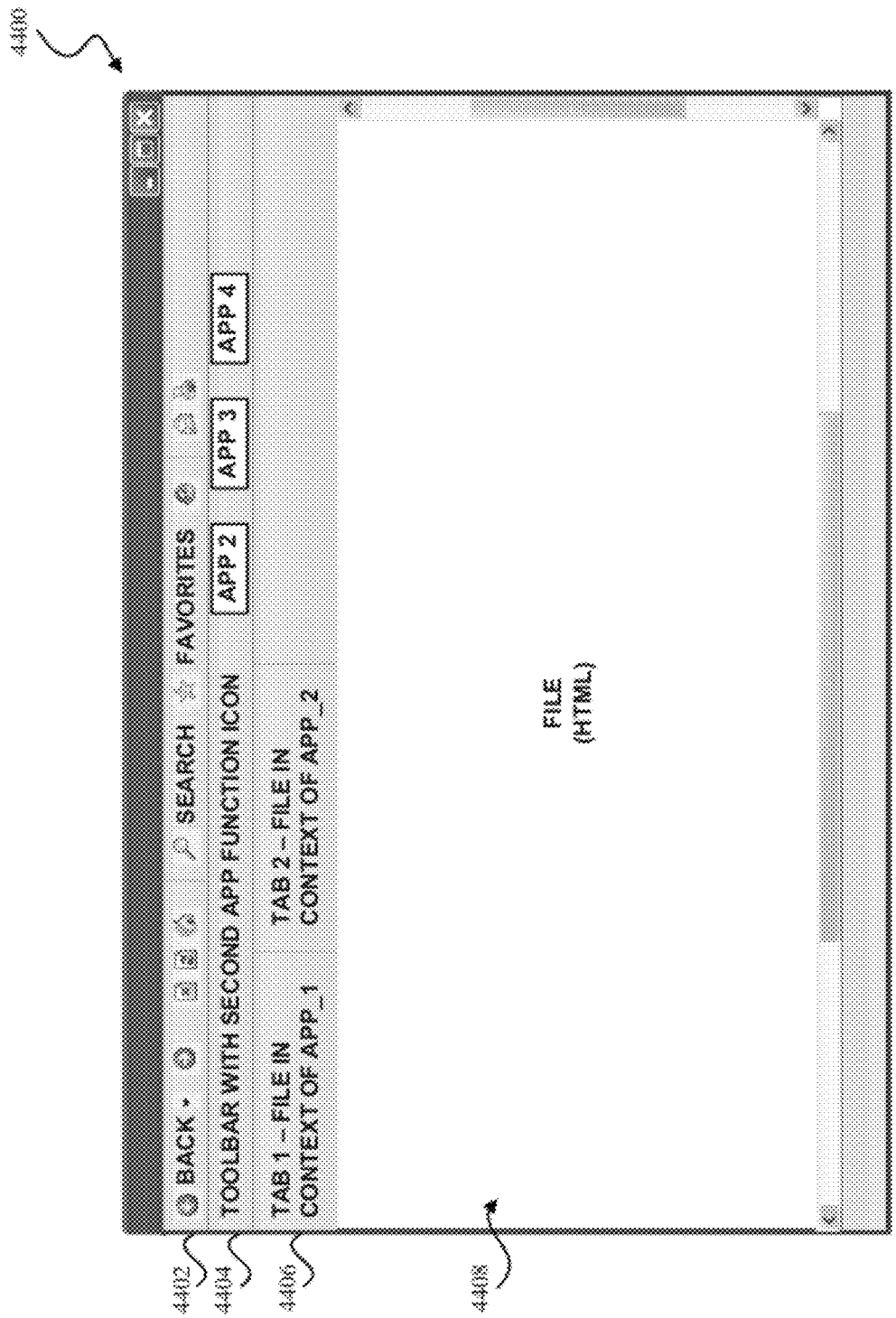
FIG. 44 shows a network browser for applying a function of an online application to a file generated by a second online application, in accordance with one embodiment.

FIG. 44 shows a network browser 4400 for applying a function of an online application to a file generated by a second online application, in accordance with one embodiment. As an option, the network browser 4400 may be implemented in the context of the details of FIGS. 35-43. Of course, however, the network browser 4400 may be implemented in any desired environment. It should also be noted that the aforementioned definitions may apply during the present description.

As shown, the network browser 4400 may include a navigator bar 4402 (e.g. an explorer bar) including back, forward, stop, reload, etc. functionally for navigating a network. Further, a toolbar 4404 may be provided including various functionality for accessing/managing files and/or applications. For example, the toolbar 4404 may include functions of a plurality of applications.

In one embodiment, the toolbar 4404 may only include functions of open applications. In another embodiment, the toolbar 4404 may only include functions that may be applied to an open file or application in use. In still another embodiment, the toolbar may include all functions available to a user. As an option, the functions available to a user may include only functions associated with applications to which the user has usage rights.

In addition to various application functions, in other embodiments, the toolbar 4404 may include a file option to access functionality associated with a file (e.g. save, save as, send, properties, etc.). Furthermore, the toolbar 4404 may include options for switching between online applications (e.g. word processors, spread sheet generation tools, PDF generators, etc.). Still yet, the toolbar may include various other functions such as view options, format options, tool options, table options, window options, help options, and various icons associated with various functionality.

Additionally, the network browser 4400 or the toolbar 4404 may include a tab bar 1006 for easy toggling between applications and files. As an option, the tab bar 4406 may allow the same file to be viewed in the context of a first online application and a second online application. In this way, a file opened by the first online application under a first tab may be viewed in the context of a second online application under a second tab, allowing a function of the second online application to be applied to the file when viewed under the second tab and/or the first tab.

Furthermore, results of applying the function may be displayed in a separate window. For example, after applying the function to the file, the results may be displayed under a tab separate from the first and/or second online application, or a separate window 4408 of the network browser 4400 or a separate network browser (not shown).

It should be noted that, the toolbar 4404 may display functions of an individual online application, or a plurality of different applications. In some cases, the different online applications may be applications located on separate servers.

Figure 45:
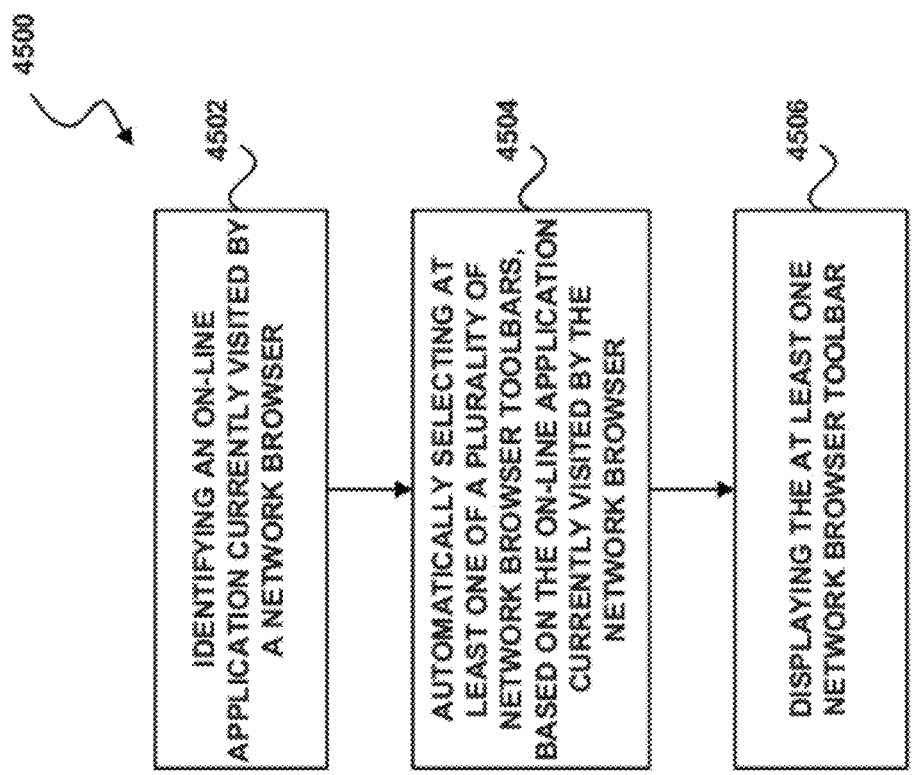
FIG. 45 shows a method for accommodating different online applications, in accordance with one embodiment.

FIG. 45 shows a method 4500 for accommodating different online applications, in accordance with one embodiment. As an option, the present method 4500 may be implemented in the context of the functionality and architecture of FIGS. 35-44. Of course, however, the method 4500 may be carried out in any desired environment. It should also be noted that the aforementioned definitions may apply during the present description.

As shown, an online application currently visited by a network browser is identified. See operation 4502. Additionally, at least one of a plurality of network browser toolbars is automatically selected based on the online application currently visited by the network browser. See operation 4504. Furthermore, the at least one network browser toolbar is displayed. See operation 4506.

In the context of the present description, a network browser toolbar refers to any row, column, or block of buttons, icons, or linked words that, when clicked, activate certain functions of an application. For example, in various embodiments, the toolbar may include save functions, spell check functions, text formatting functions, file formatting functions, search functions, drawing functions, and/or any other functions associated with an application.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 46:
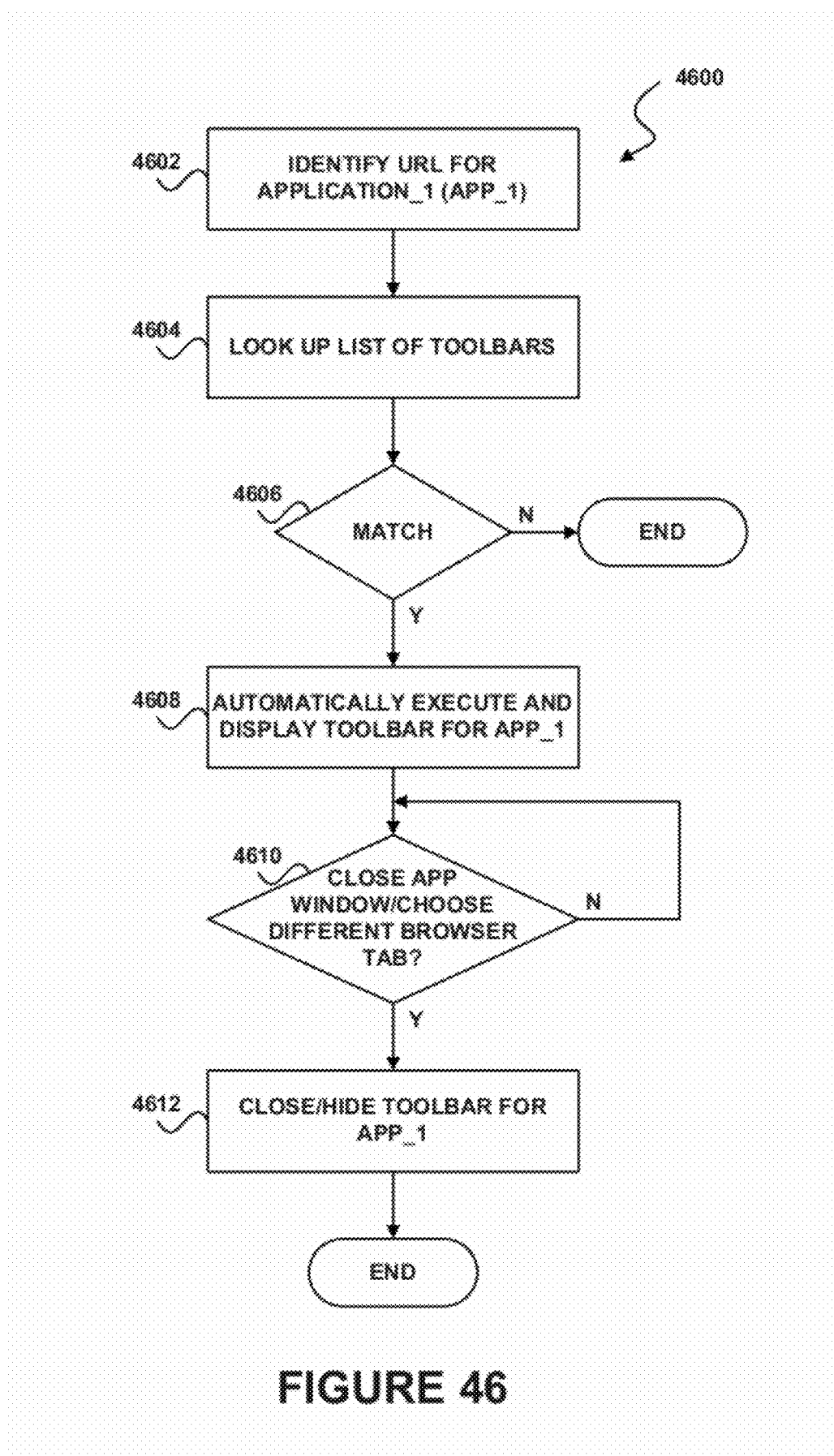
FIG. 46 shows a method for accommodating different online applications, in accordance with one embodiment.

FIG. 46 shows a method 4600 for accommodating different online applications, in accordance with one embodiment. As an option, the present method 4600 may be implemented in the context of the functionality and architecture of FIGS. 35-45. Of course, however, the method 4600 may be carried out in any desired environment. It should also be noted that the aforementioned definitions may apply during the present description.

As shown, a URL is identified for a first online application. See operation 4602. In this case, the URL may be identified upon accessing the first application and/or by opening a file associated with the first application. For example, a user may access the first online application using a network browser. In this way, the online application may be identified by monitoring URLs entered into the network browser.

Further, a list of toolbars is examined to find a toolbar associated with the URL or the first application are examined. See operation 4604. For example, a list including a plurality of toolbars associated with various online applications may be stored in a database. Using the identified URL and/or other information about the first online application, the list of toolbars may be examined to determine whether an appropriate toolbar is present for the first online application.

Once the URL has been identified, it is determined whether there is an appropriate toolbar present. See operation 4606. In one embodiment, the URLs entered in the network browser may be compared against a list of predetermined URLs associated with online applications for which an associated toolbar is stored on a client on which the network browser is installed.

If there is appropriate toolbar present, a toolbar is automatically executed and displayed for the first online application. See operation 4608. Thus, upon a match being identified based on the comparison of the URLs, a corresponding one of the toolbars is executed without user intervention.

It is then determined whether a window associated with the first online application is closed or a different tab on the network browser is selected. See operation 4610. If the window is closed or another network browser tab is selected, the toolbar corresponding to the first application is closed or hidden. See operation 4612. Thus, the network browser toolbar may be removed from an in erface of the network browser upon identification of a window in which an associated online application being closed.

In one embodiment, multiple tabs on a network browser may be open simultaneously, where more than one tab corresponds to the first application. In this case, the toolbar may remain displayed for all tabs or windows associated with the first application. Furthermore, in the case that a second application is being utilized in one of the tabs or windows, and the second tab utilizes the same or similar toolbar functionality as the first application, the toolbar may also remain displayed for the second application.

FIG. 47 shows a network browser plugin 4700 for accommodating different online applications, in accordance with one embodiment. As an option, the network browser plugin 4700 may be implemented in the context of the details of FIGS. 35-46. Of course, however, the network browser plugin 4700 may be implemented in any desired environment. It should also be noted that the aforementioned definitions may apply during the present description.

As shown, the network browser plugin 4700 may include various information for accessing a first application. For example, the network browser plugin 4700 may include a user name, user login information, an online application URL, user preferences, etc. In one embodiment, the network browser plugin 4700 may be stored on a client computer from which the URL of online applications are accessed.

For example, a user may subscribe or access an online application and be prompted to download the network browser plugin 4700 from the location of the online application to the computer or device of the user. The user may then be prompted to fill out all relevant information. In this way, the network browser plugin 4700 may be utilized to access one or more online applications without the need to enter login information every time the application is accessed. In one embodiment, the network browser plugin 4700 may include information associated with a plurality of online applications. In this case, the URL may be utilized as a lookup for all of the information utilized by the online application to allow the user access.

Figure 48:
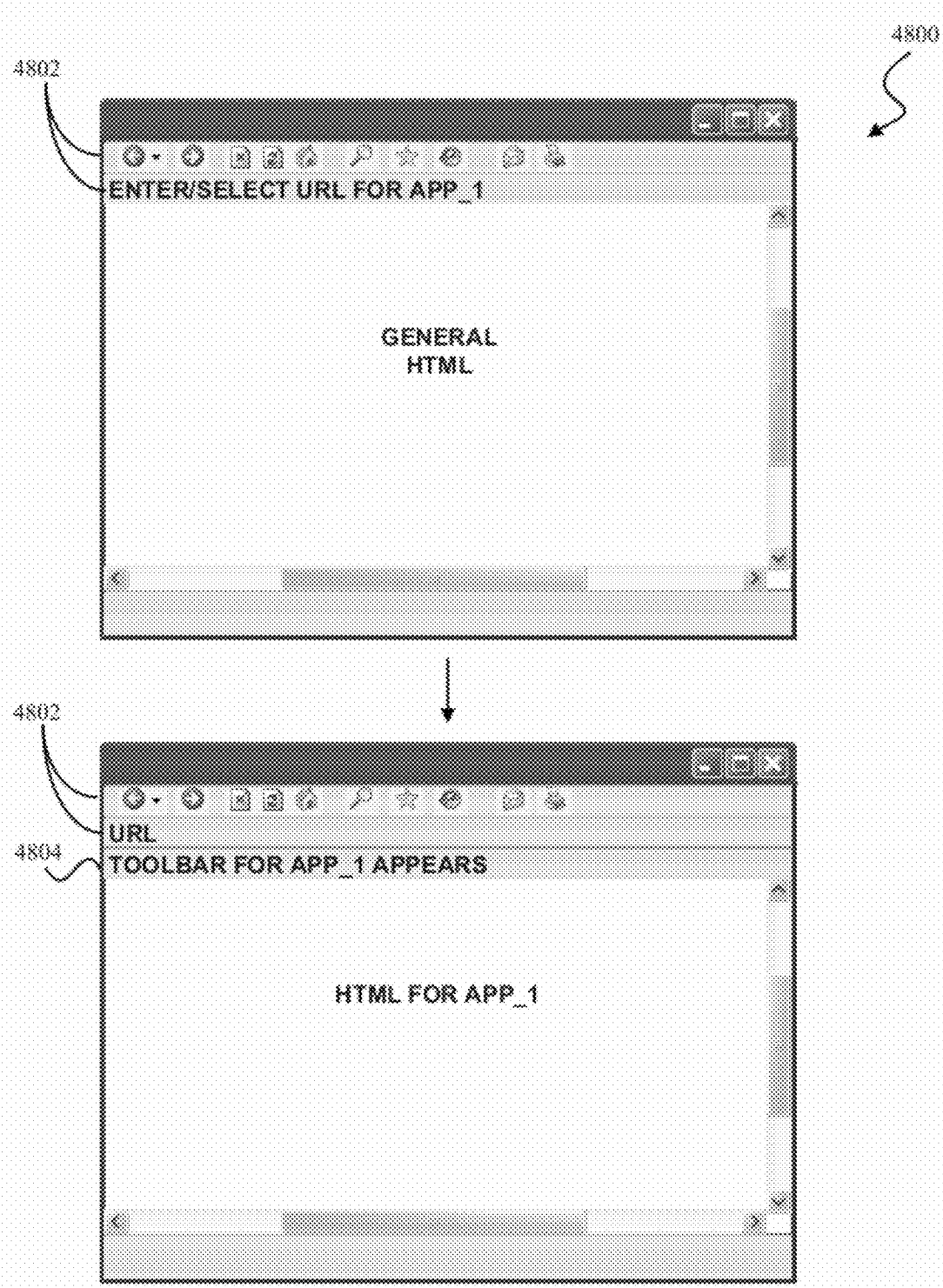
FIG. 48 shows a network browser for accommodating different online applications, in accordance with one embodiment.

FIG. 48 shows a network browser 4800 for accommodating different online applications, in accordance with one embodiment. As an option, the network browser 4800 may be implemented in the context of the details of FIGS. 35-47. Of course, however, the network browser 4800 may be implemented in any desired environment. It should also be noted that the aforementioned definitions may apply during the present description.

As shown, the network browser 4800 may include a navigator bar 4802 (e.g. an explorer bar) including back, forward, stop, reload, URL entry, etc. functionally for navigating a network. Further, a toolbar 4804 may be provided including various functionality for accessing/managing files and/or applications. For example, the toolbar 4804 may include functions for a first online application.

In addition to various functions of the first application, in other embodiments, the toolbar 4804 may include a file option to access functionality associated with a file (e.g. save, save as, send, properties, etc.). Furthermore, the toolbar 4804 may include options for switching between online applications (e.g. word processors, spread sheet generation tools, PDF generators, etc.). Still yet, the toolbar may include various other functions such as view options, format options, tool options, table options, window options, help options, and various icons associated with various functionality.

Additionally, the network browser 4800 or the toolbar 4804 may include a tab bar for easy toggling between applications and files. As an option, the tab bar may allow the same file to be viewed in the context of a first online application and a second online application. In this way, a file opened by the first online application under a first tab may be viewed in the context of a second online application under a second tab, allowing a function of the second online application to be applied to the file when viewed under the second tab and/or the first tab.

In operation, an online application currently visited by the network browser 4800 may be identified using the URL. Additionally, at least one of a plurality of network browser toolbars may be selected based on the online application currently visited by the network browser. As an option, the toolbar 4804 may be capable of being manually selected utilizing a menu. In this case, the menu may include a plurality of toolbars associated with various URLs or online applications, where the toolbars may include different functionality.

For example, a first one of the toolbars may be adapted for applying a first set of functions to a file generated utilizing a first online application, and a second one of the toolbars is adapted for applying a second set of functions to a file generated utilizing a second online application. Once the toolbar 4804 is selected, the toolbar 4804 may be displayed utilizing the network browser 4800.

As an option, log-in information utilized for the online applications may be stored on a computer on which the network browser 4800 is installed. In this way, the login information may be utilized to log-in to the online application currently visited by the network browser 4800. Thus, the user may enter the URL of the online application into the network browser 4800 and access the application without entering login information every time.

In one embodiment, the user may use bookmarks to access the online applications. In another embodiment, the user may click on a tag to access the online application. In still another embodiment, the user may access the online application by clicking an icon on a desktop. Additionally, the user may access the online application by clicking on an item illustrated in a pictorial diagram of a file structure.

It should be noted that the toolbar 4804 may be displayed independently (i.e. only a single network browser toolbar is displayed at a time), or with multiple other toolbars (e.g. other online application toolbars, search engine toolbars, email toolbars, etc.). In one embodiment, the network browser toolbar 4804 may be conditionally displayed based on a number of network browser toolbars already displayed. For example, if two toolbars are already being displayed, the network browser toolbar 4804 may not be displayed.

In another embodiment, a position of the network browser toolbar 4804 may depend on a number of network browser toolbars already displayed. As an option, if multiple toolbars are already displayed, the network browser toolbar 4804 may be displayed in a position in the network browser 4800 away from the other toolbars being displayed. For example, if multiple toolbars are being displayed at the top of the network browser 4800 the network browser toolbar 4804 may be displayed at the bottom of the network browser 4800.

In still another embodiment, a size of the network browser toolbar 4804 may depend on a number of network browser toolbars already displayed. For example, if a plurality of toolbars are already displayed, the network browser toolbar 4804 may be reduced in size (e.g. font, area, etc.). As another opticri, icons or buttons normally displayed on the network browser toolbar 4804 may be omitted in the case that limited space is available due to other toolbars being present.

In yet another embodiment, an orientation of the network browser toolbar 4804 may depend on a number of network browser toolbars already displayed. For example, if one or more toolbars are being displayed in a horizontal orientation or row across the top-side of the network browser 4800, the network browser toolbar 4804 may be displayed in a vertical orientation, as a column along a side of the network browser 4800. As an option, the network browser toolbar may be oriented vertically if one or more browser toolbars are already displayed.

In some cases, the toolbar 4804 or another toolbar displayed on the network browser 4800 may include functions for attaching files associated with the online applications to emails or other messages. In one embodiment, these attachments may be stored in a central location associated with an online application from which the attachment was generated.

Figure 49:
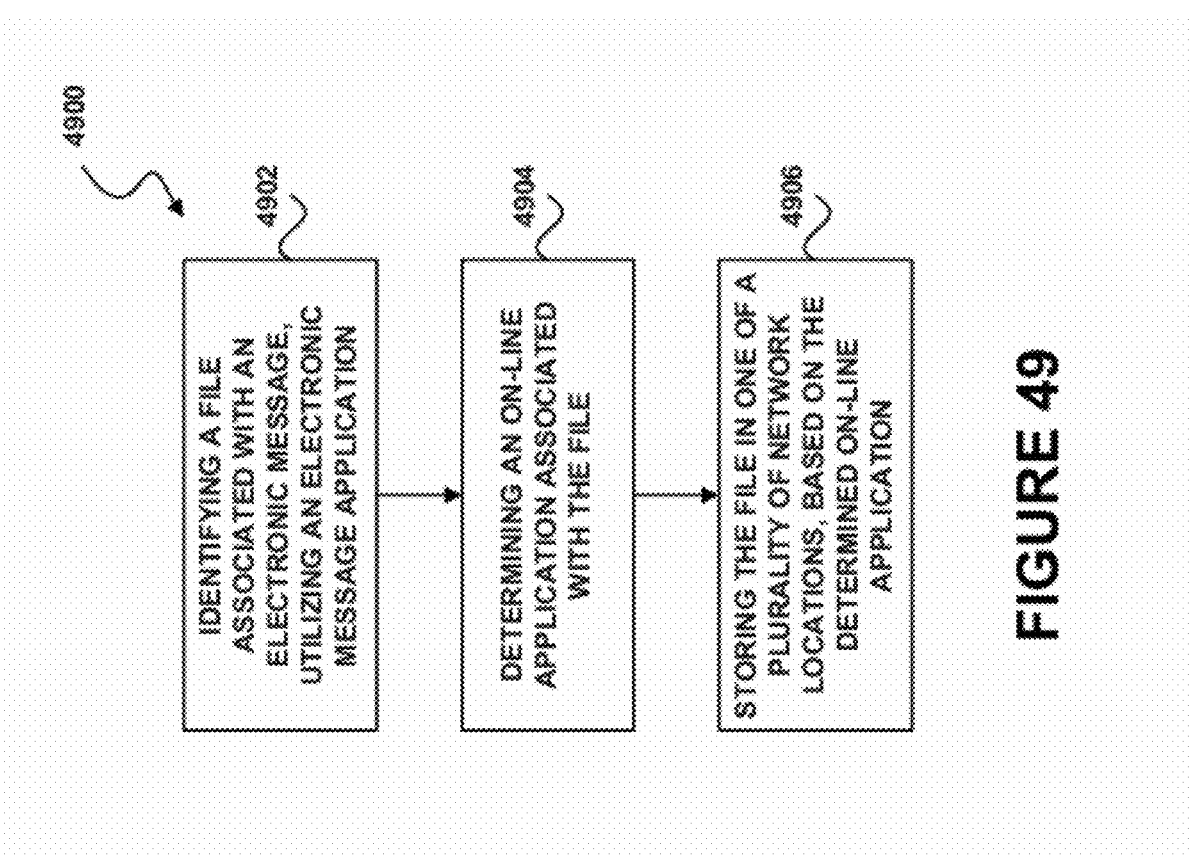
FIG. 49 shows a method for storing attachments of an electronic message in a central location associated with an online application from which the attachment was generated, in accordance with one embodiment.

FIG. 49 shows a method 4900 for storing attachments of an electronic message in a central location associated with an online application from which the attachment was generated, in accordance with one embodiment. As an option, the present method 4900 may be implemented in the context of the functionality and architecture of FIGS. 35-48. Of course, however, the method 4900 may be carried out in any desired environment. It should also be noted that the aforementioned definitions may apply during the present description.

As shown, a file associated with an electronic message is identified, utilizing an electronic message application. See operation 4902. In the context of the present description, an electronic message application refers to any application capable of identifying an electronic message. For example, in various embodiments, the electronic message application may include, but is not limited to, an email application (e.g. Microsoft Outlook, a web-based email application, etc.), a text messenger application, an instant messenger application, and/or any other electronic messenger application that meets the above definition. In various embodiments, the electronic message may include an email, a text message, an instant message, and any other electronic message.

Additionally as shown, an online application associated with the file is determined. See operation 4904. In this case, the online application may be an online application that generated the file, an online application that is capable of opening or viewing the file, an online application that is capable of modifying the file, etc.

Further, the file is stored in one of a plurality of network locations, based on the determined online application. See operation 4906. The network location may be any location capable of storing files. For example, in various embodiments, the network locations may include a server or a networked database. In this case, the network locations may be locations allocated to an individual user, a group of users, a company, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 50:
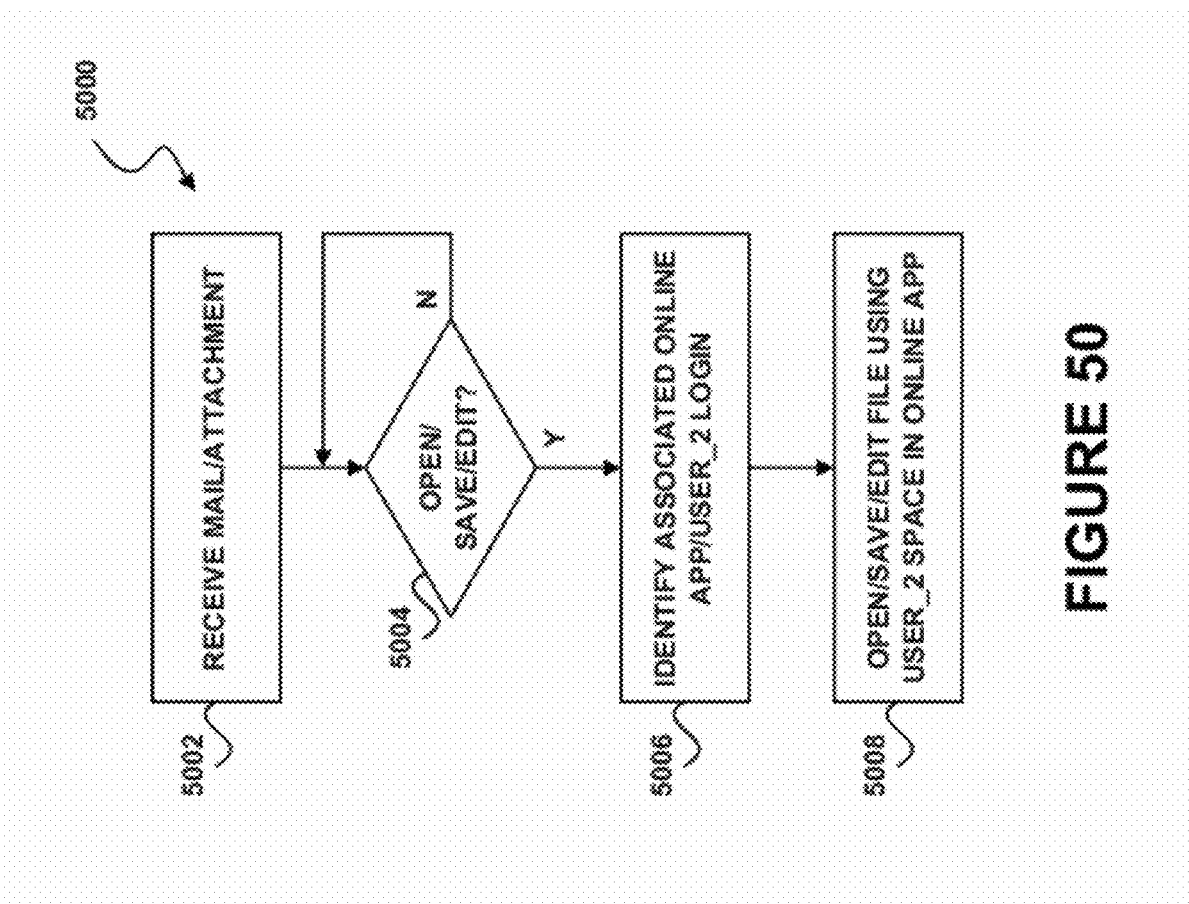
FIG. 50 shows a method for storing attachments of an electronic message in a central location associated with an online application from which the attachment was generated, in accordance with one embodiment.

FIG. 50 shows a method 5000 for storing attachments of an electronic message in a central location associated with an online application from which the attachment was generated, in accordance with one embodiment. As an option, the present method 5000 may be implemented in the context of the functionality and architecture of FIGS. 35-49. Of course, however, the method 5000 may be carried out in any desired environment. It should also be noted that the aforementioned definitions may apply during the present description.

As shown, an email from a first user, including an attachment, is received by a second user. See operation 5002. In this case, the attachment may include any file generated by any application. In one embodiment, the attachment may be virtual attachment. For example, the attachment may include a link corresponding to a file stored on a server.

Once the email is received, it is determined whether the attachment is to be opened, saved, and/or edited. See operation 5004. For example, the second user may select the attachment (e.g. using a mouse, etc.) and be given the option to open, save, edit, forward, etc. the attachment. This option may be presented in the form of a window, a drop-down menu, etc.

If it is determined that the attachment has been selected to be opened, saved, and/or edited, an online application associated with the attachment and corresponding user login information for the second user is identified. See operation 5006. The online application associated with the attachment may be determine in a variety of ways.

In one embodiment, the online application may be determined to be associated with the file, based on a header of the file. For example, a header of the file may indicate an application capable of opening, editing, or saving the file. As another option, the online application may be determined to be associated with the file, based on an extension of the file. For example, if the extension includes a ".txt" extension, it may be determined that an online text editor is associated with the file. In another case, a ".pdf" extension may indicate that a PDF viewer or editor is associated with the file.

In this way, the online application associated with the file may be determined automatically. In another embodiment, the online application associated with the file may be determined manually. For example, a user may have the option to select from a list of online applications.

In this case, the list may include all online applications capable of opening, editing, or saving the file. As an option, the list may include online applications for which the user has permission to use. As another option, the user may be given the option to have an appropriate application selected automatically.

In one embodiment, a network browser may be utilized to select the appropriate application. In this case, the network browser may be displayed upon selecting to open, save, or modify the file. As an option, the network browser may display a plurality of tabs corresponding to each online application capable of opening, editing, or saving the file.

In addition to determining an online application associated with the attachment, corresponding user login information is also determined. In one embodiment, the login information may be stored on a device on which the electronic message application is installed. In this case, the device may be any device capable of storing login information. For example, in various embodiments, the device may include a mobile device (e.g. a phone, PDA, laptop, etc.), a computer, or any other device that meets the above definition.

As an option, the login information may be included as a network browser plugin. In this case, the login information may be automatically accessed by the online application. In one embodiment, the log-in information may be utilized to login to the online application, in response to determining the online application is associated with the file. Thus, upon automatically or manually selecting the online application, the login information may be automatically obtained and utilized to access the application.

Once the online application has been determined and the login information of the second user identified, the file is open, saved, or edited (depending on the command), using space in the online application allocated to the second user. See operation 5008. For example, the file may be automatically transferred from a space at a network location associated with the first user to a space at a network location associated with the second user, such that the second user may access the file using the online application in a private or secure place, not accessible to the first user.

As another option, data included in the attachment may be used to reconstruct the file in a space on the network allocated to the second user. In this way, once the online application is determined, a program or function associated with the online application may use data in the attachment to regenerate the file. This data may be communicated either via a device of the second user or directly from the space allocated to the first user.

As still another option, the attachment may be saved directly from the device of the second user to the network space allocated to the second user. In these ways, the file (attachment) may be modified/accessed by the second user on a network location using an online application. In another embodiment, the file may be stored in a common network space such that both the first and the second user may access the file. In this way, a working document may be maintained between a plurality of users.

As an option, the network location may be associated with a URL corresponding to the online application. For example, a server may host an online application in addition to providing space for file storage or a workspace. As another option, the network location of the user space for file storage may be separate from a network location of the online application.

Figure 51:
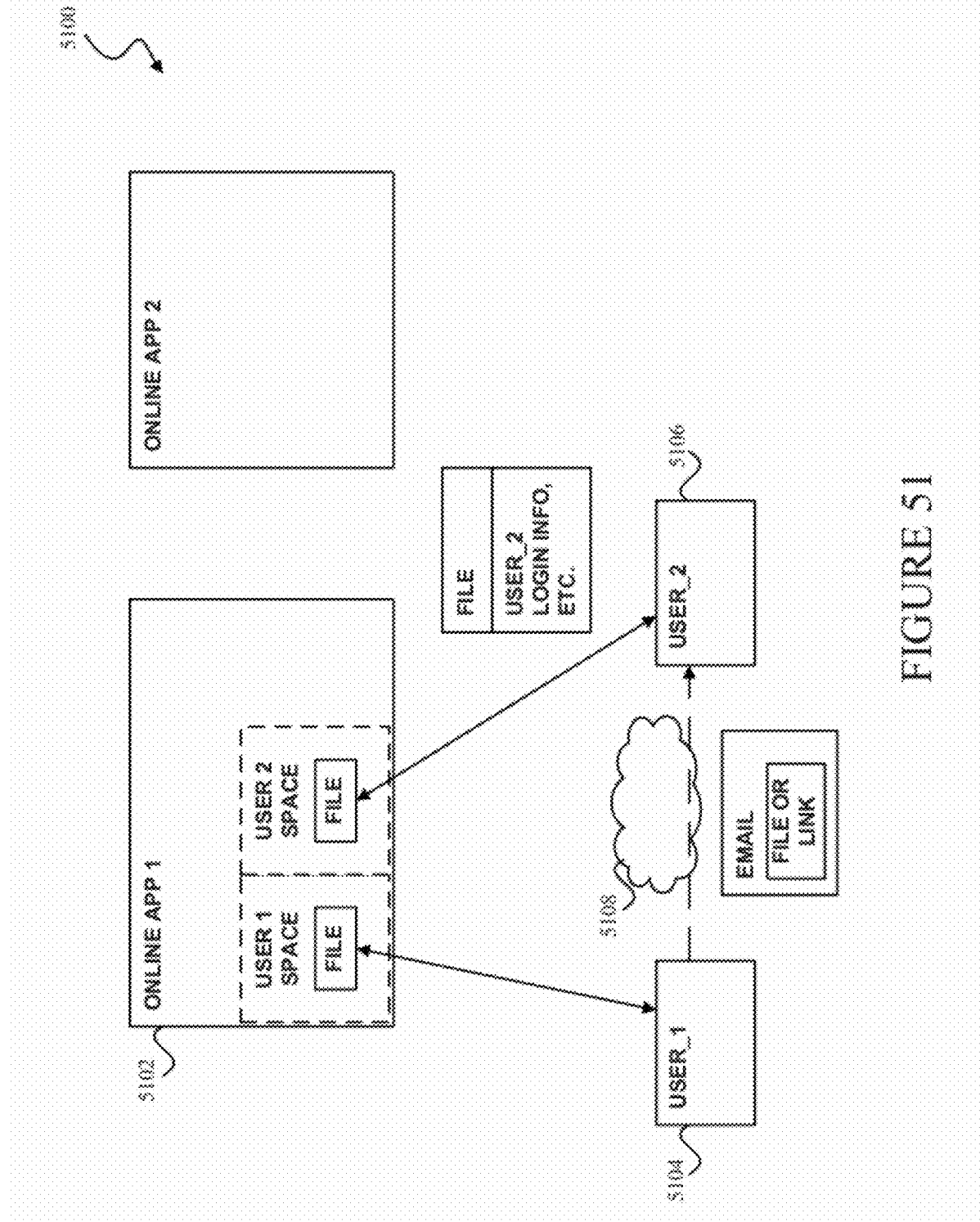
FIG. 51 shows a system for storing attachments of an electronic message in a central location associated with an online application from which the attachment was generated, in accordance with one embodiment.

FIG. 51 shows a system 5100 for storing attachments of an electronic message in a central location associated with an online application from which the attachment was generated, in accordance with one embodiment. As an option, the system 5100 may be implemented in the context of the details of FIGS. 35-50. Of course, however, the system 5100 may be implemented in any desired environment. It should also be noted that the aforementioned definitions may apply during the present description.

As shown, a plurality of online application are located one or more network locations 5102. As shown further, a device 5104 of a first user has access to at least one of the network locations 5102. Additionally, a device 5106 of a second user has access to at least one of the network locations 5102.

In use, the first user and/or the second user may each have access to allocated network space on a database or server at the network location 5102. The users may access online applications associated with the network locations, given the users have proper permission which may be obtained using appropriate login information. The users may access these online applications to create, modify, manage, and store files located at the network locations.

In one embodiment, the first and the second user may each have access to a separate network space such that files of the two users are isolated from other users. In another embodiment, a shared or common space may also be utilized. In still another embodiment, the file may be stored in a location only accessible to a recipient of the electronic message.

In one case, the first user may desire to send a file to the second user. As an option, the first user may configure an email and send the file as an attachment. As another option, the first user may send a link to the file in an email.

When the second user receives the email with the attachment, the second user may choose to open or save the attached file. When the user selects one of these options, an online application for facilitating such operations is determined. Additionally, the file is stored in one of the network locations 5102, based on the determined online application. For example, as shown the file generated by the first user using the first online application may be associated with the first online application by the device 5106 of the second user. Thus, the file may be saved in a network location associated with the first online application.

In one embodiment, the device 5106 of the second user may be used to determine the appropriate online application and the store the file. In this case, the device 5106 maybe any device capable of performing these functions (e.g. a stationary device, a mobile device, etc.). As an option, the file may be saved by selecting the electronic message and further selecting a save menu option.

In one embodiment, a request may be received to open the attached file. In this case, the online application associated with the file may be determined in response to the request. Once the online application is determined and user login information is verified, the file may be opened using the online application. In one embodiment, this may include opening the file utilizing a network browser window.

Figure 52:
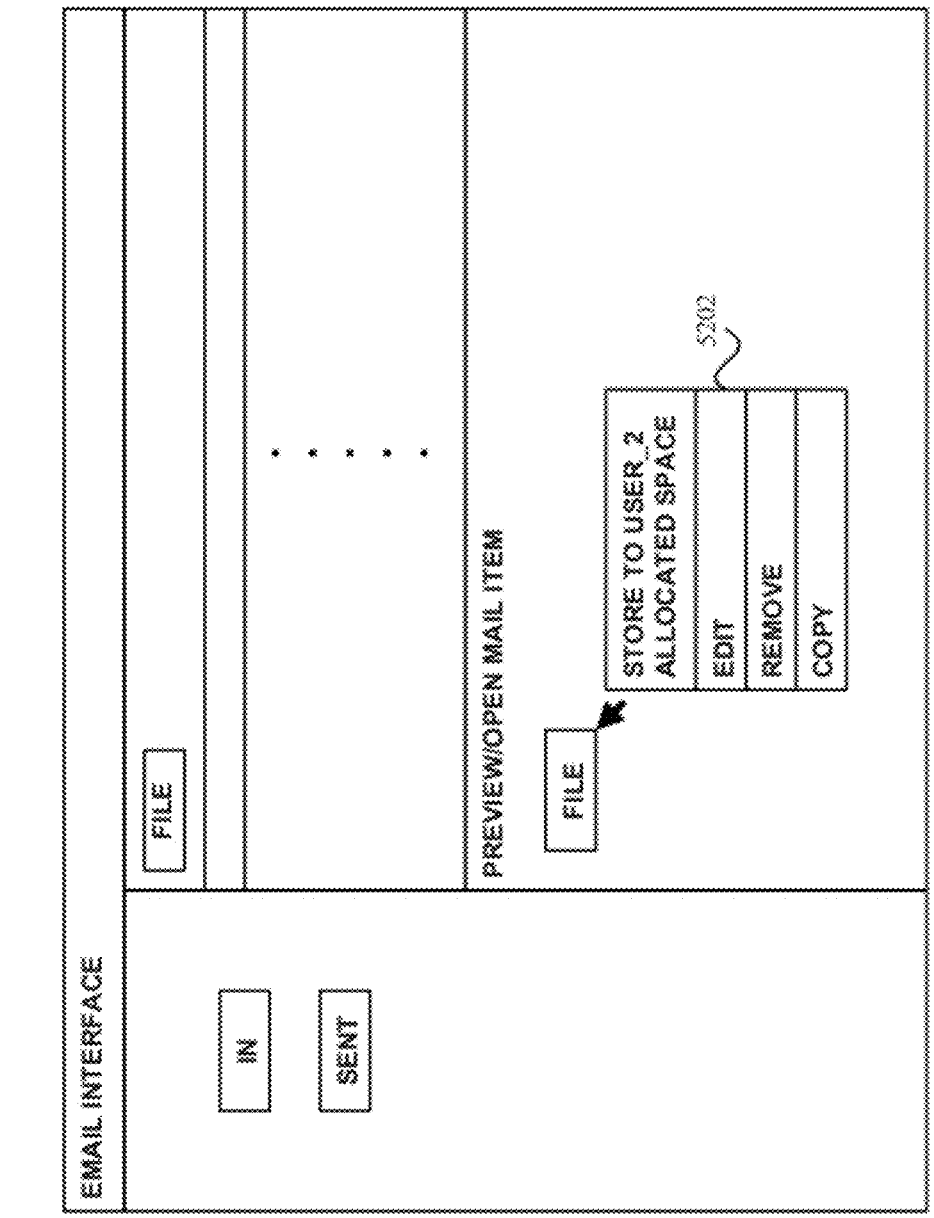
FIG. 52 shows an interface for an electronic message application for identifying a file associated with an electronic message, in accordance with one embodiment.

FIG. 52 shows an interface 5200 for an electronic message application for identifying a file associated with an electronic message, in accordance with one embodiment. As an option, the interface 5200 may be implemented in the context of the details of FIGS. 35-51. Of course, however, the interface 5200 may be implemented in any desired environment. It should also be noted that the aforementioned definitions may apply during the present description.

As shown, a menu 5202 may allow a user to select a plurality of options when a message has been received with an attachment including a file. In this case, the file may or may not have being generated using an online application. For example, the menu may include options to store the file to a network space allocated to the user, edit, remove, or copy the file. In one embodiment, the user may have the option to share the file.

Once the user makes a selection, the file may be stored on a network space which includes a plurality of other files. As an option, the user may have the ability to view all of these files using a single interface. This may allow the user to view a file structure or tags associated with all of the user's files stored on the network location.

Figure 53:
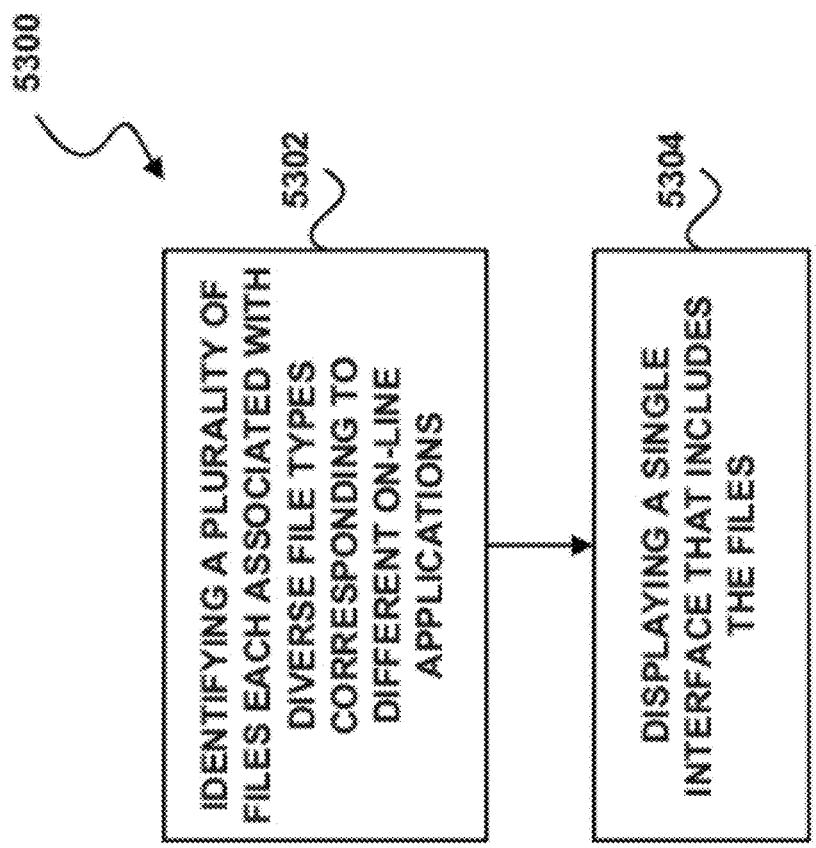
FIG. 53 shows a method for displaying a single interface that includes a plurality of files, in accordance with one embodiment.

FIG. 53 shows a method 5300 for displaying a single interface that includes a plurality of files, in accordance with one embodiment. As an option, the present method 5300 may be implemented in the context of the functionality and architecture of FIGS. 35-52. Of course, however, the method 5300 may be carried out in any desired environment. It should also be noted that the aforementioned definitions may apply during the present description.

As shown, a plurality of files are identified, each associated with diverse file types corresponding to different online applications. See operation 5302. In various embodiments, the file types may include, but are not limited to, a word processor file type, a text editor file type, a PDF file type, a drawing file type, a spreadsheet file type, a presentation file type, and/or any other file type corresponding to an online application.

Further, a single interface is displayed that includes the files. See operation 5304. As an option, the interface may be displayed using a network browser. As another option, the interface may be displayed on the device of a user. In this case, the device may include a mobile device (e.g. a phone, PDA, laptop, etc.), a computer, or any other device capable of displaying a network browser.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 54:
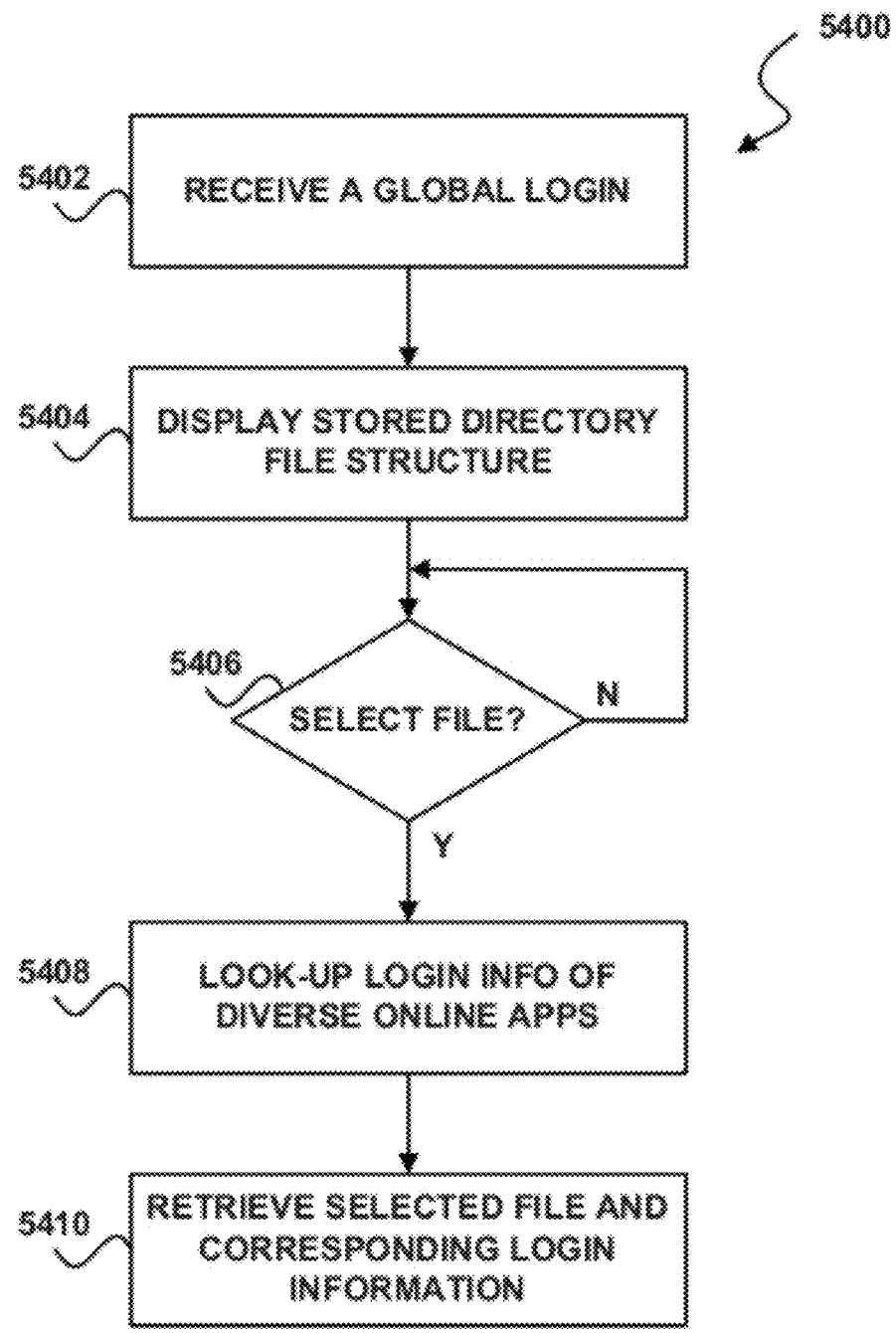
FIG. 54 shows a method for displaying a single interface that includes a plurality of files, in accordance with another embodiment.

FIG. 54 shows a method 5400 for displaying a single interface that includes a plurality of files, in accordance with another embodiment. As an option, the present method 5400 may be implemented in the context of the functionality and architecture of FIGS. 35-53. Of course, however, the method 5400 may be carried out in any desired environment. It should also be noted that the aforementioned definitions may apply during the present description.

As shown, a global login is received. See operation 5402. Once the global login is received, a file directory of stored files is displayed. See operation 5404. This file directory may be displayed in a variety of ways using a single interface.

For example, the interface may be displayed utilizing a network browser and or a network browser plug-in. In this case, identifiers associated with the files may be stored on a device on which the network browser is installed. In one embodiment, the file identifies may include tags, as described above.

In another embodiment, the identifiers associated with the files may be stored on a server. In this case, the server may be a server associated with the single interface. This server may also be associated with one or more online applications. The identifiers associated may be displayed in various ways. For example, the identifiers associated with the files may be displayed utilizing HTML. In another embodiment, the identifiers associated with the files may be displayed utilizing a JAVA script, icons, etc.

As an option, a network browser plugin may include the global login information. In this way, the global login information may be automatically obtained when accessing the single interface through a network browser associated with the network plugin. In this case, the network browser, plugin, and login information may be stored on a device of a user.

As an option, the log-in information may be capable of being entered when registering an associated one of the online applications in association with the network browser. For example, a user may access an online application for a first time using a network browser and enter registration information. As part of the registration process the user may enter login information which may saved on a device of the user. Thus, this information may be utilized each time the user accesses the interface online. As an option, the user may choose to enter login information each time the user accesses the single interface online (e.g. for security purposes, etc.)

Using the single interface, a user may view a plurality of files generated using various applications, with some of the applications being online applications. In some cases, each of the online applications may have different log-in information associated therewith. In these cases, the log-in information may be stored in and associated with a network browser or a network browser plugin. Furthermore, the log-in information may be utilized to access the interface, the files, and/or identifiers associated with the files.

With further reference to FIG. 54, once the files are displayed using the single online interface, it is determined whether a file is selected. See operation 5406. In this case, a file being selected may include selecting the file directly via a network browser displaying the single interface, of by selecting a tag associated with the file.

If a file is selected (e.g. to be accessed, saved, etc.), login information for an online application associated with that file is identified. See operation 5408. For example, user may select a file to open that is associated with an online word processor application. User login information would then be identified for the online application, either automatically (e.g. using information stored on the user device, etc.) or manually, by prompting the user to enter login information.

Once the login information has been determined, the selected file is retrieved using the corresponding login information. See operation 5410. In this case, the selected file may be retrieved from a network location of the online application associated with the file, a network location associated with the single online interface, a network location associated with a user space (e.g. individual, shared, work, etc.), and or any other network location associated with the file.

Figure 55:
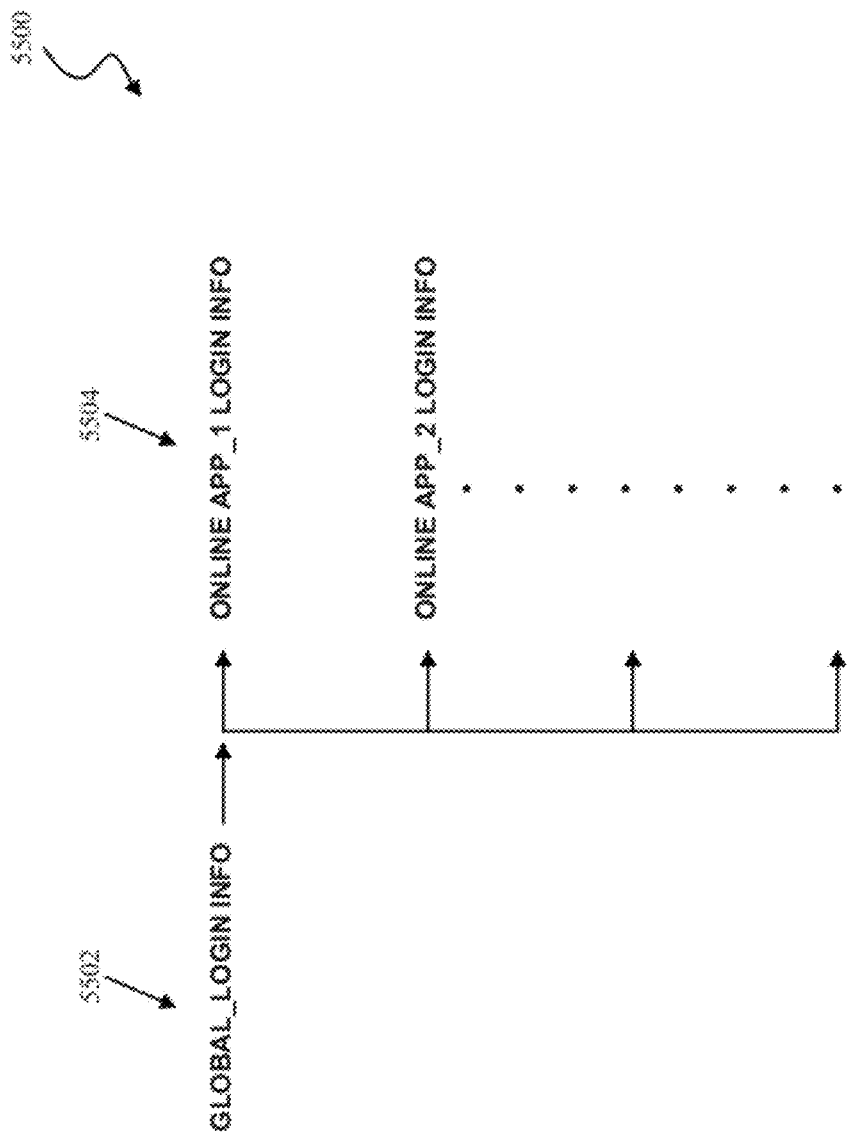
FIG. 55 shows a data structure of global login information for a single interface that includes a plurality of files associated with a plurality of different online applications, in accordance with one embodiment.

FIG. 55 shows a data structure 5500 of global login information for a single interface that includes a plurality of files associated with a plurality of different online applications, in accordance with one embodiment. As an option, the data structure 5500 may be implemented in the context of the functionality and architecture of FIGS. 35-54. Of course, however, the data structure 5500 may be implemented in any desired environment. It should also be noted that the aforementioned definitions may apply during the present description.

As shown, global login information 5502 may include login information for a plurality of different online applications 5504. In use, a user may access an interface for displaying a plurality of files each associated with diverse file types corresponding to different online applications. Upon accessing the interface, or files displayed using the interface, the user may be prompted for global login information. As another option, global login information may be obtained automatically from information a device of the user or a server associated with the single interface, etc.

In one embodiment, the global login information 5500 may include a user name and password for accessing the single interface. Once the global login information is obtained, online application login information may be accessed and obtained automatically to allow the user to access all files displayed in the interface and all corresponding online applications, without entering login information for each online application.

Thus, the user may use one global login to the single interface to access a plurality of online applications. It should be noted that the login information for the plurality of online applications may be different for some or all of the applications. However, the global login information may allow access to all online application login information.

This may be accomplished in a variety of ways. For example, the login information for the online applications may be stored on the device of the user, a server associated with the single interface, a network location associated with the users, etc. Upon entering the global login information, the login information for the online applications associated with the user may be retrieved. In various embodiments, this may be facilitated utilizing a network browser, a network browser plugin, a JAVA script, etc.

Figure 56:
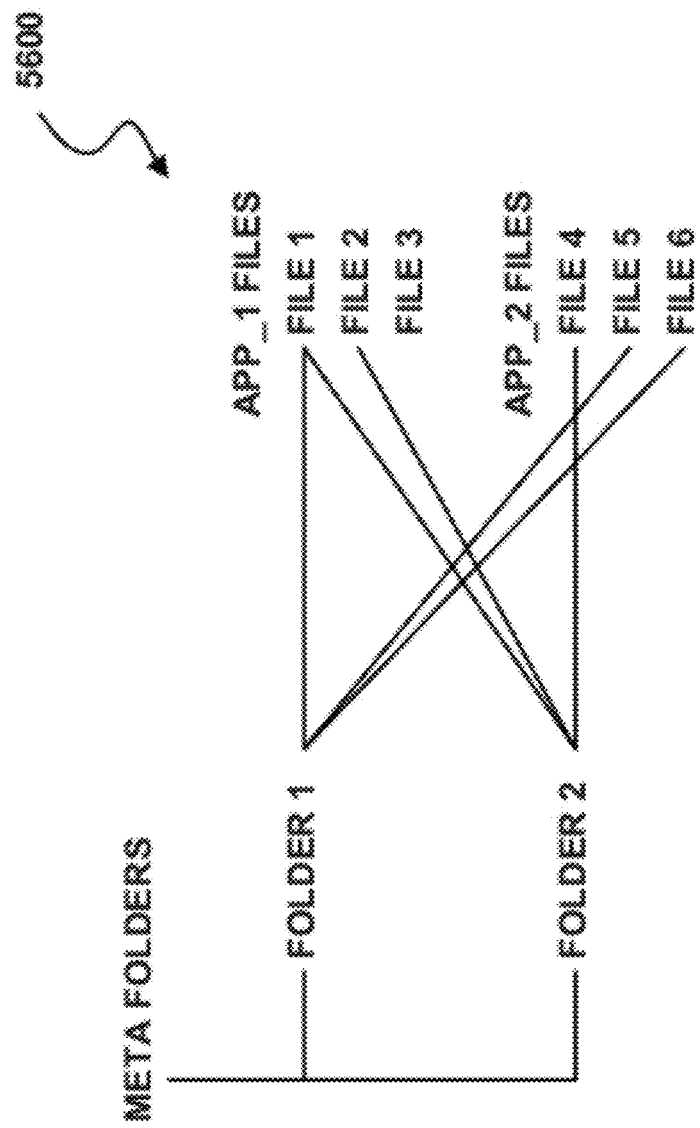
FIG. 56 shows a file structure shown in a single interface that includes a plurality of files associated with a plurality of different online applications, in accordance with one embodiment.

FIG. 56 shows a file structure 5600 shown in a single interface that includes a plurality of files associated with a plurality of different online applications, in accordance with one embodiment. As an option, the file structure 5600 may be implemented in the context of the functionality and architecture of FIGS. 35-55. Of course, however, the file structure 5600 may be implemented in any desired environment. It should also be noted that the aforementioned definitions may apply during the present description.

As shown, a single interface may include a plurality of folders for organizing a plurality of files associated with various online applications. Although, the single interface may display a standard file structure with directories, folders, sub folders, and files located, appearing to be located at a common network location, the folders, files, etc. may be located on a plurality of different servers and/or network locations.

For example, the files may be stored at different servers each associated with a different online application. However, the single interface may have the ability to show files and folders as appearing in a single folder or subset of folders. In other words, the network location of various files may be transparent to the user, where the single interface only shows groupings of files in folders/directories (e.g. using meta data, etc.).

In this way, a virtual desktop and file structure is presented to the user using the single interface. As an option, the files may also be stored on a device on which the interface is displayed. For example, a user may chose to save a copy of the files on a device such that the user may work locally with the file.

In this case, the files stored on the device and the files stored on the server may be synchronized. For example, the files on the device and the files stored on the server may be synchronized upon saving the file to the device. As another option, the files may be synchronized periodically, based on a established time (e.g. every 5, 10, 15 minutes, etc.). In this case, synchronizing the files stored on the device and the files stored on the server refers to maintaining common copies of the files stored on the device and the files stored on the server.

Figure 57:
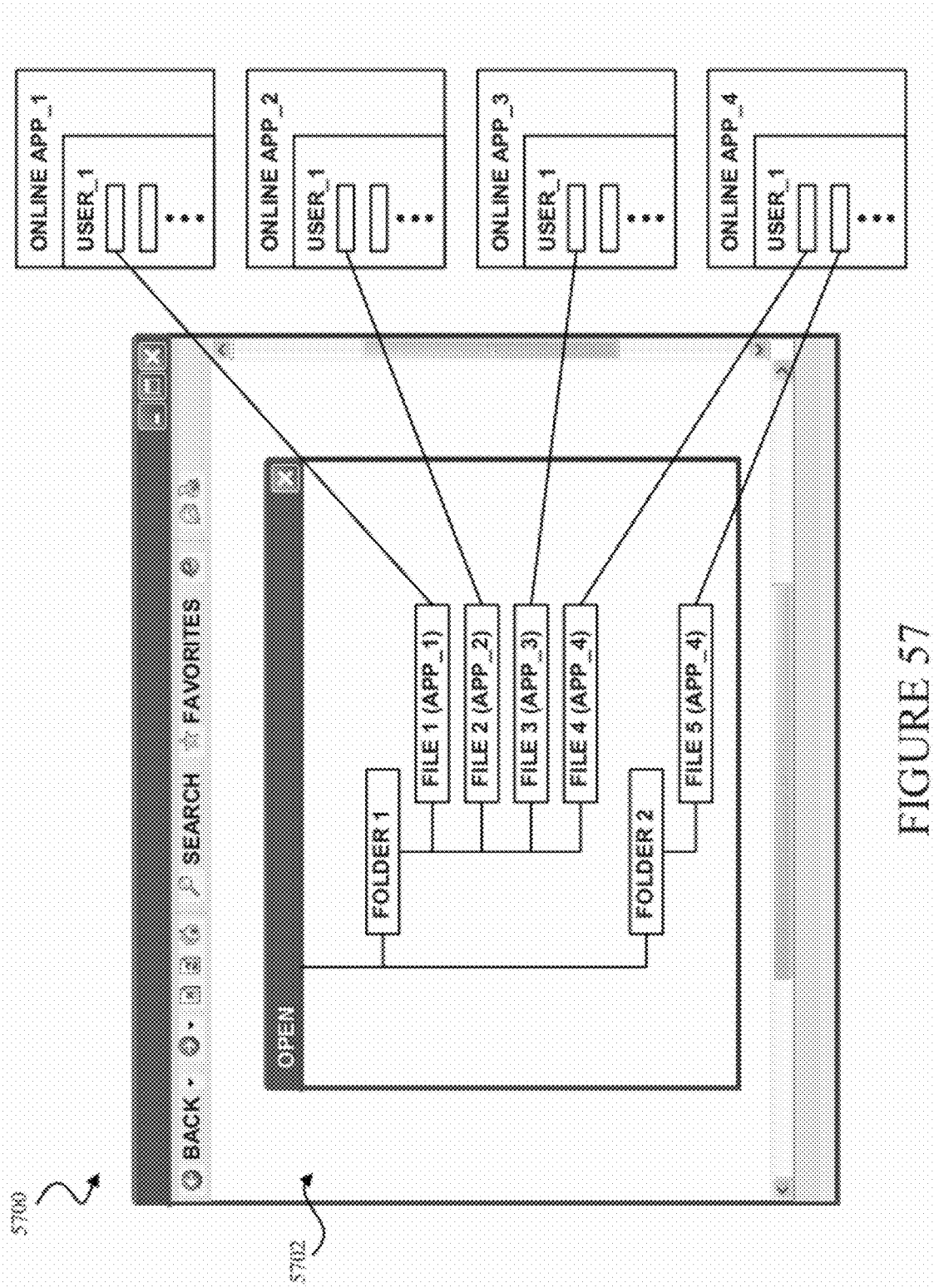
FIG. 57 shows a network browser for displaying a single interface that includes a plurality of files, in accordance with one embodiment.

FIG. 57 shows a network browser 5700 for displaying a single interface 5702 that includes a plurality of files, in accordance with one embodiment. As an option, the network browser 5700 may be implemented in the context of the details of FIGS. 35-56. Of course, however, the network browser 5700 may be implemented in any desired environment. It should also be noted that the aforementioned definitions may apply during the present description.

As shown, the single interface 5702 displays a plurality of files associated with different online applications. It should be noted that any folder displayed may include files associated with various online applications located at various network locations/servers. Furthermore, each of these online applications may require unique user login information. As noted above, one global login may be utilized to satisfy all login requirements, in accordance with one embodiment.

In addition to the illustrated functionality, the network browser 5700 and/or the interface 5702 may include functionality for searching for files/folders associated with the file structure illustrated in the interface 5700. In this way, a search may be conducted with respect to the files, utilizing the interface. In one embodiment, the files may be indexed to facilitate the search with respect to the files.

For example, in one embodiment, tags may be utilized to index the files. In another embodiment, the files may be indexed by modification time/date, alphabetically, by size, network location, file type, content type, and any other suitable criteria. As an option, the searching may include searching files associated with the interface on network locations and/or the device of the user.

Figure 58:
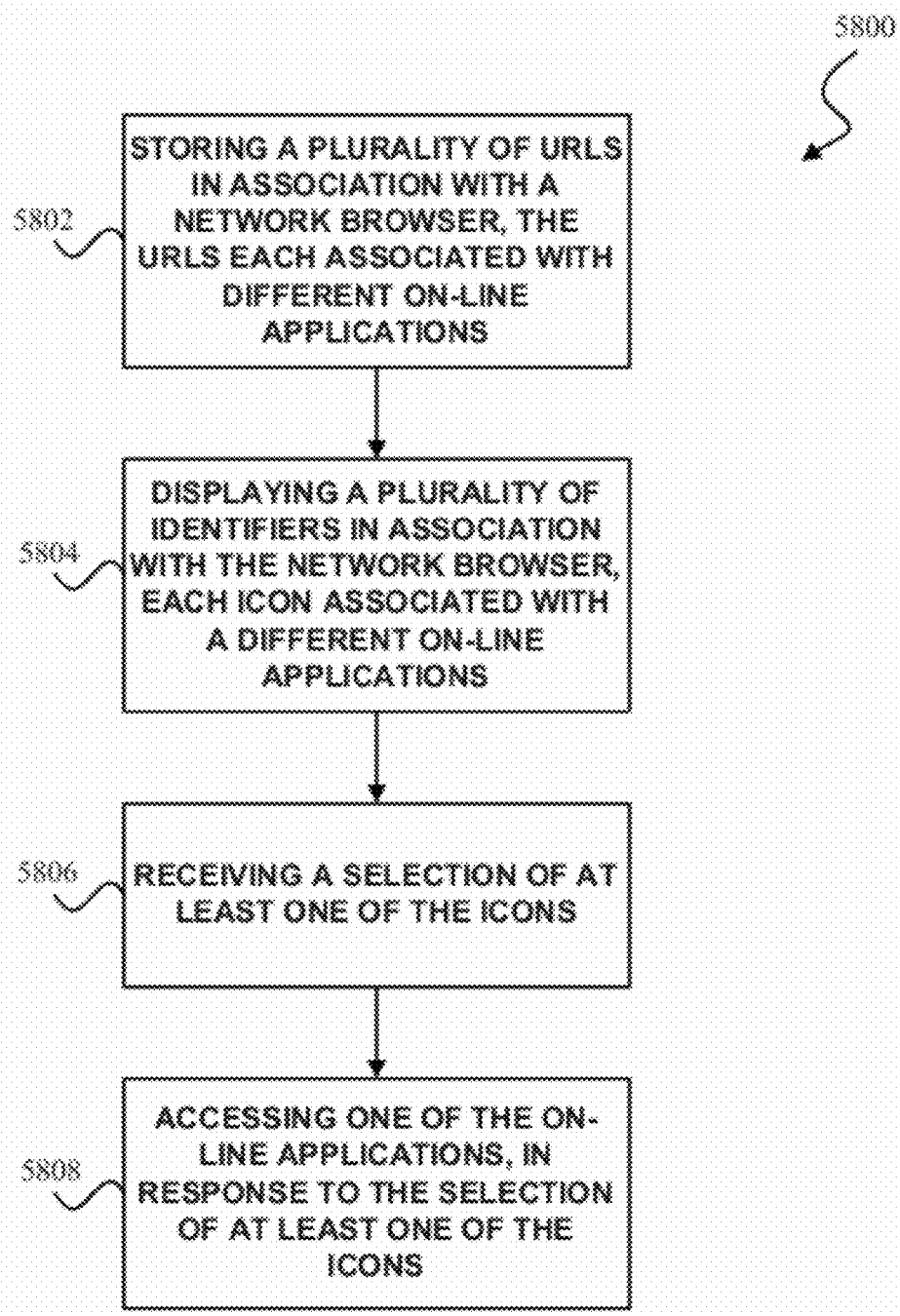
FIG. 58 shows a method for utilizing a network browser as a desktop, in accordance with one embodiment.

FIG. 58 shows a method 5800 for utilizing a network browser as a desktop, in accordance with one embodiment. As an option, the present method 5800 may be implemented in the context of the functionality and architecture of FIGS. 35-57. Of course, however, the method 5800 may be carried out in any desired environment. It should also be noted that the aforementioned definitions may apply during the present description.

As shown, a plurality of URLs in association with a network browser are stored, the URLs each associated with different online applications. See operation 5802. Additionally, a plurality of identifiers in association with the network browser are displayed, each identifier associated with a different online applications. See operation 5804.

In the context of the present description, an identifier refers to any character or number, series of characters or numbers, word, phrase, or object used for identification. For example, in various embodiments, the identifier may include, but is not limited to, icons, key words, pictures, links, and/or any other identifier that meets the above definition.

Further, a selection of at least one of the identifiers is displayed. See operation 5806. Still yet, one of the online applications is accessed, in response to the selection of at least one of the identifiers. See operation 5808.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 59:
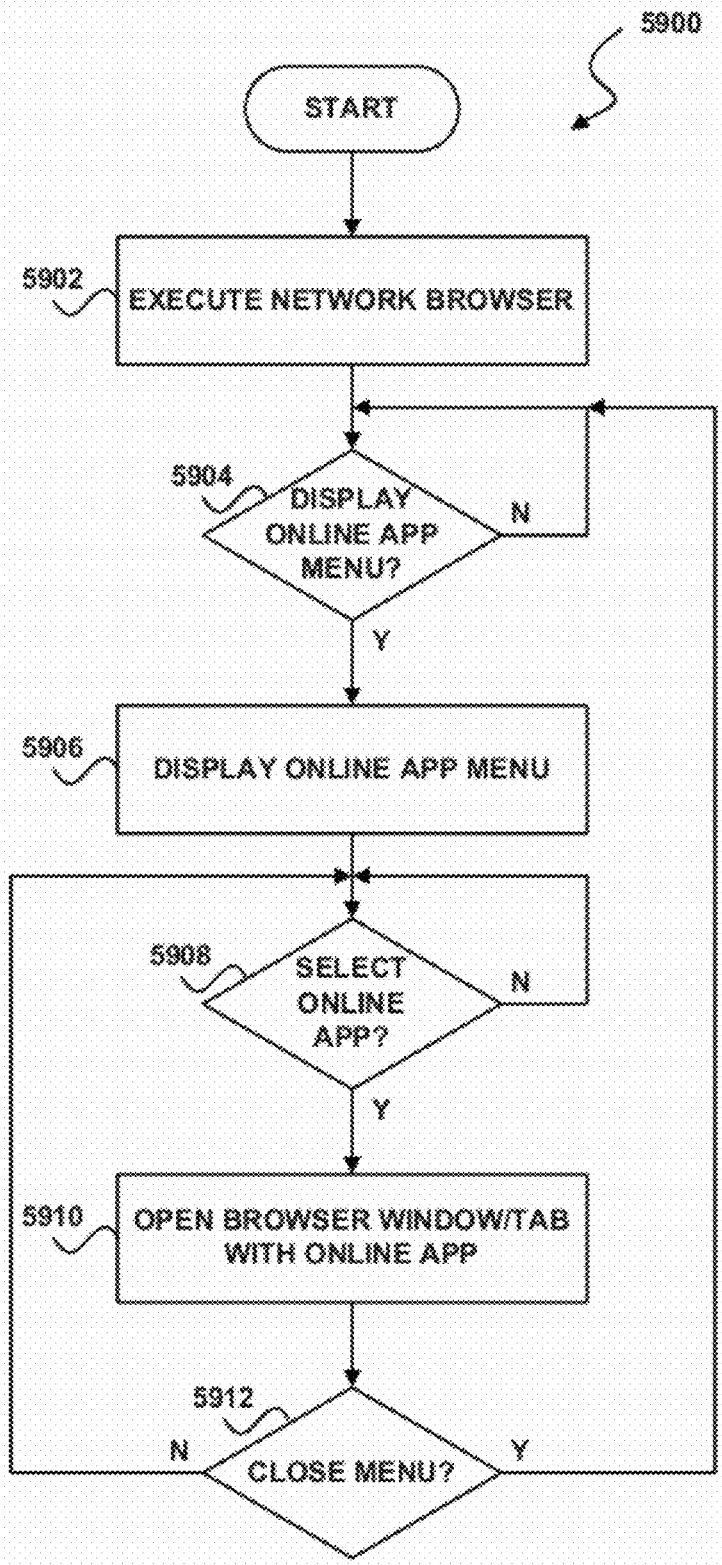
FIG. 59 shows a method for utilizing a network browser as a desktop, in accordance with another embodiment.

FIG. 59 shows a method 5900 for utilizing a network browser as a desktop, in accordance with another embodiment. As an option, the present method 5900 may be implemented in the context of the functionality and architecture of FIGS. 35-58. Of course, however, the method 5900 may be carried out in any desired environment. It should also be noted that the aforementioned definitions may apply during the present description.

As shown, a network browser is executed. See operation 5902. For example, the network browser may be opened by a user on a user device. Once the network browser is executed, it is determined whether an online application menu is to be displayed. See operation 5904. For example, in one embodiment, the user may select an option to display online applications. In another embodiment, the online application menu may be displayed automatically. In this case, an online application menu refers to a menu or list including available online applications.

If it is determined that the online application menu is to be displayed, the menu is displayed. See operation 5906. In various embodiments, the menu may be displayed as a list, window, toolbar, tabbed screens, group of identifiers, etc.

It is then determined whether an online application has been selected. See operation 5908. If an online application has been selected, a network browser window and/or browser window tab is opened with the online application. See operation 5910. In one embodiment, this may include accessing user login information for the online application. Additionally, upon displaying the network browser in operation 5902, a user may also be prompted for global login information, which allows access to the online application menu.

This global login information may also be utilized to automatically obtain login information for the online applications automatically such that one global login allows the user access to all available online applications without requiring the user to enter login information for each of the applications. This information may be stored on a device of the user, a server which includes the online application menu, and/or another network location. As shown further, it may also be determined whether the menu has been closed or remained open for the selection of other online applications. See operation 5912.

Figure 60:
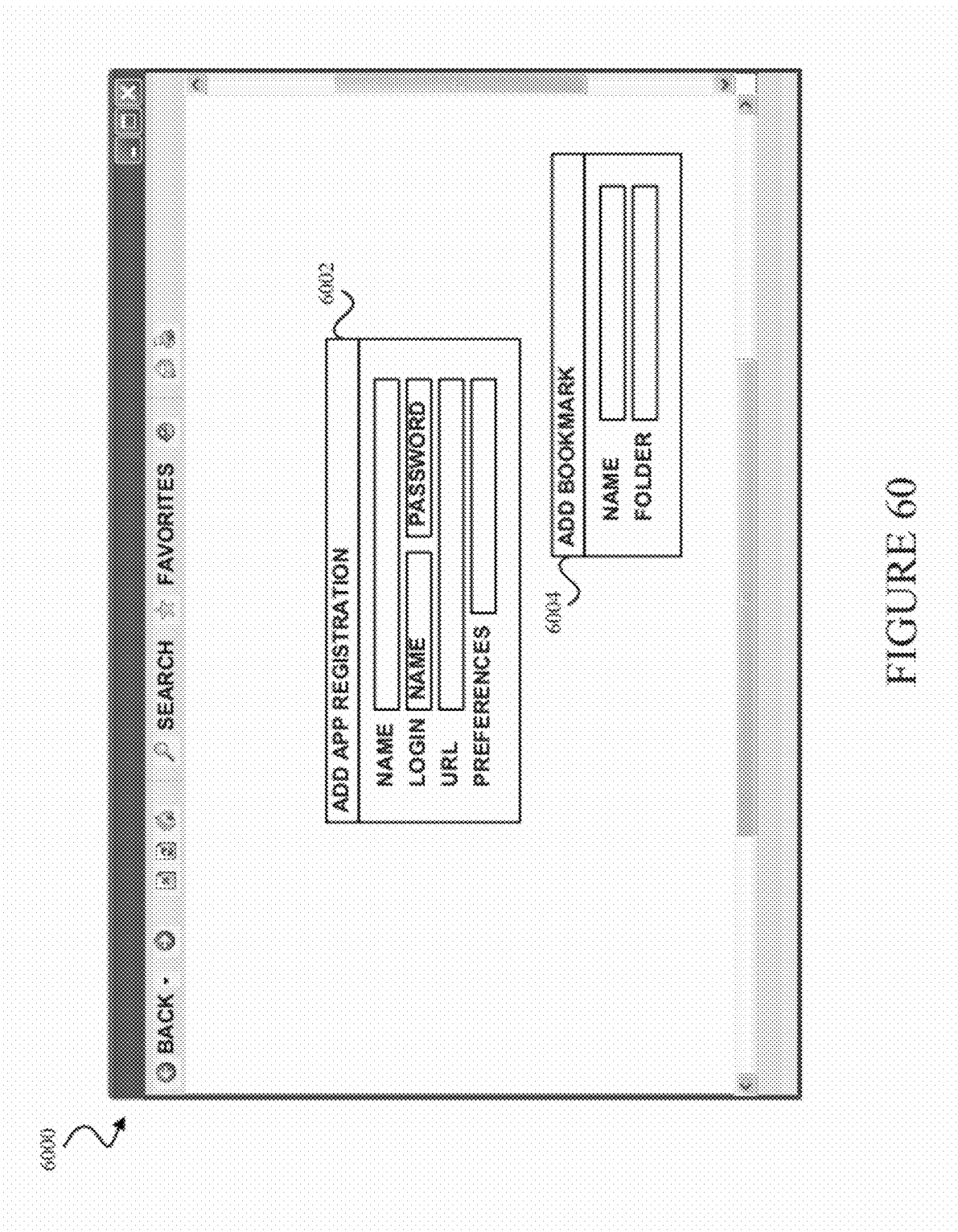
FIG. 60 shows a network browser for using as a desktop, in accordance with another embodiment.

FIG. 60 shows a network browser 6000 for using as a desktop, in accordance with another embodiment. As an option, the network browser 6000 may be implemented in the context of the functionality and architecture of FIGS. 35-59. Of course, however, network browser 6000 may be implemented in any desired environment. It should also be noted that the aforementioned definitions may apply during the present description.

As shown, upon executing the network browser 6000 to be used as a desktop, a user may be prompted to supply registration information 6002 for online applications that may be utilized in conjunction with the desktop environment. In this way, the user may configure and personalize an online desktop environment. Upon registration, entering the online application login information, and the URL associated with the online application, an identifier may be identified corresponding to the online application.

In one embodiment, the identifier may be selected by the user. In another embodiment, the identifier may automatically be selected (e.g. by the online application, a provider of the online desktop, etc.). Furthermore, in one case, the user may have the option to link or display an identifier associated with the online application. For example, the user may have the option to add a bookmark 6004 including a link to the online application. In another embodiment, the user may have the option to add the identifier to a desktop image. In this way, the user may be presented with a configurable online desktop including identifiers corresponding to various online applications, either shown on the desktop, or provided in a menu or list format.

Figure 61:
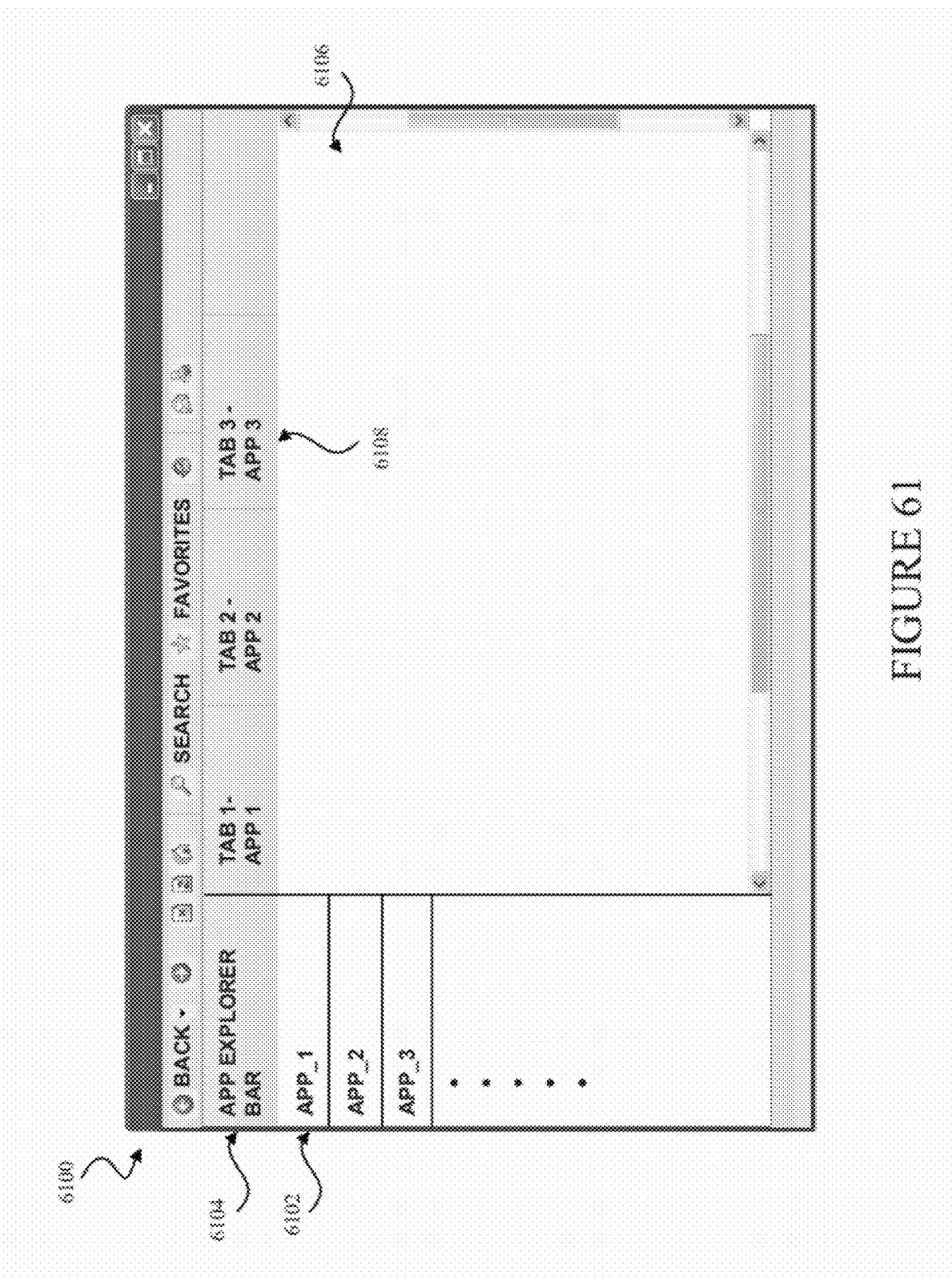
FIG. 61 shows a network browser for using as a desktop, in accordance with another embodiment.

FIG. 61 shows a network browser 6100 for using as a desktop, in accordance with another embodiment. As an option, the network browser 6100 may be implemented in the context of the functionality and architecture of FIGS. 35-60. Of course, however, network browser 6100 may be implemented in any desired environment. It should also be noted that the aforementioned definitions may apply during the present description.

In operation, a plurality of URLs in association with the network browser 6100 are stored, the URLs each associated with different online applications. In one embodiment, the URLs may include online application URLs. In this case, a plurality of bookmark URLs in association with the network browser may be stored, the bookmark URLs each associated with different web pages of interest.

Further, a plurality of identifiers 6102 in association with the network browser 6100 are displayed, each identifier associated with a different online applications. Using the identifiers 6102 one of the online applications may be accessed, in response to a selection of at least one of the identifiers 6102.

As shown, the identifiers 6102 may be displayed utilizing an explorer bar 6104 to a side of a network browser window 6106 in which HTML content is displayed. In another embodiment, the identifiers may be displayed utilizing a tool bar 6108 above the network browser window 6106 in which HTML content is displayed.

As an option, the identifiers 6102 may be accessible via at least one network browser menu. In this way, the identifiers 6102 may be accessible when the network browser menu is selected.

As noted above, accessing online applications and/or information associated with the online applications may include entering or obtaining user login information. In one embodiment, each of the URLs may have login information associated therewith. In this case, the log-in information may be stored in and/or associated with the network browser 6100 and/or a device displaying the network browser 6100.

In this way, the log-in information may be utilized to access the online application, in response to the selection of at least one of the identifiers 6102. As noted above, in one embodiment, the log-in information may be capable of being entered when registering an associated one of the online applications in association with the network browser.

As an option, the online applications may be opened in a separate new browser tab, in response to the selection of at least one of the identifiers 6102. For example, multiple tabs may appear across the top on the window 6106, each tab corresponding to a different online application. In another embodiment, the online applications may be opened in a separate new browser window, in response to the selection of at least one of the identifiers 6102. In this case, the new browser window may be included as a window within the network browser window 6106 or outside the network browser window 6106.

In one embodiment, the identifiers 6102 may be displayed as computer icons, where computer icons refer to any pictogram. As an option, the identifiers 6102 may be user configurable. For example, the appearance of die identifiers may be configurable. Additionally, a location of display of the identifies may be configurable. For example, a user may have the ability to move the identifiers to various locations in the window 6106.

Furthermore, the user may have the option to add/remove identifiers. Still yet, the configuration of the online desktop may be saved and stored on a user device and/or a network location. For example, an image on the configuration may be saved on a server hosting the online desktop. This may be accomplished by storing various data/metadata associated with the configuration.

In various embodiments, the network browser 6100 may include various other functionality. For example, in one embodiment, the network browser 6100 may display advertisements associated in conjunction with displaying online applications.

Figure 62:
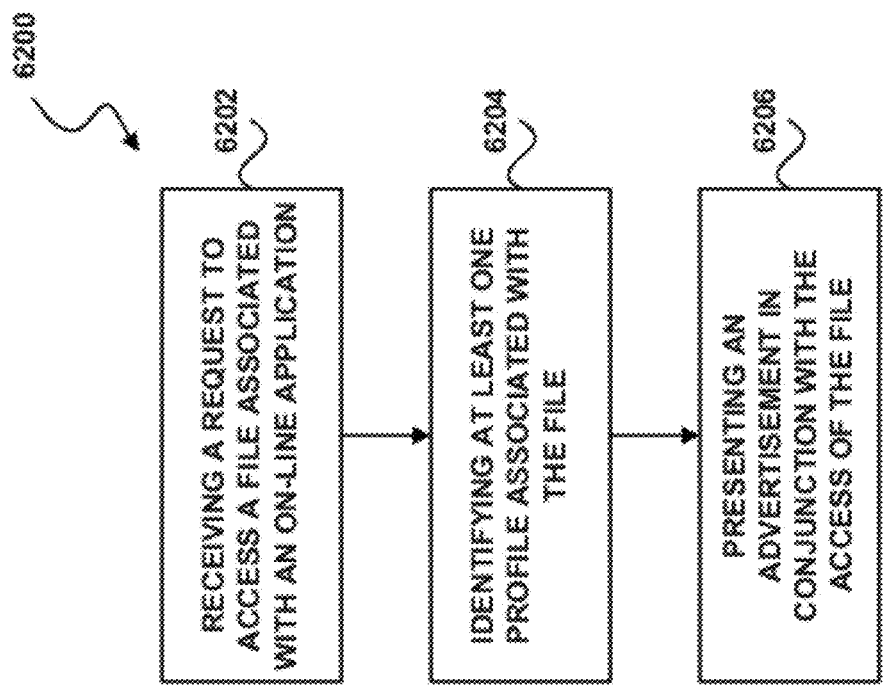
FIG. 62 shows a method of advertising in conjunction with online applications, in accordance with one embodiment.

FIG. 62 shows a method 6200 of advertising in conjunction with online applications, in accordance with one embodiment. As an option, the present method 6200 may be implemented in the context of the functionality and architecture of FIGS. 35-61. Of course, however, the method 6200 may be carried out in any desired environment. It should also be noted that the aforementioned definitions may apply during the present description.

As shown, a request to access a file associated with an online application is received. See operation 6202. Additionally, at least one profile associated with the file is identified. See operation 6204.

In the context of the present description, a profile refers to any information about an object. For example, in various embodiments, the profile may include, but is not limited to, a user profile of a user who initiated the request to access the file, a file profile associated with the file, a combination of a user and file profile, and/or any other profile that meets the above definition. In one case, the file profile may a function of a plurality of tags associated with the file. For example, tags associated with the file may include key words that may be attributed to a profile.

Further, an advertisement is presented in conjunction with the access of the file. See operation 6206. In the context of the present description, the term advertisement may refer to a survey, questionnaire, promotional content, product/service information, and/or anything that is designed to attract attention. In one embodiment, the advertisement may include a digital advertisement.

Further, the advertisement may be presented in a variety of ways. In various embodiments, the advertisement may be presented on a computer, television, PDA, mobile phone, and/or any other mobile or stationary device capable of presenting advertisements. In such embodiments, the advertisement may be presented using web pages, television programs, movies, on-demand programming, audible media, and/or any other media capable of presenting advertisements. Of course, the foregoing examples are set forth for illustrative purposes only and should not be construed as limiting in any manner.

Figure 63:
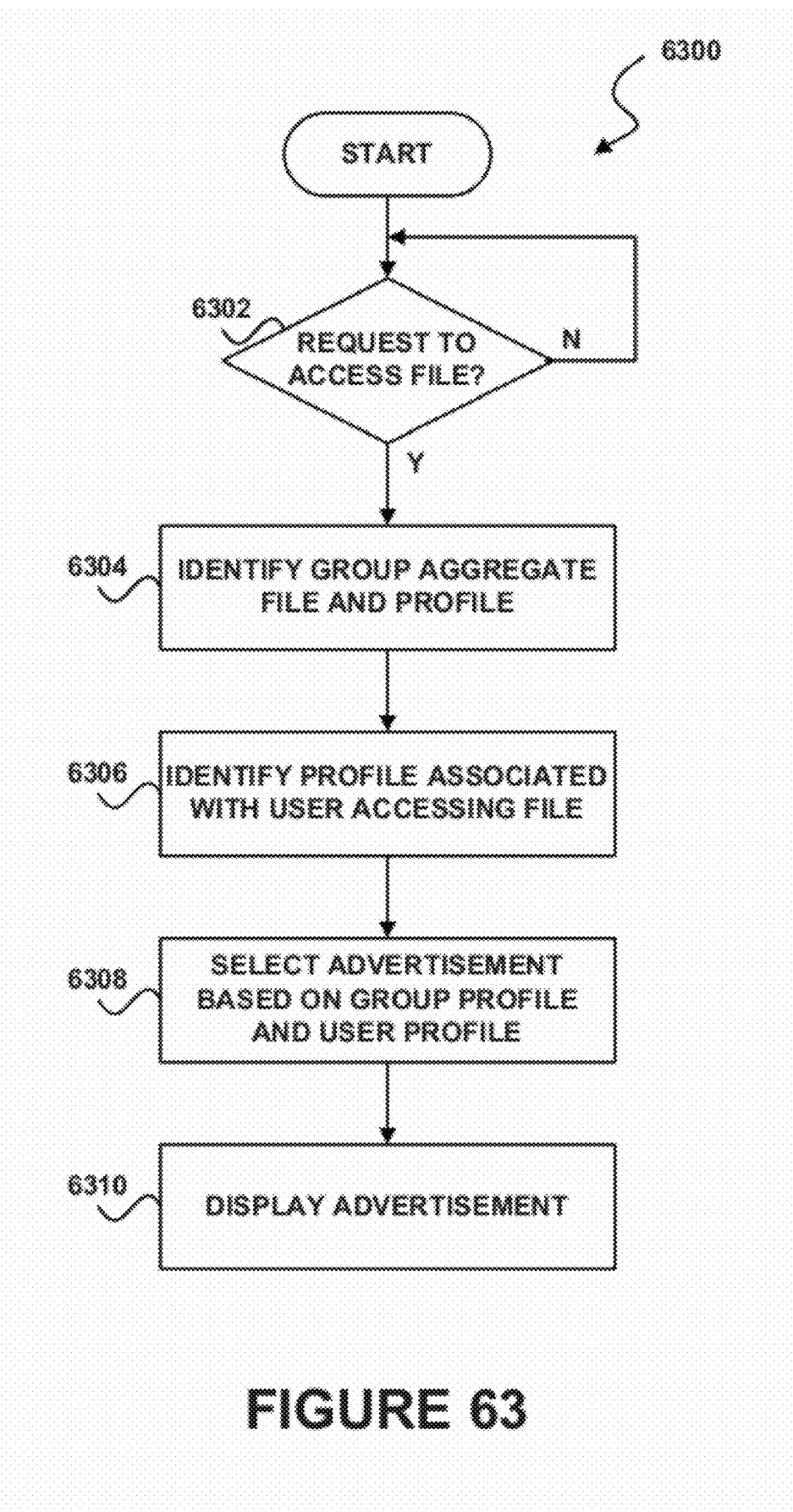
FIG. 63 shows a method of advertising in conjunction with online applications, in accordance with one embodiment.

FIG. 63 shows a method 6300 of advertising in conjunction with online applications, in accordance with one embodiment. As an option, the present method 6300 may be implemented in the context of the functionality and architecture of FIGS. 35-62. Of course, however, the method 6300 may be carried out in any desired environment. It should also be noted that the aforementioned definitions may apply during the present description.

As shown, it is determined whether a request to access a file is received. See operation 6302. If a request to access the file is received, a group profile is identified. See operation 6304. In this case, the group profile may include the profile of a user group associated with the file. For example, the file may be attributable to a group of engineers in a specific area of engineering. Thus, the group profile may be associated with the specific area of engineering.

In another case, the group profile may include a profile of a group of files associated with the user or the particular file being accessed. In this case, file tags, file types, and a number of files may contribute to the group profile.

Once a group profile is identified, a profile of a user accessing the file is identified. See operation 6306. For example, a profile of the user may have been determined when the user registered for an online application associated with the file. In this case, the user may have inputted preference information or the information may have been determined automatically based on user selections during the registration. Furthermore, the user may have inputted preference information or had preference information derived automatically after registration. Such preference information may have been derived based on internet browsing of the user, searches completed by the user, files generated by the user, file tags selected by the user, etc.

Once the profiles are identified, an advertisement is selected, based on the profiles, and then displayed. See operations 6308 and 6310. For example, the advertisement may be displayed in a window associated with a network browser corresponding to an online application. In another embodiment, the advertisement may be sent to a mobile device of the user. In still another embodiment, the advertisement information may be provided to an advertisement agency such that the agency may facilitate the advertising (e.g. via a network browser, on demand television, etc.). In this way, directed advertising may be implemented in conjunction with utilizing online applications.

Figure 64:
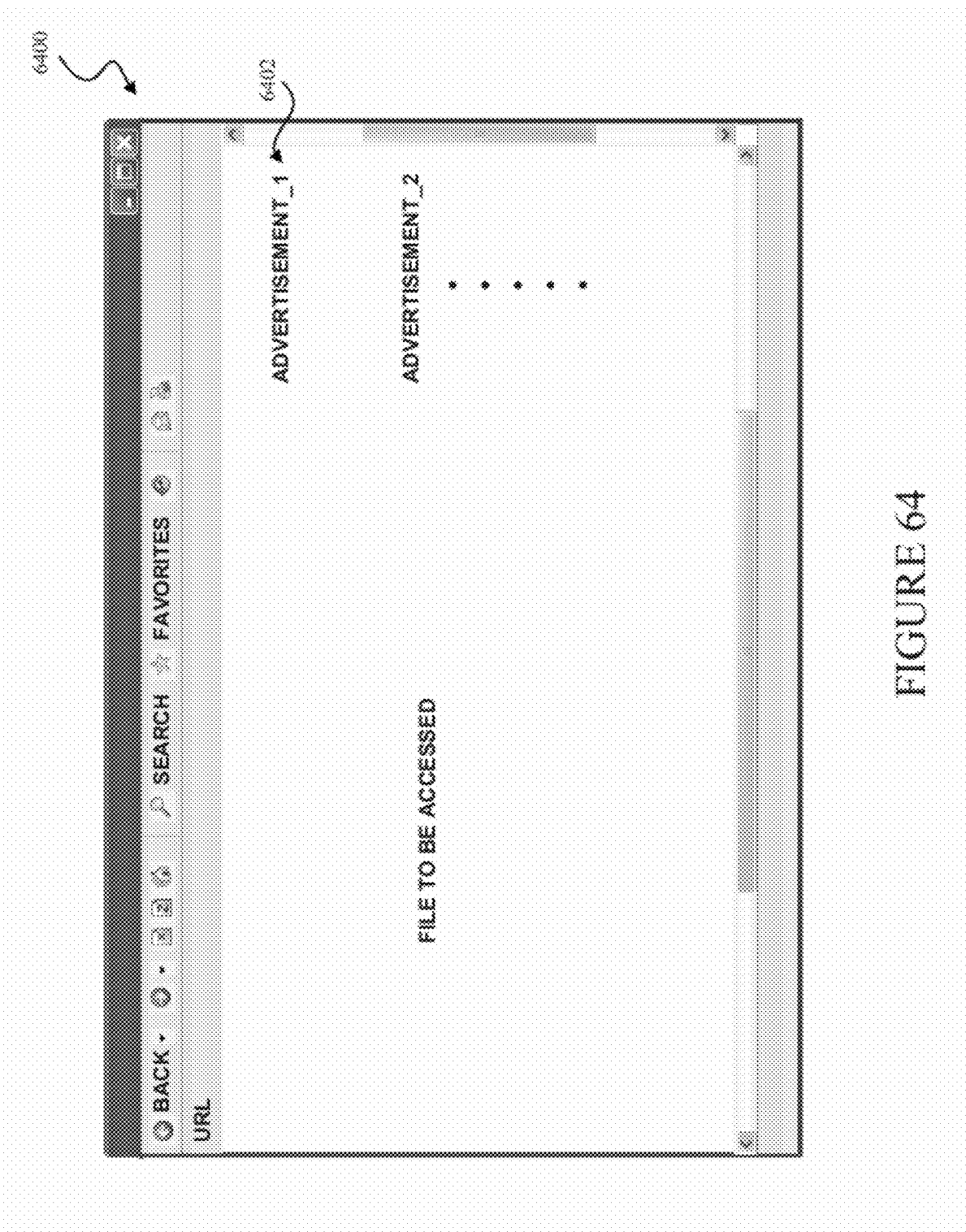
FIG. 64 shows a network browser for viewing advertisements in conjunction with files associated with online applications, in accordance with one embodiment.

FIG. 64 shows a network browser 6400 for viewing advertisements in conjunction with files associated with online applications, in accordance with one embodiment. As an option, the network browser 6400 may be implemented in the context of the functionality and architecture of FIGS. 35-63. Of course, however, the method 6400 may be carried out in any desired environment. It should also be noted that the aforementioned definitions may apply during the present description.

In operation, a request to access a file associated with an online application may be received by the network browser 6400. Additionally, at least one profile associated with the file may be identified. As mentioned above, in one embodiment, the profile may include a file profile associated with the file, where the file profile is a function of a plurality of tags associated with the file.

In this case, the tags may be manually entered or automatically determined. For example, the tags may be determined automatically by parsing words in the document. In another case, the tags may be manually entered using an interface including a folder directory. In one embodiment, the tags may be determined for a plurality of the files. The profile includes a group profile of a group of users who store a plurality of files to a network location.

As an option, the profile may include profile of a group of users who store a plurality of files to a network location. In this case, the profile may include a combination of a user profile and a group profile. In one case, the group profile may be a function of a plurality of tags associated with each of a plurality of the files.

Once the profile has been determined, an advertisement 6402 may be presented in conjunction the file, using the network browser 6400. In this case the advertisement may correspond to the profile (e.g. of the user, group, file, aggregate of multiple profiles, etc.). In addition to potentially displaying the advertisement, the network browser 6400 may display various other items. For example, in one embodiment, the network browser 6400 may include a search interface for performing a search in addition to a window illustrating search results.

Figure 65:
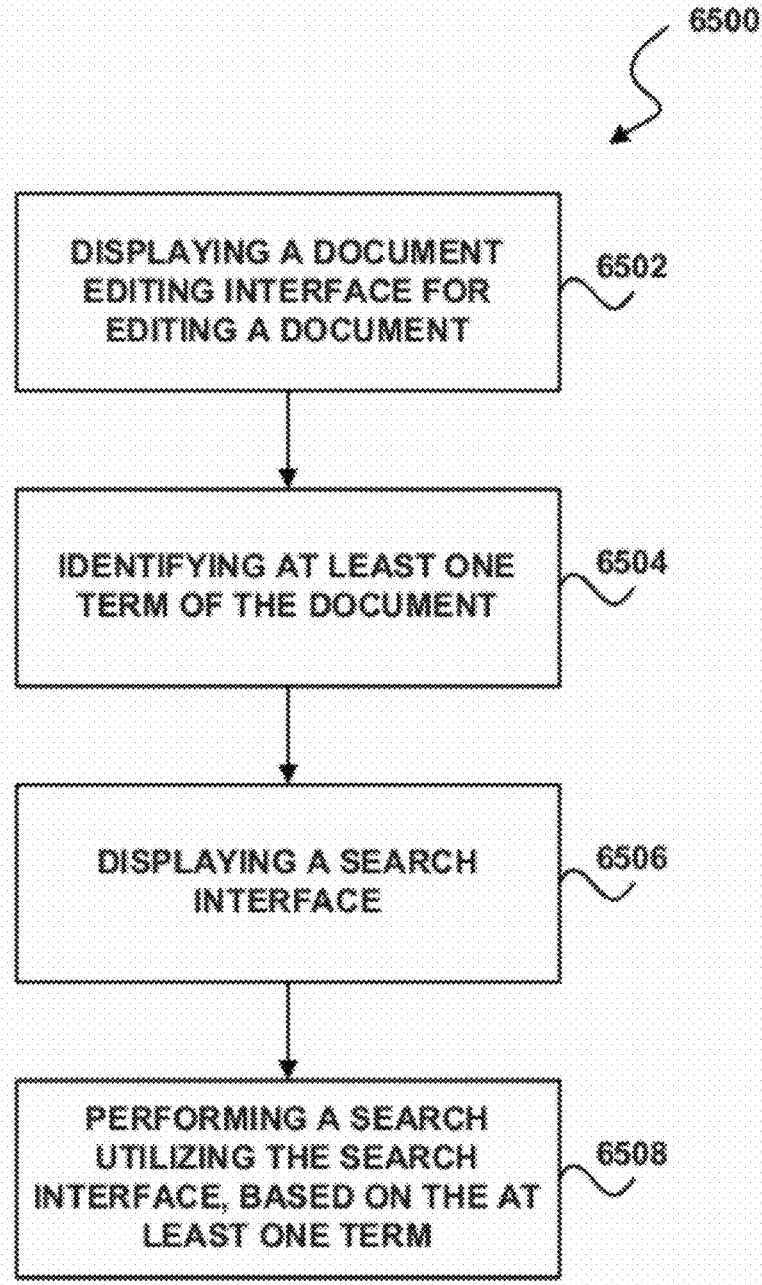
FIG. 65 shows a method for performing a search in conjunction with use of an online application, in accordance with one embodiment.

FIG. 65 shows a method 6500 for performing a search in conjunction with use of an online application, in accordance with one embodiment. As an option, the present method 6500 may be implemented in the context of the functionality and architecture of FIGS. 35-64. Of course, however, the method 6500 may be carried out in any desired environment. It should also be noted that the aforementioned definitions may apply during the present description.

In operation, a document editing interface is di splayed for editing a document. See operation 6502. Additionally, at least one term of the document is identified. See operation 6504.

In the context of the present description, a term refers to any character or number, or sequence of characters or numbers. For example, in various embodiments, term may include, but is not limited to, a key word, a phrase, a date, an amount, and/or any other term that meets the above definition.

Further, a search interface is displayed. See operation 6506. Still yet, a search is performed utilizing the search interface, based on the at least one term. See operation 6508.

Figure 66:
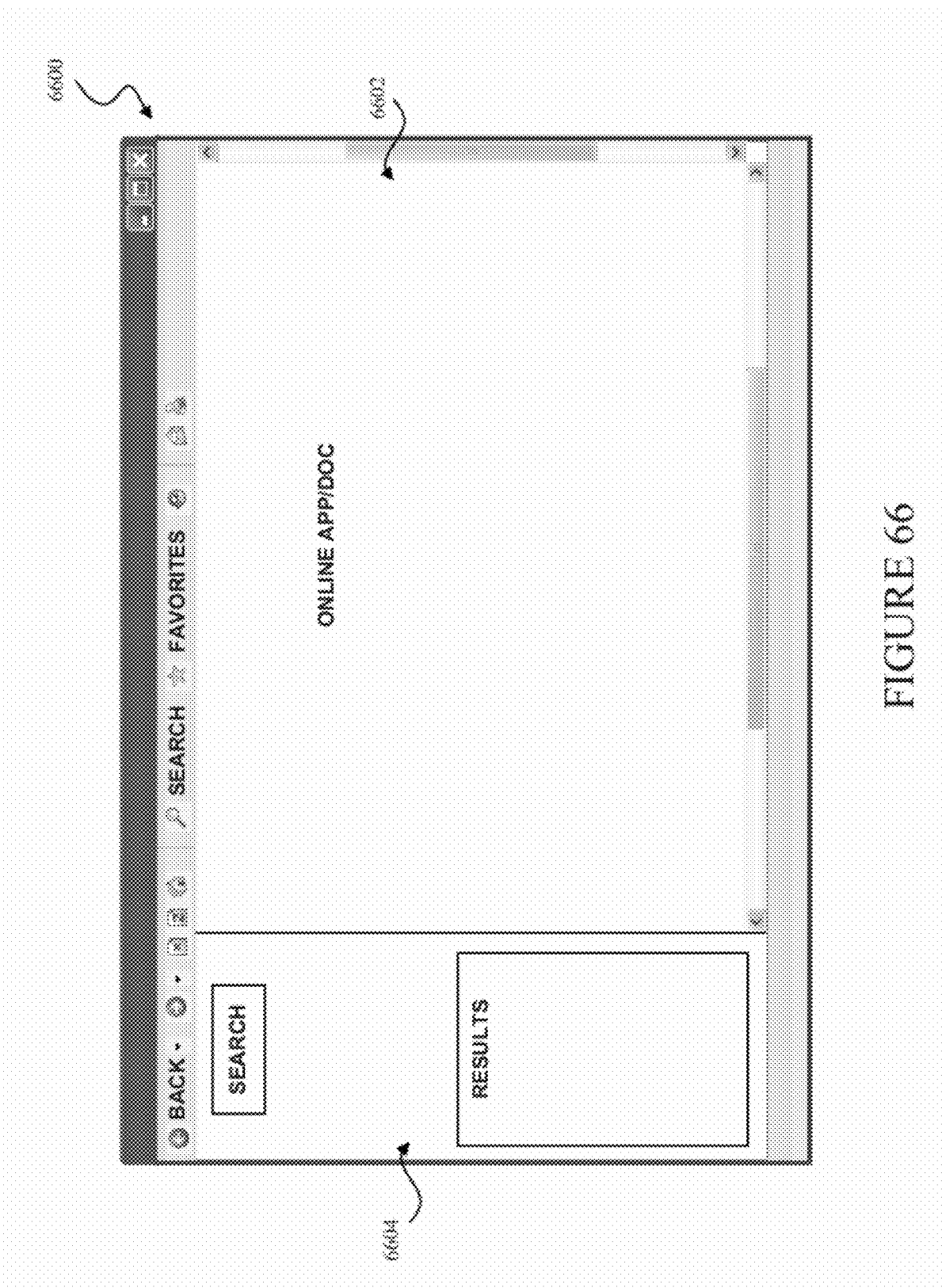
FIG. 66 shows an interface for performing a search in conjunction with use of an online application, in accordance with one embodiment.

FIG. 66 shows an interface 6600 for performing a search in conjunction with use of an online application, in accordance with one embodiment. As an option, the interface 6600 may be implemented in the context of the functionality and architecture of FIGS. 35-65. Of course, however, the interface 6600 may be implemented in any desired environment. It should also be noted that the aforementioned definitions may apply during the present description.

In operation, a document editing interface 6602 is displayed for editing a document. Additionally, at least one term of the document is identified. Further, a search interface 6604 is displayed. Still yet, a search is performed utilizing the search interface 6604, based on the at least one term. In various embodiments, may include a word processor document, a spreadsheet document, and/or a presentation document.

In one embodiment, the at least one term may be identified automatically. For example, the term may be identified by parsing words in the document. In this case, the parsing may include parsing nouns and/or verbs in the document. In one embodiment, the term may be identified by a frequency of use. In another embodiment, the term may be identified based on the same criteria used to automatically identify a tag for a document, as described above.

As an option, the at least one term may be identified manually. In this case, the term may be identified manually by highlighting the at least one term. In another embodiment, the term may be identified by typing the term in an interface search bar. As an option, the search may be performed by performing a right click operation.

As another option, a search term may be automatically suggested. In this case, a plurality of possible terms may be presented in a list. Thus, at least one of the terms in the list may be selected and searched. Further, this may be accomplished in conjunction with a manual or automatic search.

In one embodiment, the term may include includes a plurality of tags. In this case the tags may be determined automatically by parsing words in the document. In various embodiments, nouns, verbs, and/or repeated words in the document may be determined to be tags.

As shown further in FIG. 66, results of the search may be displayed simultaneously with the document. For example, the results may be positioned in a window associated with the interface 6600. In one embodiment, the results may be displayed in a separate window from the document or on a tabbed page of interface 6600.

In one case, the search results may include at least one additional document. In this case, the additional document may be associated with an online application corresponding to the document being displayed currently or another online application. Still yet, at least one additional term of the results may be identified (e.g. manually or automatically). Further, an additional search may be performed utilizing the search interface 6604, based on the at least one additional term. In this way, the search may be focused to better improve search results.

Figure 67:
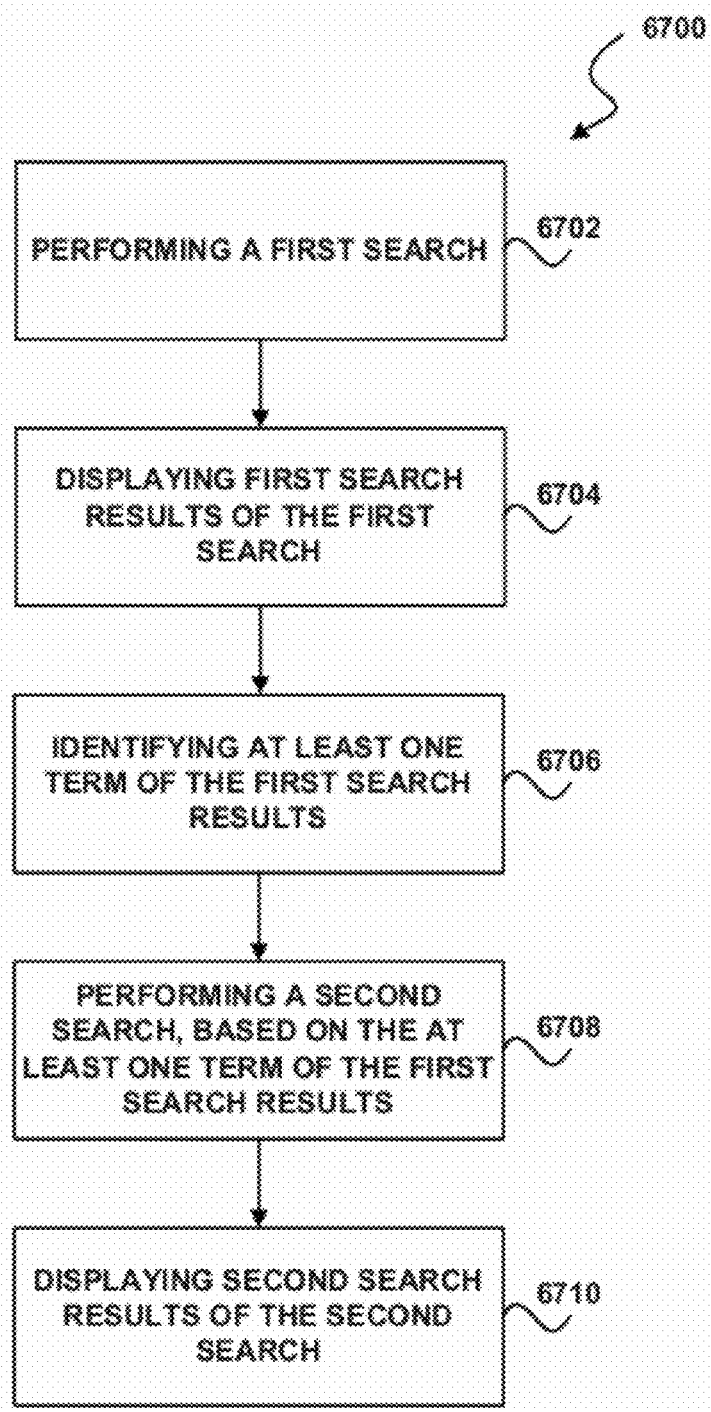
FIG. 67 shows a method for focusing a search, in accordance with one embodiment.

FIG. 67 shows a method 6700 for focusing a search, in accordance with one embodiment. As an option, the present method 6700 may be implemented in the context of the functionality and architecture of FIGS. 35-66. Of course, however, the method 6700 may be carried out in any desired environment. It should also be noted that the aforementioned definitions may apply during the present description.

As shown, a first search is performed. See operation 6702. Additionally, first search results of the first search are displayed. See operation 6704. Further, at least one term of the first search results is identified. See operation 6706.

Still yet, a second search is performed, based on the at least one term of the first search results. See operation 6708. In addition, second search results of the second search are displayed. See operation 6710.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 68:
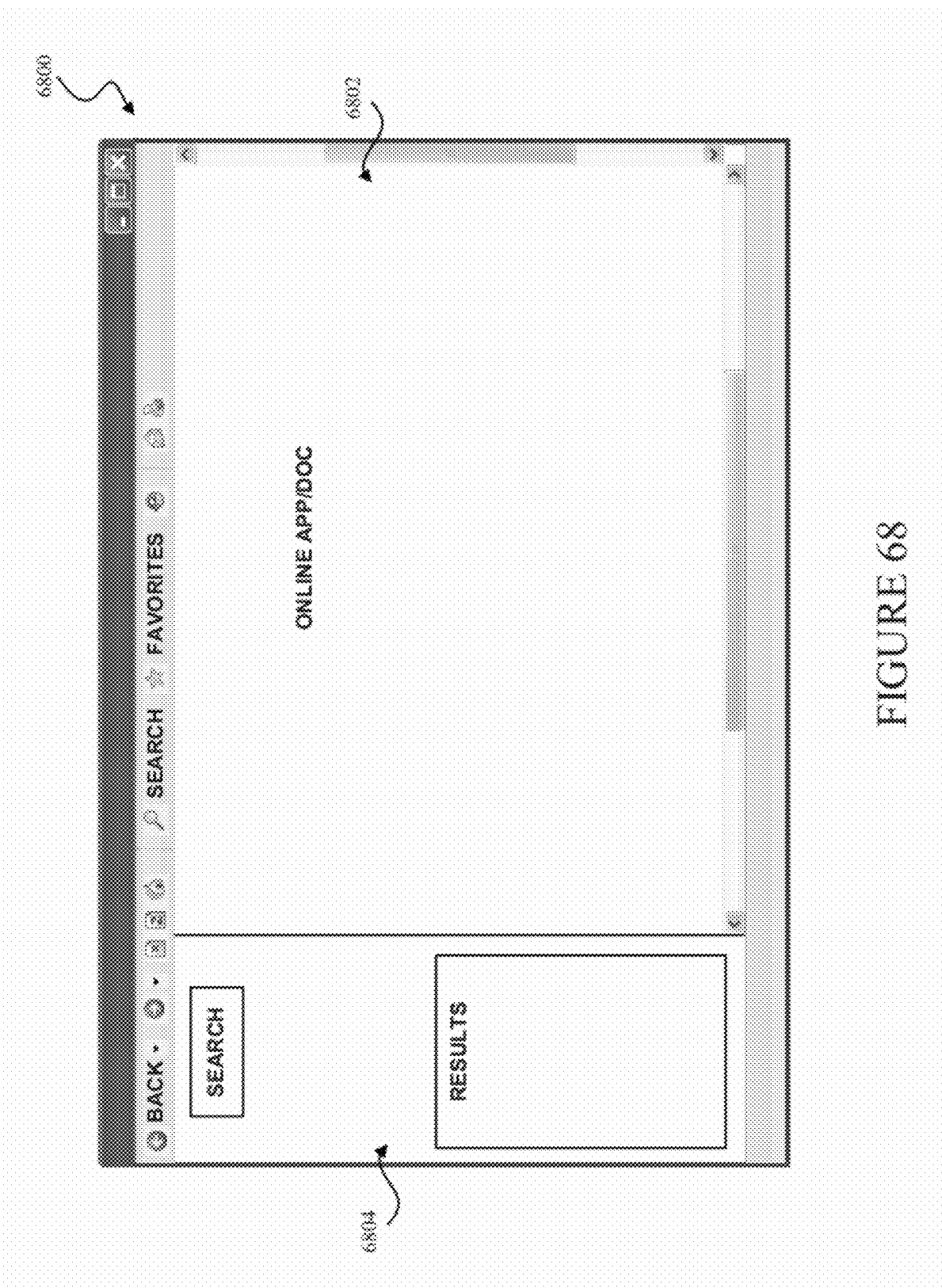
FIG. 68 shows an interface for focusing a search, in accordance with one embodiment.

FIG. 68 shows an interface 6800 for focusing a search, in accordance with one embodiment. As an option, the interface 6800 may be implemented in the context of the functionality and architecture of FIGS. 35-67. Of course, however, the interface 6800 may be implemented in any desired environment. It should also be noted that the aforementioned definitions may apply during the present description.

In operation, a first search is performed using a search interface 6804. Additionally, first search results of the first search are displayed. In one embodiment, the search results may be displayed in a search results window, in conjunction with displaying a document access by an online application.

Further, at least one term of the first search results is identified. A second search is then performed using the search interface 6804, based on the at least one term of the first search results. In addition, second search results of the second search are displayed (e.g. in a search results window).

As an option, the terms may be identified manually. In one case, term may be identified manually by highlighting the at least one term. In this case, the second search may performed by performing a right click operation.

As another option, the terms may be identified automatically. For example, the may be identified automatically by parsing the first search results. In one case, nouns in the first search results may be identified as the at least one term. Additionally, verbs in the first search results may be identified as the at least one term. Still yet, repeated words in the first search results may be identified as the at least one term.

Further, as an option, at least one term may ir elude a plurality of tags. As another option, the at least one term may be selected from a list of a plurality of suggested terms. In this case, the suggested terms may be generated automatically. Furthermore, in various embodiments, the suggested terms may be hierarchically ranked in order of a relevance value, a frequency of occurrence, alphabetically ranked, etc. As an additional option, the term may be selected by highlighting at least one of the suggested terms.

Furthermore, selecting the term may include selecting a term associated with a file corresponding to one or more online applications. In one case, exploration with this file may include opening or executing the online application. In various embodiments, this may be accomplished using any number of devices.

Figure 69:
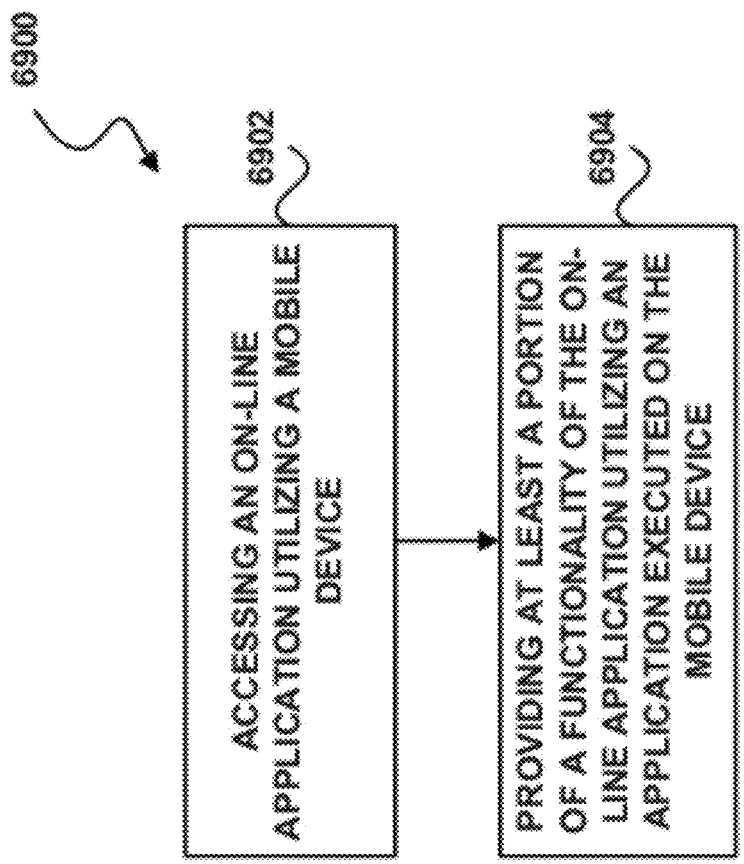
FIG. 69 shows a method for executing an online application on a mobile device, in accordance with one embodiment.

FIG. 69 shows a method 6900 for executing an online application on a mobile device, in accordance with one embodiment. As an option, the present method 6900 may be implemented in the context of the functionality and architecture of FIGS. 35-68. Of course, however, the method 6900 may be carried out in any desired environment. It should also be noted that the aforementioned definitions may apply during the present description.

As shown, an online application is accessed utilizing a mobile device. See operation 6902. Additionally, at least a portion of a functionality of the online application utilizing an application executed on the mobile device. See operation 6904.

In the context of the present description, a mobile device refers to any device which may be utilized in a mobile fashion. For example, in various embodiments, the mobile device may include, but is not limited to, a mobile phone, a PDA, a handheld computer, a laptop, and/or any other mobile device that meets the above definition.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 70:
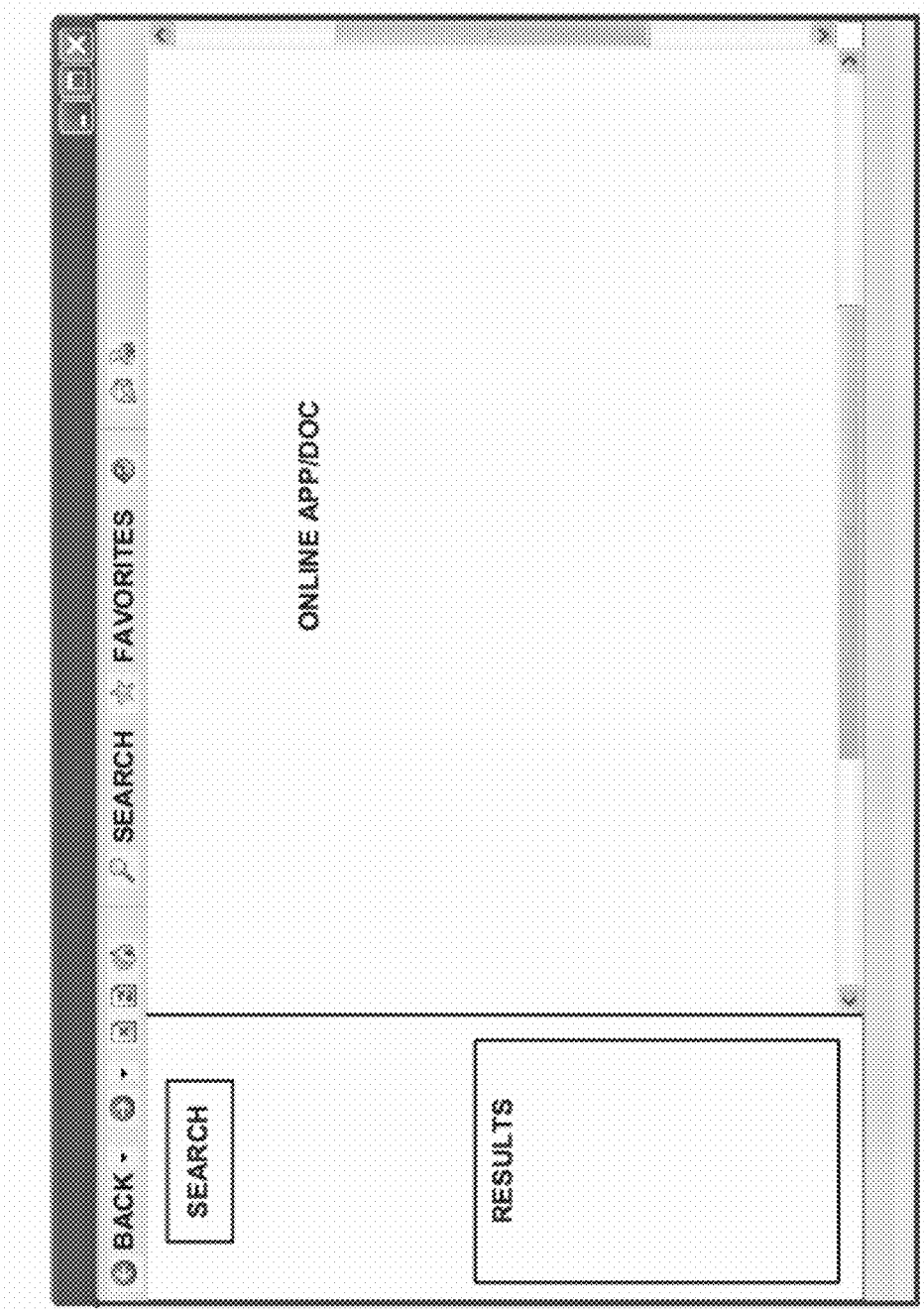
FIG. 70 shows an interface for executing an online application on a mobile device, in accordance with one embodiment.

FIG. 70 shows an interface 7000 for executing an online application on a mobile device, in accordance with one embodiment. As an option, the interface 7000 may be implemented in the context of the functionality and architecture of FIGS. 35-69. Of course, however, the interface 7000 may be implemented in any desired environment. It should also be noted that the aforementioned definitions may apply during the present description.

In operation, an online application is accessed utilizing a mobile device 102. Additionally, at least a portion of a functionality of the online application utilizing an application executed on the mobile device 102. In one embodiment, the functionality may be performed by a client application separate from a network browser. As an option, the portion of the functionality may be performed by a network browser plug-in installed on the mobile device 102.

The functionality of the online application may include any functionality capable of being executed on the mobile device 102. For example, the portion of the functionality of the online application may include formatting functionality (e.g. text formatting, paragraph formatting, etc.).

Further, in one case, the portion of the functionality may include functionality that would otherwise be provided by a server that serves the online application. For example, the portion of the functionality may include responding to requests that would otherwise be provided by a server that serves the online application. As another example, the portion of the functionality of the online application may be provided by buffering requests of a user, and delaying sending the requests to a server that serves the online application.

In one embodiment, an online application utilizing may be accessed utilizing the mobile device 102 and a request of a user to the online application may be buffered. Additionally, sending the requests to a server that serves the online application may be delayed. Still yet, a client application separate from the network browser may react to the request.

In this case, the reaction may be performed by a client application separate from the network browser. For example, in one case the reaction may be performed by a network browser plug-in installed on the mobile device 102. As an option, the reaction may simulate sending the request to a server that serves the online application.

It should be noted that all of the aforementioned functionality may be implemented on the mobile device 102. For example, the mobile device 102 may be utilized to perform searches. Furthermore, various other commands may be implemented using the mobile device 102 (e.g. cutting, pasting, etc.).

Figure 71:
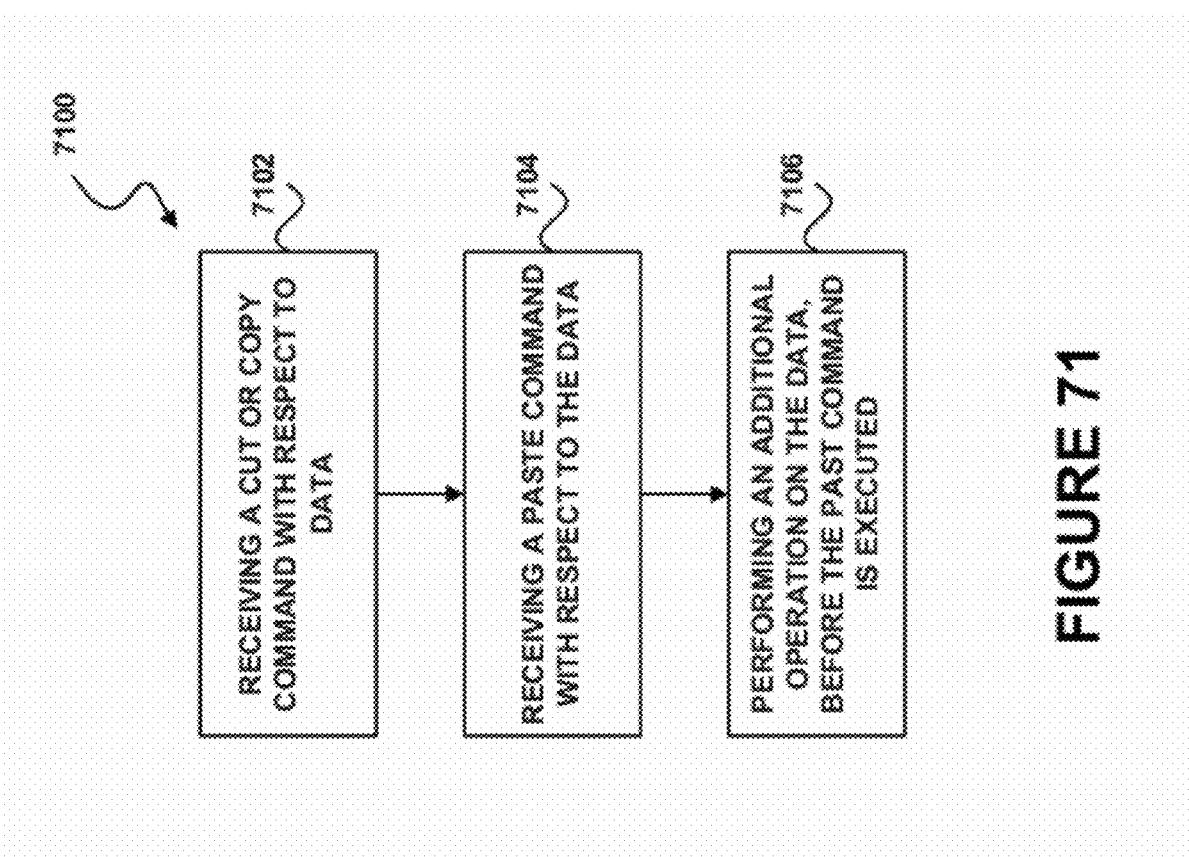
FIG. 71 shows a method for intelligent cutting and pasting, in accordance with one embodiment.

FIG. 71 shows a method 7100 for intelligent cutting and pasting, in accordance with one embodiment. As an option, the present method 7100 may be implemented in the context of the functionality and architecture of FIGS. 35-70. Of course, however, the method 7100 may be carried out in any desired environment. It should also be noted that the aforementioned definitions may apply during the present description.

As shown, a cut or copy command with respect to data is received. See operation 7102. In this case the data may be any data capable of being cut or copied. For example, in various embodiments, the data may include text, objects, symbols, pictures, and/or any other data as defined above.

Additionally, a paste command with respect to the data is received. See operation 7104. Further, an additional operation is performed on the data, before the past command is executed. See operation 7106.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 72:
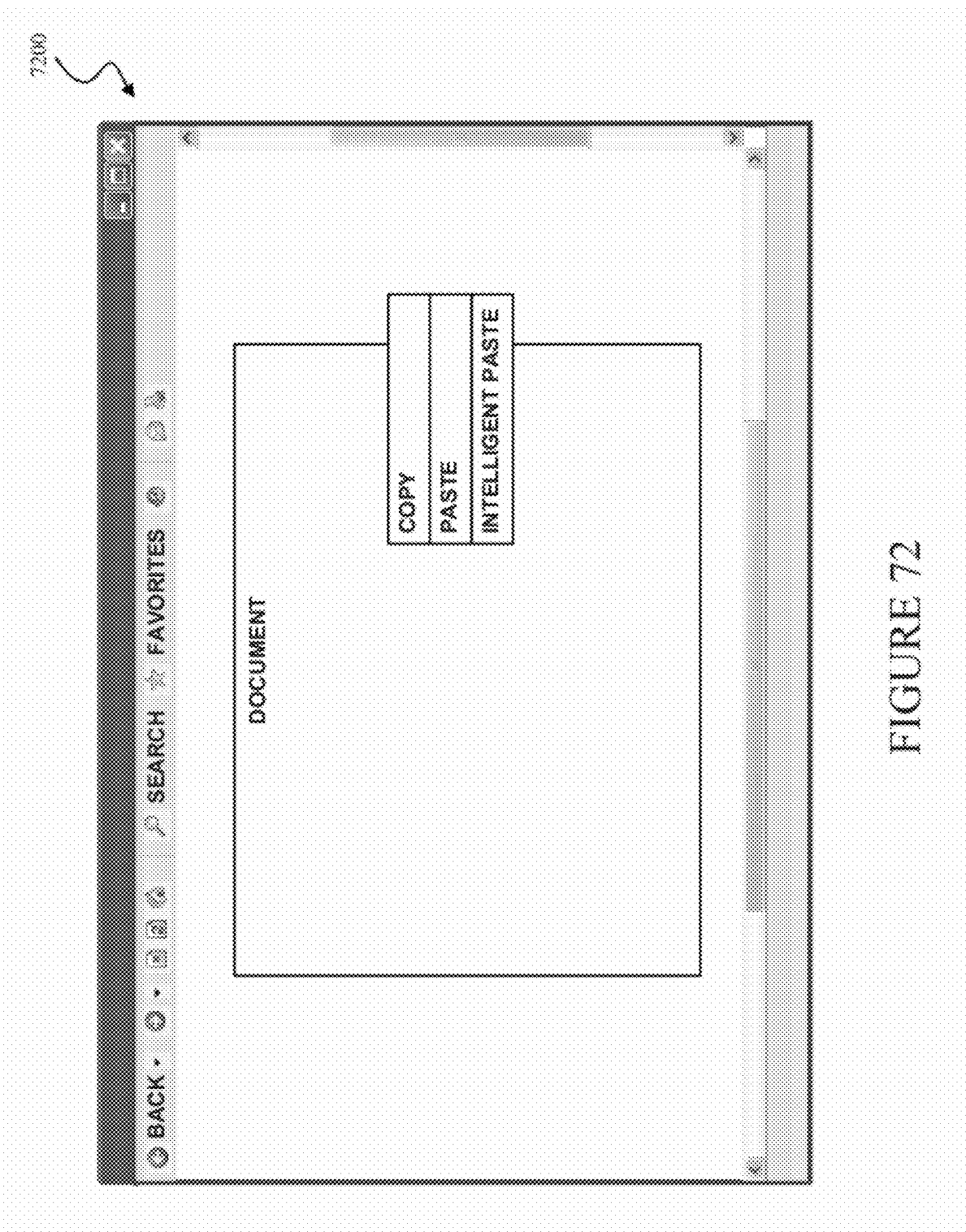
FIG. 72 shows an interface for intelligent cutting and pasting, in accordance with one embodiment.

FIG. 72 shows an interface 7200 for intelligent cutting and pasting, in accordance with one embodiment. As an option, the interface 7200 may be implemented in the context of the functionality and architecture of FIGS. 35-71. Of course, however, the interface 7200 may be implemented in any desired environment. It should also be noted that the aforementioned definitions may apply during the present description.

In operation, a cut or copy command with respect to data is received from the interface 7200. Additionally, a paste command with respect to the data is received from the interface 7200. Further, an additional operation is performed on the data, before the past command is executed.

In one embodiment, the additional operation may add or remove formatting to the data. In this case, the formatting may include text formatting, paragraph formatting, object formatting, picture formatting, and/or any other type of formatting. As an option, the additional operation may include converting a first formatting of the data to a second formatting.

In one embodiment, the second formatting may include a formatting of a destination associated with the paste command. In another embodiment, the additional operation may include performing an optical character recognition (OCR) on the data. In this case, the additional operation may include performing the optical character recognition on the data, such that the paste command results in parsed text being pasted into a document.

In one embodiment, the additional operation may be conditionally performed, based on a user instruction. In this case, the user instruction may include a right-click operation. In one case, a standard paste command may be distinguished from an intelligent paste command. Thus, it may be determined whether the paste command is an intelligent paste command.

In one embodiment, the additional operation may be performed if it is determined that the paste command is an intelligent paste command. In this case, it may be determined whether the paste command is an intelligent paste command, based on user input.

In one embodiment, the user may have an option to use a standard paste command or an intelligent paste command. In this case, the intelligent paste may be an optional preference under a settings menu. Thus, the user may select to apply the intelligent paste command indefinitely throughout a user session.

In another embodiment, the intelligent paste command may include spell check functionality. In this case, incorrect spelling of words copied may be remedied automatically upon invoking the paste command. As another option, the intelligent past command may include an option to paste using bullets. In this case, a user may paste copied text in a bullet format. The bullets may be divided in a variety of ways. For example, the bullets may be divided by carriage return, key word, periods, commas, or any other punctuation, etc. In one case, options for bullet division may be offered in a preferences or settings menu.

While various embodiments have been described above, it should be understood that they have been presented by way of example only, and not limitation. Thus, the breadth and scope of a preferred embodiment should not be limited by any of the above-described exemplary embodiments, but should be denned only in accordance with the following claims and their equivalents.

What is claimed is:

1. A computer program product embodied on a non-transitory computer readable medium, comprising:

computer code for registering a global unique user login information capable of being used to access a plurality of different online applications in association with an online application system, the different online applications including a first online application that provides access to a first one or more files stored at least one first server associated with the first online application, a second online application that provides access to a second one or more files stored at least one second server associated with the second online application, a third online application that provides access to a third one or more files stored at least one third server associated with the third online application, and a fourth online application that provides access to a fourth one or more files stored at least one fourth server associated with the fourth online application;

computer code for receiving the global unique user login information in connection with a login, in association with the online application system;

computer code for identifying at least one first online application identifier associated with the first online application for registration purposes, in association with the online application system;

computer code for identifying at least one second online application identifier associated with the second online application for registration purposes, in association with the online application system;

computer code for identifying at least one third online application identifier associated with the third online application for registration purposes, in association with the online application system;

computer code for identifying at least one fourth online application identifier associated with the fourth online application for registration purposes, in association with the online application system;

computer code for receiving an indication to add access to the first online application for registration purposes, in association with the online application system;

computer code for receiving an indication to add access to the second online application for registration purposes, in association with the online application system;

computer code for receiving an indication to add access to the third online application for registration purposes, in association with the online application system;

computer code for receiving an indication to add access to the fourth online application for registration purposes, in association with the online application system;

computer code for, in connection with the at least one first online application identifier associated with the first online application, allowing registration of the first online application by:
  utilizing data required for accessing the first online application, and
  receiving preference information associated with the first online application, in association with the online application system;

computer code for, in connection with the at least one second online application identifier associated with the second online application, allowing registration of the second online application by:
  utilizing data required for accessing the second online application, and
  receiving preference information associated with the second online application, in association with the online application system;

computer code for, in connection with the at least one third online application identifier associated with the third online application, allowing registration of the third online application by:
  utilizing data required for accessing the third online application, and
  receiving preference information associated with the third online application, in association with the online application system;

computer code for, in connection with the at least one fourth online application identifier associated with the fourth online application, allowing registration of the fourth online application by:
  utilizing data required for accessing the fourth online application, and
  receiving preference information associated with the fourth online application, in association with the online application system;

computer code for displaying the at least one first online application identifier associated with the first online application for access purposes, in association with the online application system;

computer code for displaying the at least one second online application identifier associated with the second online application for access purposes, in association with the online application system;

computer code for displaying the at least one third online application identifier associated with the third online application for access purposes, in association with the online application system;

computer code for displaying the at least one fourth online application identifier associated with the fourth online application for access purposes, in association with the online application system;

computer code for receiving a selection of the at least one first online application identifier associated with the first online application for access purposes, in association with the online application system;

computer code for receiving a selection of the at least one second online application identifier associated with the second online application for access purposes, in association with the online application system;

computer code for receiving a selection of the at least one third online application identifier associated with the third online application for access purposes, in association with the online application system;

computer code for receiving a selection of the at least one fourth online application identifier associated with the fourth online application for access purposes, in association with the online application system;

computer code for, in response to the selection of the at least one first online application identifier associated with the first online application for access purposes, managing at least one aspect of access to the first online application, utilizing the data required for accessing the first online application and the preference information associated with the first online application, in association with the online application system;

computer code for, in response to the selection of the at least one second online application identifier associated with the second online application for access purposes, managing at least one aspect of access to the second online application, utilizing the data required for accessing the second online application and the preference information associated with the second online application, in association with the online application system;

computer code for, in response to the selection of the at least one third online application identifier associated with the third online application for access purposes, managing at least one aspect of access to the third online application, utilizing the data required for accessing the third online application and the preference information associated with the third online application, in association with the online application system;

computer code for, in response to the selection of the at least one fourth online application identifier associated with the fourth online application for access purposes, managing at least one aspect of access to the fourth online application, utilizing the data required for accessing the fourth online application and the preference information associated with the fourth online application, in association with the online application system;

computer code for identifying a document, in association with the online application system;

computer code for receiving a request, in association with the online application system;

computer code for, in response to the request, displaying an interface for receiving an indication of one or more tags, the interface including:
at least one text box for receiving manually inserted tags, and
a list of potential tags from which a selection is capable of being made, in association with the online application system;

computer code for, utilizing the interface, receiving the indication of one or more tags, in association with the online application system;

computer code for correlating the one or more tags with the document, in association with the online application system;

computer code for receiving a selection of a plurality of contacts from a user that represents a subset of contacts, in association with the online application system;

computer code for identifying a current location of the user, in association with the online application system;

computer code for displaying a plurality of points-of-interest in association with the current location of the user, in association with the online application system;

computer code for receiving user input from the user identifying a particular point-of-interest, in association with the online application system;

computer code for identifying current locations of at least a portion of a plurality of contacts of the user, in association with the online application system;

computer code for identifying a status of the at least a portion of the plurality of contacts of the user, in association with the online application system;

computer code for displaying the status of the at least a portion of the plurality of contacts of the user, in association with the online application system;

computer code for displaying which of the at least a portion of the plurality of contacts of the user is at a same one of the plurality of points-of-interest as the user, in association with the online application system;

computer code for initiating communication between the user and at least one of the plurality of contacts of the user, in association with the online application system;

computer code for identifying a message to be communicated to at least one recipient, in association with the online application system;

computer code for selecting the user as the at least one recipient from a plurality of recipient candidates, based on a location associated with an originator of the message and the current location of the user, in association with the online application system; and computer code for displaying indicia for allowing the user to add at least one contact in association with a location-related functionality, in association with the online application system.

2. The computer program product of claim 1, wherein the message includes an instant message.

3. The computer program product of claim 1, wherein the message includes an e-mail.

4. The computer program product of claim 1, wherein the current location is determined utilizing a global positioning system carried by the recipient candidates.

5. The computer program product of claim 4, wherein the current location of each recipient candidate is received at a server, and the server selects the at least one recipient.

6. The computer program product of claim 1, wherein the recipient candidates are identified utilizing a contact database.

7. The computer program product of claim 1, wherein the at least one recipient is further selected from the plurality of recipient candidates, based on a current location of a sender of the message.

8. The computer program product of claim 7, wherein the at least one recipient is selected from the plurality of recipient candidates, if the current location of the sender of the message is within a predetermined distance of the current location of the recipient candidate.

9. The computer program product of claim 7, wherein the at least one recipient is selected from the plurality of recipient candidates, if a destination of the sender of the message is within a predetermined distance of the current location of the recipient candidate.

10. The computer program product of claim 1, further comprising computer code for displaying the selected user.

11. The computer program product of claim 10, wherein the message is sent to the at least one recipient, in response to a selection thereof by a sender of the message.

12. The computer program product of claim 1, wherein the computer code is a component of a vehicular assembly.

13. The computer program product of claim 12, wherein the vehicular assembly is operable to communicate with a mobile device.

14. The computer program product of claim 13, wherein the current location is received and the message is sent, utilizing a communication channel of the mobile device.

15. The computer program product of claim 12, wherein the current location of the recipient candidates are displayed via a display of the vehicular assembly.

16. The computer program product of claim 1, further comprising computer code for allowing the user to edit at least one setting corresponding to location updates for at least one of the plurality of contacts of the user.

17. The computer program product of claim 1, further comprising computer code for allowing the user to edit at least one setting corresponding to location updates.

18. The computer program product of claim 1, wherein at least one of the plurality of points-of-interest is customized by the user.

19. The computer program product of claim 1, wherein at least one of the plurality of points-of-interest is a custom point-of-interest.

20. The computer program product of claim 1, wherein the status of the plurality of contacts of the user includes a picture.

21. The computer program product of claim 1, further comprising computer code for indicating when the current location of the user is the same as the location of at least one of the plurality of contacts of the user.

22. The computer program product of claim 21, wherein the same location includes a location within a vehicle.

23. The computer program product of claim 1, wherein at least one of the plurality of points-of-interest include restaurants.

24. The computer program product of claim 1, further comprising computer code for displaying to the user the current locations of the at least a portion of the plurality of contacts of the user.

25. The computer program product of claim 1, wherein the computer program product is operable such that the user input includes a selection of the particular point-of-interest and the particular point-of-interest selection is communicated to at least one of the plurality of contacts.

26. The computer program product of claim 1, further comprising computer code for communicating a notification to at least one of the plurality of contacts in response to the user input.

27. The computer program product of claim 1, wherein the plurality of contacts includes social contacts.

28. The computer program product of claim 1, wherein the computer program product is operable such that the current location of the user is identified utilizing a mobile device.

29. The computer program product of claim 1, wherein the computer program product is operable such that information related to a past location of at least one of the plurality of contacts is displayed.

30. The computer program product of claim 1, wherein the computer program product is operable such that information related to a past location visit of at least one of the plurality of contacts is displayed.

31. The computer program product of claim 1, wherein the computer program product is operable such that information related to a message of at least one of the plurality of contacts is displayed.

32. The computer program product of claim 1, further comprising computer code for initiating communication between the user and at least one of the plurality of points-of-interest.

33. The computer program product of claim 1, further comprising computer code for providing a map between the user and at least one of the plurality of points-of-interest.

34. The computer program product of claim 1, wherein the computer program product is operable such that the current location of the user is received utilizing a vehicular assembly.

35. The computer program product of claim 1, wherein the at least one of the plurality of points-of-interest of the user includes a customized point-of-interest.

36. The computer program product of claim 1, wherein the at least one of the plurality of points-of-interest of the user includes a dynamic point-of-interest.

37. The computer program product of claim 1, wherein the computer code for displaying which of the at least a portion of the plurality of contacts of the user is at the same one of the plurality of points-of-interest displays the plurality of contacts in a list.

38. The computer program product of claim 1, wherein the computer code for displaying which of the at least a portion of the plurality of contacts of the user is at the same one of the plurality of points-of-interest displays the plurality of contacts in a map showing the same one of the plurality of points-of-interest.

39. The computer program product of claim 1, wherein the computer program product is operable such that at least one of the plurality of points-of-interest that are displayed are those that are between the current location of the user and the current location of at least one of the plurality of contacts.

40. The computer program product of claim 1, wherein the computer program product is operable such that the current location of the user is inputted manually.

41. The computer program product of claim 1, wherein the computer program product is operable such that the current location of the user is received automatically.

42. The computer program product of claim 1, wherein the computer program product is operable such that the current locations of the plurality of contacts include global positioning coordinates.

43. The computer program product of claim 1, wherein the computer program product is operable such that the at least a portion of the plurality of contacts of the user are displayed utilizing a list.

44. The computer program product of claim 1, wherein the plurality of contacts include dynamic data.

45. The computer program product of claim 1, wherein the computer program product is operable such that the at least a portion of the plurality of contacts of the user are displayed utilizing a map.

46. The computer program product of claim 1, wherein the status indicates an availability.

47. The computer program product of claim 1, wherein the status indicates an availability for communication.

48. The computer program product of claim 1, further comprising computer code for allowing communication of emails, text messages, and instant messages.

49. The computer program product of claim 1, further comprising computer code for receiving a request to access a digital entity associated with at least one of the different online applications.

50. The computer program product of claim 49, further comprising:
   computer code for identifying at least one profile in association with a request to access a digital entity; and
   computer code for presenting an advertisement in conjunction with the access of the digital entity, based on the at least one profile.

51. The computer program product of claim 50, wherein the at least one profile includes at least one user profile of an accessing user that initiated the request to access the digital entity.

52. The computer program product of claim 51, wherein the at least one user profile includes registration information determined when the accessing user registered.

53. The computer program product of claim 50, wherein the at least one profile includes at least one group profile.

54. The computer program product of claim 50, wherein the at least one profile is associated with a file.

55. The computer program product of claim 51, wherein the at least one user profile includes automatically determined information that is determined automatically based on user selections of the accessing user.

56. The computer program product of claim 55, wherein the computer program product is operable such that the automatically determined information includes Internet browsing of the accessing user.

57. The computer program product of claim 55, wherein the computer program product is operable such that the automatically determined information is determined automatically after registration based on tags selected by the accessing user.

58. The computer program product of claim 50, wherein the digital entity includes a file.

59. The computer program product of claim 50, wherein the at least one profile includes an aggregate of multiple profiles.

60. The computer program product of claim 50, wherein the digital entity includes a page.

61. The computer program product of claim 1, wherein the document includes a picture.

62. The computer program product of claim 1, wherein the computer program product is capable of cooperating with at least one mobile application adapted for accessing at least one of the different online applications utilizing a mobile device, said computer program product further being capable of allowing the at least one mobile application to provide at least a portion of a functionality of the at least one of the different online applications.

63. The computer program product of claim 62, wherein the computer program product is operable such that the portion of the functionality is performed by a client application separate from a network browser.

64. The computer program product of claim 62, wherein the computer program product is operable such that the portion of the functionality is performed by a network browser plugin installed on the mobile device.

65. The computer program product of claim 62, wherein the computer program product is operable such that the portion of the functionality includes responding to requests that would otherwise be provided by the server that serves the online application.

66. The computer program product of claim 62, wherein the computer program product is operable such that the portion of the functionality of the online application is provided by buffering requests of the user, and delaying sending the requests to the server that serves the online application.

67. The computer program product of claim 62, wherein the computer program product is operable such that the portion of the functionality includes buffering.

68. The computer program product of claim 62, wherein the computer program product is operable such that the portion of the functionality includes searching functionality.

69. The computer program product of claim 62, wherein the computer program product is operable such that the portion of the functionality includes user interface-related functionality.

70. The computer program product of claim 1, wherein the list of potential tags includes previously existing tags.

71. The computer program product of claim 1, wherein the list of potential tags includes recommended tags.

72. The computer program product of claim 1, wherein the computer program product is operable such that the receiving the request is from a logged-in user.

73. The computer program product of claim 1, wherein the data is different from the global user login information.

74. The computer program product of claim 1, wherein the data associated with the first online application is different from the data associated with the second online application.

75. The computer program product of claim 1, wherein the computer program product is operable such that the first online application identifier, the second online application identifier, the third online application identifier, and the fourth online application identifier are organized utilizing tabs.

76. The computer program product of claim 1, wherein the computer program product is operable such that the first online application identifier, the second online application identifier, the third online application identifier, and the fourth online application identifier are displayed utilizing a network browser.

77. The computer program product of claim 1, wherein the computer program product is operable such that the first online application identifier, the second online application identifier, the third online application identifier, and the fourth online application identifier are displayed utilizing a plugin.

78. The computer program product of claim 1, wherein the computer program product is operable such that the first online application identifier, the second online application identifier, the third online application identifier, and the fourth online application identifier are organized in vertically oriented tabs.

79. The computer program product of claim 1, wherein the computer program product is operable such that the first online application identifier, the second online application identifier, the third online application identifier, and the fourth online application identifier are organized in horizontally oriented tabs.

80. The computer program product of claim 1, wherein the computer program product is operable such that the preference information is derived based on internet browsing of the user.

81. The computer program product of claim 1, wherein the computer program product is operable such that the preference information is derived based on searches completed by the user.

82. The computer program product of claim 1, wherein the computer program product is operable such that the preference information is derived based on at least one page generated by the user.

83. The computer program product of claim 1, wherein the computer program product is operable such that the preference information is derived based on tags selected by the user.

84. The computer program product of claim 1, wherein the originator includes a sender of the message.

85. The computer program product of claim 1, and further comprising:
    computer code for receiving a request to access a digital entity associated with at least one of the different online applications;

computer code for identifying at least one profile in association with the request to access the digital entity, the at least one profile including:
at least one user profile of an accessing user that initiated a request to access the digital entity, the at least one user profile including:
registration information determined when the accessing user registered, and
automatically determined information that is determined automatically based on Internet browsing of the accessing user; and
at least one group profile; and
computer code for presenting an advertisement in conjunction with the access of the digital entity, based on the registration information and the automatically determined information of the at least one user profile, and the at least one group profile.

86. The computer program product of claim 85, wherein the at least one profile is associated with the digital entity.

87. The computer program product of claim 85, wherein the digital entity includes a file.

88. The computer program product of claim 85, wherein the at least one profile includes an aggregate of multiple profiles.

89. The computer program product of claim 85, wherein the digital entity includes a page.

90. The computer program product of claim 85, wherein the computer program product is operable such that the automatically determined information is determined automatically based on network browsing of the accessing user.

91. The computer program product of claim 85, wherein the computer program product is operable such that the automatically determined information is determined automatically after registration.

92. The computer program product of claim 85, wherein the computer program product is operable such that the preference information is derived based on internet browsing of the accessing user.

93. The computer program product of claim 85, wherein the computer program product is operable such that the preference information is derived based on searches completed by the accessing user.

94. The computer program product of claim 85, wherein the computer program product is operable such that the preference information is derived based on at least one page generated by the accessing user.

95. The computer program product of claim 85, wherein the preference information is derived based on tags selected by the accessing user.

96. The computer program product of claim 85, wherein the computer program product is capable of cooperating with at least one mobile application adapted for accessing at least one of the different online applications utilizing a mobile device, the computer program product further being capable of allowing the at least one mobile application to provide at least a portion of a functionality of the at least one of the different online applications.

97. The computer program product of claim 96, wherein the computer program product is operable such that the portion of the functionality is performed by client software separate from a network browser.

98. The computer program product of claim 96, wherein the computer program product is operable such that the portion of the functionality is performed by an application installed on the mobile device.

99. The computer program product of claim 96, wherein the computer program product is operable such that the portion of the functionality includes that which would otherwise be provided by a particular server associated with a corresponding online application.

100. The computer program product of claim 96, wherein the computer program product is operable such that the portion of the functionality includes responding to requests that would otherwise be provided by a particular server associated with a corresponding online application.

101. The computer program product of claim 96, wherein the computer program product is operable such that the portion of the functionality of the online application is provided by buffering requests of at least one user, and delaying sending the requests to a particular server that serves a corresponding online application.

102. The computer program product of claim 96, wherein the computer program product is operable such that the portion of the functionality includes buffering.

103. The computer program product of claim 96, wherein the computer program product is operable such that the portion of the functionality includes searching functionality.

104. The computer program product of claim 96, wherein the computer program product is operable such that the portion of the functionality includes user interface-related functionality.

105. The computer program product of claim 96, wherein the computer program product is operable such that the portion of the functionality includes a formatting functionality.

106. The computer program product of claim 85, wherein the computer program product is operable such that the digital entity includes the document.

107. The computer program product of claim 1, wherein the data required for accessing the first online application is different from the data required for accessing the second online application.

108. The computer program product of claim 1, wherein the document is a picture that is capable of being generated with an editor.

109. The computer program product of claim 1, wherein the computer program product is operable such that the first online application identifier, the second online application identifier, the third online application identifier, and the fourth online application identifier are organized utilizing separate icons.

110. The computer program product of claim 1, wherein the computer program product is operable such that the first online application identifier, the second online application identifier, the third online application identifier, and the fourth online application identifier are capable of being displayed utilizing a network browser.

111. The computer program product of claim 1, wherein the computer program product is operable such that the first online application identifier, the second online application identifier, the third online application identifier, and the fourth online application identifier are displayed utilizing a plug-in.

112. The computer program product of claim 1, wherein the computer program product is operable such that the first online application identifier, the second online application identifier, the third online application identifier, and the fourth online application identifier are organized in a vertically oriented manner.

113. The computer program product of claim 1, wherein the computer program product is operable such that the first online application identifier, the second online application identifier, the third online application identifier, and the fourth online application identifier are organized as horizontally-oriented indicia.

114. The computer program product of claim 1, wherein the data required for accessing the first online application includes first online application log-in information.

115. The computer program product of claim 1, wherein the data required for accessing the first online application includes the global unique user login information.

116. The computer program product of claim 1, wherein the computer program product is operable such that the data required for accessing the first online application is stored on at least one server.

117. The computer program product of claim 1, wherein the computer program product is operable such that the data required for accessing the first online application is utilized by being received.

118. The computer program product of claim 1, wherein the computer program product is operable such that the data required for accessing the first online application is utilized by being stored.

119. The computer program product of claim 1, wherein the computer program product is operable such that the at least one first online application identifier is identified by the user.

120. The computer program product of claim 1, wherein the computer program product is operable such that the at least one first online application identifier is identified by being displayed.

121. The computer program product of claim 1, wherein the computer program product is operable such that the at least one first online application identifier is identified by a provider other than the user.

122. The computer program product of claim 1, wherein the files include at least one of a word processor file type, a text file type, a PDF file type, a drawing file type, a spreadsheet file type, or a presentation file type.

123. The computer program product of claim 1, wherein the computer program product is operable such that the indication to add access to the first online application indicates that the at least one first online application identifier should be displayed at a predetermined location.

124. The computer program product of claim 123, wherein the predetermined location includes a desktop image.

125. The computer program product of claim 1, wherein the computer program product is operable such that the indication to add access to the first online application results in the at least one first online application identifier being displayed at a predetermined location.

126. The computer program product of claim 125, wherein the predetermined location includes a desktop image.

127. The computer program product of claim 1, wherein the computer program product is operable such that the interface is displayed in response to selection of a tag icon.

128. The computer program product of claim 1, wherein the computer program product is operable such that the global unique user login information is stored on a device of the user.

129. The computer program product of claim 1, wherein the global unique user login information includes a user identifier and a password.

130. The computer program product of claim 1, wherein the computer program product is operable such that the potential tags are generated based on previously existing tags associated with other documents.

131. The computer program product of claim 1, wherein the computer program product is operable such that the computer program product is capable of cooperating with at least one mobile application adapted for accessing at least one of the plurality of different online applications utilizing a mobile device.

132. The computer program product of claim 131, wherein the computer program product is operable such that the computer program product is capable of allowing the at least one mobile application to provide at least a portion of a functionality of the at least one of the plurality of different online applications.

133. The computer program product of claim 132, wherein the computer program product is operable such that the portion of the functionality is performed by a client application separate from a network browser.

134. The computer program product of claim 132, wherein the computer program product is operable such that the portion of the functionality is performed by a network browser plug-in installed on the mobile device.

135. The computer program product of claim 132, wherein the computer program product is operable such that the portion of the functionality is that which would otherwise be provided by a server associated with a corresponding online application.

136. The computer program product of claim 132, wherein the computer program product is operable such that the portion of the functionality includes responding to requests that would otherwise be handled by a server associated with a corresponding online application.

137. The computer program product of claim 1, and further comprising:
   computer code for receiving a request to access a page associated with at least one of the different online applications, the page including the document which is a picture;
   computer code for identifying at least one profile in association with the request to access the page, the at least one profile including:
      at least one user profile of an accessing user that initiated a request to access the page, the at least one user profile including:
         registration information determined when the accessing user registered, and
         automatically determined information that is determined automatically based on user selections of the accessing user; and
      at least one group profile; and
   computer code for presenting an advertisement in conjunction with the access of the page, based on the registration information and the automatically determined information of the at least one user profile, and the at least one group profile.

138. The computer program product of claim 1, and further comprising:
   computer code for displaying a search interface in connection with the online application system;
   computer code for performing a first search in connection with the online application system utilizing the search interface;
   computer code for displaying first search results associated with the first search;
   computer code for identifying at least one additional term by automatically suggesting a plurality of possible terms that are presented in a list;
   computer code for performing a second search in connection with the first search results, based on the at least one additional term; and
   computer code for displaying second search results of the second search.

139. The computer program product of claim 1, and further comprising:

computer code for receiving a request to access a page associated with at least one of the different online applications, the page including the document which is a picture;
computer code for identifying at least one profile in association with the request to access the page, the at least one profile including:
　at least one user profile of an accessing user that initiated a request to access the page, the at least one user profile including:
　　registration information determined when the accessing user registered, and
　　automatically determined information that is determined automatically based on user selections of the accessing user; and
　at least one group profile;
computer code for displaying a search interface in connection with the online application system, the search interface being displayed simultaneously with an advertisement that is selected based on the registration information and the automatically determined information of the at least one user profile, and the at least one group profile;
computer code for performing a first search in connection with the online application system utilizing the search interface;
computer code for displaying first search results associated with the first search;
computer code for identifying at least one additional term by automatically suggesting a plurality of possible terms that are presented in a list;
computer code for performing a second search, based on the at least one additional term; and
computer code for displaying second search results of the second search.

140. The computer program product of claim 1, wherein the computer program product is operable such that the potential tags are generated based on previously existing tags associated with the document.

141. The computer program product of claim 1, wherein the computer program product is operable such that the potential tags are generated based on a content of the document, and one or more previously existing tags associated with one or more other documents.

142. The computer program product of claim 1, wherein the computer program product is operable such that the potential tags are listed in an order that is a function of the document.

143. The computer program product of claim 1, wherein the computer program product is operable such that the potential tags are listed in an order that is a function of a relevancy to the document.

144. The computer program product of claim 1, wherein the list of potential tags includes suggested tags.

145. The computer program product of claim 1, wherein the computer program product is operable such that the correlated one or more tags are utilized in connection with a search for documents.

146. The computer program product of claim 1, wherein the computer program product is operable such that the correlated one or more tags are utilized in connection with a search for the document.

147. The computer program product of claim 1, wherein the computer program product is operable such that the correlated one or more tags are utilized in connection with a search, in association with a plurality of the different online applications.

148. The computer program product of claim 1, wherein the computer program product is operable such that multiple of the different online applications are capable of having associated login information for use in accessing user-specific information stored utilizing the multiple different online applications.

149. The computer program product of claim 148, wherein the user-specific information includes tags.

150. The computer program product of claim 148, wherein the user-specific information includes profile information.

151. The computer program product of claim 1, wherein the tags are listed in a drop down menu.

152. The computer program product of claim 1, wherein the first online application includes an online editor.

153. The computer program product of claim 1, wherein the at least one first online application identifier, the at least one second online application identifier, the at least one third online application identifier, and the at least one fourth online application identifier are displayed simultaneously during access of at least one of the first online application, the second online application, the third online application, or the fourth online application.

154. The computer program product of claim 1, wherein the computer program product is operable such that first information associated with the first online application is subject of a commenting function of the second online application.

155. The computer program product of claim 1, wherein the computer program product is operable such that first information associated with the first online application is subject of a publishing function of the second online application.

156. The computer program product of claim 1, wherein the computer program product is operable such that a picture associated with the first online application is subject of a commenting function of the second online application.

157. The computer program product of claim 1, wherein the computer program product is operable such that a picture associated with the first online application is subject of a publishing function of the second online application.

158. The computer program product of claim 1, wherein the computer program product is operable such that additional application identifiers are capable of being added.

159. The computer program product of claim 1, wherein the advertisement is displayed utilizing a web page.

160. The computer program product of claim 1, wherein the computer program product is operable such that the at least one first online application identifier, the at least one second online application identifier, the at least one third online application identifier, and the at least one fourth online application identifier are displayed simultaneously for access via an online application menu that is capable of being user-manipulated by adding and removing online application identifiers; wherein the computer program product is operable such that the computer program product is capable of cooperating with at least one mobile application adapted for accessing at least one of the plurality of different online applications utilizing a mobile device, and allowing the at least one mobile application to provide at least a portion of a functionality of the at least one of the plurality of different online applications; wherein the computer program product is operable such that the potential tags are generated based on previously existing tags; and the correlated one or more tags are capable of being utilized in connection with a search; wherein the computer program product is operable such that at least one of the different online applications is capable of accessing stored user-specific information including profile information; wherein the computer program product is operable such that first information associated with the first online application is subject of a commenting or publishing function of the second online application.

161. The computer program product of claim 1, wherein the computer program product is operable such that the at least one first online application identifier, the at least one second online application identifier, the at least one third online application identifier, and the at least one fourth online application identifier are displayed simultaneously for access via an online application menu that is capable of being user-manipulated by adding and removing online application identifiers.

162. The computer program product of claim 1, wherein the computer program product is operable such that a first document associated with the first online application which includes a word processor with tagging capabilities is capable of being subject of a commenting function of the second online application.

163. The computer program product of claim 1, wherein the computer program product is operable such that a first document associated with the first online application which includes a word processor with tagging capabilities is capable of being subject of a publishing function of the second online application.

164. The computer program product of claim 1, wherein the computer program product is operable such that a first document associated with the first online application is capable of being subject of a publishing function of the second online application while displaying the first document using the first online application, by selecting indicia representative of the publishing function of the second online application.

165. The computer program product of claim 1, wherein the computer program product is operable such that a first document associated with the first online application is capable of being subject of a publishing function of the second online application while displaying the first document using the first online application, by selecting indicia representative of the publishing function of the second online application, such that the publishing function is capable of being applied without sending data via a client.

166. The computer program product of claim 1, wherein the group profile includes profile of a user group.

167. The computer program product of claim 1, wherein the group profile includes profile of a user group associated with the file.

168. The computer program product of claim 1, wherein the group profile includes profile of a user group having a commonality.

169. The computer program product of claim 1, wherein the computer program product is operable such that the preference information associated with the first online application is capable of being entered via a registration interface dedicated to the first online application.

170. The computer program product of claim 1, wherein the computer program product is operable such that the at least one first online application identifier, the at least one second online application identifier, the at least one third online application identifier, and the at least one fourth online application identifier are displayed simultaneously for access thereto while viewing content associated with one of the different online applications.

171. The computer program product of claim 1, wherein the computer program product is operable such that the at least one first online application identifier, the at least one second online application identifier, the at least one third online application identifier, and the at least one fourth online application identifier are displayed simultaneously while viewing content associated with one of the different online applications, for access via an online application menu that is capable of being user-manipulated by moving, adding, and removing different online application identifiers.

172. The computer program product of claim 1, wherein the computer program product is operable such that a map interface is displayed including a map showing different locations of different contacts being represented thereon utilizing different indicia, where the computer program product is operable such that the map interface is capable of being utilized to cause communication with at least one of the different contacts.

173. The computer program product of claim 172, wherein the computer program product is operable such that the map interface is capable of being used to cause generation of driving directions to at least one of the different contacts.

174. The computer program product of claim 172, wherein the computer program product is operable such that the different locations are updated in at least near real-time.

175. The computer program product of claim 172, wherein the computer program product is operable such that the map interface is capable of being utilized to cause a single message to be communicated to a plurality of the different contacts.

176. The computer program product of claim 172, wherein the computer program product is operable such that the map interface is capable of being utilized to cause a single message to be communicated to a plurality of the different contacts based on a location of the different contacts.

177. The computer program product of claim 172, wherein the computer program product is operable such that the map interface is capable of being utilized to cause a single message to be communicated to a plurality of the different entities based on a location associated with the different entities.

178. The computer program product of claim 172, wherein the computer program product is operable such that the map interface is capable of being utilized to cause a single message to be communicated to a plurality of the different entities based on whether a location associated with the different entities is within a predetermined distance of a predetermined location.

179. The computer program product of claim 1, wherein the computer program product is operable such that the subset of contacts includes a social contact group.

180. The computer program product of claim 1, wherein the computer program product is operable such that the user is capable of initiating a calendar-related message based on a location-related status of the user in connection with a calendar-related event.

181. A method, comprising:
  registering, utilizing at least one predetermined server, a global unique user login information capable of being used to access a plurality of different online applications in association with an online application system, the different online applications including a first online application that provides access to a first one or more files stored at least one first server associated with the first online application, a second online application that provides access to a second one or more files stored at least one second server associated with the second online application, a third online application that provides access to a third one or more files stored at least one third server associated with the third online application, and a fourth online application that provides access to a fourth one or more files stored at least one fourth server associated with the fourth online application;
receiving the global unique user login information in connection with a login, in association with the online application system;
identifying at least one first online application identifier associated with the first online application for registration purposes, in association with the online application system;
identifying at least one second online application identifier associated with the second online application for registration purposes, in association with the online application system;
identifying at least one third online application identifier associated with the third online application for registration purposes, in association with the online application system;
identifying at least one fourth online application identifier associated with the fourth online application for registration purposes, in association with the online application system;
receiving an indication to add access to the first online application for registration purposes, in association with the online application system;
receiving an indication to add access to the second online application for registration purposes, in association with the online application system;
receiving an indication to add access to the third online application for registration purposes, in association with the online application system;
receiving an indication to add access to the fourth online application for registration purposes, in association with the online application system;
in connection with the at least one first online application identifier associated with the first online application, allowing registration of the first online application by:
 utilizing data required for accessing the first online application, and
 receiving preference information associated with the first online application, in association with the online application system;
in connection with the at least one second online application identifier associated with the second online application, allowing registration of the second online application by:
 utilizing data required for accessing the second online application, and
 receiving preference information associated with the second online application, in association with the online application system;
in connection with the at least one third online application identifier associated with the third online application, allowing registration of the third online application by:
 utilizing data required for accessing the third online application, and
 receiving preference information associated with the third online application, in association with the online application system;
in connection with the at least one fourth online application identifier associated with the fourth online application, allowing registration of the fourth online application by:
 utilizing data required for accessing the fourth online application, and
 receiving preference information associated with the fourth online application, in association with the online application system;
displaying the at least one first online application identifier associated with the first online application for access purposes, in association with the online application system;
displaying the at least one second online application identifier associated with the second online application for access purposes, in association with the online application system;
displaying the at least one third online application identifier associated with the third online application for access purposes, in association with the online application system;
displaying the at least one fourth online application identifier associated with the fourth online application for access purposes, in association with the online application system;
receiving a selection of the at least one first online application identifier associated with the first online application for access purposes, in association with the online application system;
receiving a selection of the at least one second online application identifier associated with the second online application for access purposes, in association with the online application system;
receiving a selection of the at least one third online application identifier associated with the third online application for access purposes, in association with the online application system;
receiving a selection of the at least one fourth online application identifier associated with the fourth online application for access purposes, in association with the online application system;
in response to the selection of the at least one first online application identifier associated with the first online application for access purposes, managing at least one aspect of access to the first online application, utilizing the data required for accessing the first online application and the preference information associated with the first online application, in association with the online application system;
in response to the selection of the at least one second online application identifier associated with the second online application for access purposes, managing at least one aspect of access to the second online application, utilizing the data required for accessing the second online application and the preference information associated with the second online application, in association with the online application system;
in response to the selection of the at least one third online application identifier associated with the third online application for access purposes, managing at least one aspect of access to the third online application, utilizing the data required for accessing the third online application and the preference information associated with the third online application, in association with the online application system;
in response to the selection of the at least one fourth online application identifier associated with the fourth online application for access purposes, managing at least one aspect of access to the fourth online application, utilizing the data required for accessing the fourth online application and the preference information associated with the fourth online application, in association with the online application system;
identifying a document, in association with the first online application of the online application system;

receiving a request, in association with the first online application of the online application system;

in response to the request, displaying an interface for receiving an indication of one or more tags, the interface including:
at least one text box for receiving manually inserted tags, and
a list of potential tags from which a selection is capable of being made, in association with the first online application of the online application system;

utilizing the interface, receiving the indication of one or more tags in association with the first online application of the online application system;

correlating the one or more tags with the document, in association with the first online application of the online application system;

receiving a selection of a plurality of contacts from a user that represents a subset of contacts, in association with the first online application of the online application system;

identifying a current location of the user, in association with the first online application of the online application system;

displaying a plurality of points-of-interest in association with the current location of the user, in association with the first online application of the online application system;

receiving user input from the user identifying a particular point-of-interest, in association with the first online application of the online application system;

identifying current locations of at least a portion of a plurality of contacts of the user, in association with the first online application of the online application system;

identifying a status of the at least a portion of the plurality of contacts of the user, in association with the first online application of the online application system;

displaying the status of the at least a portion of the plurality of contacts of the user, in association with the first online application of the online application system;

displaying which of the at least a portion of the plurality of contacts of the user is at a same one of the plurality of points-of-interest as the user, in association with the first online application of the online application system;

initiating communication between the user and at least one of the plurality of contacts of the user, in association with the first online application of the online application system;

identifying a message to be communicated to at least one recipient, in association with the first online application of the online application system;

selecting the user as the at least one recipient from a plurality of recipient candidates, based on a particular location associated with an originator of the message and a particular location corresponding to the user, in association with the first online application of the online application system; and displaying indicia for allowing the user to add at least one contact in association with a location-related functionality, in association with the first online application of the online application system.

182. A computer program product embodied on a non-transitory computer readable medium, comprising:

computer code for registering a global unique user login information capable of being used to access a plurality of different online applications in association with an online application system, the different online applications including a first online application that provides access to a first one or more files stored at least one first server associated with the first online application, a second online application that provides access to a second one or more files stored at least one second server associated with the second online application, a third online application that provides access to a third one or more files stored at least one third server associated with the third online application, and a fourth online application that provides access to a fourth one or more files stored at least one fourth server associated with the fourth online application;

computer code for receiving the global unique user login information in connection with a login, in association with the online application system;

computer code for identifying at least one first online application identifier associated with the first online application for registration purposes, in association with the online application system;

computer code for identifying at least one second online application identifier associated with the second online application for registration purposes, in association with the online application system;

computer code for identifying at least one third online application identifier associated with the third online application for registration purposes, in association with the online application system;

computer code for identifying at least one fourth online application identifier associated with the fourth online application for registration purposes, in association with the online application system;

computer code for receiving an indication to add access to the first online application for registration purposes, in association with the online application system;

computer code for receiving an indication to add access to the second online application for registration purposes, in association with the online application system;

computer code for receiving an indication to add access to the third online application for registration purposes, in association with the online application system;

computer code for receiving an indication to add access to the fourth online application for registration purposes, in association with the online application system;

computer code for, in connection with the at least one first online application identifier associated with the first online application, allowing registration of the first online application by:
utilizing data required for accessing the first online application, and
receiving preference information associated with the first online application, in association with the online application system;

computer code for, in connection with the at least one second online application identifier associated with the second online application, allowing registration of the second online application by:
utilizing data required for accessing the second online application, and
receiving preference information associated with the second online application, in association with the online application system;

computer code for, in connection with the at least one third online application identifier associated with the third online application, allowing registration of the third online application by:
utilizing data required for accessing the third online application, and receiving preference information associated with the third online application, in association with the online application system;

computer code for, in connection with the at least one fourth online application identifier associated with the fourth online application, allowing registration of the fourth online application by:
  utilizing data required for accessing the fourth online application, and
  receiving preference information associated with the fourth online application, in association with the online application system;

computer code for displaying the at least one first online application identifier associated with the first online application for access purposes, in association with the online application system;

computer code for displaying the at least one second online application identifier associated with the second online application for access purposes, in association with the online application system;

computer code for displaying the at least one third online application identifier associated with the third online application for access purposes, in association with the online application system;

computer code for displaying the at least one fourth online application identifier associated with the fourth online application for access purposes, in association with the online application system;

computer code for receiving a selection of the at least one first online application identifier associated with the first online application for access purposes, in association with the online application system;

computer code for receiving a selection of the at least one second online application identifier associated with the second online application for access purposes, in association with the online application system;

computer code for receiving a selection of the at least one third online application identifier associated with the third online application for access purposes, in association with the online application system;

computer code for receiving a selection of the at least one fourth online application identifier associated with the fourth online application for access purposes, in association with the online application system;

computer code for, in response to the selection of the at least one first online application identifier associated with the first online application for access purposes, managing at least one aspect of access to the first online application, utilizing the data required for accessing the first online application and the preference information associated with the first online application, in association with the online application system;

computer code for, in response to the selection of the at least one second online application identifier associated with the second online application for access purposes, managing at least one aspect of access to the second online application, utilizing the data required for accessing the second online application and the preference information associated with the second online application, in association with the online application system;

computer code for, in response to the selection of the at least one third online application identifier associated with the third online application for access purposes, managing at least one aspect of access to the third online application, utilizing the data required for accessing the third online application and the preference information associated with the third online application, in association with the online application system;

computer code for, in response to the selection of the at least one fourth online application identifier associated with the fourth online application for access purposes, managing at least one aspect of access to the fourth online application, utilizing the data required for accessing the fourth online application and the preference information associated with the fourth online application, in association with the online application system;

computer code for identifying a document, in association with the online application system;

computer code for receiving a request, in association with the online application system;

computer code for, in response to the request, displaying an interface for receiving an indication of one or more tags, the interface including:
  at least one text box for receiving manually inserted tags, and
  a list of potential tags from which a selection is capable of being made, in association with the online application system;

computer code for, utilizing the interface, receiving the indication of one or more tags, in association with the online application system;

computer code for correlating the one or more tags with the document, in association with the online application system;

computer code for receiving a selection of a plurality of contacts from a user that represents a subset of contacts, in association with the online application system;

computer code for identifying a current location of the user, in association with the online application system;

computer code for displaying a plurality of points-of-interest in association with the current location of the user, in association with the online application system;

computer code for receiving user input from the user identifying a particular point-of-interest, in association with the online application system;

computer code for identifying current locations of at least a portion of a plurality of contacts of the user, in association with the online application system;

computer code for identifying a status of the at least a portion of the plurality of contacts of the user, in association with the online application system;

computer code for displaying the status of the at least a portion of the plurality of contacts of the user, in association with the online application system;

computer code for displaying an indication as to which of the at least a portion of the plurality of contacts of the user is at a same one of the plurality of points-of-interest as the user, in association with the online application system;

computer code for initiating communication between the user and at least one of the plurality of contacts of the user, in association with the online application system;

computer code for communicating a message to at least one recipient, in association with the online application system;

computer code for selecting the user as the at least one recipient from a plurality of recipient candidates, based on a particular location of an entity associated with the message and a particular location associated with the user, in association with the online application system; and computer code for displaying indicia for allowing the user to involve at least one contact in association with a location-related functionality, in association with the online application system.

183. The computer program product of claim 182, wherein the indicia includes an icon.

184. The computer program product of claim 182, wherein the particular point-of-interest includes a meeting point.

185. The computer program product of claim 182, wherein the subset of contacts include social contacts.

186. The computer program product of claim 182, wherein the at least a portion of the plurality of contacts of the user includes social contacts.

187. The computer program product of claim 182, wherein the involvement of the at least one contact in association with the location-related functionality includes a location indication in connection with the at least one contact.

188. The computer program product of claim 182, wherein the entity includes a sender of the message.

189. The computer program product of claim 182, wherein the entity includes a person.

190. The computer program product of claim 182, wherein the computer program product is capable of cooperating with at least one mobile application adapted for accessing at least one of the different online applications utilizing a mobile device, said computer program product further being capable of allowing the at least one mobile application to provide a functionality in connection with the at least one of the different online applications; and further comprising:

computer code for identifying at least one profile in association with a request to access a digital entity, in association with the online application system, the at least one profile including:
  at least one user profile of an accessing user that initiated a request to access the digital entity, the at least one user profile including:
    registration information determined when the accessing user registered, and
    automatically determined information that is determined automatically based on user selections of the accessing user; and
  at least one group profile; and computer code for presenting an advertisement in conjunction with the access of the digital entity, in association with the online application system, based on the registration information and the automatically determined information of the at least one user profile, and the at least one group profile.

* * * * *